United States Patent
Cherinko et al.

(10) Patent No.: US 10,385,289 B2
(45) Date of Patent: Aug. 20, 2019

(54) EXTRACTION OF LIPID FROM CELLS AND PRODUCTS THEREFROM

(71) Applicant: DSM IP Assets B.V., Heerlen (NL)

(72) Inventors: Stephen Robert Cherinko, Georgetown, SC (US); Robert Cody Kertis, Timmonsville, SC (US); Kirk E. Apt, Ellicott City, MD (US); Paul Warren Behrens, Ellicott City, MD (US); Jon Milton Hansen, Ellicott City, MD (US); Joseph W. Pfeifer, III, Westminster, MD (US); Tracey Lynn Stahl, Pasadena, MD (US); Ross Zirkle, Mt. Airy, MD (US); Nasrin Tabayehnejad, Lexington, KY (US); Krishna Raman, Wilmington, DE (US); Neil Francis Leininger, Winchester, KS (US)

(73) Assignee: DSM IP Assets B.V., TE Heerlen (NL)

( * ) Notice: Subject to any disclaimer, the term of this patent is extended or adjusted under 35 U.S.C. 154(b) by 0 days.

(21) Appl. No.: 15/875,733

(22) Filed: Jan. 19, 2018

(65) Prior Publication Data
US 2018/0142183 A1    May 24, 2018

Related U.S. Application Data

(62) Division of application No. 13/151,014, filed on Jun. 1, 2011.

(Continued)

(51) Int. Cl.
*C11B 1/10*    (2006.01)
*C11B 3/02*    (2006.01)
*C11B 3/16*    (2006.01)

(52) U.S. Cl.
CPC .............. *C11B 1/10* (2013.01); *C11B 3/02* (2013.01); *C11B 3/16* (2013.01); *Y02E 50/16* (2013.01)

(58) Field of Classification Search
CPC ............... C11B 1/10; C11B 3/02; C11B 3/16
(Continued)

(56) References Cited

U.S. PATENT DOCUMENTS 3,878,232 A    4/1975 Hayes et al.
5,173,409 A    12/1992 English
(Continued)

FOREIGN PATENT DOCUMENTS

CN    1447860 A    10/2003
JP    2000245492 A2    9/2000
(Continued)

OTHER PUBLICATIONS

ATCC, ATCC 20891, 20891, 2018, http://www.atcc.org/products/all/20891.aspx.
(Continued)

*Primary Examiner* — Deborah D Carr
(74) *Attorney, Agent, or Firm* — Shannon McGarrah; Xi Chen

(57) ABSTRACT

The present invention relates to processes for obtaining a lipid from a cell by lysing the cell, contacting the cell with a base and/or salt, and separating the lipid. The present invention is also directed to a lipid prepared by the processes of the present invention. The present invention is also directed to microbial lipids having a particular anisidine value, peroxide value, and/or phosphorus content.

30 Claims, 5 Drawing Sheets

Related U.S. Application Data

Figure 1:
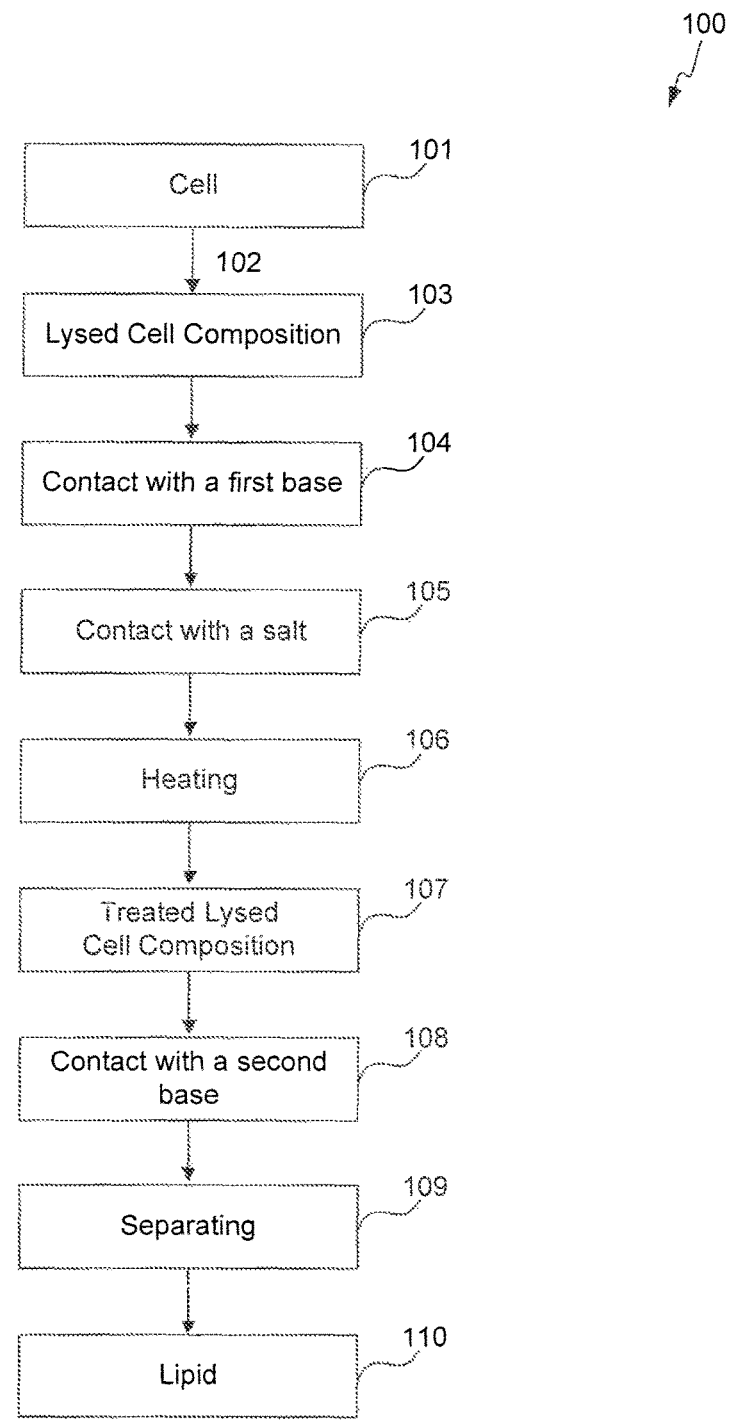

(60) Provisional application No. 61/452,721, filed on Mar. 15, 2011, provisional application No. 61/378,923, filed on Aug. 31, 2010, provisional application No. 61/350,363, filed on Jun. 1, 2010.

(58) Field of Classification Search
 USPC .................................. 554/8, 227; 435/134
 See application file for complete search history.

(56) References Cited

U.S. PATENT DOCUMENTS

| | | | |
|---|---|---|---|
| 5,683,740 | A | 11/1997 | Voultoury et al. |
| 6,447,782 | B1 | 9/2002 | Viron et al. |
| 8,207,363 | B2 | 6/2012 | Apt et al. |
| 9,738,851 | B2 | 8/2017 | Ruecker et al. |
| 2003/0060509 | A1 | 3/2003 | Elswyk |
| 2005/0239199 | A1 | 10/2005 | Kunas et al. |
| 2006/0099693 | A1* | 5/2006 | Kobzeff .................. A23D 9/00 435/134 |

FOREIGN PATENT DOCUMENTS

| | | |
|---|---|---|
| JP | 2008541779 12 | 11/2008 |
| JP | 2010500296 T2 | 1/2010 |
| JP | 2013099365 A2 | 5/2013 |
| JP | 2013532964 T2 | 8/2013 |
| WO | WO2012062962 A1 | 5/2012 |
| WO | WO2012164211 A1 | 12/2012 |

OTHER PUBLICATIONS

Liang et al., Enzyme-Assisted Aqueous Extraction of Lipid from Microalgae, Journal of Agricultural and Food Chemistry, 2012, 11771-6, 60(47).

Mankowich et al., Coating and Chemical Laboratory, CCL Report No. 137, 1963, 1-26.

Ratledge et al., Down-stream processing, extraction, and purification of single cell oils, Single Cell Oils, 2005, 202-219, Chapter 13.

Xia et al., Chemical Abstracts 2009, Preparation of virgin coconut oil by cellulase hydrolysis, 2009.

Grenville et al, Mixing: Impeller Performance in Stirred Tanks, Chemical Engineering, Aug. 2017, 42-51, US.

Particles Sciences 2009, Emulsions and Emulsification, Particles Sciences, 2009, 1-2, 9, US.

Cooney et al., Extraction of Bio-oils from Microalgae, Separation & Purification Reviews, 2009, 291-325, 38(4).

Milledge et al., A Review of the Harvesting of Micro-Algae for Biofuel Productio, Reviews in Environmental Science and Biotechnology, 2013, 165-78, 12(2).

\* cited by examiner

EXTRACTION OF LIPID FROM CELLS AND PRODUCTS THEREFROM

CROSS REFERENCE TO RELATED APPLICATIONS

The present application is a divisional of U.S. application Ser. No. 13/151,014 filed Jun. 1, 2011 which claims the benefit of U.S. Application No. 61/350,363, filed on Jun. 1, 2010, U.S. Application No. 61/378,923, filed Aug. 31, 2010, and U.S. Application No. 61/452,721, filed Mar. 15, 2011, each of which is hereby incorporated by reference in its entirety.

BACKGROUND OF THE INVENTION

Field of the Invention

The present invention relates to processes for obtaining a lipid from a cell by lysing the cell, raising a pH of the cell and/or contacting the cell with a salt, and separating the lipid. The present invention is also directed to lipids prepared by the processes of the present invention. The present invention is also directed to microbial lipids having a particular anisidine value, peroxide value, and/or phosphorus content.

Background Art

A typical process for obtaining lipids from a microbial cell, such as polyunsaturated fatty acids, involves growing microorganisms that are capable of producing the desired lipid in a fermentor, pond or bioreactor, separating the fermentation broth comprising a microbial cell biomass, drying the microbial cell biomass, and separating the lipids by solvent extraction. Steps in the separation can include diluting a fermentation broth with water, centrifuging the diluted broth, lysing the microbial cells, and extracting an intracellular lipid from the lysed cells by adding a water-immiscible solvent to the mixture in which the lipid is soluble, e.g., hexane.

Another method of extraction to remove a lipid from a microbial cell is lysing a cell in a fermentation broth using mechanical force (e.g., homogenization), enzymatic treatment, or chemical treatment to disrupt the cell walls. Lipid can be extracted from the resulting composition comprising lipids, microbial cell biomass, and water using an organic solvent, e.g., isopropyl alcohol. The lipid can be separated mechanically from the composition and the alcohol must be removed from both the lipid and the aqueous biomass waste stream. See, e.g., International Pub. Nos. WO 01/76385 and WO 01/76715.

However, industrial scale production of lipids using either of the above processes requires a large amount of volatile and flammable organic solvent, thereby creating hazardous operating conditions. The use of organic solvents in the extraction process can also necessitate using an explosion-proof lipid recovery system, thereby adding to the cost of lipid recovery. Moreover, use of an organic solvent in extracting lipid from a microbial cell can generate an organic solvent waste stream that requires a complete solvent recovery system or a proper method of disposal, which further increases the overall production cost of lipid extraction. For example, strict limits on volatile organic compound (VOC) emissions require greater manpower and added cost to vessels and other equipment.

Therefore, there is a need for a process for obtaining lipids from a cell which does not use an organic solvent. Several processes have been proposed for separating a lipid from a cell without the use of an organic solvent. For example, U.S. Pat. No. 6,750,048 discloses an aqueous washing process whereby an emulsion is washed with aqueous washing solutions until a substantially non-emulsified lipid is obtained. However, in some embodiments, this process requires multiple washing steps, which require substantial cost and time. U.S. Pat. No. 7,431,952 discloses a process whereby lysed cells are centrifuged to remove cell wall debris and then oils are extracted and purified. However, this process provides a crude oil that requires extensive further purification. Thus, what is needed is a process that does not utilize a volatile solvent to extract a lipid from a cell, and which can be performed using readily available equipment and a minimum number of steps to provide a highly pure lipid.

BRIEF SUMMARY OF THE INVENTION

The present invention is directed to a process for obtaining a lipid from a microbial cell composition, the process comprising raising the pH of the cell composition to 8 or above, and separating a lipid from the cell composition, wherein the lipid optionally contains less than 5% by weight or volume of an organic solvent.

In some embodiments, the raising the pH lyses the cell composition. In some embodiments, the raising the pH demulsifies the cell composition.

In some embodiments, the process comprises adding a salt to the cell composition to demulsify the cell composition. In some embodiments, the adding a salt is performed after the raising the pH.

In some embodiments, the process further comprises heating the lysed cell composition to demulsify the cell composition. In some embodiments, the heating is performed after the raising the pH.

In some embodiments, the process further comprises raising the pH of the cell composition a second time to demulsify the cell composition. In some embodiments, the raising the pH a second time is performed after the adding a salt or the heating.

The present invention is also directed to a process for obtaining a lipid from a cell, the process comprising lysing a cell to form a lysed cell composition, raising the pH of the lysed cell composition to 8 or above to demulsify the cell composition, adding a salt to the lysed cell composition to demulsify the cell composition, and separating a lipid from the demulsified cell composition, wherein the lipid optionally contains less than 5% by weight or volume of an organic solvent.

The present invention is directed to a process for obtaining a lipid from a cell composition, the process comprising raising the pH of the cell composition to 8 or above to lyse the cell composition and demulsify the cell composition, adding a salt to the cell composition, and separating a lipid from the demulsified cell composition, wherein the lipid optionally contains less than 5% by weight or volume of an organic solvent.

The present invention is also directed to a process for obtaining a lipid from a cell, the process comprising lysing a cell to form a lysed cell composition, agitating the cell composition to demulsify the cell composition, and separating a lipid from the demulsified cell composition, wherein the lipid optionally contains less than 5% by weight or volume of an organic solvent.

In some embodiments, the process further comprises heating the lysed cell composition to demulsify the cell composition. In some embodiments, the heating is performed after the adding a salt.

In some embodiments, the process further comprises agitating the lysed cell composition to demulsify the cell composition. In some embodiments, the agitating is for 5 minutes to 96 hours.

In some embodiments, the agitating comprises agitating the cell composition with an impeller having a tip speed of 350 centimeters per second to 900 centimeters per second.

In some embodiments, the process further comprises raising the pH of the lysed cell composition to demulsify the cell composition. In some embodiments, raising the pH of the lysed cell composition to demulsify the cell composition comprises adding a base. In some embodiments, a second base is added after the adding of a salt or the heating.

In some embodiments, the heating is for 10 minutes to 96 hours.

In some embodiments, the cell composition is heated to a temperature of 60° C. to 100° C. In some embodiments, the cell composition is heated to a temperature of 90° C. to 100° C.

In some embodiments, raising the pH comprises adding a base. In some embodiments, the base has a $pK_b$ of 1 to 12.

In some embodiments, the separating a lipid occurs at a temperature of 10° C. to 100° C.

In some embodiments, the process comprises agitating the lysed cell composition by stirring, mixing, blending, shaking, vibrating, or a combination thereof. In some embodiments, the process comprises agitating the lysed cell composition at 0.1 hp/1000 gal to 10 hp/1000 gal of lysed cell composition. In some embodiments, the process comprises agitating the lysed cell composition with an agitator having an impeller tip speed of 200 ft/min to 1,000 ft/min.

In some embodiments, the lysing comprises mechanical treatment, physical treatment, chemical treatment, enzymatic treatment, or a combination thereof. In some embodiments, the mechanical treatment is homogenization.

In some embodiments, the salt is added in an amount of 0.1% to 20% by weight of the lysed cell composition. In some embodiments, the salt is added to the lysed cell composition in an amount of 0.5% to 15% by weight of the lysed cell composition. In some embodiments, the salt is added to the lysed cell composition in an amount of 2% to 10% by weight of the lysed cell composition.

In some embodiments, the salt is selected from the group consisting of: alkali metal salts, alkali earth metal salts, sulfate salts, and combinations thereof. In some embodiments, the salt is sodium chloride. In some embodiments, the salt is sodium sulfate.

In some embodiments, the separating comprises centrifuging. In some embodiments, the separating comprises centrifuging at a temperature of 30° C. to 90° C.

In some embodiments, the process provides a lipid comprising at least 50% by weight triglyceride.

In some embodiments, the process provides a lipid having an anisidine value of 26 or less, 25 or less, 20 or less, 15 or less, 10 or less, 5 or less, 2 or less, or 1 or less.

In some embodiments, the process provides a lipid having a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less.

In some embodiments, the process provides a lipid having a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less.

In some embodiments, the process provides a lipid having at least 10%, at least 15%, at least 20%, at least 25%, at least 30%, at least 35%, at least 40%, at least 45%, or at least 50% by weight of a desired polyunsaturated fatty acid (PUFA). In some embodiments, the process provides a lipid having at least 10%, at least 15%, at least 20%, at least 25%, at least 30%, at least 35%, at least 40%, at least 45%, or at least 50% by weight of docosahexaenoic acid ("DHA"), and/or at least 10%, at least 15%, or at least 20% by weight of docosapentaenoic acid ("DPA n-6"), and/or at least 10%, at least 15%, or at least 20% by weight of eicosapentaenoic acid ("EPA"), and/or at least 10%, at least 15%, at least 20%, at least 25%, at least 30%, at least 35%, at least 40%, at least 45%, or at least 50% by weight of arachidonic acid ("ARA").

In some embodiments, the cell is a microbial cell. In some embodiments, the process comprises concentrating a fermentation broth comprising the microbial cell.

In some embodiments, the cell is an oilseed. In some embodiments, the oilseed is selected from the group consisting of sunflower seeds, canola seeds, rapeseeds, linseeds, castor oil seeds, coriander seeds, calendula seeds, and genetically modified variants thereof.

In some embodiments, the process comprises washing the cell or cell composition.

In some embodiments, the process comprises pasteurizing the cell or cell composition.

In some embodiments, the process comprises concentrating the lysed cell composition.

In some embodiments, the process comprises refining the lipid. In some embodiments, the refining is selected from the group consisting of: caustic refining, degumming, acid treatment, alkali treatment, cooling, heating, bleaching, deodorizing, deacidification, and combinations thereof.

In some embodiments, the process comprises harvesting the lipid, wherein the harvesting comprises pumping the lipid without agitation.

The present invention is also directed to a lipid obtained by any of the processes of the present invention.

In some embodiments, the lipid comprises one or more polyunsaturated fatty acids. In some embodiments, the lipid has at least 10%, at least 15%, at least 20%, at least 25%, at least 30%, at least 35%, at least 40%, at least 45%, or at least 50% by weight of a desired PUFA. In some embodiments, the lipid has at least 10%, at least 15%, at least 20%, at least 25%, at least 30%, at least 35%, at least 40%, at least 45%, or at least 50% by weight of DHA, and/or at least 10%, at least 15%, or at least 20% by weight of DPA n-6, and/or at least 10%, at least 15%, or at least 20% by weight of EPA, and/or at least 10%, at least 15%, at least 20%, at least 25%, at least 30%, at least 35%, at least 40%, at least 45%, or at least 50% by weight of ARA.

In some embodiments, the lipid has an overall aroma intensity of 3 or less. In some embodiments, the lipid has an overall aromatic intensity of 2 or less.

In some embodiments, the lipid comprises a triacylglycerol fraction of at least 10% by weight, wherein at least 12% by weight of the fatty acids in the triacylglycerol fraction is eicosapentaenoic acid, wherein at least 25% by weight of the fatty acids in the triacylglycerol fraction is docosahexaenoic acid, and wherein less than 5% by weight of the fatty acids in the triacylglycerol fraction is arachidonic acid.

In some embodiments, the lipid comprises at least 20% by weight eicosapentaenoic acid and less than 5% by weight each of arachidonic acid, docosapentaenoic acid n-6, oleic acid, linoleic acid, linolenic acid, eicosenoic acid, erucic acid, and stearidonic acid.

In some embodiments, the lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or Less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less.

In some embodiments, the lipid is a crude lipid. In some embodiments, the crude lipid optionally has less than 5% by weight or volume of an organic solvent.

The present invention is also directed to a crude microbial lipid having an anisidine value of 26 or less, a peroxide value of 5 or less, a phosphorus content of 100 ppm or less, and optionally less than 5% by weight or volume of an organic solvent.

In some embodiments, the crude microbial lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less.

In some embodiments, the crude microbial lipid has at least 10%, at least 15%, at least 20%, at least 25%, at least 30%, at least 35%, at least 40%, at least 45%, or at least 50% by weight of a desired PUFA. In some embodiments, the crude microbial lipid has at least 10%, at least 15%, at least 20%, at least 25%, at least 30%, at least 35%, at least 40%, at least 45%, or at least 50% by weight of DI-IA, and/or at least 10%, at least 15%, or at least 20% by weight of DPA n-6, and/or at least 10%, at least 15%, or at least 20% by weight of EPA, and/or at least 10%, at least 15%, at least 20%, at least 25%, at least 30%, at least 35%, at least 40%, at least 45%, or at least 50% by weight of ARA.

The present invention is also directed to an extracted microbial lipid comprising a triglyceride fraction of at least 70% by weight, wherein the docosahexaenoic acid content of the triglyceride fraction is at least 50% by weight, wherein the docosapentaenoic acid n-6 content of the triglyceride fraction is from at least 0.5% by weight to 6% by weight, and wherein the oil has an anisidine value of 26 or less.

The present invention is also directed to an extracted microbial lipid comprising a triglyceride fraction of at least 70% by weight, wherein the docosahexaenoic acid content of the triglyceride fraction is at least 40% by weight, wherein the docosapentaenoic acid n-6 content of the triglyceride fraction is from at least 0.5% by weight to 6% by weight, wherein the ratio of docosahexaenoic acid to docosapentaenoic acid n-6 is greater than 6:1, and wherein the oil has an anisidine value of 26 or less.

The present invention is also directed to an extracted microbial lipid comprising a triglyceride fraction of at least about 70% by weight, wherein the docosahexaenoic acid content of the triglyceride fraction is at least 60% by weight and wherein the oil has an anisidine value of 26 or less.

In some embodiments, the extracted lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less.

In some embodiments, the extracted microbial lipid is a crude lipid or a crude oil. In some embodiments, the crude lipid optionally has less than 5% by weight or volume of an organic solvent.

The present invention is also directed to a process for obtaining a lipid, the process comprising refining a crude lipid of the present invention. In some embodiments, the refining is selected from the group consisting of: caustic refining, degumming, acid treatment, alkali treatment, cooling, heating, bleaching, deodorizing, deacidification, and combinations thereof.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1-4 provide schematic flow charts describing processes of the present invention.

Figure 5:
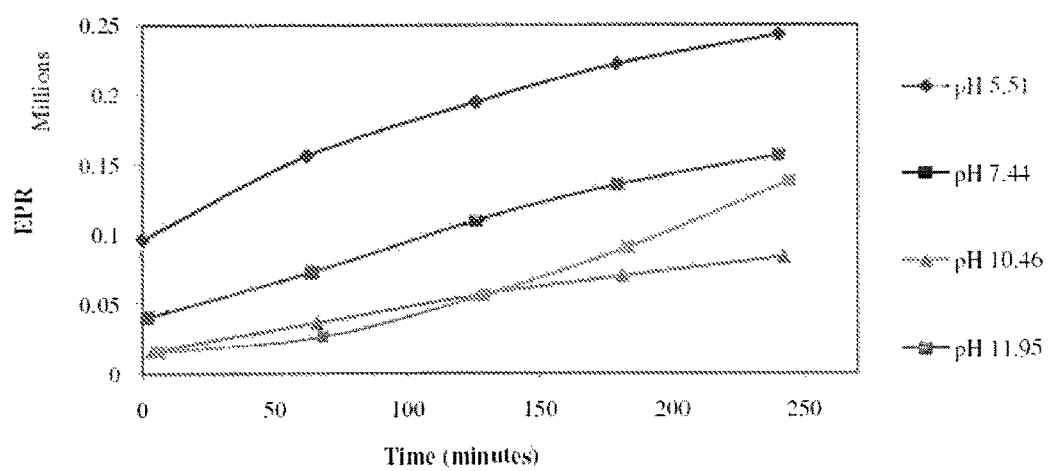

FIG. 5 is a graph providing the electron paramagnetic resonance (EPR) over time of lysed cells compositions at various pHs.

The present invention will now be described with reference to the accompanying drawings. In the drawings, like reference numbers indicate identical or functionally similar elements. Additionally, the left-most digit(s) of a reference number can identify the drawing in which the reference number first appears.

DETAILED DESCRIPTION OF THE INVENTION

The present invention is directed to a process for obtaining a lipid from a microbial cell composition, the process comprising raising the pH of the cell composition to 8 or above and separating a lipid from the cell composition, wherein the lipid optionally contains less than 5% by weight or volume of an organic solvent. In some embodiments, the process further comprises one or more of adding a salt to the cell composition to demulsify the cell composition, heating the cell to demulsify the cell composition, agitating the cell composition to demulsify the cell composition, and raising the pH of the cell composition a second time to demulsify the cell composition.

The present invention is also directed to a process for obtaining a lipid from a cell, the process comprising lysing a cell to form a lysed cell composition, raising the pH of the lysed cell composition to 8 or above to demulsify the cell composition, adding a salt to the lysed cell composition to demulsify the cell composition, and separating a lipid from the demulsified cell composition, wherein the lipid optionally contains less than 5% by weight or volume of an organic solvent. The cell can be a microbial cell or an oilseed cell. In some embodiments, the process further comprises one or more of: heating the lysed cell composition to demulsify the cell composition, agitating the lysed cell composition to demulsify the cell composition, and raising the pH of the lysed cell composition a second time to demulsify the cell composition.

The present invention is directed to a process for obtaining a lipid from a cell composition, the process comprising raising the pH of the cell composition to 8 or above to lyse the cell composition and demulsify the cell composition, adding a salt to the cell composition, and separating a lipid from the demulsified cell composition, wherein the lipid optionally contains less than 5% by weight or volume of an organic solvent. In some embodiments, the process further comprises one or more of heating the cell composition to demulsify the cell composition, agitating the cell composition to demulsify the cell composition, and raising the pH of the cell composition a second time to demulsify the cell composition.

The present invention is directed to a process for obtaining a lipid from a microbial cell, the process comprising lysing a microbial cell to form a lysed cell composition, adding a base to the lysed cell composition to demulsify the cell composition, and separating a lipid from the demulsified cell composition, wherein the lipid optionally contains less than 5% by weight or volume of an organic solvent. In some embodiments, the process further comprises one or more of: adding a salt to the lysed cell composition to demulsify the cell composition, heating the lysed cell composition to demulsify the cell composition, agitating the lysed cell composition to demulsify the cell composition, and adding a second base to the lysed cell composition to demulsify the cell composition.

The present invention is also directed to a process for obtaining a lipid from a cell, the process comprising lysing a cell to form a lysed cell composition, adding a base to the lysed cell composition to demulsify the cell composition, adding a salt to the lysed cell composition to demulsify the cell composition, and separating a lipid from the demulsified cell composition, wherein the lipid optionally contains less than 5% by weight or volume of an organic solvent. The cell can be a microbial cell or an oilseed cell. In some embodiments, the process further comprises one or more of: heating the lysed cell composition to demulsify the cell composition, agitating the lysed cell composition to demulsify the cell composition, and adding a second base to the lysed cell composition to demulsify the cell composition.

The present invention is also directed to a process for obtaining a lipid from a cell, the process comprising lysing a cell to form a lysed cell composition, agitating the cell composition to demulsify the cell composition, and separating a lipid from the demulsified cell composition, wherein the lipid optionally contains less than 5% by weight or volume of an organic solvent.

The present invention is also directed to a lipid obtained by any of the processes of the present invention.

The present invention is also directed to an extraction process for obtaining a lipid from a cell, the process comprising lysing the cell to form a lysed cell composition, contacting the lysed cell composition with a first base, contacting the lysed cell composition with a salt, heating the lysed cell composition for 5 minutes to 96 hours, contacting the lysed cell composition with a second base, and separating a lipid from the lysed cell composition at a temperature of 10° C. to 100° C.

The present invention is also directed to an extraction process for obtaining a lipid from a cell, the process comprising lysing the cell to form a lysed cell composition, contacting the lysed cell composition with a salt, and agitating the lysed cell composition for 5 minutes to 96 hours to provide a treated lysed cell composition, and separating a lipid from the treated lysed cell composition at a temperature of 10° C. to 100° C.

The present invention is also directed to an extraction process for obtaining a lipid from a cell, the process comprising lysing the cell to form a lysed cell composition, contacting the lysed cell composition with a salt, and separating a lipid from the lysed cell composition at a temperature of 10° C. to 100° C.

In some embodiments, the base or second base have a $pK_b$ of 1 to 12. In some embodiments, the base or second base have a $pK_b$ of 3 to 5.

In some embodiments, a process comprises agitating the lysed cell composition for 5 minutes to 96 hours, 10 minutes to 96 hours, 10 minutes to 4 hours, 12 hours to 84 hours, or 24 hours to 72 hours.

In some embodiments, the process comprises agitating the lysed cell composition by stirring, mixing, blending, shaking, vibrating, or a combination thereof. In some embodiments, the process comprises agitating the lysed cell composition at 0.1 hp/1000 gal to 10 hp/1000 gal of lysed cell composition. In some embodiments, the process comprises agitating the lysed cell composition with an agitator having an impeller tip speed of 200 ft/min to 1000 ft/min.

In some embodiments, lysing comprises a process selected from: mechanically treating, physically treating, chemically treating, enzymatically treating, or a combination thereof.

In some embodiments, the lysed cell composition is contacted with a salt in an amount of 0.1% to 20% by weight, 0.5% to 15% by weight, or 2% to 10% by weight of the lysed cell composition.

In some embodiments, the salt is selected from the group consisting of: alkali metal salts, alkali earth metal salts, sulfate salts and combinations thereof. In some embodiments, the salt is sodium chloride. In some embodiments, the salt is sodium sulfate.

In some embodiments, the process comprises heating the lysed cell composition for 5 minutes to 96 hours, 10 minutes to 4 hours, 12 hours to 84 hours, or 24 hours to 72 hours.

In some embodiments, the separating comprises centrifuging. In some embodiments, the separating comprises centrifuging at a temperature of 10° C. to 100° C.

In some embodiments, the process comprises prior to the lysing: washing, centrifuging, evaporating, or a combination thereof, a broth that includes the cell.

In some embodiments, the process provides a lipid having an anisidine value of 15 or less. In some embodiments, the process provides a lipid comprising at least 50% by weight triglycerides.

In some embodiments, the process does not add an organic solvent to the lysed cell composition. Organic solvents include polar solvents, non-polar solvents, water-miscible solvents, water-immiscible solvents, and combinations thereof.

In some embodiments, the process comprises concentrating a broth comprising a cell. In some embodiments, the process comprises concentrating the lysed cell composition.

The present invention is also directed to the lipid prepared by a process described herein. In some embodiments, the lipid comprises one or more polyunsaturated fatty acids. In some embodiments, the lipid has at least 10%, at least 15%, at least 20%, at least 25%, at least 30%, at least 35%, at least 40%, at least 45%, or at least 50% by weight of a desired PUFA. In some embodiments, the lipid has at least 10%, at least 15%, at least 20%, at least 25%, at least 30%, at least 35%, at least 40%, at least 45%, or at least 50% by weight of DHA, and/or at least 10%, at least 15%, or at least 20% by weight of DPA n-6, and/or at least 10%, at least 15%, or at least 20% by weight of EPA, and/or at least 10%, at least 15%, at least 20%, at least 25%, at least 30%, at least 35%, at least 40%, at least 45%, or at least 50% by weight of ARA. In some embodiments, the lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less.

In some embodiments, the lipid comprises a triacylglycerol fraction of at least 10% by weight, wherein at least 12% by weight of the fatty acids in the triacylglycerol fraction is eicosapentaenoic acid, wherein at least 25% by weight of the fatty acids in the triacylglycerol fraction is docosahexaenoic acid, and wherein less than 5% by weight of the fatty acids in the triacylglycerol fraction is arachidonic acid. In some embodiments, the lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, the lipid is a crude lipid.

In some embodiments, the lipid comprises at least 20% by weight eicosapentaenoic acid and less than 5% by weight each of arachidonic acid, docosapentaenoic acid n-6, oleic acid, linoleic acid, linolenic acid, eicosenoic acid, erucic acid, and stearidonic acid. In some embodiments, the lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, the lipid is a crude oil.

The present invention is also directed to a crude microbial lipid having an anisidine value of 26 or less, a peroxide value of 5 or less, a phosphorus content of 100 ppm or less, and optionally less than 5% by weight or volume of an organic solvent. In some embodiments, the crude microbial lipid has an anisidine value of 26 or less, 25 or less, 20 or less, 15 or less, 10 or less, 5 or less, 2 or less or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, 1 ppm or less. In some embodiments, the crude microbial lipid has at least 10%, at least 15%, at least 20%, at least 25%, at least 30%, at least 35%, at least 40%, at least 45%, or at least 50% by weight of a desired PUFA. In some embodiments, the crude microbial lipid has at least 10%, at least 15%, at least 20%, at least 25%, at least 30%, at least 35%, at least 40%, at least 45%, or at least 50% by weight of DHA, and/or at least 10%, at least 15%, or at least 20% by weight of DPA n-6, and/or at least 10%, at least 15%, or at least 20% by weight of EPA, and/or at least 10%, at least 15%, at least 20%, at least 25%, at least 30%, at least 35%, at least 40%, at least 45%, or at least 50% by weight of ARA.

The present invention is also directed to an extracted microbial lipid comprising a triglyceride fraction of at least 70% by weight, wherein the docosahexaenoic acid content of the triglyceride fraction is at least 50% by weight, wherein the docosapentaenoic acid n-6 content of the triglyceride fraction is from at least 0.5% by weight to 6% by weight, and wherein the oil has an anisidine value of 26 or less. In some embodiments, the extracted lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, the extracted lipid is a crude lipid.

The present invention is also directed to an extracted microbial lipid comprising a triglyceride fraction of at least 70% by weight, wherein the docosahexaenoic acid content of the triglyceride fraction is at least 40% by weight, wherein the docosapentaenoic acid n-6 content of the triglyceride fraction is from at least 0.5% by weight to 6% by weight, wherein the ratio of docosahexaenoic acid to docosapentaenoic acid n-6 is greater than 6:1, and wherein the oil has an anisidine value of 26 or less. In some embodiments, the extracted lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, the extracted lipid is a crude lipid.

The present invention is also directed to an extracted microbial lipid comprising a triglyceride fraction of at least about 70% by weight, wherein the docosahexaenoic acid content of the triglyceride fraction is at least 60% by weight and wherein the oil has an anisidine value of 26 or less. In some embodiments, the extracted lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, the extracted lipid is a crude lipid.

The present invention is also directed to a crude lipid extracted from a microorganism of the species *Crypthecodinium cohnii*, having a phosphorus content of 100 ppm or less. In some embodiments, the crude lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less.

The present invention is also directed to a process for obtaining a lipid, the process comprising refining a crude lipid of the present invention. In some embodiments, the refining is selected from the group consisting of: caustic refining, degumming, acid treatment, alkali treatment, cooling, heating, bleaching, deodorizing, deacidification, and combinations thereof.

Overview

Generally, the processes of the present invention do not utilize an organic solvent in order to extract or otherwise separate a lipid. Thus, in some embodiments, an organic solvent is not added to a cell broth comprising plant material or fermentation broth comprising a microbial cell, is not added to a cell composition, is not added to a lysed cell composition, or is not added to a lipid during a process of the present invention in an amount or concentration sufficient to extract a lipid. In some embodiments, an organic solvent can be added to a cell composition, a lysed cell composition, or a demulsified cell composition. In such embodiments, the organic solvent is added in a concentration less than 5%, less than 4%, less than 3%, less than 2%, less than 1%, less than 0.5%, less than 0.1%, or less than 0.05% by volume. As used herein, an "organic solvent" refers to a solvent that includes at least one carbon atom. As used herein, "solvent" refers to an agent that is hydrophobic or lipophilic, and is not a lipid. As used herein, "hydrophobic" refers to an agent that is repelled from a mass of water. As used herein, "lipophilic" refers to an agent that dissolves lipids. Organic solvents that are not used in a process of the present invention include, but are not limited to, polar solvents, non-polar solvents, water-miscible solvents, water-immiscible solvents, and combinations thereof. Non-limiting examples of organic solvents include substituted and unsubstituted $C_4$-$C_8$ alkyls (e.g., hexane and the like), $C_5$-$C_{12}$ cylcolalkyls, $C_4$-$C_{12}$ alkenes, $C_1$-$C_8$ alcohols (e.g., iso-propanol and the like), $C_1$-$C_8$ aldehydes, $C_4$-$C_8$ ethers, $C_1$-$C_8$ esters, $C_6$-$C_{12}$ aryls, $C_1$-$C_8$ amides, $C_5$-$C_{12}$ heteroaryls, and combinations thereof. An organic solvent as defined herein can be optionally added to a lysed cell composition, for example, as a component of a base and/or a salt for contacting with the lysed cell composition. However, in such embodiments the organic solvent is present in a concentration such that the lipid is not substantially extracted from the cell composition, lysed cell composition, or demulsified cell composition by the solvent (i.e., in a concentration of less than 5%, less than 4%, less than 3%, less than 2%, less than 1%, less than 0.5%, less than 0.1%, or less than 0.05% by volume or weight).

In some embodiments, a process of the present invention does not include washing, e.g., with water, or the process reduces the number of washings of, a lysed cell composition or a demulsified cell composition. "Washing" refers to a process of diluting a composition with, e.g., water or buffer and removing the water or buffer, e.g., by centrifugation. Washing a cell composition can decrease the overall yield of a lipid obtained from a cell. In the present invention, the washing can be decreased by 1 time, 2 times, 3 times or more.

Definitions

As used herein, "lipid" or "oil" refers to one or more fatty acids (including free fatty acids and esters of fatty acids), phospholipids, triacylglycerols (i.e. triglycerides), diacylglycerides, monoacylglycerides, lysophospholipids, soaps, phosphatides, waxes, sterols and sterol esters, carotenoids, xanthophylls, hydrocarbons, and other lipids known to one of ordinary skill in the art. Lipids include polar lipids and neutral lipids.

As used herein, "polar lipid" refers to lipids that contain a polar group and are more readily soluble in polar solvents. Polar lipids include phospholipids. As used herein, "phospholipid" refers to lipids having a phosphate group. As used herein, "neutral lipid" refers to lipids that do not contain areas of polarity and are more readily soluble in non-polar solvents. Neutral lipids include triacylglycerols (TAG).

Fatty acids are classified based on the length and saturation characteristics of the carbon chain. Fatty acids are termed short chain, medium chain, or long chain fatty acids based on the number of carbons present in the chain. Fatty acids are termed saturated fatty acids when no double bonds are present between the carbon atoms, and are termed unsaturated fatty acids when double bonds are present. Unsaturated long chain fatty acids are monounsaturated when only one double bond is present and are polyunsaturated when more than one double bond is present.

Fatty acids present in the lipid can have 4 to 28 carbon atoms. In some embodiments, a lipid comprises one or more polyunsaturated fatty acids. Polyunsaturated fatty acids (PUFAs) are classified based on the position of the first double bond from the methyl end of the fatty acid: omega-3 (n-3) fatty acids contain a first double bond at the third carbon, while omega-6 (n-6) fatty acids contain a first double bond at the sixth carbon. For example, docosahexaenoic acid ("DHA") is an omega-3 long chain polyunsaturated fatty acid (LC-PUFA) with a chain length of 22 carbons and 6 double bonds, often designated as "22:6 n-3." For the purposes of this application, long chain polyunsaturated fatty acids (LC-PUFAs) are defined as fatty acids of 18 and more carbon chain length, and are preferably fatty acids of 20 or more carbon chain length, containing 3 or more double bonds. LC-PUFAs of the omega-6 series include, but are not limited to, di-homo-gammalinoleic acid (C20:3n-6), arachidonic acid (C20:4n-6) ("ARA"), docosatetraenoic acid or adrenic acid (C22:4n-6), and docosapentaenoic acid (C22:5n-6) ("DPA n-6"). The LC-PUFAs of the omega-3 series include, but are not limited to, eicosatrienoic acid (C20:3n-3), eicosatetraenoic acid (C20:4n-3), eicosapentaenoic acid (C20:5n-3) ("EPA"), docosapentaenoic acid (C22:5n-3), and docosahexaenoic acid (C22:6n-3). The LC-PUFAs also include fatty acids with greater than 22 carbons and 4 or more double bonds including, but not limited to, C24:6(n-3) and C28:8(n-3).

The terms "fatty acid," "polyunsaturated fatty acid," and "PUFA" include not only the free fatty acid form, but other forms as well, such as the triacylglycerol (TAG) form, the phospholipid (PL) form and other esterified forms. As used herein, the terms "ester" and "esterified" refer to the replacement of the hydrogen in the carboxylic acid group of a PUFA molecule with another substituent. Typical esters are known to those in the art, a discussion of which is provided by Higuchi, T. et al., *Pro-drugs as Novel Delivery Systems, Vol. 14*, A.C.S. Symposium Series, *Bioreversible Carriers in Drug Design*, Edward B. Roche ed., Amer. Pharma. Assoc., Pergamon Press (1987), and *Protective Groups in Organic Chemistry*, McOmie ed., Plenum Press, New York (1973), each of which is incorporated herein by reference in its entirety. Examples of common esters include methyl, ethyl, trichloroethyl, propyl, butyl, pentyl, tert-butyl, benzyl, nitrobenzyl, methoxybenzyl and benzhydryl.

In some embodiments, a lipid comprises at least 10%, at least 20%, at least 30%, at least 35%, at least 40%, at least 50%, at least 60%, at least 70% or at least 80% by weight PUFA. In some embodiments, a lipid comprises at least 10%, at least 20%, at least 30%, at least 35%, at least 40%, at least 50%, at least 60%, at least 70% or at least 80% by weight DHA. In some embodiments, a lipid comprises less than 50%, less than 40%, less than 30%, less than 20%, less than 15%, less than 10%, or less than 5% by weight EPA. In some embodiments, a lipid comprises less than 10%, less than 5%, less than 2%, less than 1%, or less than 0.5% by weight sterols. In some embodiments, one or more PUFAs are present in a lipid in one or more forms, such as triglycerides, diglycerides, monoglycerides, phospholipids, free fatty acids, esterified fatty acids, alkali metal salts of fatty acids, alkali earth metal salts of fatty acids, and combinations thereof.

In some embodiments, a lipid separated after centrifuging in a process of the present invention comprises at least 50%, at least 60%, at least 70%, at least 80%, at least 90%, at least 95%, or 50% to 95%, 50% to 90%, 50% to 85%, 50% to 80%, 50% to 75%, 60% to 95%, 60% to 90%, 60% to 85%, 70% to 95%, 70% to 90%, 70% to 85%, 75% to 95%, 75% to 90%, or 75% to 85%, by weight of triglycerides.

In some embodiments, the triglycerides comprise at least 10%, at least 20%, at least 30%, at least 35%, at least 40%, at least 50%, at least 60%, at least 70% or at least 80% by weight DHA. In some embodiments, the triglycerides comprise at least 50%, at least 40%, at least 30%, at least 20%, at least 15%, at least 10%, or at least 5% by weight EPA.

As discussed herein, additional refining of a lipid after the centrifuging can provide a lipid comprising at least 80%, at least 85%, at least 90%, at least 95%, at least 99%, or 80% to 99.5%, 80% to 99%, 80% to 97%, 80% to 95%, 80% to 90%, 85% to 99.5%, 85% to 99%, 85% to 97%, 85% to 95%, 85% to 90%, 90% to 99.5%, 90% to 99%, 90% to 97%, 90% to 95%, 95% to 99.5%, 95% to 99%, 95% to 97%, 97% to 99.5%, or 98% to 99.5% triglyceride by weight.

As used herein, a "cell" refers to a lipid-containing biomaterial, such as biomaterial derived from plants or microorganisms. In some embodiments, suitable plant material includes, but is not limited to, plant parts and oilseeds. Oilseeds include, but are not limited to, sunflower seeds, canola seeds, rapeseeds, linseeds, castor oil seeds, coriander seeds, calendula seeds or the like, and genetically modified variants thereof. Oil produced from plant material and/or microorganisms, such as oleaginous microorganisms, according to the processes described herein, is also referred to as vegetable oil. Oil produced from algae and/or fungi is also referred to as algal and/or fungal oil, respectively.

As used herein, a "microbial cell" or "microorganism" refers to organisms such as algae, bacteria, fungi, protist, and combinations thereof, e.g., unicellular organisms. In some embodiments, a microbial cell is a eukaryotic cell. A microbial cell suitable for use with the present invention includes, but is not limited to, golden algae (e.g., microorganisms of the kingdom Stramenopiles), green algae, diatoms, dinoflagellates (e.g., microorganisms of the order Dinophyceae including members of the genus *Crypthecodinium* such as, for example, *Crypthecodinium cohnii* or *C. cohnii*), yeast (*Ascomycetes* or *Basidiomycetes*), and fungi of the genera *Mucor* and *Mortierella*, including but not limited to *Mortierella alpina* and *Mortierella* sect. *schmuckeri*. A microbial cell suitable for use with the present invention can further include, but is not limited to genera found in the following groups of organisms: *Stramenopiles, Hamatores, Proteromonads, Opalines, Develpayella, Diplophrys, Labrinthulids, Thraustochytrids, Biosecids, Oomycetes, Hypochytridiomycetes, Commotion, Reticulosphaera, Pelagomonas, Pelagococcus, Ollicola, Aureococcus, Parmales, Diatoms, Xanthophytes, Phaeophytes, Eustigmatophytes, Raphidophytes, Synurids, Axodines* (including *Rhizochromulinaales, Pedinellales, Dictyochales*), *Chrysomeridales, Sarcinochrysidales, Hydrurales, Hibberdiales*, and *Chromulinales*.

In some embodiments, a microbial cell for use with the present invention is a microorganism of the phylum Labyrinthulomycota. In some embodiments, a microbial cell of the phylum Labyrinthulomycota is a thraustochytrid, such as a *Schizochytrium* or *Thraustochytrium*. According to the present invention, the term "thraustochytrid" refers to any member of the order Thraustochytriales, which includes the family Thraustochytriaceae, and the term "labyrinthulid" refers to any member of the order Labyrinthulales, which includes the family Labyrinthulaceae.

Members of the family Labyrinthulaceae were previously considered to be members of the order Thraustochytriales, but in more recent revisions of the taxonomic classification of such organisms, the family Labyrinthulaceae is now considered to be a member of the order Labyrinthulales. Both Labyrinthulales and Thraustochytriales are considered to be members of the phylum Labyrinthulomycota. Taxonomic theorists now generally place both of these groups of microorganisms with the algae or algae-like protists of the Stramenopile lineage. The current taxonomic placement of the thraustochytrids and labyrinthulids can be summarized as follows:

Realm: Stramenopila (Chromista)
    Phylum: Labyrinthulomycota (Heterokonta)
        Class: Labyrinthulomycetes (Labyrinthulae)
            Order: Labyrinthulales
                Family: Labyrinthulaceae
            Order: Thraustochytriales
                Family: Thraustochytriaceae For purposes of the present invention, strains of microbial cells described as thraustochytrids include the following organisms: Order: Thraustochytriales; Family: Thraustochytriaceae; Genera: *Thraustochytrium* (Species: sp., *arudimentale, aureum, benthicola, globosum, kinnei, motivum, multirudimentale, pachydermum, proliferum, roseum*, and *striatum*), *Ulkenia* (Species: sp., *amoeboidea, kerguelensis, minuta, profunda, radiata, sailens, sarkariana, schizochytrops, visurgensis, yorkensis*, and sp. BP-5601), *Schizochytrium* (Species: sp., *aggregatum, limnaceum, mangrovei, minutum*, and *octosporum*), *Japonochytrium* (Species: sp., *marinum*), *Aplanochytrium* (Species: sp., *haliotidis, kerguelensis, profunda*, and *stocchinoi*), *Althornia* (Species: sp., *crouchii*), or *Elina* (Species: sp., *marisalba*, and *sinorifica*). For the purposes of this invention, species described within *Ulkenia* will be considered to be members of the genus *Thraustochytrium*. *Aurantiacochytrium* and *Oblogospora* are two additional genuses encompassed by the phylum Labyrinthulomycota in the present invention. In some embodiments, a microbial cell is of the genus *Thraustochystrium, Schizochytrium*, and mixtures thereof.

Microbial cells suitable for use with the present invention include, but are not limited to, Labyrinthulids selected from: Order: Labyrinthulales, Labyrinthulaceae, Genera: *Labyrinthula* (Species: sp., *algeriensis, coenocystis, chattonii, macrocystis, macrocystis atlantica, macrocystis macrocystis, marina, minuta, roscoffensis, valkanovii, vitellina, vitellina pacifica, vitellina vitellina*, and *zopfii*), *Labyrinthuloides* (Species: sp., *haliotidis*, and *yorkensis*), *Labyrinthomyxa* (Species: sp., *marina*), *Diplophrys* (Species: sp., *archeri*), *Pyrrhosorus* (Species: sp., *marinus*), *Sorodiplophrys* (Species: sp., *stercorea*), and *Chlamydomyxa* (Species: sp., *labyrinthuloides*, and *montana*) (although there is currently not a consensus on the exact taxonomic placement of *Pyrrhosorus, Sorodiplophrys*, and *Chlamydomyxa*).

Host cells of the phylum Labyrinthulomycota include, but are not limited to, deposited strains PTA-10212, PTA-10213, PTA-10214, PTA-10215, PTA-9695, PTA-9696, PTA-9697, PTA-9698, PTA-10208, PTA-10209, PTA-10210, PTA-10211, the microorganism deposited as SAM2179 (named "*Ulkenia* SAM2179" by the depositor), any *Thraustochytrium* species (including former *Ulkenia* species such as *U. visurgensis, U. amoeboida, U. sarkariana, U. profunda, U. radiata, U. minuta* and *Ulkenia* sp. BP-5601), and including *Thraustochytrium striatum, Thraustochytrium aureum, Thraustochytrium roseum*; and any *Japonochytrium* species. Strains of Thraustochytriales include, but are not limited to *Thraustochytrium* sp. (23B) (ATCC 20891); *Thraustochytrium striatum* (Schneider)(ATCC 24473); *Thraustochytrium aureum* (Goldstein) (ATCC 34304); *Thraustochytrium roseum* (Goldstein) (ATCC 28210); *Japonochytrium* sp. (L1) (ATCC 28207); ATCC 20890; ATCC 20892; a mutant strain derived from any of the aforementioned microorganisms; and mixtures thereof. *Schizochytrium* include, but are not limited to *Schizochytrium aggregatum, Schizochytrium limacinum, Schizochytrium* sp. (S31) (ATCC 20888), *Schizochytrium* sp. (S8) (ATCC 20889), *Schizochytrium* sp. (LC-RM) (ATCC 18915), *Schizochytrium* sp, (SR 21), deposited strain ATCC 28209, deposited *Schizochytrium limacinum* strain IFO 32693, a mutant strain derived from any of the aforementioned microorganisms, and mixtures thereof. In some embodiments, the host cell is a *Schizochytrium* or a *Thraustochytrium*. *Schizochytrium* can replicate both by successive bipartition and by forming sporangia, which ultimately release zoospores. *Thraustochytrium*, however, replicate only by forming sporangia, which then release zoospores. In some embodiments, the host cell of the invention is a recombinant host cell.

Effective culture conditions for a microbial cell for use with the invention include, but are not limited to, effective media, bioreactor, temperature, pH, and oxygen conditions that permit lipid production. An effective medium refers to any medium in which a microbial cell, e.g., Thraustoehytriales microbial cell, is typically cultured. Such media typically comprises an aqueous medium having assimilable carbon, nitrogen, and phosphate sources, as well as appropriate salts, minerals, metals, and other nutrients, such as vitamins. Microbial cells for use with the present invention can be cultured in conventional fermentation bioreactors, shake flasks, test tubes, microtiter dishes, and petri plates. In some embodiments, culturing is carried out at a temperature, pH, and oxygen content appropriate for a recombinant cell.

In some embodiments, a microbial cell is capable of growth at a salinity level of 12 g/L or less, 5 g/L or less, or 3 g/L or less of sodium chloride.

In some embodiments, a microbial cell produces a lipid comprising omega-3 and/or omega-6 PUFAs. In some embodiments, a microbial cell produces a lipid comprising DHA, DPA (n-3), DPA (n-6), EPA, arachidonic acid (ARA), or the like, and combinations thereof. Non-limiting examples of microorganisms that produce a lipid comprising a PUFA are disclosed above and are also found in U.S. Pat. Nos. 5,340,594, 5,340,742 and 5,583,019, each of which is incorporated by reference herein in its entirety.

In some embodiments, a microbial cell comprises at least 30% by weight lipids, at least 35% by weight lipids, at least 40% by weight lipids, at least 50% by weight lipids, at least 60% by weight lipids, at least 70% by weight lipids, or at least 80% by weight lipids. In some embodiments, a microbial cell for use with the present invention is capable of producing at least 0.1 grams per liter per hour (g/L/h) of DHA, at least 0.2 g/L/h of DHA, at least 0.3 g/L/h of DHA, or at least 0.4 g/L/h of DHA.

Processes

The processes of the present invention comprises lysing a cell or cell biomass to form a lysed cell composition. As used herein, the term "cell biomass" refers to a population of plant or microbial cells. As used herein, the terms "lyse" and "lysing" refer to a process of rupturing the cell wall and/or cell membrane of a cell. In some embodiments, lysing comprises a process such as: mechanically treating, chemically treating, enzymatically treating, physically treating, or combinations thereof.

As used herein, mechanically treating includes, but is not limited to, homogenizing a cell, applying ultrasound to a cell, cold-pressing a cell, milling a cell or the like, and combinations thereof. In some embodiments, a process comprises lysing the cell by homogenization. In some embodiments, a process comprises lysing the cell with a homogenizer.

Homogenizing a cell can include, but is not limited to, processes utilizing a French pressure cell press, a sonicator, a homogenizer, a ball mill, a rod mill, a pebble mill, a bead mill, a high pressure grinding roll, a vertical shaft impactor, an industrial blender, a high shear mixer, a paddle mixer, a polytron homogenizer or the like, and combinations thereof. In some embodiments, a cell is flowed through a homogenizer that is optionally heated. In some embodiments, suitable homogenization can include 1 to 3 passes through a homogenizer at either high and/or low pressures. In some embodiments, a pressure during homogenization can be 150 bar to 1,400 bar, 150 bar to 1,200 bar, 150 bar to 900 bar, 150 bar to 300 bar, 300 bar to 1,400 bar, 300 bar to 1,200 bar, 300 bar to 900 bar, 400 bar to 800 bar, 500 bar to 700 bar, or 600 bar.

As used herein, physically treating can include, but is not limited to, heating a cell, drying a cell, or the like, and combinations thereof.

Heating a cell can include, but is not limited to, resistive heating, convection heating, steam heating, heating in a fluid bath, heating with solar energy, heating with focused solar energy, and the like, any of which can be performed in a tank, pool, tube, conduit, flask, or other containment device. In some embodiments, a cell is heated in a tank that includes resistive coils in/on its walls. In some embodiments, a cell is heated in a liquid bath that includes a tubing passing there through.

Drying a cell can include, but is not limited to, exposing to air flow, exposing to heat (e.g., convection heat, a heated surface, and the like), exposing to solar energy, freeze drying (lyophilizing), spray drying, and combinations thereof. In some embodiments, drying comprises applying a cell to a rotating drum that is optionally heated.

As used herein, chemically treating includes, but is not limited to, raising a pH of a cell, contacting a cell with a chemical or the like.

Raising a pH of a cell can include, but is not limited to, adding a base to a cell composition. In some embodiments, bases suitable for use with the present invention include, but are not limited to, hydroxide bases (e.g., LiOH, NaOH, KOH, $Ca(OH)_2$, and the like, and combinations thereof), carbonate bases (e.g., $Na_2CO_3$, $K_2CO_3$, $MgCO_3$, and the like, and combinations thereof), bicarbonate bases (e.g., $LiHCO_3$, $NaHCO_3$, $KHCO_3$, and the like, and combinations thereof), and combinations thereof. A base can be in the form of a solid (e.g., crystals, a granulate, pellets, and the like) or a liquid (e.g., an aqueous solution, an alcoholic solution such as a hydroxide base in methanol, ethanol, propanol, and the like), and combinations thereof. In some embodiments, the pH of the cell composition is raised to 8 or above, 9 or above, 10 or above, 11 or above, 12 or above, or a pH of 7 to 13, 7 to 12, 7 to 11, 7 to 10, 7 to 9, 8 to 13, 8 to 12, 8 to 11, 8 to 10, 8 to 9, 9 to 12, 9 to 11, 9 to 10, 10 to 12, or 10 to 11.

In some embodiments, raising a pH of a cell can include, but is not limited to, performing a chloralkali process. In some embodiments, a fermentation broth containing sodium chloride and a cell composition is subjected to electrolysis, which would result in the formation of sodium hydroxide. The formation of sodium hydroxide raises the pH of the cell. In some embodiments, a fermentation broth can include calcium chloride or potassium chloride in place of or in addition to sodium chloride. Subjecting such a fermentation broth to electrolysis results in the formation of calcium hydroxide or potassium hydroxide, respectively, thereby raising the pH of the cell.

Enzymatic lysing refers to lysis of a cell wall or cell membrane of a cell by contacting the cell with one or more enzymes. Enzymes suitable for use with the present invention include, but are not limited to, proteases, cellulases, hemicellulases, chitinases, pectinases, and combinations thereof. Non-limiting examples of proteases include serine proteases, theronine proteases, cysteine proteases, aspartate proteases, metalloproteases, glutamic acid proteases, alacase, and combinations thereof. Non-limiting examples of cellulases include sucrase, maltase, lactase, alpha-glucosidase, beta-glucosidase, amylase, lysozyme, neuraminidase, galactosidase, alpha-mannosidase, glucuronidase, hyaluronidase, pullulanase, glucocerebrosidase, galactosyl-ceramidase, acetylgalactosaminidase, fucosidase, hexosaminidase, iduronidase, maltase-glucoamylase, and combinations thereof. A non-limiting example of a chitinase includes chitotriosidase. Non-limiting examples of pectinases include pectolyase, pectozyme, polygalacturonase, and combinations thereof. In some embodiments, some enzymes are activated by heating.

As used herein, a "lysed cell composition" refers to a composition comprising one or more lysed cells, including cell debris and other contents of the cell, in combination with a lipid (from the lysed cells), and optionally, broth that contains microbial cells or plant material. In some embodiments, plant material is contained in a broth or media comprising the plant material and water. In some embodiments, a microbial cell is contained in a fermentation broth or media comprising the microbial cell and water. In some embodiments, a lysed cell composition refers to a composition comprising one or more lysed cells, cell debris, a lipid, the natural contents of the cell, and aqueous components from a broth. In some embodiments, a lysed cell composition is in the form of an oil-in-water emulsion comprising a mixture of a continuous aqueous phase and a dispersed lipid phase. In some embodiments, a dispersed lipid phase is present in a concentration of 1% to 60%, 1% to 50%, 1% to 40%, 1% to 30%, 1% to 20%, 5% to 60%, 5% to 50%, 5% to 40%, 5% to 30%, 5% to 20%, 10% to 60%, 10% to 50%, 10% to 40%, 20% to 60%, 20% to 50%, 20% to 40%, 30% to 60%, 30% to 50%, or 40% to 60% by weight of an emulsified lysed cell composition.

While not being bound to any particular theory, it is believed the processes of the present invention break up or demulsify an emulsified lysed cell composition, allowing a lipid to be separated from the lysed cell composition. As used herein, the terms "emulsion" and "emulsified" refers to a mixture of two or more immiscible phases or layers wherein one phase or layer is dispersed in another phase or layer. As used herein, the terms "break," "break up," "demulsify," "demulsification," "demulsifying," and "breaking" refer to a process of separating immiscible phases or layers of an emulsion. For example, demulsifying or breaking an emulsified lysed cell composition refers to a process by which an emulsified lysed cell composition changes from an emulsion having one or more phases or layers to a composition having two or more phases or layers. For example, in some embodiments, a process of the present invention breaks an emulsified lysed cell composition from a single-phase to two or more phases. In some embodiments, the two or more phases include a lipid phase and an aqueous phase. In some embodiments, a process of the present invention breaks an emulsified lysed cell compositions from one or more phases to at least three phases. In some embodiments, the three phases include a lipid phase, an aqueous phase, and a solid phase. In some embodiments, the three phases include a lipid phase, an emulsion phase, and an aqueous phase.

In some embodiments, the processes of the present invention demulsify a lysed cell composition to form a demulsified cell composition by removing or breaking at least 75% of the emulsion, at least 80% of the emulsion, at least 85% of the emulsion, at least 90% of the emulsion, at least 95% of the emulsion, at least 99% of the emulsion. In some embodiments, the process of the present invention demulsify a lysed cell composition by removing or breaking 75% of the emulsion to 99% of the emulsion, 75% of the emulsion to 95% of the emulsion, 75% of the emulsion to 90% of the emulsion, 75% of the emulsion to 85% of the emulsion, 75% of the emulsion to 80% of the emulsion, 80% of the emulsion to 99% of the emulsion, 80% of the emulsion to 95% of the emulsion, 80% of the emulsion to 90% of the emulsion, 80% of the emulsion to 85% of the emulsion, 85% of the emulsion to 99% of the emulsion, 85% of the emulsion to 95% of the emulsion, 85% of the emulsion to 90% of the emulsion, 90% of the emulsion to 99% of the emulsion, 90% of the emulsion to 95% of the emulsion, or 95% of the emulsion to 99% of the emulsion by weight or volume.

In some embodiments, prior to lysing the cell, the cell can be washed and/or pasteurized. In some embodiments, washing the cell includes using an aqueous solution, such as water, to remove any extracellular water-soluble or water-dispersible compounds. In some embodiments, the cell can be washed once, twice, thrice, or more. In some embodiments, pasteurizing the cell includes heating the cell to inactivate any undesirable enzymes, for example any enzymes that might degrade lipid or reduce the yield of PUFAs. In some embodiments, the cell can be washed first and then pasteurized.

In some embodiments, the cell is plant biomaterial and the plant biomaterial is formed prior to lysing. In some embodiments, the plant biomaterial is formed by removing or extracting oilseeds from a plant. In some embodiments, an interior of an oilseed is removed from an outer hull of an oilseed by grinding, milling, extruding, aspirating, crushing, or combinations thereof. In some embodiments, the dehulled oilseeds can be homogenized or expelled using processes known in the art, such as by passing the oilseeds through a press to grind the dehulled oilseeds into a cake. In some embodiments, water can be added to the cake to form an emulsified lysed cell composition. In some embodiments, the emulsified lysed cell composition can be filtered using processes known in the art to remove any excess hull fragments from the lysed cell composition.

In some embodiments, treating a lysed cell composition with a first base breaks up (i.e., demulsifies) an emulsified lysed cell composition. In some embodiments, treating a lysed cell composition with a second base breaks (i.e., demulsifies) an emulsified lysed cell composition. In some embodiments, treating a lysed cell composition with a salt breaks (i.e., demulsifies) an emulsified lysed cell composition. In some embodiments, heating a lysed cell composition breaks (i.e., demulsifies) an emulsified lysed cell composition. In some embodiments, agitating a lysed cell composition breaks (i.e., demulsifies) an emulsified lysed cell composition. In some embodiments, simultaneous heating and agitating of a lysed cell composition breaks (i.e., demulsifies) an emulsified lysed cell composition. In some embodiments, one or more of the preceding treatments breaks up (i.e., demulsifies) an emulsified lysed cell composition.

In some embodiments, the process of the invention comprises raising the pH of a cell composition to lyse and/or demulsify the cell composition. In some embodiments, the process of the invention comprises raising the pH of a lysed cell composition to demulsify the lysed cell composition. In some embodiments, raising the pH comprises contacting a cell composition or lysed cell composition with a base. In some embodiments, the process of the invention comprises contacting a lysed cell composition with a base to demulsify the lysed cell composition. As used herein, "contacting" refers to combining a cell composition or a lysed cell composition with a second composition (e.g., by adding a composition to a cell composition or a lysed cell composition, by adding a cell composition or a lysed cell composition to a composition, and the like). As used herein, a "composition" can comprise a pure material or include a combination of two or more materials, substances, excipients, portions, and the like. Contacting a lysed cell composition with a first base raises the pH of the lysed cell composition. In some embodiments, a lysed cell composition is contacted with a second base. In some embodiments, the pH of a lysed cell composition or a demulsified cell composition is raised a second time. In some embodiments, the second raising of the pH comprises contacting a lysed cell composition or demulsified cell composition with a second base. In some embodiments, a lysed cell composition is contacted with a first base, then heated, agitated, or a combination thereof, and subsequently contacted with a second base to provide a treated lysed cell emulsion.

In some embodiments, the first base and/or second base has a $pK_b$ of 1 to 12, 1 to 10, 1 to 8, 1 to 6, 1 to 5, 2 to 12, 2 to 10, 2 to 8, 2 to 6, 2 to 5, 3 to 10, 3 to 6, 3 to 5, 4 to 10, 4 to 8, 4 to 6, 5 to 10, or 5 to 8. As used herein, the term "$pK_b$" refers to the negative logarithm of the base association constant, $K_b$, of the base. $K_b$ refers to the equilibrium constant for the ionization of the base in water, wherein:

$$B + H_2O \rightleftharpoons HB^+ + OH^-; \text{ and}$$

the $K_b$ of base, B, is defined as:

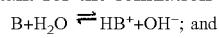

$$K_b = \frac{[HB^+][OH^-]}{[B]}.$$

Bases suitable for use with the present invention include, but are not limited to, hydroxide bases (e.g., LiOH, NaOH, KOH, Ca(OH)$_2$, and the like, and combinations thereof), carbonate bases (e.g., Na$_2$CO$_3$, K$_2$CO$_3$, MgCO$_3$, and the like, and combinations thereof), bicarbonate bases (e.g., LiHCO$_3$, NaHCO$_3$, KHCO$_3$, and the like, and combinations thereof), and combinations thereof. A base can be in the form of a solid (e.g., crystals, a granulate, pellets, and the like) or a liquid (e.g., an aqueous solution, an alcoholic solution such as a hydroxide base in methanol, ethanol, propanol, and the like), and combinations thereof. Thus, a solvent can be optionally present in a base for use with the present invention. As used herein, "solvent" refers to an agent that is hydrophobic or lipophilic. As used herein, "hydrophobic" refers to an agent that is repelled from a mass of water. As used herein, "lipophilic" refers to an agent that dissolves in lipids.

In some embodiments, contacting a cell composition or a lysed cell composition with a base raises the pH of the lysed cell composition. In some embodiments, contacting a lysed cell composition with a base raises the pH of the lysed cell composition to 8 or above, 9 or above, 10 or above, 11 or above, 12 or above, or a pH of 7 to 13, 7 to 12, 7 to 11, 7 to 10, 7 to 9, 8 to 13, 8 to 12, 8 to 11, 8 to 10, 8 to 9, 9 to 12, 9 to 11, 9 to 10, 10 to 12, or 10 to 11. In some embodiments, contacting a lysed cell composition with a base provides a pH of 8 or below, 7 or below, 6 or below, or 5 or below to the composition.

In some embodiments, raising the pH of the cell composition or lysed cell composition with the addition of the base inhibits lipid oxidation, thereby minimizing the amount of free radicals in the lysed cell composition so that the crude lipid obtained from the processes of the invention has a low peroxide value (e.g., 5 or less, 4.5 or less, 4 or less, 3.5 or less, 3 or less, 2.5 or less, 2 or less, 1.5 or less, 1 or less, 0.5 or less, 0.2 or less, or 0.1 or less) and/or a low anisidine value (e.g., 26 or less, 25 or less, 20 or less, 15 or less, 10 or less, 5 or less, 2 or less, or 1 or less). As used herein, the terms "peroxide value" or "PV" refer to the measure of primary reaction products, such as peroxides and hydroperoxides, that occur during oxidation of the lipid. As used herein peroxide value is measured in meq/kg. As used herein, the terms "anisidine value" or "AV" refer to the measure of secondary reaction products, such as aldehydes and ketones, that occur during oxidation of the lipid.

In some embodiments, free radicals in the lysed cell composition after adjusting the pH with a base are detected using an Electron Paramagnetic Resonance spectrometer, e.g., Bruker BioSpin e-scan EPR (system number SC0274) (Bruker BioSpin, Billerica, Mass.). In some embodiments, a sample of the lysed cell composition is diluted in about 1:1 ratio with deionized water prior to measuring the EPR. In some embodiments, in order to measure the EPR, a spin trap chemical is added to a sample of the lysed cell composition. In some embodiments, the spin trap chemical is any spin trap chemical known in the art, including, but not limited to, POBN ($\alpha$-(4-Pyridyl 1-oxide)-N-tert-butylnitrone) or DMPO (5,5-dimethyl-1-pyrroline-N-oxide). In some embodiments, the spin trap chemical is about 1.25 M and about 50 µL is added to about 0.5 gram sample of the lysed cell composition. In some embodiments, a sample containing the spin trap chemical is incubated at room temperature (e.g., about 20° C.). In some embodiments, the following spectrometer parameters are used: modulation frequency of about 86 Hz, modulation amplitude of about 2 gauss, microwave power of about 5 mW, time constant of about 20 seconds, sweep time of about 10 seconds, sweep width of about 100 gauss, and a number of scans of about 8. The EPR is measured over time to determine the concentration of free radicals present in the lipid. In some embodiments, the EPR is measured hourly over a course of four hours. In some embodiments, the lysed cell composition has an EPR signal strength (intensity or amplitude) at the above listed parameters of less than $0.15 \times 10^6$, less than $0.14 \times 10^6$, less than $0.13 \times 10^6$, less than $0.12 \times 10^6$, less than $0.11 \times 10^6$, less than $0.1 \times 10^6$, less than $0.09 \times 10^6$, less than $0.08 \times 10^6$, less than $0.07 \times 10^6$, less than $0.06 \times 10^6$, or less than $0.05 \times 10^6$ after 4 hours. In some embodiments, the lysed cell composition has an EPR of $0.05 \times 10^6$ to $0.15 \times 10^6$, $0.05 \times 10^6$ to $0.14 \times 10^6$, $0.05 \times 10^6$ to $0.13 \times 10^6$, $0.05 \times 10^6$ to $0.12 \times 10^6$, $0.05 \times 10^6$ to $0.11 \times 10^6$, $0.05 \times 10^6$ to $0.1 \times 10^6$, $0.05 \times 10^6$ to $0.09 \times 10^6$, $0.07 \times 10^6$ to $0.15 \times 10^6$, $0.07 \times 10^6$ to $0.13 \times 10^6$, $0.07 \times 10^6$ to $0.11 \times 10^6$, $0.08 \times 10^6$ to $0.14 \times 10^6$, $0.08 \times 10^6$ to $0.12 \times 10^6$, $0.08 \times 10^6$ to $0.1 \times 10^6$, $0.09 \times 10^6$ to $0.13 \times 10^6$, or $0.09 \times 10^6$ to $0.11 \times 10^6$. In some embodiments, the pH of the lysed cell composition resulting in an EPR specified above is 8 to 12, 8 to 11, 8 to 10, 8 to 9, 9 to 12, 9 to 11, 9 to 10, 10 to 12, or 10 to 11. In some embodiments, a lysed cell composition having an EPR signal strength specified above results in a crude lipid having an AV of 26 or less, 25 or less, 20 or less, 15 or less, 10 or less, 5 or less, 2 or less, or 1 or less. In some embodiments, a lysed cell composition having an EPR specified above results in a crude lipid having a PV of 5 or less, 4.5 or less, 4 or less, 3.5 or less, 3 or less, 2.5 or less, 2 or less, 1.5 or less, 1 or less, 0.5 or less, 0.2 or less, or 0.1 or less.

In some embodiments, a process comprises contacting a cell composition or lysed cell composition with a salt to demulsify the lysed cell composition. As used herein, a "salt" refers to an ionic compound formed by replacing a hydrogen ion from an acid with a metal (e.g., an alkali metal, an alkali earth metal, a transition metal, and the like) or a positively charged compound (e.g., $NH_4^+$ and the like). Salts suitable for use with the present invention include, but are not limited to, alkali metal salts, alkali earth metal salts, or the like, and combinations thereof. Negatively charged ionic species present in a salt for use with the present include, but are not limited to, halides, sulfate, bisulfate, sulfite, phosphate, hydrogen phosphate, dihydrogen phosphate, carbonate, bicarbonate, or the like, and combinations thereof. In some embodiments, a salt for use with the present invention is selected from: sodium chloride, sodium sulfate, sodium carbonate, calcium chloride, potassium sulfate, magnesium sulfate, monosodium glutamate, ammonium sulfate, potassium chloride, iron chloride, iron sulfate, aluminum sulfate, and combinations thereof. In some embodiments, a salt does not include NaOH. A salt can be added as a solid (e.g., in crystalline, amorphous, pelletized, and/or granulated form), and/or as a solution (e.g., a dilute solution, a saturated solution, or a super-saturated solution) containing, for example, water, an alcohol, and the like, and combinations thereof.

In some embodiments, the salt is added in an amount of 5 g/l to 25 g/l, 5 g/l to 10 g/l, 10 g/l to 15 g/l, 15 g/l to 20 g/l, 20 g/l to 25 g/l, or 10 g/l to 20 g/l.

In some embodiments, a temperature of a cell composition or a lysed cell composition is less than or equal to 60° C., less than or equal to 55° C., less than or equal to 45° C., less than or equal to 40° C., less than or equal to 35° C., less than or equal to 30° C., or less than or equal to 25° C. when a salt is added to demulsify the cell composition or the lysed cell composition. In some embodiments, a temperature of a lysed cell composition is 0° C. to 60° C., 0° C. to 55° C., 0° C. to 50° C., 0° C. to 45° C., 0° C. to 40° C., 0° C. to 35° C., 0° C. to 30° C., 0° C. to 25° C., 20° C. to 60° C., 20° C. to 55° C., 20° C. to 50° C., 20° C. to 45° C., 20° C. to 40° C., 20° C. to 35° C., 20° C. to 30° C., 30° C. to 60° C., 30° C. to 55° C., 30° C. to 50° C., 30° C. to 45° C., 30° C. to 40° C., 30° C. to 40° C., 40° C. to 60° C., 40° C. to 55° C., 40° C. to 50° C., or 50° C. to 60° C. when a salt is added to demulsify the cell composition or the lysed cell composition.

In some embodiments, the process comprises contacting a cell composition or a lysed cell composition with 20% or less, 15% or less, 10% or less, 7.5% or less, 5% or less, or 2% or less salt by weight, of the lysed cell composition or the cell composition. In some embodiments, a process comprises contacting a cell composition or a lysed cell composition with 0.1% to 20%, 0.1% to 15%, 0.1% to 10%, 0.5% to 20%, 0.5% to 15%, 0.5% to 10%, 0.5% to 5%, 0.5% to 4%, 0.5% to 3%, 0.5% to 2.5%, 0.5% to 2%, 0.5% to 1.5%, 0.5% to 1%, 1% to 20%, 1% to 15%, 1% to 10%, 1% to 5%, 1% to 4%, 1% to 3%, 1% to 2.5%, 1% to 2%, 1% to 1.5%, 1.5% to 5%, 1.5% to 4%, 1.5% to 3%, 1.5% to 2.5%, 1.5% to 2%, 2% to 20%, 2% to 15%, 2% to 10%, 2% to 5%, 2% to 4%, 2% to 3%, 2% to 2.5%, 2.5% to 5%, 2.5% to 4%, 2.5% to 3%, 3% to 5%, 3% to 4%, 4% to 5%, 5% to 20%, 5% to 15%, 5% to 10%, 10% to 20%, 10% to 15%, or 15% to 20% salt, by weight, of the cell composition or lysed cell composition (e.g., a total broth weight). For example, when a lysed cell composition weighs 1,000 kg, contacting with 0.5% to 20% salt, by weight, requires combining 5 kg to 200 kg of salt with the lysed cell composition.

In some embodiments, the process comprises heating a cell composition or a lysed cell composition to demulsify the lysed cell composition. In some embodiments the cell composition or the lysed cell composition is heated for a sufficient period of time for a base and/or a salt to demulsify a cell composition or a lysed cell composition. In some embodiments, the process comprises heating a cell composition or a lysed cell composition for at least 5 minutes, at least 10 minutes, at least 20 minutes, at least 30 minutes, at least 1 hour, at least 2 hours, at least 4 hours, at least 8 hours, at least 12 hours, at least 18 hours, at least 24 hours, at least 30 hours, at least 36 hours, at least 42 hours, at least 48 hours, at least 54 hours, at least 60 hours, at least 66 hours, at least 72 hours, at least 78 hours, at least 84 hours, at least 90 hours or at least 96 hours. In some embodiments, the process comprises heating a lysed cell composition for 5 minutes to 96 hours, 5 minutes to 4 hours, 5 minutes to 2 hours, 5 minutes to 1 hour, 10 minutes to 4 hours, 10 minutes to 2 hours, 10 minutes to 1 hour, 1 hour to 96 hours, 1 hour to 84 hours, 1 hour to 72 hours, 1 hour to 60 hours, 1 hour to 48 hours, 1 hour to 36 hours, 1 hour to 24 hours, 1 hour to 4 hours, 4 hours to 96 hours, 4 hours to 84 hours, 4 hours to 72 hours, 4 hours to 60 hours, 4 hours to 48 hours, 4 hours to 36 hours, 4 hours to 24 hours, 8 hours to 96 hours, 8 hours to 84 hours, 8 hours to 72 hours, 8 hours to 60 hours, 8 hours to 48 hours, 8 hours to 36 hours, 8 hours to 24 hours, 8 hours to 12 hours, 12 hours to 96 hours, 12 hours to 84 hours, 12 hours to 72 hours, 12 hours to 60 hours, 12 hours to 48 hours, 12 hours to 36 hours, 12 hours to 24 hours, 24 hours to 96 hours, 24 hours to 84 hours, 24 hours to 72 hours, 24 hours to 60 hours, 24 hours to 48 hours, or 24 hours to 36 hours.

In some embodiments, a cell composition or a lysed cell composition can be heated at a temperature of at least 10° C., at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., at least 85° C., at least 90° C., at least 95° C., or at least 100° C. In some embodiments, a process comprises heating a cell composition or a lysed cell composition at a temperature of 10° C. to 100° C., 10° C. to 90° C., 10° C. to 80° C., 10° C. to 70° C., 20° C. to 100° C., 20° C. to 90° C., 20° C. to 80° C., 20° C. to 70° C., 30° C. to 100° C., 30° C. to 90° C., 30° C. to 80° C., 30° C. to 70° C., 40° C. to 100° C., 40° C. to 90° C., 40° C. to 80° C., 50° C. to 100° C., 50° C. to 90° C., 50° C. to 80° C., 50° C. to 70° C., 60° C. to 100° C., 60° C. to 90° C., 60° C. to 80° C., 70° C. to 100° C., 70° C. to 90° C., 80° C. to 100° C., 80° C. to 90° C., or 90° C. to 100° C. In some embodiments, a salt can be added to the cell composition or the lysed cell composition during the heating.

In some embodiments, a cell composition or a lysed cell composition can be heated in a closed system or in a system with an evaporator. In some embodiments, a cell composition or lysed cell composition can be heated in a system with an evaporator such that a portion of the water present in the cell composition or the lysed cell composition is removed by evaporation. In some embodiments, a process comprises heating a cell composition or a lysed cell composition in a system with an evaporator to remove up to 1%, 5%, 10%, 15%, 20%, 25%, 30%, 35%, 40%, 45% or 50% by weight of water present in the cell composition or lysed cell composition. In some embodiments, a process comprises heating a cell composition or a lysed cell composition in a system with an evaporator to remove 1% to 50%, 1% to 45%, 1% to 40%, 1% to 35%, 1% to 30%, 1% to 25%, 1% to 20%, 1% to 15%, 1% to 10%, 1% to 5%, 5% to 50%, 5% to 45%, 5% to 40%, 5% to 35%, 5% to 30%, 5% to 25%, 5% to 20%, 5% to 15%, 5% to 10%, 10% to 50%, 10% to 45%, 10% to 40%, 10% to 35%, 10% to 30%, 10% to 25%, 10% to 20%, 10% to 15%, 15% to 50%, 15% to 45%, 15% to 40%, 15% to 35%, 15% to 30%, 15% to 25%, 15% to 20%, 20% to 50%, 20% to 45%, 20% to 40%, 20% to 35%, 20% to 30%, 20% to 25%, 25% to 50%, 25% to 45%, 25% to 40%, 25% to 35%, 25% to 30%, 30% to 50%, 30% to 45%, 30% to 40%, 30% to 35%, 35% to 50%, 35% to 45%, 35% to 40%, 40% to 50%, 40% to 45%, or 45% to 50%.

In some embodiments, the process comprises holding a cell composition or a lysed cell composition in a vessel for a predetermined time to demulsify the lysed cell composition. In some embodiments, the process comprises holding a cell composition or a lysed cell composition in a vessel for at least 5 minutes, at least 10 minutes, at least 20 minutes, at least 30 minutes, at least 1 hour, at least 2 hours, at least 4 hours, at least 8 hours, at least 12 hours, at least 18 hours, at least 24 hours, at least 30 hours, at least 36 hours, at least 42 hours, at least 48 hours, at least 54 hours, at least 60 hours, at least 66 hours, at least 72 hours, at least 78 hours, at least 84 hours, at least 90 hours or at least 96 hours. In some embodiments, the process comprises holding a cell composition or a lysed cell composition for 5 minutes to 96 hours, 5 minutes to 4 hours, 5 minutes to 2 hours, 5 minutes to 1 hour, 10 minutes to 4 hours, 10 minutes to 2 hours, 10 minutes to 1 hour, 1 hour to 96 hours, 1 hour to 84 hours, 1 hour to 72 hours, 1 hour to 60 hours, 1 hour to 48 hours, 1 hour to 36 hours, 1 hour to 24 hours, 1 hour to 4 hours, 4 hours to 96 hours, 4 hours to 84 hours, 4 hours to 72 hours, 4 hours to 60 hours, 4 hours to 48 hours, 4 hours to 36 hours, 4 hours to 24 hours, 8 hours to 96 hours, 8 hours to 84 hours, 8 hours to 72 hours, 8 hours to 60 hours, 8 hours to 48 hours, 8 hours to 36 hours, 8 hours to 24 hours, 8 hours to 12 hours, 12 hours to 96 hours, 12 hours to 84 hours, 12 hours to 72 hours, 12 hours to 60 hours, 12 hours to 48 hours, 12 hours to 36 hours, 12 hours to 24 hours, 24 hours to 96 hours, 24 hours to 84 hours, 24 hours to 72 hours, 24 hours to 60 hours, 24 hours to 48 hours, or 24 hours to 36 hours.

In some embodiments, the process comprises contacting an antioxidant with a lysed cell emulsion. Antioxidants suitable for use with the present invention include, but are not limited to, a tocopherol, a tocotrienol, a polyphenol, resveratrol, a flavonoid, a carotenoid, lycopene, a carotene, lutein, ascorbic acid, ascorbyl palmitate, or the like, and combinations thereof.

In some embodiments, the process comprises allowing an emulsified lysed cell composition to stand, wherein the lipid is separated from the emulsified lysed cell composition using gravity.

As used herein, the terms "agitating" and "agitation" refer to a process of affecting motion in a lysed cell composition through an application of force. In some embodiments, the process of the invention comprises agitating a cell composition or a lysed cell composition by stirring, mixing, blending, shaking, vibrating, or a combination thereof. In some embodiments, the process of agitating a cell composition or a lysed cell composition demulsifies the cell composition or the lysed cell composition.

In some embodiments, the process of the invention comprises agitating a lysed cell composition at 0.1 hp/1,000 gal to 10 hp/1,000 gal, 0.5 hp/1,000 gal to 8 hp/1,000 gal, 1 hp/1,000 gal to 6 hp/1,000 gal, or 2 hp/1,000 gal to 5 hp/1,000 gal of lysed cell composition.

In some embodiments, the process of the invention comprises agitating a cell composition or a lysed cell composition using an agitator. In some embodiments, the agitator is a dispersion style agitator that disperses a base and/or salt in the cell composition or the lysed cell composition. In some embodiments, an agitator has one or more impellers. As used herein, "impeller" refers to a device arranged to impart motion to a cell composition or a lysed cell composition when rotated. Impellers suitable for use with the present invention include straight blade impellers, Rushton blade impellers, axial flow impellers, radial flow impellers, concave blade disc impellers, high-efficiency impellers, propellers, paddles, turbines, or the like, and combinations thereof.

In some embodiments, a process includes agitating a cell composition or a lysed cell composition using an agitator having an impeller tip speed of 90 ft/min to 1,200 ft/min, 200 ft/min to 1,000 ft/min, 300 ft/min to 800 ft/min, 400 ft/min to 700 ft/min, or 500 ft/min to 600 ft/min. In some embodiments, a process includes agitating a cell composition or a lysed cell composition using an agitator having an impeller tip speed of 350 centimeters/second to 900 centimeters per second, 350 centimeters/second to 850 centimeters per second, 350 centimeters/second to 800 centimeters/second, 350 centimeters/second to 750 centimeters/second, 350 centimeters/second to 700 centimeters/second, 350 centimeters/second to 650 centimeters/second, 350 centimeters/second to 600 centimeters/second, 350 centimeters/second to 550 centimeters/second, 350 centimeters/second to 500 centimeters/second, 350 centimeters/second to 450 centimeters/second, 350 centimeters/second to 400 centimeters/second, 400 centimeters/second to 900 centimeters per second, 400 centimeters/second to 850 centimeters per second, 400 centimeters/second to 800 centimeters/second, 400 centimeters/second to 750 centimeters/second, 400 centimeters/second to 700 centimeters/second, 400 centimeters/second to 650 centimeters/second, 400 centimeters/second to 600 centimeters/second, 400 centimeters/second to 550 centimeters/second, 400 centimeters/second to 500 centimeters/second, 400 centimeters/second to 450 centimeters/second, 450 centimeters/second to 900 centimeters per second, 450 centimeters/second to 850 centimeters per second, 450 centimeters/second to 800 centimeters/second, 450 centimeters/second to 750 centimeters/second, 450 centimeters/second to 700 centimeters/second, 450 centimeters/second to 650 centimeters/second, 450 centimeters/second to 600 centimeters/second, 450 centimeters/second to 550 centimeters/second, 450 centimeters/second to 500 centimeters/second, 500 centimeters/second to 900 centimeters per second, 500 centimeters/second to 850 centimeters per second, 500 centimeters/second to 800 centimeters/second, 500 centimeters/second to 750 centimeters/second, 500 centimeters/second to 700 centimeters/second, 500 centimeters/second to 650 centimeters/second, 500 centimeters/second to 600 centimeters/second, 500 centimeters/second to 550 centimeters/second, 550 centimeters/second to 900 centimeters per second, 550 centimeters/second to 850 centimeters per second, 550 centimeters/second to 800 centimeters/second, 550 centimeters/second to 750 centimeters/second, 550 centimeters/second to 700 centimeters/second, 550 centimeters/second to 650 centimeters/second, 550 centimeters/second to 600 centimeters/second, 600 centimeters/second to 900 centimeters per second, 600 centimeters/second to 850 centimeters per second, 600 centimeters/second to 800 centimeters/second, 600 centimeters/second to 750 centimeters/second, 600 centimeters/second to 700 centimeters/second, 600 centimeters/second to 650 centimeters/second, 650 centimeters/second to 900 centimeters per second, 650 centimeters/second to 850 centimeters per second, 650 centimeters/second to 800 centimeters/second, 650 centimeters/second to 750 centimeters/second, 650 centimeters/second to 700 centimeters/second, 700 centimeters/second to 900 centimeters per second, 700 centimeters/second to 850 centimeters per second, 700 centimeters/second to 800 centimeters/second, 700 centimeters/second to 750 centimeters/second, 750 centimeters/second to 900 centimeters per second, 750 centimeters/second to 850 centimeters per second, 750 centimeters/second to 800 centimeters/second, 800 centimeters/second to 900 centimeters/second, 800 centimeters/second to 850 centimeters per second, or 850 centimeters/second to 900 centimeters/second. As used herein, "impeller tip speed" refers to the speed of the outer most portion of the impeller as it rotates around its central axis.

In some embodiments, the agitating (and optionally additional steps as described herein) is performed in a container comprising an impeller, wherein a ratio of the impeller diameter to the container volume is 0.1 to 0.5, 0.1 to 0.4, 0.2 to 0.5, 0.2 to 0.4, 0.3 to 0.5, or 0.3 to 0.4.

In some embodiments, the agitating (and optionally additional steps as described herein) is performed in a container comprising an impeller, wherein a ratio of the impeller diameter to the inner diameter of the container is at least 0.25, at least 0.34, at least 0.65, 0.25 to 0.65, 0.25 to 0.33, 0.3 to 0.6, 0.3 to 0.5, 0.3 to 0.4, 0.34 to 0.65, 0.34 to 0.6, 0.34 to 0.55, 0.37 to 0.55, 0.4 to 0.65, 0.4 to 0.6, 0.4 to 0.5, or 0.42 to 0.55.

In some embodiments, agitating comprises mixing a cell composition or a lysed cell composition such that the cell composition or the lysed cell composition is placed under flow conditions described by a Reynolds number of 10 to 10,000, 1,000 to 10,000, 1,500 to 10,000, or 2,000 to 10,000. In some embodiments, a lysed cell emulsion during the agitating has a Reynolds number of 2,000 or more, 3,000 or more, or 5,000 or more, or 2,000 to 10,000, 3,000 to 10,000, or 5,000 to 10,000.

In some embodiments, a process comprises agitating a cell composition or a lysed cell composition for at least 5 minutes, at least 10 minutes, at least 20 minutes, at least 30 minutes, at least 1 hour, at least 2 hours, at least 4 hours, at least 8 hours, at least 12 hours, at least 18 hours, at least 24 hours, at least 30 hours, at least 36 hours, at least 42 hours, at least 48 hours, at least 54 hours, at least 60 hours, at least 66 hours, at least 72 hours, at least 78 hours, at least 84 hours, at least 90 hours or at least 96 hours. In some embodiments, a process comprises agitating a cell composition or a lysed cell composition for 5 minutes to 96 hours, 5 minutes to 4 hours, 5 minutes to 2 hours, 5 minutes to 1 hour, 10 minutes to 4 hours, 10 minutes to 2 hours, 10 minutes to 1 hour, 1 hour to 96 hours, 1 hour to 84 hours, 1 hour to 72 hours, 1 hour to 60 hours, 1 hour to 48 hours, 1 hour to 36 hours, 1 hour to 24 hours, 1 hour to 4 hours, 4 hours to 96 hours, 4 hours to 84 hours, 4 hours to 72 hours, 4 hours to 60 hours, 4 hours to 48 hours, 4 hours to 36 hours, 4 hours to 24 hours, 8 hours to 96 hours, 8 hours to 84 hours, 8 hours to 72 hours, 8 hours to 60 hours, 8 hours to 48 hours, 8 hours to 36 hours, 8 hours to 24 hours, 8 hours to 12 hours, 12 hours to 96 hours, 12 hours to 84 hours, 12 hours to 72 hours, 12 hours to 60 hours, 12 hours to 48 hours, 12 hours to 36 hours, 12 hours to 24 hours, 20 hours to 40 hours, 24 hours to 96 hours, 24 hours to 84 hours, 24 hours to 72 hours, 24 hours to 60 hours, 24 hours to 48 hours, or 24 hours to 36 hours.

In some embodiments, a process comprises simultaneously agitating and heating a cell composition or a lysed cell composition to demulsify the cell composition or the lysed cell composition. In some embodiments, a process comprises agitating a cell composition or a lysed cell composition at a temperature of at least 10° C., at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., at least 85° C., at least 90° C., at least 95° C., or at least 100° C. In some embodiments, a process comprises agitating a cell composition or a lysed cell composition at a temperature of 10° C. to 100° C., 10° C. to 90° C., 10° C. to 80° C., 10° C. to 70° C., 20° C. to 100° C., 20° C. to 90° C., 20° C. to 80° C., 20° C. to 70° C., 30° C. to 100° C., 30° C. to 90° C., 30° C. to 80° C., 30° C. to 70° C., 40° C. to 100° C., 40° C. to 90° C., 40° C. to 80° C., 50° C. to 100° C., 50° C. to 90° C., 50° C. to 80° C., 50° C. to 70° C., 60° C. to 100° C., 60° C. to 90° C., 60° C. to 80° C., 70° C. to 100° C., 70° C. to 90° C., 80° C. to 1000° C., 80° C. to 90° C., or 90° C. to 100° C.

In some embodiments, the various combinations of forming a lysed cell composition, contacting a lysed cell composition with a base or raising the pH of a lysed cell composition, contacting a lysed cell composition with a salt, heating the lysed cell composition, and agitating a lysed cell composition can occur in a single vessel. In some embodiments, the various combinations of forming a cell composition, contacting a cell composition with a base or raising the pH of a cell composition, contacting a cell composition with a salt, heating the cell composition, and agitating a cell composition can occur in a single vessel. In some embodiments, the single vessel includes a fermentation vessel. In some embodiments, the fermentation vessel can have a volume of at least 20,000 liters, at least 50,000 liters, at least 100,000 liters, at least 120,000 liters, at least 150,000 liters, at least 200,000 liters, or at least 220,000 liters. In some embodiments, the fermentation vessel can have a volume of 20,000 liters to 220,000 liters, 20,000 liters to 100,000 liters, 20,000 liters to 50,000 liters, 50,000 liters to 220,000 liters, 50,000 liters to 150,000 liters, 50,000 liters to 100,000 liters, 100,000 liters to 220,000 liters, 100,000 liters to 150,000 liters, 100,000 liters to 120,000 liters, 150,000 liters to 220,000 liters, 150,000 liters to 200,000 liters, or 200,000 liters to 220,000 liters.

In some embodiments, a quantity of cell composition or lysed cell composition formed in a vessel can be transferred into one or more agitation vessels. In some embodiments, the agitation vessels can have a volume of at least 20,000 liters, at least 30,000 liters, at least 40,000 liters or at least 50,000 liters. In some embodiments, the agitation vessels can have a volume of 20,000 liters to 50,000 liters, 20,000 liters to 40,000 liters, 20,000 liters to 30,000 liters, 30,000 liters to 50,000 liters, 30,000 liters to 40,000 liters or 40,000 liters to 50,000 liters.

In some embodiments, the agitation vessels can have any combination of the following properties. In some embodiments, the agitation vessels can have two impellers. In some embodiments, the impellers are Rushton blade impellers. In some embodiments, the impellers are separated from each other by a distance at least equal to a diameter of the smallest impeller. In some embodiments, the impellers are 30 inches to 40 inches, 33 inches to 37 inches, 33 inches, 34 inches, 35 inches, 36 inches or 37 inches from tip to tip. In some embodiments, the agitation vessels have a volume of at least 10,000 liters, at least 20,000 liters, at least 30,000 liters, at least 40,000 liters or at least 50,000 liters. In some embodiments, the agitation vessels have an inner diameter of 90 inches to 110 inches, 95 inches to 105 inches, 98 inches, 99 inches, 100 inches, 101 inches, or 102 inches. In some embodiments, a first impeller is located 15 inches to 20 inches, 16 inches to 19 inches, or 17 inches to 18 inches from a bottom of the agitation vessel and a second impeller is located 60 inches to 80 inches, 65 inches to 75 inches, 68 inches, 69 inches, 70 inches, 71 inches, 72 inches, 73 inches, 74 inches, or 75 inches above the first impeller. In some embodiments, a lysed cell composition is agitated at least 50 rpm, at least 60 rpm, or at least 70 rpm. In some embodiments, a lysed cell composition is agitated at 50 rpm to 70 rpm, 50 rpm to 60 rpm, or 60 rpm to 70 rpm.

In some embodiments, the cell composition, the lysed cell composition, or the lipid are harvested from a vessel by pumping the cell composition, the lysed cell composition, or the lipid from the vessel. In some embodiments, the cell composition, the lysed cell composition, or the lipid are harvested from a vessel without agitating the vessel. In some embodiments, the cell composition, the lysed cell composition, or the lipid are harvested from a vessel by pumping, without agitation, the cell composition, the lysed cell composition, or the lipid from the vessel. In some embodiments, the cell composition, the lysed cell composition, or the lipid are harvested from a vessel without blowing air. In some embodiments, harvesting the cell composition, the lysed cell composition, or the lipid by the techniques described above results in a crude lipid having a low anisidine value (e.g., 26 or less, 25 or less, 20 or less, 15 or less, 10 or less, 5 or less, 2 or less, or 1 or less) and/or a low phosphorus content (e.g., 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less).

As described herein, the present invention utilizes various combinations of contacting a lysed cell composition with a first base or raising the pH of a lysed cell composition, contacting a lysed cell composition with a salt, heating a lysed cell composition, and agitating a lysed cell composition to provide a treated lysed cell composition. As described herein, the present invention utilizes various combinations of contacting a cell composition with a first base or raising the pH of a cell composition, contacting a cell composition with a salt, heating a cell composition, and agitating a cell composition to provide a treated cell composition. The treated cell composition or treated lysed cell composition is at least partially demulsified compared with an untreated cell composition or treated lysed cell composition. Thus, a treated cell composition or treated lysed cell composition can be placed in a centrifuge and a lipid can be separated therefrom.

In some embodiments, after raising the pH of a cell composition or lysed cell composition, e.g., by contacting with a first base, the heating the cell composition or lysed cell composition and/or the agitating the cell composition or lysed cell composition can decrease the pH of the treated cell composition or treated lysed cell composition. In order for a lipid to be more effectively separated from a treated cell composition or treated lysed cell composition by centrifuging, the pH of the treated cell composition or treated lysed cell composition is raised a second time, e.g., by contacting the treated cell composition or the treated lysed cell composition with a second base. In some embodiments, contacting a treated lysed cell composition with a second base raises the pH of the treated cell composition or the treated lysed cell composition. In some embodiments, a treated cell composition or a treated lysed cell composition is contacted with a second base to raise the pH of the treated cell composition or the treated lysed cell composition to 7 or above, 7.5 or above, 8 or above, 8.5 or above, 9 or above, 9.5 or above, 10 or above, 10.5 or above, 11 or above, 11.5 or above, or 12 or above. In some embodiments, a treated cell composition or a treated lysed cell composition is contacted with a second base to raise the pH of the treated lysed cell composition to 7 to 13, 7 to 12, 7 to 11, 7 to 10, 7 to 9, 7 to 8, 7 to 7.5, 7.5 to 8, 8 to 13, 8 to 12, 8 to 11, 8 to 10, 8 to 9, 8 to 8.5, 8.5 to 9, 9 to 12, 9 to 11, 9 to 10, 9 to 9.5, 9.5 to 10, 10 to 12, or 10 to 11.

In some embodiments, the pH of a treated cell composition or a treated lysed cell emulsion is 7 or less, 6 or less, 5 or less, 4 or less, or 3 or less.

The processes of the present invention comprise separating a lipid from a treated cell composition or a treated lysed cell composition. In some embodiments, a lipid is separated from a lysed cell emulsion after contacting a lysed cell emulsion with a second base, after the agitating a lysed cell emulsion, or after contacting a lysed cell emulsion with a salt by, for example, permitting the treated lysed cell emulsion to rest for a period of time sufficient for a lipid to separate from the treated lysed cell emulsion (e.g., as a separate layer). The lipid can be subsequently removed, for example, by decanting, skimming, vacuuming, pumping, sucking off, drawing off, siphoning, or otherwise removing the lipid from the surface of the treated lysed cell emulsion.

In some embodiments, the separating comprises centrifuging a treated cell composition or a treated lysed cell composition (e.g., at a temperature of 30° C. to 100° C.), whereby the centrifuging separates a lipid from the treated cell composition or the treated lysed cell composition.

In some embodiments, a process comprises centrifuging a treated cell composition or a treated lysed cell composition at a temperature of at least 10° C., at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., at least 85° C., at least 90° C., at least 95° C., or at least 100° C. In some embodiments, a process comprises centrifuging a treated cell composition or a treated lysed cell composition at a temperature of 10° C. to 100° C., 10° C. to 90° C., 10° C. to 80° C., 20° C. to 100° C., 20° C. to 90° C., 20° C. to 80° C., 25° C. to 100° C., 25° C. to 90° C., 25° C. to 80° C., 25° C. to 75° C., 30° C. to 100° C., 30° C. to 90° C., 30° C. to 80° C., 40° C. to 100° C., 40° C. to 90° C., 40° C. to 80° C., 50° C. to 100° C., 50° C. to 90° C., 50° C. to 80° C., 50° C. to 70° C., 60° C. to 100° C., 60° C. to 90° C., 60° C. to 80° C., 60° C. to 70° C., 70° C. to 100° C., or 70° C. to 90° C.

In some embodiments, centrifuging is conducted at a feed rate (of a treated cell composition or a treated lysed cell composition into a centrifuge) of 1 kilogram per minute (kg/min) to 500 kg/min, 1 kg/min to 400 kg/min, 1 kg/min to 300 kg/min, 1 kg/min to 200 kg/min, 1 kg/min to 100 kg/min, 1 kg/min to 75 kg/min, 1 kg/min to 50 kg/min, 1 kg/min to 40 kg/min, 1 kg/min to 30 kg/min, 1 kg/min to 25 kg/min, 1 kg/min to 10 kg/min, 10 kg/min to 500 kg/min, 10 kg/min to 400 kg/min, 10 kg/min to 300 kg/min, 10 kg/min to 200 kg/min, 10 kg/min to 100 kg/min, 10 kg/min to 75 kg/min, 10 kg/min to 50 kg/min, 10 kg/min to 40 kg/min, 10 kg/min to 30 kg/min, 20 kg/min to 500 kg/min, 20 kg/min to 400 kg/min, 20 kg/min to 300 kg/min, 20 kg/min to 200 kg/min, 20 kg/min to 100 kg/min, 20 kg/min to 75 kg/min, 20 kg/min to 50 kg/min, 20 kg/min to 40 kg/min, 25 kg/min to 500 kg/min, 25 kg/min to 400 kg/min, 25 kg/min to 300 kg/min, 25 kg/min to 200 kg/min, 25 kg/min to 100 kg/min, 25 kg/min to 75 kg/min, 25 kg/min to 50 kg/min, 30 kg/min to 60 kg/min, 30 kg/min to 50 kg/min, 30 kg/min to 40 kg/min, 50 kg/min to 500 kg/min, 100 kg/min to 500 kg/min, or 200 kg/min to 500 kg/min.

The total time required for the separating can vary depending on the volume of the treated cell composition or the treated lysed cell composition. Typical total time for separation (e.g., centrifuge time) is at least 0.1 hour, at least 0.2 hour, at least 0.5 hour, at least 1 hour, at least 2 hours, at least 4 hours, at least 6 hours, at least 8 hours, at least 10 hours, at least 12 hours, or 0.1 hour to 24 hours, 0.5 hour to 24 hours, 1 hour to 12 hours, 2 hours to 10 hours, or 4 hours to 8 hours.

In some embodiments, a process of the invention comprises centrifuging a treated cell composition or a treated lysed cell composition at a centrifugal force of 1,000 g to 25,000 g, 1,000 g to 20,000 g, 1,000 g to 10,000 g, 2,000 g to 25,000 g, 2,000 g to 20,000 g, 2,000 g to 15,000 g, 3,000 g to 25,000 g, 3,000 g to 20,000 g, 5,000 g to 25,000 g, 5,000 g to 20,000 g, 5,000 g to 15,000 g, 5,000 g to 10,000 g, 5,000 g to 8,000 g, 10,000 g to 25,000 g, 15,000 g to 25,000 g, or at least 1,000 g, at least 2,000, g, at least 4,000 g, at least 5,000 g, at least 7,000 g, at least 8,000 g, at least 10,000 g, at least 15,000 g, at least 20,000 g, or at least 25,000 g. As used herein, "g" refers to standard gravity or approximately 9.8 m/s$^2$. In some embodiments, a process of the invention comprises centrifuging a treated cell composition or a treated lysed cell composition at 4,000 rpm to 14,000 rpm, 4,000 rpm to 10,000 rpm, 6,000 rpm to 14,000 rpm, 6,000 rpm to 12,000 rpm, 8,000 to 14,000 rpm, 8,000 rpm to 12,000 rpm, or 8,000 rpm to 10,000 rpm.

In some embodiments, a process of the invention comprises drying a lipid after separation of the lipid from a treated cell composition or a treated lysed cell composition in order to remove water from the lipid. In some embodiments, drying the lipid can include, but is not limited to, heating the lipid to evaporate water. In some embodiments, after drying, the lipid has a water content by weight percentage of lipid that is less than 3%, less than 2.5%, less than 2%, less than 1.5%, less than 1%, less than 0.5%, less than 0.1%, or 0%. In some embodiments, after drying, the lipid has a water content by weight percentage of lipid of 0% to 3%, 0% to 2.5%, 0% to 2%, 0% to 1.5%, 0% to 1%, 0% to 0.5%, 0.1% to 3%, 0.1% to 2.5%, 0.1% to 2%, 0.1% to 1.5%, 0.1% to 1%, 0.1% to 0.5%, 0.5% to 3%, 0.5% to 2.5%, 0.5% to 2%, 0.5% to 1.5%, 0.5% to 1%, 1% to 3%, 1% to 2.5%, 1% to 2%, 1% to 1.5%, 1.5% to 3%, 1.5% to 2.5%, 1.5% to 2%, 2% to 3%, 2% to 2.5%, or 2.5% to 3%.

In some embodiments, a process further comprises refining a lipid by one or more processes selected from caustic refining, degumming, alkali-refining, bleaching, deodorization, deacidification, or the like, and combinations thereof to remove one or more phospholipids, free fatty acids, phosphatides, color bodies, sterols, odors, and other impurities. As used herein, a "refined oil" is a crude lipid or crude oil that has been refined. As used herein, "a crude lipid" or "a crude oil" is a lipid or oil that has not been refined. In some embodiments, the lipid separated from a demulsified cell composition is a crude lipid.

Various exemplary processes of the present invention are described schematically in FIGS. 1-4. Referring to FIG. 1, in some embodiments, the present invention is directed to a process (100) for obtaining a lipid (110) from a cell (101), comprising lysing (102) the cell (101) to form a lysed cell composition (103). The lysed cell composition is contacted with a first base (104) to demulsify lysed cell composition (103), contacted with a salt (105) to demulsify lysed cell composition (103), and heated (106), e.g., for 10 minutes to 96 hours, to provide a treated lysed cell composition (107). The treated lysed cell composition (107) is contacted with a second base (108) and separated (109), e.g., at a temperature of 10° C. to 100° C., to provide a lipid (110).

Figure 2:
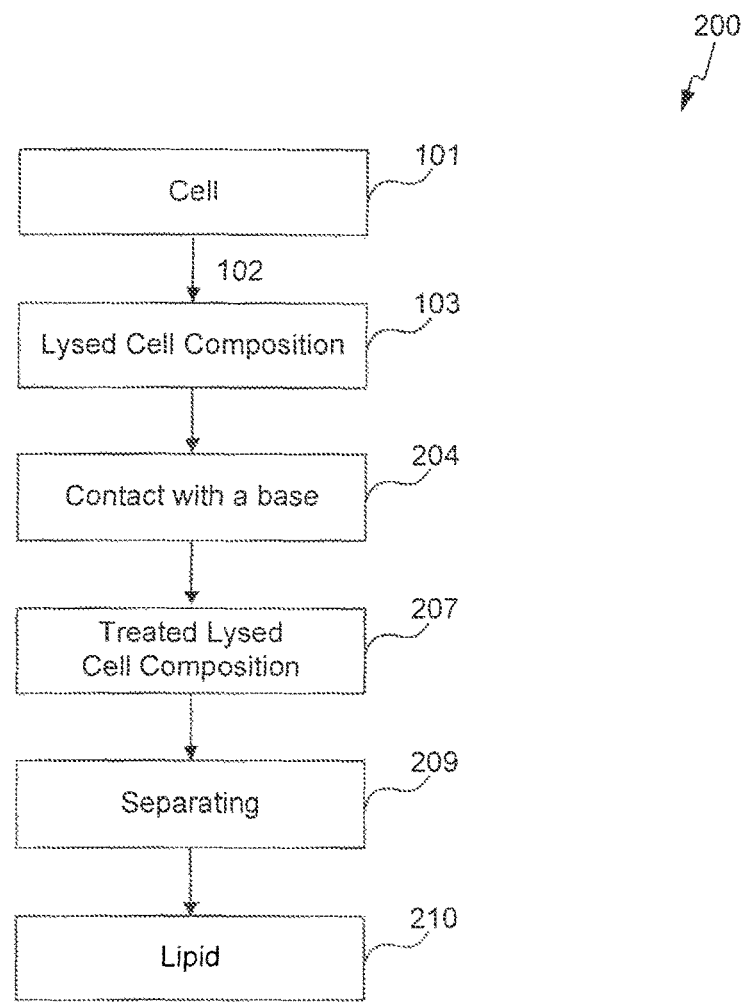

Referring to FIG. 2, in some embodiments, the present invention is directed to a process (200) for obtaining a lipid (210) from a cell, the process comprising lysing (102) a cell (101) to form a lysed cell composition (103). The lysed cell composition is then contacted with a base (204) to demulsify lysed cell composition (103) and to provide a treated lysed cell composition (207). The treated lysed cell composition (207) is separated (209), e.g., at a temperature of 10° C. to 100° C., to provide a lipid (210).

Figure 3:
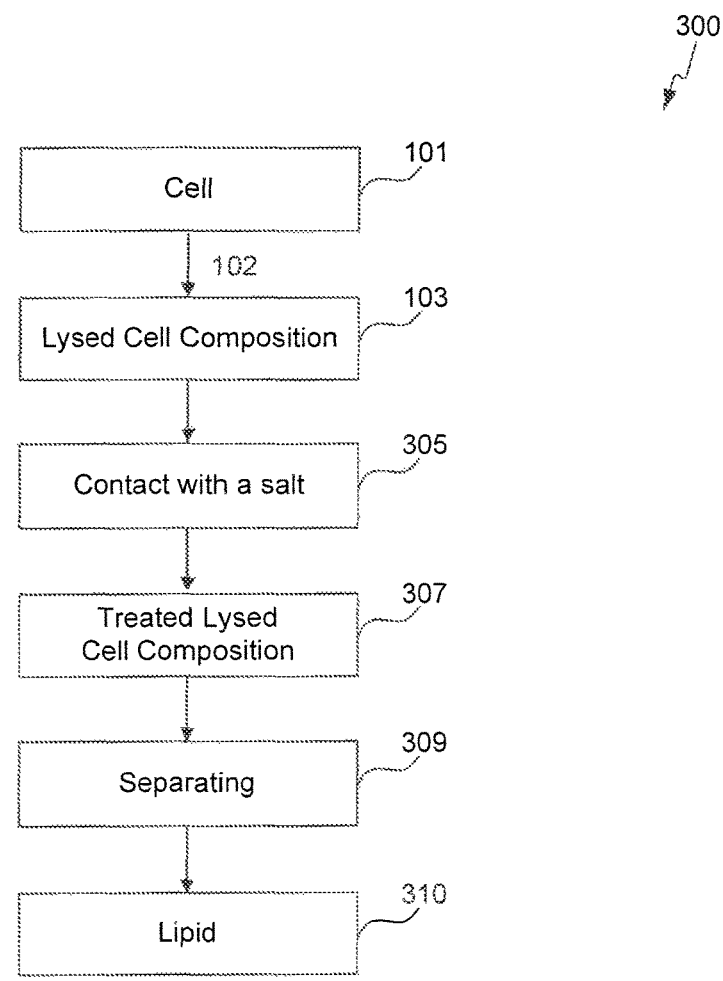

Referring to FIG. 3, in some embodiments, the present invention is directed to a process (300) for obtaining a lipid (310) from a cell, the process comprising lysing (102) a cell (101) to form a lysed cell composition (103). The lysed cell composition is then contacted with a salt (305) to demulsify lysed cell composition (103) and to provide a treated lysed cell composition (307), which is separated (309), e.g., at a temperature of 10° C. to 100° C., to provide a lipid (310).

Figure 4:
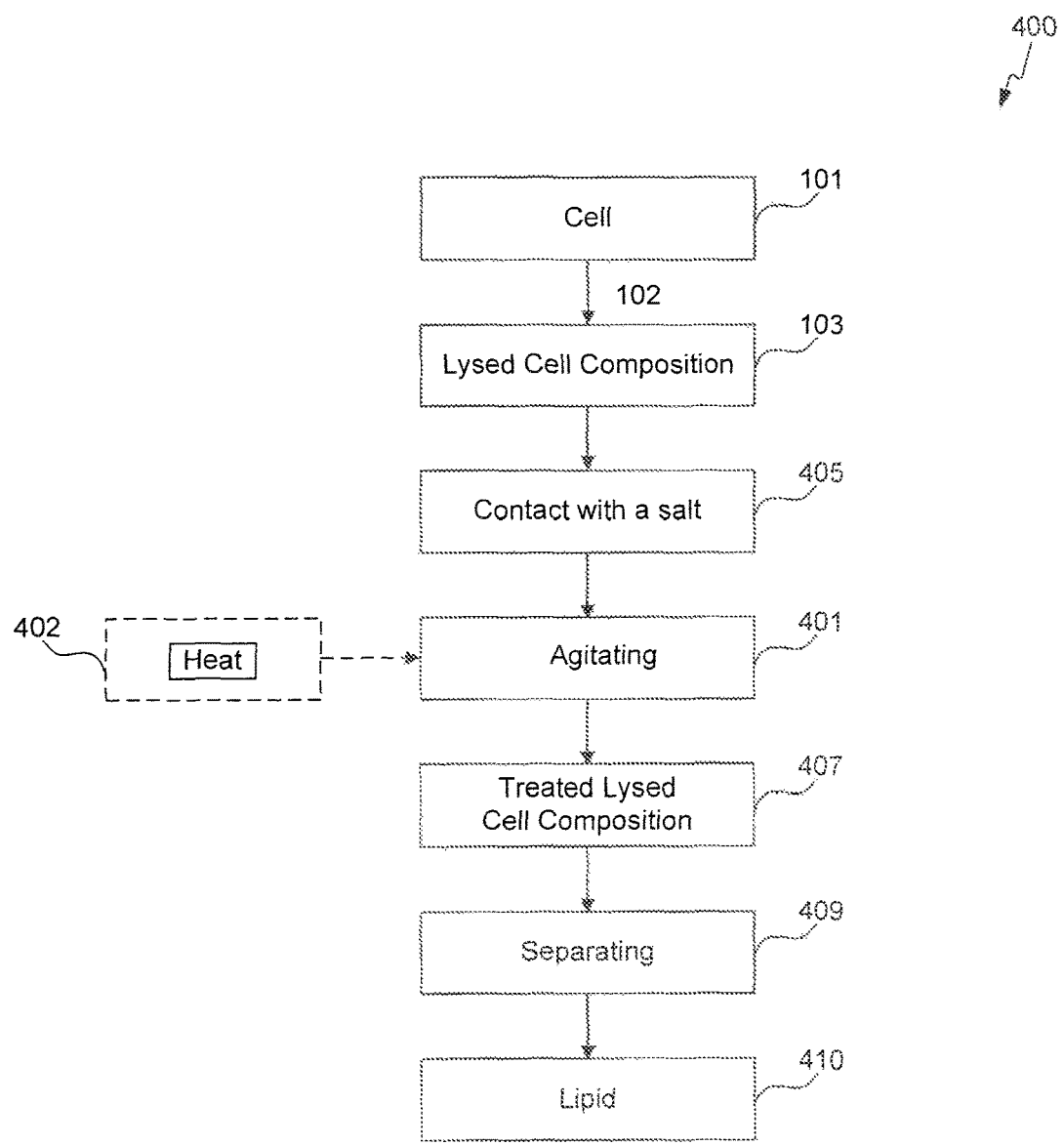

Referring to FIG. 4, in some embodiments, the present invention is directed to a process (400) for obtaining a lipid (410) from a cell, the process comprising lysing (102) a cell (101) to form a lysed cell composition (103). The lysed cell composition is then contacted with a salt (405) to demulsify lysed cell composition (103) and agitated (401), e.g., for 5 minutes to 96 hours, and optionally heated (402), to provide a treated lysed cell composition (407). The treated lysed cell composition is then separated (409), e.g., at a temperature of 10° C. to 100° C., to provide a lipid (410).

In some embodiments, a process of the present invention comprises concentrating a broth comprising a microbial cell, a broth comprising plant material and/or concentrating a lysed cell composition. As used herein, "concentrating" refers to removing water from a composition. Concentrating can include, but is not limited to, evaporating, chemical drying, centrifuging, and the like, and combinations thereof. In some embodiments, a broth comprising a microbial cell or a broth comprising plant material is concentrated to provide a lipid concentration of at least 4%, at least 5%, at least 10%, at least 15%, at least 20%, at least 25%, or at least 30% by weight of the broth. In some embodiments, a broth comprising a microbial cell or a broth comprising plant material is concentrated to provide a lipid concentration of 4% to 40%, 4% to 30%, 4% to 20%, 4% to 15%, 5% to 40%, 5% to 30%, 5% to 20%, 10% to 40%, 10% to 30%, 10% to 20%, 15% to 40%, 15% to 30%, 20% to 40%, 20% to 30%, 25% to 40%, or 30% to 40% by weight of the broth.

In some embodiments, a cell composition or a lysed cell composition is concentrated to provide a lipid concentration of at least 4%, at least 5%, at least 10%, at least 15%, at least 20%, at least 25%, or at least 30% by weight of the lysed cell composition. In some embodiments, a cell composition or a lysed cell composition is concentrated to provide a lipid concentration of 4% to 40%, 4% to 30%, 4% to 20%, 4% to 15%, 5% to 40%, 5% to 30%, 5% to 20%, 10% to 40%, 10% to 30%, 10% to 20%, 15% to 40%, 15% to 30%, 20% to 40%, 20% to 30%, 25% to 40%, or 30% to 40% by weight of the lysed cell composition.

In some embodiments, a lipid prepared by a process of the present invention has an overall aroma intensity of 2 or less. As used herein, the term "overall aroma intensity" refers to the olfactory sensory rating given to the lipid by a panel of sensory analysts. As used herein, the term "sensory analyst" refers to a trained individual that provides feedback on and/or rates the sensory characteristics of a substance.

In some embodiments, a lipid prepared by a process of the present invention has an overall aromatic intensity of 3 or less. As used herein, the term "overall aromatic intensity" refers to the gustatory, or taste, sensory rating given to the lipid by a panel of sensory analysts. In some embodiments, the Universal Spectrum descriptive analysis method is used to assess the aroma and aromatic characteristics of samples. This method uses an intensity scale of 0-15, where 0=none detected and 15=very high intensity, to measure the aroma and aromatic attributes of the oils.

In some embodiments, a lipid prepared by a process of the present invention does not have an aftertaste characterized as fishy. As used herein, the term "aftertaste" refers to the persistence of a sensation of a flavor in the lipid, as characterized by a panel of sensory analysts.

In some embodiments, a process of the present invention provides a crude lipid having a peroxide value (PV) of 5 or less, 4.5 or less, 4 or less, 3.5 or less, 3 or less, 2.5 or less, 2 or less, 1.5 or less, 1 or less, 0.5 or less, 0.2 or less, or 0.1 or less. As used herein, the terms "peroxide value" or "PV" refer to the measure of primary reaction products, such as peroxides and hydroperoxides, that occur during oxidation of the lipid. In some embodiments, the PV is an indicator of the quality of the lipid and the extent of oxidation which has occurred in the lipid having a low PV (i.e., 5 or less) demonstrates increased stability and sensory profiles than lipids having a PV greater than 5. In some embodiments, adding a base to a lysed cell composition, as discussed above, raises the pH of the lysed cell composition and inhibits lipid oxidation, thereby minimizing the amount of free radicals in the lysed cell composition so that the crude lipid obtained from the processes of the invention has a low PV (i.e., 5 or less).

In some embodiments, a process of the present invention provides a crude lipid having an anisidine value (AV) of 26 or less, 25 or less, 20 or less, 15 or less, 10 or less, 5 or less, 2 or less, or 1 or less. As used herein, the terms "anisidine value" or "AV" refer to the measure of secondary reaction products, such as aldehydes and ketones, that occur during oxidation of the lipid. In some embodiments, the AV is an indicator of the quality of the lipid and the extent of oxidation which has occurred in the lipid. A lipid having a low AV (i.e., 26 or less) demonstrates increased stability and sensory profiles than lipids having an AV greater than 26. In some embodiments, adding a base to a lysed cell composition, as discussed above, raises the pH of the lysed cell composition and inhibits lipid oxidation, thereby minimizing the amount of free radicals in the lysed cell composition so that the crude lipid obtained from the processes of the invention has a low AV (i.e., 26 or less).

In some embodiments, a process of the present invention provides a crude lipid having a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less.

In some embodiments, a process of the present invention provides a crude lipid that has a lower anisidine value, lower peroxide value, lower phosphorus content and/or a higher extraction yield than if extraction was performed using a solvent (e.g., atypical hexane extraction or a FRIOLEX® process (Westfalia Separator AG, Germany)). The FRIOLEX® process which is a process of extracting lipids with a water-soluble organic solvent as described in U.S. Pat. No. 5,928,696 and International Pub. Nos. WO 01/76385 and WO 01/76715, each of which is incorporated by reference herein in its entirety.

In some embodiments, heating the lysed cell composition causes the secondary reaction products (e.g., aldehydes and ketones) to participate in a reaction similar to the Maillard reaction with proteins present in the lysed cell composition. The reaction is believed to create products that possess antioxidant activity, which reduces the oxidation of the lipid. In some embodiments, additional protein, e.g., soy protein, can be added to the lysed cell composition to increase the antioxidant activity. The reduction in oxidation of the lipid reduces the AV of the lipid, reduces any aftertaste of the lipid and/or increases the stability of the lipid. In some embodiments, the stability is increased at least 5%, at least 10%, at least 15% or at least 20%.

In some embodiments, a lipid extracted by a process of the present invention, the biomass remaining after extraction of the lipid, or combinations thereof can be used directly as a food or food ingredient, such as an ingredient in baby food, infant formula, beverages, sauces, dairy based foods (such as milk, yogurt, cheese and ice-cream), oils (e.g., cooking oils or salad dressings), and baked goods; nutritional supplements (e.g., in capsule or tablet forms); feed or feed supplement for any non-human animal (e.g., those whose products (e.g., meat, milk, or eggs) are consumed by humans); food supplements; and pharmaceuticals (in direct or adjunct therapy application). The term "animal" refers to any organism belonging to the kingdom Animalia and includes any human animal, and non-human animal from which products (e.g., milk, eggs, poultry meat, beef, pork or lamb) are derived. In some embodiments, the lipid and/or biomass can be used in seafood. Seafood is derived from, without limitation, fish, shrimp and shellfish. The term "products" includes any product derived from such animals, including, without limitation, meat, eggs, milk or other products. When the lipid and/or biomass are fed to such animals, polyunsaturated lipids can be incorporated into the flesh, milk, eggs or other products of such animals to increase their content of these lipids.

Microbial Lipids

In some embodiments, the present invention is directed to a microbial lipid extracted according to the processes of the present invention. In some embodiments, a crude microbial lipid has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, the crude microbial lipid has less than 5%, less than 4%, less than 3%, less than 2%, or less than 1% by weight or volume of an organic solvent. In some embodiments, the crude microbial lipid has at least 10%, at least 15%, at least 20%, at least 25%, at least 30%, at least 35%, at least 40%, at least 45%, or at least 50% by weight of a desired PUFA. In some embodiments, the crude microbial lipid has at least 10%, at least 15%, at least 20%, at least 25%, at least 30%, at least 35%, at least 40%, at least 45%, or at least 50% by weight of DHA, and/or at least 10%, at least 15%, or at least 20% by weight of DPA n-6, and/or at least 10%, at least 15%, or at least 20% by weight of EPA, and/or at least 10%, at least 15%, at least 20%, at least 25%, at least 30%, at least 35%, at least 40%, at least 45%, or at least 50% by weight of ARA. In some embodiments a crude microbial lipid extracted according to the processes of the present invention result in a lower anisidine value, lower peroxide value, lower phosphorus content and/or a higher extraction yield than if extraction was performed using a solvent (e.g., a typical hexane extraction or a FRIOLEX® process (Westfalia Separator AG, Germany)).

Lipids Extracted from a First Set of Isolated Thraustochytrid Microorganisms

In some embodiments, the present invention is further directed to a microbial lipid extracted from a thraustochytrid as described in U.S. Pub. No. 2010/0239533 and Int'l. Pub. No. WO 2010/107415, each of which is incorporated by reference herein in its entirety. In some embodiments, the method comprises growing a thraustochytrid in a culture to produce a biomass and extracting a lipid comprising omega-3 fatty acids from the biomass. The lipid can be extracted from a freshly harvested biomass or can be extracted from a previously harvested biomass that has been stored under conditions that prevent spoilage. Known methods can be used to culture a thraustochytrid of the invention, to isolate a biomass from the culture, and to analyze the fatty acid profile of oils extracted from the biomass. See, e.g., U.S. Pat. No. 5,130,242, incorporated by reference herein in its entirety. The lipid can be extracted according to the processes of the present invention.

A microbial lipid of the invention can be any lipid derived from a microorganism, including, for example: a crude oil extracted from the biomass of the microorganism without further processing; a refined oil that is obtained by treating a crude microbial oil with further processing steps such as refining, bleaching, and/or deodorizing; a diluted microbial oil obtained by diluting a crude or refined microbial oil; or an enriched oil that is obtained, for example, by treating a crude or refined microbial oil with further methods of purification to increase the concentration of a fatty acid (such as DHA) in the oil.

In some embodiments, the microbial lipid comprises a sterol esters fraction of 0%, at least 0.1%, at least 0.2%, at least 0.5%, at least about 1%, at least 1.5%, at least 2%, or at least 5% by weight. In some embodiments, the microbial lipid comprises a sterol esters fraction of from 0% to 1.5%, 0% to 2%, 0% to 5%, 1% to 1.5%, 0.2% to 1.5%, 0.2% to 2%, or 0.2% to 5% by weight. In some embodiments, the microbial lipid comprises a sterol esters fraction of less than 5%, less than 4%, less than 3%, or less than 2% by weight.

In some embodiments, the microbial lipid comprises a triglyceride fraction of at least 65%, at least 70%, at least 75%, at least 80%, at least 85%, or at least 90% by weight. In some embodiments, the microbial lipid comprises a triglyceride fraction of from 65% to 95%, 75% to 95%, or 80% to 95% by weight, or 97% by weight, or 98% by weight.

In some embodiments, the microbial lipid comprises a free fatty acid fraction of at least 0.5%, at least 1%, at least 1.5%, at least 2%, at least 2.5%, or at least 5% by weight. In some embodiments, the microbial lipid comprises a free fatty acid fraction of from 0.5% to 5%, 0.5% to 2.5%, 0.5% to 2%, 0.5% to 1.5%, 0.5% to 1%, 1% to 2.5%, 1% to 5%, 1.5% to 2.5%, 2% to 2.5%, or 2% to 5% by weight. In some embodiments, the microbial lipid comprises a free fatty acid fraction of less than 5%, less than 4%, less than 3%, less than 2%, or less than 1% by weight.

In some embodiments, the microbial lipid comprises a sterol fraction of at least 0.5%, at least 1%, at least 1.5%, at least 2%, or at least 5% by weight. In some embodiments, the microbial lipid comprises a sterol fraction of from 0.5% to 1.5%, 1% to 1.5%, 0.5% to 2%, 0.5% to 5%, 1% to 2%, or 1% to 5% by weight. In some embodiments, the microbial lipid comprises a sterol fraction of less than 5%, less than 4%, less than 3%, less than 2%, or less than 1% by weight.

In some embodiments, the microbial lipid comprises a diglyceride fraction of at least 1.5%, at least 2%, at least 2.5%, at least 3%, at least 3.5%, or at least 5% by weight. In some embodiments, the microbial lipid comprises a diglyceride fraction of from 1.5% to 3%, 2% to 3%, 1.5% to 3.5%, 1.5% to 5%, 2.5% to 3%, 2.5% to 3.5%, or 2.5% to 5% by weight.

In some embodiments, the microbial lipid comprises unsaponifiables of less than 2%, less than 1.5%, less than 1%, or less than 0.5% by weight of the oil.

The lipid classes present in the microbial oil, such as the triglyceride fraction, can be separated by flash chromatography and analyzed by thin layer chromatography (TLC), or separated and analyzed by other methods know in the art.

In some embodiments, the microbial lipid and/or one or more fractions thereof selected from the triglyceride fraction, the free fatty acid fraction, the sterol fraction, the diglyceride fraction, and combinations thereof, comprises at least 40%, at least 45%, at least 50%, at least 55%, at least 60%, at least 65%, at least 70%, at least 75%, or at least 80% by weight DHA. In some embodiments, the microbial lipid and/or one or more fractions thereof selected from the triglyceride fraction, the free fatty acid fraction, the sterol fraction, the diglyceride fraction, and combinations thereof, comprises from 40% to 45%, 40% to 50%, 40% to 60%, 50% to 60%, 55% to 60%, 40% to 65%, 50% to 65%, 55% to 65%, 40% to 70%, 40% to 80%, 50% to 80%, 55% to 80%, 60% to 80%, or 70% to 80% by weight DHA. In some embodiments, the microbial lipid comprises a sterol esters fraction comprising 45% or less, 40% or less, 35% or less, 30% or less, 25% or less, 20% or less, 15% or less, or 13% or less by weight DHA. In some embodiments, the microbial lipid and/or one or more fractions thereof selected from the triglyceride fraction, the free fatty acid fraction, the sterol fraction, the diglyceride fraction, and combinations thereof, comprises 10% or less, 9% or less, 8% or less, 7% or less, 6% or less, 5% or less, 4% or less, 3% or less, 2% or less, or 1% or less by weight EPA. In some embodiments, the microbial lipid and/or one or more fractions thereof selected from the triglyceride fraction, the free fatty acid fraction, the sterol fraction, the diglyceride fraction, and combinations thereof, comprises from 2% to 3%, 2% to 3.5%, 2.5% to 3.5%, 2% to 6%, 2.5% to 6%, 3.0% to 6%, 3.5% to 6%, 5% to 6%, or 2% to 10% by weight EPA. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, is substantially free of EPA. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, comprises a weight ratio of DHA to EPA of at least 5:1, at least 7:1, at least 9:1, at least 10:1, at least 15:1, at least 20:1, at least 25:1, at least 30:1, or at least 50:1, wherein the microbial lipid and/or one or more fractions thereof comprises 10% or less by weight of EPA. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, comprises a weight ratio of DHA to EPA of at least 5:1, but less than 20:1. In some embodiments, the weight ratio of DHA to EPA is from 5:1 to 18:1, from 7:1 to 16:1, or from 10:1 to 15:1. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof comprises from 0.1% to 0.25%, 0.2% to 0.25%, 0.1% to 0.5%, or 0.1% to 1.5% by weight ARA. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, comprises 1.5% or less, 1% or less, 0.5% or less, 0.2% or less, or 0.1% or less by weight ARA. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, is substantially free of ARA. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, comprises a weight ratio of DHA to ARA of at least 20:1, at least 30:1, at least 35:1, at least 40:1, at least 60:1, at least 80:1, at least 100:1, at least 150:1, at least 200:1, at least 250:1, or at least 300:1. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, comprises from 0.5% to 1%, 0.5% to 2%, 0.5% to 2.5%, 0.5% to 3%, 0.5% to 3.5%, 0.5% to 5%, 0.5% to 6%, 1% to 2%, 2% to 3%, 2% to 3.5%, 1% to 2.5%, 1% to 3%, 1% to 3.5%, 1% to 5%, or 1% to 6% by weight DPA n-6. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, comprises 6% or less, 5% or less, 3% or less, 2.5% or less, 2% or less, 1% or less, or 0.5% or less by weight DPA n-6. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, is substantially free of DPA n-6. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, comprises a weight ratio of DHA to DPA n-6 of greater than 6:1, of at least 8:1, at least 10:1, at least 15:1, at least 20:1, at least 25:1, at least 50:1, or at least 100:1. In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, comprises 5% or less, 4% or less, 3% or less, 2% or less, 1.5% or less, 1% or less, or 0.5% or less by weight each of linoleic acid (18:2 n-6), linolenic acid (18:3 n-3), eicosenoic acid (20:1 n-9), and erucic acid (22:1 n-9). In some embodiments, the microbial lipid and/or one or more fractions thereof selected from the sterol esters fraction, the triglyceride fraction, the free fatty acid fraction, the sterol fraction, the diglyceride fraction, the polar fraction (including the phospholipid fraction), and combinations thereof, comprises 5% or less, 4% or less, 3% or less, 2% or less, 1.5% or less, or 1% or less by weight of heptadecanoic acid (17:0). In some embodiments, the microbial lipid and/or one or more fractions thereof comprise 0.01% to 5% by weight, 0.05% to 3% by weight, or 0.1% to 1% by weight of heptadecanoic acid.

In some embodiments, an extracted microbial lipid comprises a triglyceride fraction of at least 70% by weight, wherein the docosahexaenoic acid content of the triglyceride fraction is at least 50% by weight, wherein the docosapentaenoic acid n-6 content of the triglyceride fraction is from at least 0.5% by weight to 6% by weight, and wherein the oil has an anisidine value of 26 or less. In some embodiments, an extracted microbial lipid comprises a triglyceride fraction of at least 70% by weight, wherein the docosahexaenoic acid content of the triglyceride fraction is at least 40% by weight, wherein the docosapentaenoic acid n-6 content of the triglyceride fraction is from at least 0.5% by weight to 6% by weight, wherein the ratio of docosahexaenoic acid to docosapentaenoic acid n-6 is greater than 6:1, and wherein the lipid has an anisidine value of 26 or less. In some embodiments, an extracted microbial lipid comprises a triglyceride fraction of at least 70% by weight, wherein the docosahexaenoic acid content of the triglyceride fraction is at least 60% by weight and wherein the lipid has an anisidine value of 26 or less. In some embodiments, an extracted microbial lipid having any of the above fatty acid profiles has an anisidine value of 26 or less, 25 or less, 20 or less, 15 or less, 10 or less, 5 or less, 2 or less, or 1 or less and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, an extracted microbial lipid having any of the above fatty acid profiles is extracted from an isolated thraustochytrid microorganism having the characteristics of the thraustochytrid species deposited under ATCC Accession No. PTA-9695, PTA-9696, PTA-9697, or PTA-9698. In some embodiments, an extracted microbial lipid having any of the above fatty acid profiles is a crude lipid. In some embodiments, the crude lipid has less than 5% by weight or volume of an organic solvent. In some embodiments the microbial lipid extracted according to the processes of the present invention result in a lower anisidine value, lower peroxide value, lower phosphorus content and/or a higher extraction yield if extraction was performed using a solvent (e.g., atypical hexane extraction or a FRIOLEX™ process (Westfalia Separator AG, Germany)).

Lipids Extracted from a Second Set of Isolated Thraustochytrid Microorganisms

In some embodiments, the present invention is further directed to a microbial lipid extracted from a thraustochytrid as described in U.S. application Ser. No. 12/729,013 and PCT/US2010/028175, each of which is incorporated by reference herein in its entirety. In some embodiments, the method comprises growing a thraustochytrid in a culture to produce a biomass and extracting a lipid comprising omega-3 fatty acids from the biomass. The lipid can be extracted from a freshly harvested biomass or can be extracted from a previously harvested biomass that has been stored under conditions that prevent spoilage. Known methods can be used to culture a thraustochytrid of the invention, to isolate a biomass from the culture, and to analyze the fatty acid profile of oils extracted from the biomass. See, e.g., U.S. Pat. No. 5,130,242, incorporated by reference herein in its entirety. The lipid can be extracted according to the processes of the present invention.

A microbial lipid of the invention can be any lipid derived from a microorganism, including, for example: a crude oil extracted from the biomass of the microorganism without further processing; a refined oil that is obtained by treating a crude microbial oil with further processing steps such as refining, bleaching, and/or deodorizing; a diluted microbial oil obtained by diluting a crude or refined microbial oil; or an enriched oil that is obtained, for example, by treating a crude or refined microbial oil with further methods of purification to increase the concentration of a fatty acid (such as DHA) in the oil.

In some embodiments, the microbial lipid comprises a sterol esters fraction of 0%, at least 0.1%, at least 0.2%, at least 0.5%, at least 1%, at least 1.5%, at least 2%, or at least 5% by weight. In some embodiments, the microbial lipid comprises a sterol esters fraction of 0% to 1.5%, 0% to 2%, 0% to 5%, 1% to 1.5%, 0.2% to 1.5%, 0.2% to 2%, or 0.2% to 5% by weight. In some embodiments, the microbial lipid comprises a sterol esters fraction of 5% or less, 4% or less, 3% or less, 2% or less, 1% or less, 0.5% or less, 0.3% or less, 0.2% or less, 0.5% or less, 0.4% or less, 0.3% or less, or 0.2% or less by weight.

In some embodiments, the microbial lipid comprises a triacylglycerol fraction of at least 35%, at least 40%, at least 45%, at least 50%, at least 55%, at least 60%, at least 65%, at least 70%, at least 75%, at least 80%, at least 85%, or at least 90% by weight. In some embodiments, the microbial lipid comprises a triacylglycerol fraction of 35% to 98%, 35% to 90%, 35% to 80%, 35% to 70%, 35% to 70%, 35% to 65%, 40% to 70%, 40% to 65%, 40% to 55%, 40% to 50%, 65% to 95%, 75% to 95%, 75% to 98%, 80% to 95%, 80% to 98%, 90% to 96%, 90% to 97%, 90% to 98%, 90%, 95%, 97%, or 98% by weight.

In some embodiments, the microbial lipid comprises a diacylglycerol fraction of at least 10%, at least 11%, at least 12%, at least 13%, at least 14%, at least 15%, at least 16%, at least 17%, at least 18%, at least 19%, or at least 20% by weight. In some embodiments, the microbial lipid comprises a diacylglycerol fraction of 10% to 45%, 10% to 40%, 10% to 35%, 10% to 30%, 15% to 40%, 15% to 35%, or 15% to 30% by weight. In some embodiments, the microbial lipid comprises a 1,2-diacylglycerol fraction of at least 0.2%, at least 0.3%, at least 0.4%, at least 0.5%, at least 1%, at least 5%, at least 10%, at least 11%, at least 12%, at least 13%, at least 14%, at least 15%, at least 16%, at least 17%, at least 18%, at least 19%, or at least 20% by weight. In some embodiments, the microbial lipid comprises a diacylglycerol fraction of 0.2% to 45%, 0.2% to 30%, 0.2% to 20%, 0.2% to 10%, 0.2% to 5%, 0.2% to 1%, 0.2% to 0.8%, 0.4% to 45%, 0.4% to 30%, 0.4% to 20%, 0.4% to 10%, 0.4% to 5%, 0.4% to 1%, 0.4% to 0.8%, 0.5% to 1%, 0.5% to 0.8%, 10% to 45%, 10% to 40%, 10% to 35%, 10% to 30%, 15% to 40%, 15% to 35%, 15% to 30%, or 15% to 25% by weight. In some embodiments, the microbial lipid comprises a 1,3-diacylglycerol fraction of at least 0.1%, at least 0.2%, at least 0.5%, at least 1%, at least 2%, at least 2.5%, or at least 3% by weight.

In some embodiments, the microbial lipid comprises a sterol fraction of at least 0.3%, at least 0.4%, at least 0.5%, at least 1%, at least 1.5%, at least 2%, or at least 5% by weight. In some embodiments, the microbial lipid comprises a sterol fraction of 0.3% to 5%, 0.3% to 2%, 0.3% to 1.5%, 0.5% to 1.5%, 1% to 1.5%, 0.5% to 2%, 0.5% to 5%, 1% to 2%, or 1% to 5% by weight. In some embodiments, the microbial lipid comprises a sterol fraction of 5% or less, 4% or less, 3% or less, 2% or less, 1.5% or less, or 1% or less by weight.

In some embodiments, the microbial lipid comprises a phospholipid fraction of at least 2%, at least 5%, or at least 8% by weight. In some embodiments, the microbial lipid comprises a phospholipid fraction of 2% to 25%, 2% to 20%, 2% to 15%, 2% to 10%, 5% to 25%, 5% to 20%, 5% to 20%, 5% to 10%, or 7% to 9% by weight. In some embodiments, the microbial lipid comprises a phospholipid fraction of less than 20%, less than 15%, less than 10%, less than 9%, or less than 8% by weight. In some embodiments, the microbial lipid is substantially free of phospholipids.

In some embodiments, the microbial lipid comprises unsaponifiables of less than 2%, less than 1.5%, less than 1%, or less than 0.5% by weight of the oil.

The lipid classes present in the microbial lipid, such as a triacylglycerol fraction, can be separated by flash chromatography and analyzed by thin layer chromatography (TLC), or separated and analyzed by other methods known in the art.

In some embodiments, the microbial lipid and/or one or more fractions thereof selected from the triacylglycerol fraction, the free fatty acid fraction, the sterol fraction, the diacylglycerol fraction, and combinations thereof, comprises at least 5%, at least 10%, more than 10%, at least 12%, at least 13%, at least 14%, at least 15%, at least 16%, at least 17%, at least 18%, at least 19%, at least 20%, at least 25%, at least 30%, least 35%, at least 40%, or at least 45% by weight EPA. In some embodiments, the microbial lipid and/or one or more fractions thereof selected from the triacylglycerol fraction, the free fatty acid fraction, the sterol fraction, the diacylglycerol fraction, and combinations thereof, comprises 5% to 55%, 5% to 50%, 5% to 45%, 5% to 40%, 5% to 35%, 5% to 30%, 10% to 55%, 10% to 50%, 10% to 45%, 10% to 40%, 10% to 35%, 10% to 30%, at least 12% to 55%, at least 12% to 50%, at least 12% to 45%, at least 12% to 40%, at least 12% to 35%, or at least 12% to 30%, 15% to 55%, 15% to 50%, 15% to 45%, 15% to 40%, 15% to 35%, 15% to 30%, 15% to 25%, 15% to 20%, 20% to 55%, 20% to 50%, 20% to 45%, 20% to 40%, or 20% to 30% by weight EPA. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, comprises at least 5%, at least 10%, at least 15%, at least 20%, at least 25%, at least 30%, at least 35%, at least 40%, at least 50%, or at least 60% by weight DI-IA. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, comprises 5% to 60%, 5% to 55%, 5% to 50%, 5% to 40%, 10% to 60%, 10% to 50%, 10% to 40%, 20% to 60%, 25% to 60%, 25% to 50%, 25% to 45%, 30% to 50%, 35% to 50%, or 30% to 40% by weight DHA. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, comprises 10% or less, 9% or less, 8% or less, 7% or less, 6% or less, 5% or less, 4% or less, 3% or less, 2% or less, or 1% or less by weight DHA. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, comprises 1% to 10%, 1% to 5%, 2% to 5%, 3% to 5%, or 3% to 10% by weight of the fatty acids as DHA. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, is substantially free of DHA. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, comprises 0.1% to 5%, 0.1% to less than 5%, 0.1% to 4%, 0.1% to 3%, 0.1% to 2%, 0.2% to 5%, 0.2% to less than 5%, 0.2% to 4%, 0.2% to 3%, 0.2% to 2%, 0.3% to 2%, 0.1% to 0.5%, 0.2% to 0.5%, 0.1% to 0.4%, 0.2% to 0.4%, 0.5% to 2%, 1% to 2%, 0.5% to 1.5%, or 1% to 1.5% by weight ARA. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, comprises 5% or less, less than 5%, 4% or less, 3% or less, 2% or less, 1.5% or less, 1% or less, 0.5% or less, 0.4% or less, 0.3% or less, 0.2% or less, or 0.1% or less by weight ARA. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, is substantially free of ARA. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, comprises 0.4% to 2%, 0.4% to 3%, 0.4% to 4%, 0.4% to 5%, 0.4% to less than 5%, 0.5% to 1%, 0.5% to 2%, 0.5% to 3%, 0.5% to 4%, 0.5% to 5%, 0.5% to less than 5%, 1% to 2%, 1% to 3%, 1% to 4%, 1% to 5%, or 1% to less than 5% by weight DPA n-6. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, comprises 5%, less than 5%, 4% or less, 3% or less, 2% or less, 1% or less, 0.75% or less, 0.6% or less, or 0.5% or less by weight DPA n-6. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, is substantially free of DPA n-6. In some embodiments, the microbial lipid and/or one or more fractions thereof selected from the triacylglycerol fraction, the diacylglycerol fraction, the sterol fraction, the sterol esters fraction, the free fatty acids fraction, the phospholipid fraction, and combinations thereof, comprises fatty acids with 5% or less, less than 5%, 4% or less, 3% or less, or 2% or less by weight of oleic acid (18:1 n-9), linoleic acid (18:2 n-6), linolenic acid (18:3 n-3), eicosenoic acid (20:1 n-9), erucic acid (22:1 n-9), stearidonic acid (18:4 n-3), or combinations thereof.

In some embodiments, an extracted microbial lipid comprises at least 20% by weight eicosapentaenoic acid and less than 5% by weight each of arachidonic acid, docosapentaenoic acid n-6, oleic acid, linoleic acid, linolenic acid, eicosenoic acid, erucic acid, and stearidonic acid. In some embodiments, an extracted microbial lipid comprises a triacylglycerol fraction of at least 10% by weight, wherein at least 12% by weight of the fatty acids in the triacylglycerol fraction is eicosapentaenoic acid, wherein at least 25% by weight of the fatty acids in the triacylglycerol fraction is docosahexaenoic acid, and wherein less than 5% by weight of the fatty acids in the triacylglycerol fraction is arachidonic acid. In some embodiments, an extracted microbial lipid having any of the above fatty acid profiles has an anisidine value of 26 or less, 25 or less, 20 or less, 15 or less, 10 or less, 5 or less, 2 or less, or 1 or less, and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, an extracted microbial lipid having any of the above fatty acid profiles is extracted from an isolated thraustochytrid microorganism having the characteristics of the thraustochytrid species deposited under ATCC Accession No. PTA-10208, PTA-10209, PTA-10210, PTA-10211, PTA-10212, PTA-10213, PTA-10214, or PTA-10215. In some embodiments, an extracted microbial lipid having any of the above fatty acid profiles is a crude lipid. In some embodiments, the crude lipid has less than 5% by weight or volume of an organic solvent. In some embodiments a microbial lipid extracted according to the processes of the present invention result in a lower anisidine value, and/or lower peroxide value, and/or lower phosphorus content than if extraction was performed using a typical hexane extraction or a FRIOLEX® process (Westfalia Separator AG, Germany).

In some embodiments, a lipid obtained by any of the processes of the present invention comprises at least 20% by weight eicosapentaenoic acid and less than 5% by weight each of arachidonic acid, docosapentaenoic acid n-6, oleic acid, linoleic acid, linolenic acid, eicosenoic acid, erucic acid, and stearidonic acid. In some embodiments, a lipid obtained by any of the processes of the present invention comprises a triacylglycerol fraction of at least 10% by weight, wherein at least 12% by weight of the fatty acids in the triacylglycerol fraction is eicosapentaenoic acid, wherein at least 25% by weight of the fatty acids in the triacylglycerol fraction is docosahexaenoic acid, and wherein less than 5% by weight of the fatty acids in the triacylglycerol fraction is arachidonic acid. In some embodiments, a lipid obtained by any of the processes of the present invention having any of the above fatty acid profiles has an anisidine value of 26 or less, 25 or less, 20 or less, 15 or less, 10 or less, 5 or less, or 2 or less, or 1 or less and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less, and/or a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, a lipid obtained by any of the processes of the present invention having any of the above fatty acid profiles is extracted from an isolated thraustochytrid microorganism having the characteristics of the thraustochytrid species deposited under ATCC Accession No. PTA-10208, PTA-10209, PTA-10210, PTA-10211, PTA-10212, PTA-10213, PTA-10214, or PTA-10215. In some embodiments, a lipid obtained by any of the processes of the present invention having any of the above fatty acid profiles is a crude lipid. In some embodiments, the crude lipid has less than 5% by weight or volume of an organic solvent. In some embodiments a lipid extracted according to the processes of the present invention result in a lower anisidine value, lower peroxide value, lower phosphorus content and/or a higher extraction yield if extraction was performed using a solvent (e.g., atypical hexane extraction or a FRIOLEX® process (Westfalia Separator AG, Germany)).

Lipids Extracted from an Isolated Microorganism of the Species *Crypthecodinium cohnii*

In some embodiments, the present invention is further directed to a crude lipid extracted from a microorganism of the species *Crypthecodinium cohnii*. In some embodiments, the method comprises growing a microorganism of the species *Crypthecodinium cohnii* in a culture to produce a biomass and extracting a lipid comprising omega-3 fatty acids from the biomass. The lipid can be extracted from a freshly harvested biomass or can be extracted from a previously harvested biomass that has been stored under conditions that prevent spoilage. Known methods can be used to culture a microorganism of the species *Crypthecodinium cohnii*, and to isolate a biomass from the culture. See, e.g., U.S. Pat. No. 7,163,811, incorporated by reference herein in its entirety. The lipid can be extracted according to the processes of the present invention.

In some embodiments, the crude lipid extracted from a microorganism of the species *Crypthecodinium cohnii* according to the extraction methods of the present invention can have a lower phosphorus content compared to using a typical hexane extraction method. In some embodiments, the crude lipid extracted from a microorganism of the species *Crypthecodinium cohnii* comprises a phosphorus content of 100 ppm or less, 95 ppm or less, 90 ppm or less, 85 ppm or less, 80 ppm or less, 75 ppm or less, 70 ppm or less, 65 ppm or less, 60 ppm or less, 55 ppm or less, 50 ppm or less, 45 ppm or less, 40 ppm or less, 35 ppm or less, 30 ppm or less, 25 ppm or less, 20 ppm or less, 15 ppm or less, 10 ppm or less, 5 ppm or less, 4 ppm or less, 3 ppm or less, 2 ppm or less, or 1 ppm or less. In some embodiments, the crude oil has an anisidine value of 26 or less, 25 or less, 20 or less, 15 or less, 10 or less, 5 or less, or 2 or less, or 1 or less and/or a peroxide value of 5 or less, 4.5 or less, 4 or less, 3.5 or less, 3 or less, 2.5 or less, 2 or less, 1.5 or less, 1 or less, 0.5 or less, 0.2 or less, or 0.1 or less. In some embodiments a crude microbial lipid extracted according to the processes of the present invention result in a lower anisidine value, lower peroxide value, lower phosphorus content and/or a higher extraction yield if extraction was performed using a solvent (e.g., atypical hexane extraction or a FRIOLEX® process (Westfalia Separator AG, Germany)).

Having generally described the invention, a further understanding can be obtained by reference to the examples provided herein. These examples are given for purposes of illustration only and are not intended to be limiting. The following examples are illustrative, but not limiting, of a process and a lipid prepared by a process of the present invention. Other suitable modifications and adaptations of the variety of conditions and parameters normally encountered in extraction of a lipid from a cell, and which would become apparent to those skilled in the art, and are within the spirit and scope of the invention.

EXAMPLES

Example 1

A cell broth (20,000 kg) containing microbial cells (*Schizochytrium*) was heated to 60° C. Enzymes (i.e., Alcalase 2.4 L FG 0.5%) were added to the cell biomass to lyse the cells and form an emulsified lysed cell composition. The emulsified lysed cell composition was first treated with a first base (NaOH, 250 kg of 50% w/w solution) until the pH of the lysed cell composition was from 10.4 to 10.6. Next, a salt (solid NaCl, in an amount of 2%, by weight, of the lysed cell composition) was added to the lysed cell composition. The lysed cell composition was then heated to a temperature of 85° C. to 102° C. and held at that temperature level for 24 hours to 70 hours. A second base (NaOH, 50% w/w solution, 40 kg) was then added to the lysed cell composition until the pH was above 8. The lysed cell composition was then centrifuged to separate the lysed cell composition into three phases: a top phase containing a lipid layer, a middle phase containing an emulsion layer, and a bottom phase containing a solid layer. The lysed cell composition was then centrifuged at 40° C. to 80° C. using a Westfalia RSE110 Centrifuge (Westfalia Separator Industry GmbH, Germany), operating at 6,000 rpms at a feed rate of 30 kg/min to separate a lipid from the lysed cell composition. The centrifuging provided three phases: an upper phase containing a lipid, a middle phase containing an emulsion, and a bottom phase containing a solid/liquid emulsion. The pH of the lysed cell composition was maintained at 7.5 to 8.5 during the centrifuging. The total time to centrifuge the entire 20,000 kg batch was approximately 10 to 11 hours. The lipid layer was separated and had a moisture content of approximately 1% by weight.

Example 2

A cell broth (500 g) containing microbial cells (*Crypthecodinium cohnii*) was concentrated from approximately 7% biomass to 13.5% biomass, by weight of the broth. The broth was homogenized at a pressure of 10,000 psi (2 passes) to form a lysed cell composition. The lysed cell composition was treated with a base (i.e., NaOH, 10 g of a 50% w/w solution) until the pH of the lysed cell composition was 10.4 to 10.6. A salt (solid NaCl, in an amount of 2% by weight of the lysed cell composition) was added to the lysed cell composition. The lysed cell composition was then heated to a temperature of 85° C. to 92° C. and held at that temperature range for 15 minutes to 2 hours. The lysed cell composition was then centrifuged at a temperature of 70° C. to 90° C. using a Bench Top Sigma 6K15 Centrifuge (SIGMA Laborzentrifugen GmbH, Germany), operating at 5,400 rpm to separate the lysed cell composition into three phases: an upper phase containing a lipid, a middle phase containing an emulsion, and a bottom phase containing a solid/liquid emulsion. The pH of the lysed cell composition during centrifuging was maintained at 6.5 to 8.5. The total time to centrifuge was 5 minutes. The lipid layer was separated and had a moisture content of approximately 1% by weight.

Example 3

A cell broth (20,000 kg) containing microbial cells (*Schizochytrium*) was heated to 60° C. Enzymes (i.e., Alcalase 2.4 L FG 0.5%) were added to the cell biomass to lyse the cells and form a lysed cell composition. Next, a salt (solid $Na_2SO_4$, 2,000 kg, or 10%, by weight, of the lysed cell composition) was added to the lysed cell composition. The lysed cell composition was then agitated for 24 hours to 48 hours at room temperature. The lysed cell composition was then centrifuged at 40° C. to 75° C. using a Westfalia RSE110 Centrifuge (Westfalia Separator Industry GmbH, Germany), operating at 6,000 rpm at a feed rate of 40 kg/min to separate a lipid from the lysed cell composition. The centrifuging provided three phases: an upper phase containing a lipid, a middle phase containing an emulsion, and a bottom phase containing a solid/liquid emulsion. The total time to centrifuge the entire 20,000 kg batch was approximately 8 to 9 hrs. The lipid layer was separated from the centrifuged lysed cell composition.

Example 4

A pasteurized cell broth (500 g) containing microbial cells (ATCC Accession No. PTA-10208) was provided. Enzymes (i.e., Alcalase 2.4 L FG 0.5%) were added to the cell biomass to lyse the cells and form an emulsified lysed cell composition. The emulsified lysed cell composition was treated with a first base (i.e., a 25% solution of NaOH) to adjust the pH of the lysed cell composition to 10.5. Next, a salt (solid NaCl, in an amount of 2%, by weight, of the lysed cell composition) was added to the lysed cell composition. The lysed cell composition was then heated to a temperature of 95° C. and held at that temperature level for 2 hours while agitating the lysed cell composition. A second base (i.e., a 25% solution of NaOH) was then added to the lysed cell composition until the pH was 8.3. The lysed cell composition was then centrifuged at 5,100 rpm for 5 minutes to separate the lysed cell composition and yield a lipid layer and a small emulsion layer.

Example 5

A cell broth (500 g) that was concentrated and pasteurized containing microbial cells (ATCC Accession No. PTA-9695) was provided. Enzymes (i.e., Alcalase 2.4 L FG 0.5%) were added to the cell biomass to lyse the cells and form an emulsified lysed cell composition. The emulsified lysed cell composition was treated with a base (i.e., a 25% solution of NaOH) to adjust the pH of the lysed cell composition to 10.5. Next, a salt (solid NaCl, in an amount of 2%, by weight, of the lysed cell composition) was added to the lysed cell composition. The lysed cell composition was then heated to a temperature of 95° C. and held at that temperature level for 1 hour while agitating the lysed cell composition and the pH dropped to 8.5. After an hour in the fermentation broth having a total of 10 ml, there was an about 1 ml layer of oil (lipid) and an about 6 ml layer of emulsion. The lysed cell composition was heated for a total of 220 minutes and the emulsion layer started to disappear. The lysed cell composition was then centrifuged at 5,100 rpm for 5 minutes to separate the lysed cell composition. The extraction yield of the lipid was 58.8 by weight % The anisidine value (AV) of the crude oil was 11.3. The cell breakage yield was in a range of 93% to 95% by weight.

Example 6

A pasteurized cell broth (473 g) containing microbial cells of the isolated thraustochytrid deposited under ATCC Accession No. PTA-9695 was provided. Enzymes (i.e., Alcalase 2.4 L FG 0.5%) were added to the cell biomass to lyse the cells and form an emulsified lysed cell composition. The emulsified lysed cell composition was treated with a first base (i.e., a 25% solution of NaOH) to adjust the pH of the lysed cell composition to 10.62. Next, a salt (solid NaCl, in an amount of 2%, by weight, of the lysed cell composition) was added to the lysed cell composition. The lysed cell composition was then heated to a temperature of 95° C. and held at that temperature level for 3 hours while agitating the lysed cell composition. A second base (i.e., a 25% caustic solution of NaOH) was then added to the lysed cell composition until the pH was 8.13. The lysed cell composition was then centrifuged at 5,100 rpm for 5 minutes to separate the lysed cell composition and yield a lipid layer and an emulsion layer in equal amounts. In order to determine if raising the pH increased the yield of the lipid layer, additional second base (i.e., a 25% solution of NaOH) was added to the separated lysed cell composition until the pH was 9.02 and the lysed cell composition was again centrifuged at 5,100 rpm for 5 minutes. This resulted in a similar yield of lipid layer. Additional second base was added again to the separated lysed cell composition until the pH was 10.12 and the lysed cell composition was again centrifuged at 5,100 rpm for 5 minutes. Again, this resulted in a similar yield of lipid layer.

Example 7

A pasteurized cell broth (470 g) containing microbial cells (ATCC Accession No. PTA-9695) was provided. The cell biomass was mechanically homogenized to lyse the cells and form an emulsified lysed cell composition. The emulsified lysed cell composition was treated with a first base (i.e., a 25% solution of NaOH) to adjust the pH of the lysed cell composition to 10.5. Next, a salt (solid NaCl, in an amount of 2%, by weight, of the lysed cell composition) was added to the lysed cell composition. The lysed cell composition was then heated to a temperature of 95° C. and held at that temperature level for 3 hours while agitating the lysed cell composition. A second base (i.e., a 25% solution of NaOH) was then added to the lysed cell composition until the pH was 8.07. The lysed cell composition was then centrifuged at 5400 rpm for 5 minutes to separate the lysed cell composition and yield a lipid layer and an emulsion layer wherein the emulsion layer was larger than the lipid layer. In order to determine if raising the pH increased the yield of the lipid layer, additional second base was added to the separated lysed cell composition until the pH was 9.11 and the lysed cell composition was again centrifuged at 5,100 rpm for 5 minutes. This resulted in a similar yield of lipid layer. Additional second base was added again to the separated lysed cell composition until the pH was 10.09 and the lysed cell composition was again centrifuged at 5,100 rpm for 5 minutes. Again, the resulted in a similar yield of lipid layer.

Example 8

A cell broth containing microbial cells (*Crypthecodinium cohnii*) was used in a decreased biotin trial fermentor. 20,000 kg of washed, concentrated, and pasteurized broth was harvested. This was pulled out at the startup of pasteurization. It was held for approximately 1 day before being transferred and homogenized. The material was homogenized at 813 bar/one pass and collected back into a treatment tank. Through microscopic inspection, it was estimated that approximately 80% of the cells were lysed.

The broth was heated to about 40° C. before treatment began. The pH was adjusted to 10.5 and 2% NaCl was added and heated to 66° C. At this point a significant oil layer had already formed and the pH had dropped to 9.5 after 1-2 hours. The broth was held at 66° C. overnight.

The next day, the broth was centrifuged on the Westfalia RSE-110 with a 155 mm ring dam installed. The viscosity was about 180 cP at 40° C. The centrifuge was fed at 48 kg/min, with 5-10 psi backpressure on the light phase and 30 psi backpressure on the heavy phase. The feed temperature was maintained at 70° C. No oil was present in the waste phase and only a few drops were visible after isopropyl alcohol was added.

Table 1 shows the results of analyses performed on the crude oil obtained from this procedure.

TABLE 1

Specifications of crude oil obtained using process of Example 8.

| | |
|---|---|
| % Oil | 87.79 |
| DHA (mg/g) | 531.02 |
| % DHA | 60.49 |
| PV | 1.95 (0.6*) |
| AV | 15 |
| % FFA | 0.18 |
| Phosphorus (ppm) | 8.65 |
| Copper (ppm) | 0.22 |
| Iron (ppm) | 0.7 |
| Lead (ppm) | 0.63 |

*PV of the centrifuged oil.

Of the 20,000 kg of broth provided, 10.5% by weight (2,100 kg) was biomass. Of the biomass, 50% by weight was oil (1,050 kg). Of the oil, 58.9% by weight was DHA (618 kg). After running the process described above, there was 592.5 kg of material in the lipid layer, of which about 87.8% by weight (520.2 kg) was oil. Thus, the extraction yield of oil from the biomass was 49.5%. Of that oil, 60.5% by weight (314.6 kg) was DHA, thereby resulting in an extraction yield of 51% by weight DHA from the biomass.

Example 9

A cell broth (about 500 g) that was washed, concentrated, and pasteurized containing microbial cells (*Schizochytrium*) was provided. The broth was chemically treated with a base (i.e., a 25% solution of NaOH) without a prior cell lysis step. The addition of the base raised the pH of the broth from 5.8 to 11.2. The addition of the base and the rise in the pH lysed the cells to form a lysed cell composition. Next, a salt (solid $Na_2SO_4$, in an amount of 5%, by weight, of the lysed cell composition) was added to the lysed cell composition. The lysed cell composition was then heated to a temperature in a range of 90° C. to 95° C. and held at that temperature level for 90 minutes and the pH of the lysed cell composition dropped to 9.7. After the 90 minutes there was an about 2.5 ml of oil layer per 45 ml of fermentation broth and there was no moisture loss. After 3 hours, the pH had dropped to 9.2. The solution was then centrifuged at about 5,100 rpm for 5 minutes to separate the lysed cell composition and yield a lipid layer. The extraction yield of the lipid was 81% by weight. The anisidine value (AV) of the crude oil was 20.1. The cell breakage yield was in a range of 92% to 98% by weight.

Example 10

A cell broth (about 500 g) that was washed, concentrated, and pasteurized containing microbial cells (*Schizochytrium*) was provided. The broth was chemically treated with a base (i.e., a 25% solution of NaOH) without a prior cell lysis step. The addition of the base raised the pH of the broth from 4.8 to 11. The addition of the base and the rise in the pH lysed the cells to form a lysed cell composition. Next, a salt (solid NaCl, in an amount of 2%, by weight, of the lysed cell composition) was added to the lysed cell composition. The lysed cell composition was then heated to a temperature in a range of 90° C. to 95° C. and held at that temperature level for 3.5 hours and the pH of the lysed cell composition dropped to 8.7 and there was no moisture loss. The solution was then centrifuged at about 5,100 rpm for 5 minutes to separate the lysed cell composition and yield a lipid layer. The extraction yield of the lipid after 3.5 hours was 92% by weight.

A portion of the lysed cell composition was held for 6 hours and the pH of the lysed cell composition dropped to 8.6. The solution was then centrifuged at about 5,100 rpm for 5 minutes to separate the lysed cell composition and yield a lipid layer. The extraction yield of the lipid after 6 hours was 89% by weight. The anisidine value (AV) of the crude oil was 14.4. The cell breakage yield was 95% by weight.

Example 11

A cell broth (about 500 g) that was washed, concentrated, and pasteurized containing microbial cells (*Schizochytrium*) was provided. The broth was chemically treated with a base (i.e., a 50% solution of NaOH) without a prior cell lysis step. The addition of the base raised the pH of the broth from 5.8 to 11.2. The addition of the base and the rise in the pH lysed the cells to form a lysed cell composition. The lysed cell composition was then heated to 70° C. under vacuum to reduce the water content from 88.7% to 85.5%. During evaporation, the pH dropped to 10.36. The solution was then centrifuged at about 5,100 rpm for 5 minutes to separate the lysed cell composition and yield a lipid layer. The extraction yield of the lipid was 83.9% by weight. The anisidine value (AV) of the crude oil was 10.5. The cell breakage yield was 93.17% by weight.

The process was repeated except the lysed cell composition was heated to 70° C. under vacuum to reduce the water content from 88.7% to 79.2%. The extraction yield of the lipid was 87.5% by weight when the water content was reduced to 79.2% and the cell breakage yield was 92.3% by weight. The process was also repeated to reduce the water content from 88.7% to 80.8%. The extraction yield of the lipid was 90% by weight when the water content was reduced to 80.8% and the cell breakage yield was 95.9% by weight.

Example 12

A cell broth (about 500 g) that was washed, concentrated, and pasteurized containing microbial cells (*Schizochytrium*) was provided. The broth was chemically treated with a base (i.e., a 50% solution of NaOH) without a prior cell lysis step. The addition of the base raised the pH of the broth from 5.6 to 11.1. The addition of the base and the rise in the pH lysed the cells to form a lysed cell composition. The lysed cell composition was then heated to 90° C. in a closed system for 40 minutes. After the 40 minutes, there was an about 1 ml layer of oil (lipid) per 40 ml of fermentation broth. The solution was then centrifuged at about 5,100 rpm for 5 minutes to separate the lysed cell composition and yield a lipid layer. The extraction yield of the lipid was 85.1% by weight. The anisidine value (AV) of the crude oil was 16.3. The cell breakage yield was 97.6% by weight.

Example 13

A cell broth (about 500 g) that was washed, concentrated, and pasteurized containing microbial cells (*Schizochytrium*) was provided. The broth was chemically treated with a base (i.e., a 50% solution of NaOH) without a prior cell lysis step. The addition of the base raised the pH of the broth from 4.9 to 11.2. The addition of the base and the rise in the pH lysed the cells to form a lysed cell composition. The lysed cell composition was then mixed at room temperature for 4 hours. The solution was then centrifuged at about 5,100 rpm for 5 minutes to separate the lysed cell composition and yield a small lipid layer.

A portion of the lysed cell composition was mixed at room temperature for about 96 hours. The solution was then centrifuged at about 5,100 rpm for 5 minutes to separate the lysed cell composition and yield a larger lipid layer. The extraction yield of lipid was 61.4% by weight. The anisidine value (AV) of the crude oil was 22.6.

Example 14

A cell broth (about 500 g) that was washed, concentrated, and pasteurized containing microbial cells (ATCC Accession No. PTA-9695) was provided. The broth was chemically treated with a base (i.e., a 50% solution of NaOH) without a prior cell lysis step. The addition of the base raised the pH of the broth from 5.6 to 11.1. The addition of the base and the rise in the pH lysed the cells to form a lysed cell composition. The lysed cell composition was then heated in a range of 70° C. to 75° C. for 3 hours. The solution was then centrifuged at about 5,100 rpm for 5 minutes to separate the lysed cell composition and yield a lipid layer. The extraction yield of the lipid was 84.4% by weight.

A portion of the lysed cell composition was heated for a total of 5 hours. The solution was then centrifuged at about 5,100 rpm for 5 minutes to separate the lysed cell composition and yield a similar lipid layer. The extraction yield of lipid was 87.3% by weight. The cell breakage yield was 89.1% by weight.

Example 15

A cell broth (about 500 g) that was washed, concentrated, and pasteurized containing microbial cells (*Schizochytrium*) was provided. The broth was chemically treated with a base (i.e., a 50% solution of NaOH) without a prior cell lysis step. The addition of the base raised the pH of the broth from 7.3 to 11. The addition of the base and the rise in the pH lysed the cells to form a lysed cell composition. Next, a salt (solid $Na_2SO_4$, in an amount of 5%, by weight, of the lysed cell composition) was added to the lysed cell composition. The lysed cell composition was then heated to a temperature of 90° C. and held at that temperature level for 2 hours. While maintaining a temperature of 90° C. for additional 2 to 4 hours, the vessel containing the lysed cell composition was opened to allow evaporation of water. The solution was then centrifuged at about 5,100 rpm for 5 minutes to separate the lysed cell composition and yield a lipid layer. Extraction yield of the lipid was greater than 70% by weight. The anisidine value (AV) of the crude oil was 11.6.

Example 16

A cell broth (9,925 kg) containing microbial cells (ATCC Accession No. PTA-9695) was provided. The cell broth was diluted with water in a 1:1 ratio by weight to form a diluted broth of 20,000 kg. The solid content of the broth prior to dilution was 16.13% by weight and after dilution was 8.25% by weight. The diluted broth was mixed and centrifuged with a desludging centrifuge at 6,400 rpm to remove extra-cellular water-soluble or water-dispersible compounds. The concentrate (10,250 kg) from the centrifuge was collected and had a solids content of 10.5% by weight. The collected concentrate was heated to 62° C. to 64° C. to pasteurize the concentrate. Enzymes (i.e., Alcalase 2.4 L FG 0.5%) were added to the pasteurized concentrate to lyse the cells and form an emulsified lysed cell composition. The emulsified lysed cell composition was treated with a base (i.e., a 25% solution of NaOH) to adjust the pH of the lysed cell composition to 11. Next, a salt (solid $Na_2SO_4$, in an amount of 5%, by weight, of the lysed cell composition) was added to the lysed cell composition. The lysed cell composition was then heated to a temperature of 95° C. and held at that temperature level for 10 hours to 12 hours while agitating the lysed cell composition. After agitation, the pH of the lysed cell composition was 8.6 and there was a very small emulsion layer. The agitation tank was allowed to cool to 60° C. and the pH of the lysed cell composition increased to 9.6 while cooling. The pH of the lysed cell composition was lowered to 8.2 by adding phosphoric acid. The addition of the phosphoric acid did not harm the separation of the lipid layer and the very small emulsion layer. The lysed cell composition was then centrifuged at 5,100 rpm at a feed rate of 48 kg/min for 5 minutes at 60° C. to 63° C. to separate the lysed cell composition and yield a lipid layer having a moisture content of 1.7% to 2.3% by weight.

Example 17

A cell broth (500 g) that was washed, concentrated, and pasteurized containing microbial cells (*Crypthecodinium cohnii*) was provided. The broth was homogenized at a pressure of 8,000 to 12,000 psi (2 passes) to form a lysed cell composition. The lysed cell composition was treated with a base (i.e., a 12.5% solution of NaOH) until the lysed cell composition reached a pH of 7.8 to 8.2. A salt (solid $Na_2SO_4$, in an amount of 5% by weight of the lysed cell composition) was added to the lysed cell composition. The lysed cell composition was then heated to a temperature of 60° C. and held at that temperature. The pH of the lysed cell composition was maintained at the 7.8 to 8.2 level by the addition of base (i.e., a 12.5% solution of NaOH) for 10 to 15 hours in a closed system with little to no moisture loss. The lysed cell composition was then centrifuged at about 5,100 rpm for 5 minutes to separate the lysed cell composition and yield an oil layer. This resulted in an oil layer of about 2 ml in a sample of 40 ml. The extraction yield of the oil was 73% by weight. The anisidine value (AV) of the crude oil was 13.5. The cell breakage yield was 82% to 86% by weight.

Example 18

A pasteurized cell broth (1,000 g) containing microbial cells (*Schizochytrium*) was provided. Enzymes (i.e., Alcalase 2.4 L FG 0.5%) were added to the cell biomass to lyse the cells and form an emulsified lysed cell composition. The emulsified lysed cell composition was treated with a base (i.e., a 12.5% solution of NaOH) to adjust the pH of the lysed cell composition from 7.21 to 10.52. Next, a salt (solid NaCl, in an amount of 2%, by weight, of the lysed cell composition) was added to the lysed cell composition. The broth was then separated into 4 portions with each portion being held at 4 different temperatures and times: 1) Trial #1 was held at 90° C. for 22 hours; 2) Trial #2 was held at 90° C. for 2 hours and then held at 25° C. for 20 hours; 3) Trial #3 was held at 60° C. for 22 hours; and 4) Trial #4 was held at 25° C. for 22 hours. The individual trials were then centrifuged without further pH adjustment. For Trials #1, #2, and #3, the broth was centrifuged at approximately 6,600 rpm (a g-force of 4,800) for 5 minutes to separate the lysed cell composition. Because the separation for Trial #4 was not good (<20%) at a g-force of 4,800, the g-force was increased to 15,000 and the broth was spun at a g-force of 15,000 for 5 minutes. The extraction yield of the lipid as a weight percent and the anisidine value (AV) are listed in the table below.

TABLE 2

Conditions and Results When Varying Temperature and Heating Time of the Lysed Cell Composition.

| Trial # | Treatment Time and Temp. | Centrifugation Conditions | AV | Oil Yield (%) |
|---|---|---|---|---|
| 1 | 90° C. for 22 hours | pH = 6.22<br>g-force = 4,800 | 58.7 | 51.4 |
| 2 | 90° C. for 2 hours,<br>25° C. for 20 hours | pH = 8.19<br>g-force = 4,800 | 109.2 | 82.2 |
| 3 | 60° C. for 22 hours | pH = 8.38<br>g-force = 4,800 | 91.2 | 27.2 |
| 4 | 25° C. for 22 hours | pH = 10.03<br>g-force =15,000 | 105.2 | 55.7 |

The anisidine values in Table 2 were higher than expected. One difference between previous examples and this example was that the lysed cell composition was allowed to sit for a long period of time before the lipids were extracted. It is hypothesized that the long period of time before extraction leads to the oxidation of the dissolved oxygen present in the lysed cell composition. The increased oxidation then leads to an increase in the anisidine value. The fact that the trial heated at the highest temperature for the longest time (Trial #1) had the lowest anisidine value supports this hypothesis because the dissolved oxygen content of a lysed cell composition generally decreases as the temperature is increased. The increased anisidine values are therefore believed to be an anomaly that was a result of the delay in extracting the lipids from the lysed cell composition. In production, there would be no delay time in extracting the lipids from the lysed cell composition and the anisidine values would be consistent with previous results of anisidine values of 26 or less.

Example 19

A pasteurized cell broth (1,000 g) containing microbial cells (*Schizochytrium*) was provided. The broth was then split into 3 portions and diluted as follows: 1) Trial #1 was not diluted at all and served as the control portion; 2) Trial #2 was diluted 25% with water; and 3) Trial #3 was diluted 50% with water. Enzymes (i.e., Alcalase 2.4 L PG 0.5%) were added to the cell biomass to lyse the cells and form an emulsified lysed cell composition. The emulsified lysed cell composition was treated with a base (i.e., a 12.5% solution of NaOH) to adjust the pH of the lysed cell composition from 6.8 to 10.6. Next, a salt (solid NaCl, in an amount of 2%, by weight, of the lysed cell composition) was added to the lysed cell composition. The broth was then heated to 90° C. and held for 20 hours. After the hold time, the broth for each trial was separated into two with one half being centrifuged as is and the other half having its pH adjusted to approximately 8.5 before centrifugation. Both portions were then centrifuged at approximately 8,545 rpm (a g-force of 8,000) for 5 minutes. The extraction yield of the lipid as a weight percent and the anisidine value (AV) are listed in the table below.

TABLE 3

Conditions and Results When Varying Dilution of the Pasteurized Broth.

| Trial # | Diluted? | Centrifugation Conditions | AV | Oil Yield (%) |
|---|---|---|---|---|
| 1 | No dilution | pH = 6.0 g-force = 8,000 | 51.8 | 81.2 |
| 1a | No dilution | pH = 8.4 g-force = 8,000 | 44.3 | 78.1 |
| 2 | 25% dilution with water | pH = 5.5 g-force = 8,000 | 76.1 | 88.9 |
| 2a | 25% dilution with water | pH = 8.4 g-force = 8,000 | 85.3 | 82.1 |
| 3 | 50% dilution with water | pH = 5.7 g-force = 8,000 | 68.5 | 85.0 |
| 3a | 50% dilution with water | pH = 8.5 g-force = 8,000 | 79.6 | 84.0 |

The anisidine values in Table 3 were higher than expected. One difference between previous examples (excluding Example 18) and this example was that the lysed cell composition was allowed to sit for a long period of time before the lipids were extracted. It is hypothesized that the long period of time before extraction leads to the oxidation of the dissolved oxygen present in the lysed cell composition. The increased oxidation then leads to an increase in the anisidine value. The increased anisidine values are therefore believed to be an anomaly that was a result of the delay in extracting the lipids from the lysed cell composition. In production, there would be no delay time in extracting the lipids from the lysed cell composition and the anisidine values would be consistent with previous results of anisidine values of 26 or less.

Example 20

Cell broths obtained from various fermentation lots were treated using the process described in Example 2 except the timing of adding the salt (e.g., before and after homogenization) and the amount of salt were varied. The resulting separated lipids were analyzed and the analyses are provided in Table 4.

TABLE 4

Specifications of lipids obtained using processes of the present invention varying the timing of salt addition and the amount of salt added.

| | Fermentation Lot | | | | | |
|---|---|---|---|---|---|---|
| | P2137 | P2137 | P4167 | P4167 | P2137 | P2137 |
| Addition of NaCl* | Before | Before | After | After | After | After |
| % NaCl by weight | 2 | 5 | 2 | 5 | 5 | 5 |
| % Lipid* | 27 | 37 | 51 | 72 | 59 | 15 |
| % Starting Solids by weight | 13 | 12.9 | 19.2 | 19.2 | 13.3 | 7.5+ |
| % Solids by weight before Centrifugation | 19.7 | 21.7 | 19.7 | 20.1 | 20.2 | 8.6 |

*Addition of NaCl was before or after homogenization; % lipid refers to the percentage of lipids in triglyceride form
+This run was diluted to have a low percentage of starting solids.

The data provided in Table 4 demonstrates that adding the salt after homogenization results in higher % lipid values than adding the salt before homogenization. The data provided in Table 4 also demonstrates that diluting the sample resulted in lower a % lipid value.

Example 21

A sample of Alcalase enzyme treated lysed cell composition obtained from microbial cells (Schizochytrium) was used. The sample had a pH of approximately 5.5. The sample was divided into 4 smaller samples and the pH of three of the samples was adjusted to approximately 7.4, approximately 10.5, and approximately 12, respectively, by adding sodium hydroxide. The samples were diluted in a 1:1 ratio with deionized water. POBN (α-(4-Pyridyl 1-oxide)-N-tert-butylnitrone, 1.25 M; 50 µL) was added as a spin trap chemical to 0.5 g of each of the diluted samples. The samples were measured with a Bruker BioSpin c-scan EPR (Electron Paramagnetic Resonance) spectrometer (system number SC0274) (Bruker BioSpin, Billerica, Mass.) to measure the amount of free radicals present from lipid oxidation. The samples were incubated at room temperature (20° C.) and 50 µL of each of the POBN containing samples was tested at hourly intervals for four hours after adjusting the pHs using the following spectrometer parameters: modulation frequency of 86 Hz, modulation amplitude of 2.11 gauss, microwave power of 5.19 mW, time constant of 20.48 seconds, sweep time of 10.49 seconds, sweep width of 100 gauss, and a number of scans of 8. The results of the EPR spectrometer readings are provided in FIG. 5.

The data in FIG. 5 demonstrates that initially the level of free radicals was highest for the sample at pH 5.5 and lowest for the samples at pH 10.5 and 12. The data also demonstrates that over the 4 hour period the rate of radical formation was slowest for the sample at pH 10.5 and highest for the sample at pH 5.5. The data also demonstrates that the addition of a base to the lysed cell composition inhibits lipid oxidation, and therefore leads to a low AV in the crude lipid and refined oil.

Example 22

Oilseeds are extracted from a rapeseed plant and are then passed through a grinding mill to crack and break the outer hull of the oilseeds. The oilseeds are then dehulled through known means, such as through aspiration, to remove the meat (interior) of the seeds from the hull of the oilseeds. The dehulled oilseeds are then homogenized or expelled by passing them through a press to grind the dehulled oilseeds into a cake in order to lyse the cells of the oilseeds. Water is added to form an emulsified lysed cell composition. The emulsified lysed cell composition is filtered to remove any excess hull fragments from the lysed cell composition. The emulsified lysed cell composition is treated with a base (i.e., a 25% solution of NaOH) to adjust the pH of the lysed cell composition to 11. Next a salt (solid NaCl, in an amount 2% by weight of the lysed cell composition) is added to the lysed cell composition. The lysed cell composition is then heated to a temperature of 90° C. and held at that level for 6 hours to 48 hours while agitating the lysed cell composition. The lysed cell composition is then centrifuged at 5,100 rpm for 5 minutes to separate the lysed cell composition and yield a lipid layer and an emulsion layer.

Example 23

Comparative Analysis of Crude Lipids Obtained by Hexane Extraction

The crude lipids obtained from a lot using the process described in Example 2 was analyzed to determine various specifications. Additional crude lipids were obtained using a typical hexane extraction process on the same microbial cell utilized in Example 2. The hexane extraction process included spray drying a fermentation broth, adding hexane to the spray dried biomass to obtain a solution of 15% to 20% solids by weight. The solution was then homogenized to lyse the cells to form a lysed cell composition. The lysed cell composition was centrifuged and a layer containing lipid and hexane was removed. The hexane was then removed from the lipid. The results of the analyses are provided in Table 5.

TABLE 5

Specifications of lipids obtained using processes of the present invention or a hexane extraction process.

| | Fermentation Lot | | | | | | |
|---|---|---|---|---|---|---|---|
| | A | B | C | D | E | F | G |
| Extraction Method | Ex. 2 | Hexane | Hexane | Hexane | Hexane | Hexane | Hexane |
| AV* | 5.9 | ND | ND | ND | 14.7 | 17.18 | 6.7 |
| PV* | 1.21 | 0.65 | 1.56 | 0.46 | ND | 0.85 | 0.3 |
| % Lipid* | 89.61 | 86.94 | 84.31 | 86.75 | 85.53 | 86.05 | 86.54 |
| DHA (mg/g) | 537.47 | 508.15 | 459.32 | 465.31 | 510.49 | 495.82 | 506.33 |
| % DHA* | 59.98 | 58.39 | 54.49 | 53.65 | 59.71 | 57.68 | 58.51 |

*AV = Anisidine Value; PV = peroxide value; % lipid refers to the percentage of lipids in triglyceride form; % DHA refers to the percentage of DHA in the lipid The data provided in Table 5 demonstrates that the crude lipids obtained by the processes of the present invention exhibit superior anisidine values, percentage of lipid, amount of DHA and percentage of DHA compared to lipids prepared by typical hexane extraction processes.

Comparative Analysis of Crude Lipids Obtained by the FRIOLEX® Processes

Example 24

The crude lipids obtained from various fermentation lots using the processes described in Examples 1 and 3 were analyzed to determine various specifications. Additional crude lipids were obtained using a FRIOLEX® process (Westfalia Separator AG, Germany), which is a process of extracting lipids with a water-soluble organic solvent as described in U.S. Pat. No. 5,928,696 and International Pub. Nos. WO 01/76385 and WO 01/76715. The results of the analyses are provided in Table 6.

TABLE 6

Specifications of lipids obtained using processes of the present invention or a FRIOLEX ® process.

| | Fermentation Lot | | | | | | | |
|---|---|---|---|---|---|---|---|---|
| | A | B | B | B | B | C | C | C |
| Extraction Method | Ex. 1 | Ex. 1 | Ex. 3 | Ex. 1[a] | Ex. 1[b] | Ex. 1 | Ex. 1 | FRIOLEX ® |
| AV* | 3.1 | 1.6 | 3.9 | 300 | 7.1 | 3.5 | 4 | 36 |
| PV* | 1.8 | 0.17 | 0.14 | 6.16 | 0.34 | 0 | 0 | 0.35 |
| % Lipid* | 96.27 | 93.67 | 92.55 | 87.20 | 94.42 | 95.14 | 94.31 | 93.92 |
| DHA (mg/g) | 452.4 | 458.16 | 455.17 | 414.66 | 471.55 | 416.41 | 416.05 | 415.38 |
| Extraction Yield (%) | 93.5 | 87 | ND | 96 | ND | 94 | 94 | 94 |

*AV = Anisidine Value; PV = peroxide value; % lipid refers to the percentage of lipids in triglyceride form
[a]The lysed cell composition was not heated.
[b]The lysed cell composition was allowed to stand for 3 weeks prior to extraction.

The data provided in Table 6 demonstrates that the crude lipids obtained by the processes of the present invention exhibit superior anisidine values (with the exception of the lipid obtained when the lysed cell composition was not heated) compared to lipids prepared by a FRIOLEX® process. The lipids prepared by a process of the present invention exhibit anisidine values that are from 4.4% to 19.7% of the anisidine values of a lipid prepared using the FRIOLEX® process.

It is believed that a lipid prepared by a process of the present invention has increased stability. For example, as shown in Table 6, a process of the present invention was used to extract a lipid from a lysed cell composition, wherein the lysed cell composition was allowed to stand for 3 weeks prior to the extraction process. It is believed that the anisidine value of a lipid in a lysed cell composition increases with time, and thus, it would be expected that a lipid extracted from a 3 week old lysed cell composition have increased anisidine values. However, as shown in Table 6, the lipid obtained from the 3 week old lysed cell composition using a process of the present invention had an anisidine value which was 19.7% of the anisidine value of a lipid prepared by the FRIOLEX® process.

Example 25

The crude lipids obtained from a broth of microbial cells (ATCC Accession No, PTA-9695) using the process described in Example 16 were analyzed to determine various specifications. Additional crude lipids were obtained from a broth of microbial cells (ATCC Accession No. PTA-9695) using a FRIOLEX® process (Westfalia Separator AG, Germany), which is a process of extracting lipids with a water-soluble organic solvent (e.g., isopropyl alcohol) as described in U.S. Pat. No. 5,928,696 and International Pub. Nos. WO 01/76385 and WO 01/76715. The results of the analyses are provided in Table 7.

TABLE 7

Crude Lipid Comparison

|  | Example 16 | FRIOLEX ® |
|---|---|---|
| % Oil | 9.19 | 93.73 |
| DHA (mg/g) | 570.68 | 574.33 |
| % DHA | 62.1 | 61.27 |
| % FFA | 1.13 | 0.22 |
| PV | 0 | 0.74 |
| AV | 10 | 73.9 |
| Iron (ppm) | 0.11 | 0 |
| Copper (ppm) | 0.67 | 0.3 |
| Lead (ppm) | 0.21 | 0 |
| Phosphorus (ppm) | 5.22 | 7.20 |
| Extraction yield (%) | 61.4 | 45.3 |

The data provided in Table 7 demonstrates that the crude lipids obtained by the processes of the present invention exhibit superior anisidine values (AV) and peroxide values (PV) compared to lipids prepared by a FRIOLEX® process. The data also demonstrates that the extraction yield of lipid obtained by the processes of the present invention are superior compared to the extraction yield of lipid obtained by a FRIOLEX® process.

Example 26

Refining of Crude Lipids

Crude lipids were obtained using the processes outlined in Example 1 and a FRIOLEX® process. The crude lipids were further processed by sequentially: 1) degumming and caustic refining; 2) bleaching; 3) chilled filtering; and 4) deodorizing with antioxidants. The data for the crude lipids, caustic refined lipids, bleached lipids, and deodorized lipids are presented in Tables 8a and 8b. A comparison of the refined oils is presented in Table 9.

TABLE 8a

Lipids obtained from the FRIOLEX ® process (Example 24)

| Processing Step | FFA % | PV | AV | DHA (mg/g) | Yield % (Lipid) | Yield % (DHA) |
|---|---|---|---|---|---|---|
| Crude Lipid | 0.28 | 0.37 | 33.6 | 413.6 | N/A | N/A |
| Caustic Refined Lipid | <0.1 | 0.29 | — | 416.4 | 85.7 | 86.3 |
| Bleached Lipid | <0.1 | 0.16 | 13.9 | 413.1 | 71.5 | 70.9 |
| Filtered Lipid | <0.1 | 0.19 | 13.3 | 424.86 | 70.3 | 76.0 |
| Deodorized Lipid w/AOX* | 0.06 | <0.1 | 14.3 | 401.5 | 96.6 | 89.4 |

*AOX refers to antioxidants

TABLE 8b

Lipids obtained from an extraction process using NaCl (Example 1)

| Processing Step | FFA % | PV | AV | DHA (mg/g) | Yield % (Lipid) | Yield % (DHA) |
|---|---|---|---|---|---|---|
| Crude Lipid | 1.36 | 0 | 3.5 | 406.7 | N/A | N/A |
| Caustic Refined Lipid | <0.1 | 0.27 | 2.3 | 410.8 | 85.9 | 86.7 |
| Bleached Lipid | <0.1 | 0.16 | 0.8 | 404.3 | 97.0 | 95.5 |
| Filtered Lipid | <0.1 | 0.37 | 1.0 | 414.1 | 59.3 | 60.7 |
| Deodorized Lipid w/AOX | 0.06 | <0.1 | 1.8 | 379.9* | 94.9 | 87.1 |

*Note:
Increased dilution with high oleic sunflower oil (HOSO) was the reason for the decrease in DHA (mg/g).

TABLE 9

Refined Oil Comparison

|  | FRIOLEX ® (Example 24) | Example 1 |
|---|---|---|
| DHA (mg/g) | 401.5 | 379.9* |
| % DHA | 42.69 | 40.18 |
| FFA % | 0.06 | 0.06 |
| PV | <0.1 | <0.1 |
| AV | 14.3 | 1.8 |
| Iron (ppm) | 0.05 | <0.02 |
| Copper (ppm) | <0.02 | <0.02 |
| Lead (ppm) | <0.1 | <0.1 |
| Arsenic (ppm) | <0.1 | <0.1 |
| Mercury (ppm) | <0.01 | <0.01 |
| % Moisture and volatiles | <0.01 | <0.01 |
| Unsaponifiables (%) | 1.17 | 1.33 |
| Trans-fatty acid by IR (%) | <1 | <1 |

*Note:
Increased dilution with HOSO was the reason for the decrease in DHA (mg/g).

The data provided in Table 8a, Table 8b, and Table 9 demonstrate that a refined oil prepared by a process of the present invention exhibits lower anisidine values compared to a refined oil prepared by the FRIOLEX® process.

Example 27

Sensory Profile Comparison

The refined oils obtained in Example 26 were analyzed by a panel of 8 to 12 sensory analysts. The sensory analysts rated various lipid specifications based on aroma, aromatics, and aftertaste to provide an "overall aroma intensity" for each lipid. The Universal Spectrum descriptive analysis method was used to assess the aroma and aromatic characteristics of samples. This method uses an intensity scale of 0-15, where 0=none detected and 15=very high intensity, to measure the aroma and aromatic attributes of the oils. The results of the sensory data are provided in Table 10.

TABLE 10

Sensory specifications of a lipid prepared by the FRIOLEX ® process (Example 24) and a lipid prepared by a process of the present invention (Example 1)

Specifications

Aroma

|  | Overall Intensity | Fishy Marine Complex | Green Complex | Herbaceous | Nutty Roasted | Painty | Other |
|---|---|---|---|---|---|---|---|
| FRIOLEX ® | 3 | 1 | 1 | 1 | 0 | 0 | 0 |
| Ex. 1 | 2 | 0 | 1 | 1 | 0 | 0 | 0 |

Aromatics

|  | Overall Intensity | Fishy Marine Complex | Green Complex | Herbaceous | Nutty Roasted | Painty | Other |
|---|---|---|---|---|---|---|---|
| FRIOLEX ® | 4 | 1 | 1 | 2 | 0 | 0 | 0 |
| Ex. 1 | 3 | 0 | 1 | 2 | 0 | 0 | 0 |

Aftertaste

| FRIOLEX ® | Herbal/slightly fishy |
|---|---|
| Ex. 1 | Herbal |

The data provided in Table 10 demonstrates that a refined oil prepared by a process of the present invention exhibits superior sensory data compared to a refined oil prepared by the FRIOLEX® process. As shown above, the lipids provided by the present invention had an overall aroma intensity of 3 and 2, whereas, the FRIOLEX® lipids provided an overall aroma intensity of 4 and 3, respectively.

Example 28

Comparative Example

An extraction process for obtaining lipids from microorganisms without the use of an organic solvent is disclosed in U.S. Pat. No. 6,750,048. A comparison of a refined oil obtained from a crude lipid prepared by a process of the present invention and a refined oil obtained from a crude lipid prepared by the extraction process disclosed in U.S. Pat. No. 6,750,048 is provided in Table 11.

TABLE 11

Comparative data for a lipid prepared by a process of the present invention (Example 1) and a lipid prepared by a process disclosed in U.S. Pat. No. 6,750,048.

|  | Example 1 | U.S. Pat. No. 6,750,048 |
|---|---|---|
| DHA (mg/g) | 379.9 | 346 |
| % DHA | 40.18 | 37.3 |
| FFA % | 0.06 | ND |
| PV | <0.1 | 0.46 |
| AV | 1.8 | ND |
| Iron (ppm) | <0.02 | 0.26 |
| Copper (ppm) | <0.02 | <0.05 |
| Lead (ppm) | <0.1 | <0.20 |
| Arsenic (ppm) | <0.1 | <0.20 |
| Mercury (ppm) | <0.01 | <0.20 |
| % Moisture and volatiles | <0.01 | 0.02 |
| Unsaponifiables (%) | 1.33 | ND |
| Trans-fatty acid by IR (%) | <1 | ND |

The data provided in Table 11 demonstrates that a refined oil obtained from a crude lipid prepared by a process of the present invention exhibits superior properties compared to a refined oil obtained from a crude lipid prepared by the extraction process disclosed in U.S. Pat. No. 6,750,048.

Example 29

The isolated thraustochytrid (ATCC Accession No. PTA-9695) was characterized for taxonomic classification.

Samples were collected from intertidal habitats during low tide. Water, sediment, living plant material and decaying plant/animal debris were placed into sterile 50 ml tubes. Portions of each sample along with the water were spread onto solid agar plates of isolation media. Isolation media consisted of: 500 ml of artificial seawater, 500 ml of distilled water, 1 g of glucose, 1 g of glycerol, 13 g of agar, 1 g of glutamate, 0.5 g of yeast extract, 0.5 g casein hydrolysate, 1 ml of a vitamin solution (100 mg/L thiamine, 0.5 mg/L biotin, 0.5 mg $B_{12}$), 1 ml of a trace mineral solution (PII metals, containing per liter: 6.0 g $FeCl_3 6H_2O$, 6.84 g $H_3BO_3$, 0.86 g $MnCl_2 4H_2O$, 0.06 g $ZnCl_2$, 0.026 $CoCl_2 6H_2O$, 0.052 g $NiSO_4 H_2O$, 0.002 g $CuSO_4 5H_2O$ and 0.005 g $Na_2MoO_4 2H_2O$), and 500 mg each of penicillin G and streptomycin sulfate. The agar plates were incubated in the dark at 20-25° C. After 2-4 days the agar plates were examined under magnification, and colonies of cells were picked with a sterile toothpick and restreaked onto a fresh plate of media. Cells were repeatedly streaked onto fresh media until contaminated organisms were removed.

Colonies from agar plates were transferred to petri dishes with half-strength seawater and (1 ml) of a suspension of autoclaved newly hatched brine shrimp larvae. The brine shrimp larvae became heavily overgrown with clusters of sporangia after 2-3 days. Released zoospores were biflagellate at discharge, swimming actively away from the mature sporangium, wall remnants of which are clearly visible (in phase contrast) after spore release. Sporangia measured 12.5 µm to 25 µm in diameter, and zoospores were 2.5 µm to 2.8 µm×4.5 µm to 4.8 µm in size. There were 8 to 24 spores per individual sporangium. Settled zoospores enlarged and rapidly underwent binary divisions leading to tetrads, octads, and finally to clusters of sporangia. Tetrad formation commenced at a very early stage prior to maturity of the sporangia. These characteristics are in agreement with the genus *Schizochytrium*.

The isolated thraustochytrid (ATCC Accession No. PTA-9695) was further characterized based on the similarity of its 18s rRNA gene to that of known species. Total genomic DNA from the thraustochytrid (ATCC Accession No. PTA-9695) was prepared by standard procedures (Sambrook J. and Russell D. 2001. Molecular cloning: A laboratory manual, 3rd edition. Cold Spring Harbor Laboratory Press, Cold Spring Harbor, N.Y.) and used for PCR amplification of the 18s RNA gene. The PCR amplification of the 18s rRNA gene was carried out with primers previously described (Honda et. al., *J. Eukaryot. Microbial.* 46(6) 1999). The PCR conditions with chromosomal DNA template were as follows: 0.2 µM dNTPs, 0.1 uM each primer, 8% DMSO, 200 ng chromosomal DNA, 2.5 U PfuUltra® II fusion HS DNA polymerase (Stratagene), and 1× PfuUltra® buffer (Stratagene) in a 50 µL total volume. The PCR Protocol included the following steps: (1) 95° C. for 2 minutes; (2) 95° C. for 45 seconds; (3) 55° C. for 30 seconds; (4) 72° C. for 2 minutes; (5) repeat steps 2-4 for 40 cycles; (6) 72° C. for 5 minutes; and (7) hold at 6° C.:

PCR amplification yielded a distinct DNA product with the expected size using chromosomal template described above. The PCR product was cloned into the vector pJET1.2/blunt (Fermentas) according to the manufacturer's instructions, and the insert sequence was determined using supplied standard primers.

Table 12 shows a comparison of the 18s rRNA sequence from the thraustochytrid (ATCC Accession No. PTA-9695) to DNA sequences in the National Center for Biotechnology Information (NCBI) electronic database. Briefly, "% Identity" was determined by the scoring matrix "swgapdnamt" within the "AlignX" program of the VectorNTI program (Invitrogen), a standard for DNA alignment. The "% Coverage" was taken from the results of a Basic Local Alignment Search Tool (BLAST) calculation from the NCBI electronic database and is the percent of the query length that is included in the aligned segments.

TABLE 12

Comparison of 18s rRNA Sequences

| Thraustochytrids | % Identity Calculation #1 | % Coverage Calculation #2 |
|---|---|---|
| *Thraustochytrium aggregatum* (p) | 98 | 90 |
| *Thraustochutriidae* sp. HU1 | 84 | 86 |
| *Thraustochutriidae* sp. 8-7 | 84 | 91 |
| *Thraustochytrium multirudimentale* | 81 | 88 |
| *Thraustochutriidae* sp. PW19 | 81 | 85 |
| *Schizochytrium* sp. ATCC 20888 | 81 | 95 |

(p): indicates partial sequence

As shown in Table 12, it was found that, in terms of % identity, the 18s rRNA gene sequence from the thraustochytrid (ATCC Accession No. PTA-9695) is closely related, though not identical, to the 18s rRNA gene sequence of *T. aggregatum* provided in Honda, D. et al., J. Euk. Micro. 46(6): 637-647 (1999). The 18s rRNA sequence published for *Thraustochytrium aggregatum* is a partial sequence, with an approximately 71 DNA nucleotide gap in the middle of the sequence. In terms of percent coverage, the 18s rRNA gene sequence of the isolate of the invention is more closely related to *Schizochytrium* sp. ATCC 20888 than to *T. aggregatum*.

Highly conserved proteins such as actin and beta-tubulin have been widely used, along with 18s rRNA gene, as markers for assessing phylogenetic relationships between organisms (Baldauf, S. M. Am. Nat. 154, S178 (1999)). Total genomic DNA from the thraustochytrid (ATCC Accession No. PTA-9695) was also used as a template for PCR amplification of both the actin and beta-tubulin genes. The PCR amplification was carried out with primers designed to conserved regions from the actin and beta-tubulin DNA sequences from *T. aggregatum*.

The PCR conditions with chromosomal DNA template were as follows: 0.2 µM dNTPs, 0.1 uM each primer, 8% DMSO, 200 ng chromosomal DNA, 2.5 U Herculase® II fusion DNA polymerase (Stratagene), and 1× Herculase® buffer (Stratagene) in a 50 µL total volume. The PCR Protocol included the following steps: (1) 95° C. for 2 minutes; (2) 95° C. for 30 seconds; (3) 55° C. for 30 seconds; (4) 72° C. for 2 minutes; (5) repeat steps 2-4 for 40 cycles; (6) 72° C. for 5 minutes; and (7) hold at 6° C.

PCR amplification yielded distinct DNA products with the expected sizes using chromosomal template described above. The respective PCR products were cloned into the vector pJET1.2/blunt (Fermentas) according to the manufacturer's instructions, and the insert sequence of each were determined using supplied standard primers.

Table 13 shows identities for the actin amino acid sequence from the thraustochytrid (ATCC Accession No. PTA-9695) as compared to actin sequences available in the public database. Identities were determined through use of the scoring matrix "blosum62mt2" within the "AlignX" program of the VectorNTI program, a standard for protein alignment.

TABLE 13

Comparison of Actin Protein Sequence % Identities

| Thraustochytrids | % Identity |
|---|---|
| *Thraustochytriidae* sp. RT49 | 98 |
| *Schizochytrium* sp. ATCC 20888 | 96 |
| *Thraustochytrium striatum* | 96 |
| *Thraustochytrium aggregatum* | 96 |
| *Japonochytrium marinum* | 95 |
| *Thraustochytrium aureum* | 95 |

Table 14 shows identities for the beta-tubulin amino acid sequence from the thraustochytrid (ATCC Accession No. PTA-9695) as compared to beta-tubulin sequences available in the public database. Identities were determined through use of the scoring matrix "blosum62mt2" within the "AlignX" program of the VectorNTI program, a standard for protein alignment.

TABLE 14

Comparison of Beta-Tubulin Protein Sequence % Identities

| Thraustochytrids | % Identity |
|---|---|
| *Aplanochytrium kerguelense* | 100 |
| *Aplanochytrium stocchinoi* | 100 |
| *Japonochytrium marinum* | 100 |
| *Labyrinthula* sp. N8 | 100 |
| *Thraustochytriidae* sp. RT49 | 100 |
| *Thraustochytrium aggregatum* | 100 |
| *Thraustochytriidae* sp. HU1 | 100 |
| *Thraustochytrium aureum* | 100 |
| *Thraustochytrium kinnei* | 100 |
| *Thraustochytriidae* sp. #32 | 100 |
| *Thraustochytriidae* sp. PW19 | 100 |
| *Schizochytrium aggregatum* | 100 |
| *Schizochytrium* sp. ATCC 20888 | 100 |

Based on the above characterizations, the isolated thraustochytrid (ATCC Accession No. PTA-9695) is believed to represent a new *Schizochytrium* species and is therefore also designated as *Schizochytrium* sp. ATCC PTA-9695.

Example 30

The isolated thraustochytrid (ATCC Accession No. PTA-9695) produced high levels of cell growth under varying culture conditions, as described below. Typical media and cultivation conditions are shown in Table 15. Also, high levels of fatty acids and DHA were observed (i.e., greater than 50% by weight of the dry cell weight were fatty acids and greater than 50% by weight of the fatty acid methyl esters was DHA).

TABLE 15

Vessel Media

| Ingredient | | concentration | ranges |
|---|---|---|---|
| NaCl | g/L | 12.5 | 0-25, 5-20, or 10-15 |
| KCl | g/L | 1.0 | 0-5, 0.25-3, or 0.5-2 |
| MgSO$_4$•7H$_2$O | g/L | 5.0 | 0-10, 2-8, or 3-6 |
| (NH$_4$)$_2$SO$_4$ | g/L | 0.6 | 0-10, 0.25-5, or 0.5-3 |
| CaCl$_2$ | g/L | 0.29 | 0.1-5, 0.15-3, or 0.2-1 |
| T 154 (yeast extract) | g/L | 6.0 | 0-20, 1-15, or 5-10 |
| KH$_2$PO$_4$ | g/L | 1.2 | 0.1-10, 0.5-5, or 1-3 |
| Post autoclave (Metals) | | | |
| Citric acid | mg/L | 3.5 | 0.1-100, 1-50, or 2-25 |
| FeSO$_4$•7H$_2$O | mg/L | 10.30 | 0.1-100, 1-50, or 5-25 |
| MnCl$_2$•4H$_2$O | mg/L | 3.10 | 0.1-100, 1-50, or 2-25 |
| ZnSO$_4$•7H$_2$O | mg/L | 3.10 | 0.1-100, 1-50, or 2-25 |
| CoCl$_2$•6H$_2$O | mg/L | 0.04 | 0.001-1, 0.005-0.5, or 0.01-0.1 |
| Na$_2$MoO$_4$•2H$_2$O | mg/L | 0.04 | 0.001-1, 0.005-0.5, or 0.01-0.1 |
| CuSO$_4$•5H$_2$O | mg/L | 2.07 | 0.1-100, 0.5-50, or 1-25 |
| NiSO$_4$•6H$_2$O | mg/L | 2.07 | 0.1-100, 0.5-50, or 1-25 |
| Post autoclave (Vitamins) | | | |
| Thiamine | mg/L | 9.75 | 0.1-100, 1-50, or 5-25 |
| Vitamin B12 | mg/L | 0.16 | 0.1-100, 0.1-10, or 0.1-1 |
| Ca½-pantothenate | mg/L | 3.33 | 0.1-100, 0.1-50, or 1-10 |
| Post autoclave (Carbon) | | | |
| Glucose | g/L | 30.0 | 5-150, 10-100, or 20-50 |
| Nitrogen Feed: | | | |
| NH$_4$OH | mL/L | 21.6 | 0-150, 10-100, or 15-50 |

Typical cultivation conditions would include the following:

| pH | about 6.5-about 8.5, about 6.5-about 8.0, or about 7.0-about 7.5 |
|---|---|
| temperature: | about 17-about 30 degrees Celsius, about 20-about 25 degrees Celsius, or about 22 to about 23 degrees Celsius |
| dissolved oxygen: | about 5-about 100% saturation, about 10-about 80% saturation, or about 20-about 50% saturation |
| glucose controlled @: | about 5-about 50 g/L, about 10-about 40 g/L, or about 20-about 35 g/L. |

In carbon and nitrogen-fed cultures with 8200 ppm at 22.5° C. with 20% dissolved oxygen at pH 7.0, the isolate produced a dry cell weight of 140 g/L after 7 days of culture, with a fatty acid content of 70% by weight. Closed loop ammonia feed was used and the pH was maintained at 7.0. The omega-3 productivity was 8.92 g/(L*day) under these conditions, with 4.7 g/L EPA (5% by weight of fatty acids) and 56.3 g/L DHA (57% by weight of fatty acids) in 7 days.

In carbon and nitrogen-fed cultures with 3640 ppm Cl$^-$ at 22.5° C. with 20% dissolved oxygen at pH 7.0, the isolate produced a dry cell weight of 82 g/L after 7 days of culture, with a fatty acid content of 58% by weight. The omega-3 productivity was 4.5 g/(L*day) under these conditions, with 2.1 g/L EPA (4.3% by weight of fatty acids) and 28.5 g/L DHA (58.7% by weight of fatty acids) in 7 days.

In carbon and nitrogen-fed cultures with 980 ppm Cl$^-$ at 22.5° C. with 20% dissolved oxygen at pH 7.0, the isolate produced a dry cell weight of 60 g/L after 7 days of culture, with a fatty acid content of 53% by weight. The omega-3 productivity was 2.8 g/(L*day) under these conditions, with 1.1 g/L EPA (3.4% by weight of fatty acids) and 18.4 g/L DHA (56.8% by weight of fatty acids) in 7 days.

Example 31

Oils were extracted from a biomass sample (Sample A) of the isolated thraustochytrid (ATCC Accession No. PTA-9695). The biomass sample was produced in a carbon and nitrogen-fed culture with 980 ppm Cl$^-$ at 22.5° C. with 20% dissolved oxygen at pH 7.0. Oils were extracted from biomass Sample A by the hexane extraction process to yield microbial oil Sample A1. Briefly, dried biomass was ground with hexane using stainless steel tubes and stainless steel ball bearings for approximately 2 hours. The slurry was vacuum filtered and the filtrate was collected. The hexane was removed using a rotary evaporator. Oils were also extracted from biomass Sample A using the FRIOLEX® process (GEA Westfalia Separator UK Ltd., Milton Keynes, England) to yield microbial oil Sample A2. Individual lipid classes were isolated from microbial oil Samples A1 and A2 using low pressure flash chromatography, and the weight percent of each class was determined. The fatty acid profile of each class was determined using gas chromatography with flame ionization detection (GC-FID) as fatty acid methyl esters (FAME).

Flash Chromatography—Flash chromatography was used to separate the lipid classes present in the crude oils, and to determine the weight percent of each class present in the oils. The chromatography system utilized Silica Gel 60 (EMD Chemical, Gibbstown, N.J.) with mobile phase composed of Petroleum Ether and Ethyl Acetate at 3 mL/min. A step gradient was used to selectively elute each lipid class from the column. The mobile phase gradient started from 100% petroleum ether and finished with 50% ethyl acetate (followed by a 100% methanol wash). Fractions were collected in 10 mL test tubes using a Gilson FC 204 large-bed fraction collector (Gilson, Inc., Middleton, Wis.). Each tube was analyzed by thin layer chromatography (TLC) and the tubes containing individual lipid classes (as judged by single spots on TLC plate with expected retention factor (RI)) were pooled, concentrated to dryness, and weighed. The total fraction content was then determined gravimetrically.

TLC Analysis—Thin layer chromatography was conducted on silica gel plates. The plates were eluted using a solvent system consisting of petroleum ether:ethyl ether: acetic acid (80:20:1) and were visualized using iodine vapor. The Rf values of each spot were then compared with reported literature values for each lipid class.

Fatty Acid Analysis—The samples of biomass and isolated lipid classes were analyzed for fatty acid composition as FAMEs. Samples were weighed directly into screw cap test tubes, and 1 mL of C19:0 internal standard (NuCheck, Elysian, Minn.) in toluene and 2 mL of 1.5 N HCl in methanol was added to each tube. The tubes were vortexed briefly and placed in a heating block for 2 hours at 100° C. The tubes were removed from the heating block, allowed to cool, and 1 mL of saturated NaCl in water was added. The tubes were vortexed again, centrifuged, and a portion of the top (organic) layer was placed in a GC vial and analyzed by GC-FID. FAME's were quantified using a 3-point internal standard calibration curve generated using Nu-Chek-Prep GLC reference standard (Nu-Chek Prep, Inc., Elysian, Minn.) and tentatively identified based on retention time. Fatty acids present were expressed as mg/g and % of total FAME.

Sample A1 was prepared by dissolving the crude oil in hexane and applying to the head of the column. After fractionation of the sample using flash chromatography, the sterol ester fraction accounted for 1.2% by weight, the triacylglycerol (TAG) fraction accounted for 82.7% by weight, the free fatty acid (FFA) fraction accounted for 0.9% by weight, and the diacylglycerol (DAG) fraction accounted for 2.9% by weight of the crude oil. The total fatty acid profiles of the Sample A1 crude oil and isolated fractions are shown below in Table 16 and Table 17 calculated as mg/g and % FAME, respectively.

TABLE 16

Sample A1 Fatty Acid Profiles Calculated as Milligrams per Gram FAME

| Fatty Acid | Biomass | Crude Oil | Sterol Esters | TAG | FFA | DAG |
|---|---|---|---|---|---|---|
| | | | Wt. % | | | |
| | NA | 38% | 1.2% | 82.7% | 0.9 | 2.9% |
| | FAME (mg/g) | FAME (mg/g) | FAME (mg/g) | FAME (mg/g) | FAME (mg/g) | FAME (mg/g) |
| C12:0* | 0.6 | 0.0 | 1.9 | 3.2 | 1.7 | 0.0 |
| C14:0* | 5.7 | 13.6 | 12.8 | 20.2 | 13.0 | 17.6 |
| C14:1* | 0.0 | 0.0 | 0.0 | 0.0 | 0.0 | 0.0 |
| C15:0 | 1.3 | 3.4 | 3.1 | 3.1 | 2.1 | 2.6 |
| C16:0* | 105.5 | 239.5 | 222.2 | 274.3 | 183.3 | 225.1 |
| C16:1* | 0.0 | 0.0 | 0.8 | 0.0 | 0.8 | 0.0 |
| C18:0* | 6.4 | 16.4 | 43.1 | 16.8 | 9.8 | 14.0 |
| C18:1 N9* | 0.0 | 3.8 | 1.9 | 3.3 | 1.0 | 3.5 |
| C18:1 N7 | 0.0 | 0.0 | 0.0 | 0.0 | 0.0 | 0.0 |
| C18:2 N6* | 0.0 | 0.0 | 0.0 | 0.0 | 0.0 | 0.0 |
| C20:0* | 1.8 | 5.5 | 13.0 | 4.7 | 2.0 | 2.9 |
| C18:3 N3* | 0.0 | 0.0 | 0.0 | 0.0 | 0.0 | 0.0 |
| C20:1 N9* | 0.0 | 0.0 | 0.0 | 0.0 | 0.0 | 0.0 |
| C18:4 N3 | 0.0 | 0.0 | 0.0 | 0.0 | 0.6 | 0.0 |
| C20:2 N6* | 0.0 | 0.0 | 0.0 | 0.0 | 0.0 | 0.0 |
| C20:3 N6 | 0.0 | 0.0 | 0.0 | 0.0 | 0.0 | 0.0 |
| C22:0* | 0.0 | 0.8 | 7.3 | 0.8 | 0.0 | 1.2 |
| C20:4 N7 | 0.0 | 0.0 | 0.8 | 0.0 | 0.0 | 0.0 |
| C20:3 N3 | 0.0 | 0.0 | 0.0 | 0.0 | 0.0 | 0.0 |
| C20:4 N6* | 1.0 | 3.4 | 0.0 | 2.6 | 2.0 | 1.9 |
| C22:1 N9* | 0.0 | 0.0 | 0.0 | 0.0 | 0.0 | 0.0 |
| C20:4 N5 | 0.0 | 0.0 | 0.0 | 0.0 | 0.0 | 0.0 |
| C20:4 N3 | 1.5 | 4.1 | 1.5 | 3.5 | 2.1 | 2.1 |
| C20:5 N3* | 18.2 | 39.5 | 3.5 | 38.4 | 30.6 | 42.8 |
| C24:0* | 0.0 | 0.0 | 6.3 | 0.0 | 0.0 | 0.0 |
| C22:4 N9 | 0.0 | 0.0 | 0.0 | 0.0 | 0.0 | 0.0 |
| C24:1 N9* | 0.0 | 0.0 | 0.0 | 0.0 | 0.0 | 0.0 |
| C22:5 N6* | 11.9 | 29.5 | 8.9 | 26.9 | 14.8 | 18.7 |
| C22:5 N3* | 1.1 | 4.7 | 0.9 | 3.6 | 3.4 | 2.7 |
| C22:6 N3* | 253.5 | 569.7 | 107.3 | 556.5 | 352.8 | 451.4 |
| Sum of all FAME's | 408.6 | 934.0 | 435.4 | 958.0 | 620.1 | 786.4 |

TABLE 17

Sample A1 Fatty Acid Profiles as a Percent of Total FAME

| Fatty Acid | Biomass % FAME | Crude Oil % FAME | Sterol Esters % FAME | TAG % FAME | FFA % FAME | DAG % FAME |
|---|---|---|---|---|---|---|
| C12:0* | 0.1 | 0.0 | 0.4 | 0.3 | 0.3 | 0.0 |
| C14:0* | 1.4 | 1.5 | 2.9 | 2.1 | 2.1 | 2.2 |
| C14:1* | 0.0 | 0.0 | 0.0 | 0.0 | 0.0 | 0.0 |
| C15:0 | 0.3 | 0.4 | 0.7 | 0.3 | 0.3 | 0.3 |
| C16:0* | 25.8 | 25.6 | 51.0 | 28.6 | 29.6 | 28.6 |

TABLE 17-continued

Sample A1 Fatty Acid Profiles as a Percent of Total FAME

| Fatty Acid | Biomass % FAME | Crude Oil % FAME | Sterol Esters % FAME | TAG % FAME | FFA % FAME | DAG % FAME |
|---|---|---|---|---|---|---|
| C16:1* | 0.0 | 0.0 | 0.2 | 0.0 | 0.1 | 0.0 |
| C18:0* | 1.6 | 1.8 | 9.9 | 1.8 | 1.6 | 1.8 |
| C18:1 N9* | 0.0 | 0.4 | 0.4 | 0.3 | 0.2 | 0.4 |
| C18:1 N7 | 0.0 | 0.0 | 0.0 | 0.0 | 0.0 | 0.0 |
| C18:2 N6* | 0.0 | 0.0 | 0.0 | 0.0 | 0.0 | 0.0 |
| C20:0* | 0.4 | 0.6 | 3.0 | 0.5 | 0.3 | 0.4 |
| C18:3 N3* | 0.0 | 0.0 | 0.0 | 0.0 | 0.0 | 0.0 |
| C20:1 N9* | 0.0 | 0.0 | 0.0 | 0.0 | 0.0 | 0.0 |
| C18:4 N3 | 0.0 | 0.0 | 0.0 | 0.0 | 0.1 | 0.0 |
| C20:2 N6* | 0.0 | 0.0 | 0.0 | 0.0 | 0.0 | 0.0 |
| C20:3 N6 | 0.0 | 0.0 | 0.0 | 0.0 | 0.0 | 0.0 |
| C22:0* | 0.0 | 0.1 | 1.7 | 0.1 | 0.0 | 0.1 |
| C20:4 N7 | 0.0 | 0.0 | 0.2 | 0.0 | 0.0 | 0.0 |
| C20:3 N3 | 0.0 | 0.0 | 0.0 | 0.0 | 0.0 | 0.0 |
| C20:4 N6* | 0.3 | 0.4 | 0.0 | 0.3 | 0.3 | 0.2 |
| C22:1 N9* | 0.0 | 0.0 | 0.0 | 0.0 | 0.0 | 0.0 |
| C20:4 N5 | 0.0 | 0.0 | 0.0 | 0.0 | 0.0 | 0.0 |
| C20:4 N3 | 0.4 | 0.4 | 0.4 | 0.4 | 0.3 | 0.3 |
| C20:5 N3* | 4.5 | 4.2 | 0.8 | 4.0 | 4.9 | 5.4 |
| C24:0* | 0.0 | 0.0 | 1.4 | 0.0 | 0.0 | 0.0 |
| C22:4 N9 | 0.0 | 0.0 | 0.0 | 0.0 | 0.0 | 0.0 |
| C24:1 N9* | 0.0 | 0.0 | 0.0 | 0.0 | 0.0 | 0.0 |
| C22:5 N6* | 2.9 | 3.2 | 2.1 | 2.8 | 2.4 | 2.4 |
| C22:5 N3* | 0.3 | 0.5 | 0.2 | 0.4 | 0.5 | 0.3 |
| C22:6 N3* | 62.0 | 61.0 | 24.6 | 58.1 | 56.9 | 57.4 |
| Sum of FAME % | 100.0 | 100.0 | 100.0 | 100.0 | 100.0 | 100.0 |

Sample A2 was prepared by dissolving the crude oil in hexane and applying to the head of the column. After fractionation of the sample using flash chromatography, the sterol ester fraction accounted for 0.8% by weight, the triacylglycerol (TAG) fraction accounted for 83.4% by weight, the free fatty acid (FFA) fraction accounted for 1.8% by weight, and the diacylglycerol (DAG) fraction accounted for 5.6% by weight of the crude oil. The total fatty acid profiles of the Sample A2 crude oil and isolated fractions are shown below in Table 18 and Table 19 calculated as mg/g and % FAME, respectively.

TABLE 18

Sample A2 Fatty Acid Profiles Calculated as Milligrams per Gram FAME

| | Biomass | Crude Oil | Sterol Esters | TAG | FFA | DAG |
|---|---|---|---|---|---|---|
| | | | Wt. % | | | |
| Fatty Acid | NA FAME (mg/g) | NA FAME (mg/g) | 0.8% FAME (mg/g) | 83.4% FAME (mg/g) | 1.8% FAME (mg/g) | 5.6% FAME (mg/g) |
| C12:0* | 0.6 | 0.0 | 0.0 | 1.5 | 0.0 | 1.0 |
| C14:0* | 5.7 | 13.2 | 8.9 | 14.1 | 9.5 | 5.4 |
| C14:1* | 0.0 | 0.0 | 0.0 | 0.0 | 0.0 | 0.0 |
| C15:0 | 1.3 | 3.3 | 2.8 | 3.4 | 2.1 | 2.2 |
| C16:0* | 105.5 | 233.7 | 183.8 | 246.1 | 159.7 | 137.3 |
| C16:1* | 0.0 | 0.0 | 0.0 | 0.8 | 0.0 | 0.0 |
| C18:0* | 6.4 | 16.6 | 23.6 | 16.9 | 11.3 | 5.6 |
| C18:1 N9* | 0.0 | 7.6 | 5.0 | 4.3 | 2.4 | 2.6 |
| C18:1 N7 | 0.0 | 0.0 | 0.0 | 0.0 | 0.0 | 0.0 |
| C18:2 N6* | 0.0 | 2.2 | 0.7 | 1.6 | 0.8 | 5.1 |
| C20:0* | 1.8 | 5.2 | 12.1 | 5.5 | 2.6 | 1.1 |
| C18:3 N3* | 0.0 | 0.0 | 0.0 | 0.0 | 0.0 | 0.0 |
| C20:1 N9* | 0.0 | 0.0 | 0.0 | 0.0 | 0.0 | 0.0 |
| C18:4 N3 | 0.0 | 0.0 | 0.0 | 0.8 | 1.0 | 0.0 |
| C20:2 N6* | 0.0 | 0.0 | 0.0 | 0.0 | 0.0 | 0.0 |
| C20:3 N6 | 0.0 | 0.0 | 0.0 | 0.3 | 0.0 | 0.0 |
| C22:0* | 0.0 | 0.7 | 6.0 | 1.3 | 0.8 | 0.0 |
| C20:4 N7 | 0.0 | 0.0 | 0.0 | 0.0 | 0.0 | 0.0 |
| C20:3 N3 | 0.0 | 0.0 | 0.0 | 0.0 | 0.0 | 0.0 |
| C20:4 N6* | 1.0 | 3.0 | 0.0 | 3.1 | 2.3 | 1.2 |
| C22:1 N9* | 0.0 | 0.0 | 0.0 | 0.0 | 0.0 | 0.0 |
| C20:4 N5 | 0.0 | 0.0 | 0.0 | 0.0 | 0.0 | 0.0 |
| C20:4 N3 | 1.5 | 4.1 | 1.4 | 4.3 | 2.7 | 1.0 |
| C20:5 N3* | 18.2 | 38.6 | 2.7 | 38.6 | 39.5 | 45.5 |
| C24:0* | 0.0 | 0.0 | 4.7 | 0.6 | 0.0 | 0.3 |
| C22:4 N9 | 0.0 | 0.0 | 0.0 | 0.0 | 0.0 | 0.0 |
| C24:1 N9* | 0.0 | 0.0 | 0.0 | 0.0 | 0.0 | 0.0 |
| C22:5 N6* | 11.9 | 28.2 | 8.6 | 29.6 | 18.0 | 14.7 |
| C22:5 N3* | 1.1 | 3.4 | 0.0 | 3.5 | 2.5 | 2.2 |
| C22:6 N3* | 253.5 | 566.7 | 102.2 | 575.0 | 475.3 | 447.2 |
| Sum of all FAME's | 408.6 | 926.5 | 362.3 | 951.3 | 730.4 | 672.5 |

TABLE 19

Sample A2 Fatty Acid Profiles as a Percent of Total FAME

| Fatty Acid | Biomass % FAME | Crude Oil % FAME | Sterol Esters % FAME | TAG % FAME | FFA % FAME | DAG % FAME |
|---|---|---|---|---|---|---|
| C12:0* | 0.1 | 0.0 | 0.0 | 0.2 | 0.0 | 0.2 |
| C14:0* | 1.4 | 1.4 | 2.4 | 1.5 | 1.3 | 0.8 |
| C14:1* | 0.0 | 0.0 | 0.0 | 0.0 | 0.0 | 0.0 |
| C15:0 | 0.3 | 0.4 | 0.8 | 0.4 | 0.3 | 0.3 |
| C16:0* | 25.8 | 25.2 | 50.7 | 25.9 | 21.9 | 20.4 |
| C16:1* | 0.0 | 0.0 | 0.0 | 0.1 | 0.0 | 0.0 |
| C18:0* | 1.6 | 1.8 | 6.5 | 1.8 | 1.5 | 0.8 |
| C18:1 N9* | 0.0 | 0.8 | 1.4 | 0.5 | 0.3 | 0.4 |
| C18:1 N7 | 0.0 | 0.0 | 0.0 | 0.0 | 0.0 | 0.0 |
| C18:2 N6* | 0.0 | 0.2 | 0.2 | 0.2 | 0.1 | 0.8 |
| C20:0* | 0.4 | 0.6 | 3.3 | 0.6 | 0.4 | 0.2 |
| C18:3 N3* | 0.0 | 0.0 | 0.0 | 0.0 | 0.0 | 0.0 |
| C20:1 N9* | 0.0 | 0.0 | 0.0 | 0.0 | 0.0 | 0.0 |
| C18:4 N3 | 0.0 | 0.0 | 0.0 | 0.1 | 0.1 | 0.0 |
| C20:2 N6* | 0.0 | 0.0 | 0.0 | 0.0 | 0.0 | 0.0 |
| C20:3 N6 | 0.0 | 0.0 | 0.0 | 0.0 | 0.0 | 0.0 |
| C22:0* | 0.0 | 0.1 | 1.7 | 0.1 | 0.1 | 0.0 |
| C20:4 N7 | 0.0 | 0.0 | 0.0 | 0.0 | 0.0 | 0.0 |
| C20:3 N3 | 0.0 | 0.0 | 0.0 | 0.0 | 0.0 | 0.0 |
| C20:4 N6* | 0.3 | 0.3 | 0.0 | 0.3 | 0.3 | 0.2 |
| C22:1 N9* | 0.0 | 0.0 | 0.0 | 0.0 | 0.0 | 0.0 |
| C20:4 N5 | 0.0 | 0.0 | 0.0 | 0.0 | 0.0 | 0.0 |
| C20:4 N3 | 0.4 | 0.4 | 0.4 | 0.4 | 0.4 | 0.2 |
| C20:5 N3* | 4.5 | 4.2 | 0.7 | 4.1 | 5.4 | 6.8 |
| C24:0* | 0.0 | 0.0 | 1.3 | 0.1 | 0.0 | 0.0 |
| C22:4 N9 | 0.0 | 0.0 | 0.0 | 0.0 | 0.0 | 0.0 |
| C24:1 N9* | 0.0 | 0.0 | 0.0 | 0.0 | 0.0 | 0.0 |
| C22:5 N6* | 2.9 | 3.0 | 2.4 | 3.1 | 2.5 | 2.2 |
| C22:5 N3* | 0.3 | 0.4 | 0.0 | 0.4 | 0.3 | 0.3 |
| C22:6 N3* | 62.0 | 61.2 | 28.2 | 60.4 | 65.1 | 66.5 |
| Sum of FAME % | 100.0 | 100.0 | 100.0 | 100.0 | 100.0 | 100.0 |

It is noted that Samples A1 and A2 were extracted using a typical hexane extraction and a FRIOLEX® process, respectively. The fatty acid profiles of Tables 16-19 are expected to be the substantially the same if the samples were extracted using the processes of the present invention.

Example 32

After oil was extracted from the fermentation broth using the Friolex process, as described in Example 31, the crude oil was further processed via refining, bleaching, and deodorizing steps to obtain a final oil. The final oil was diluted with high oleic sunflower oil to obtain finished commercial oil with a DHA content of approximately 400 mg/g. Individual lipid classes were isolated and the fatty acid profiles of each class was determined using gas chromatography with flame ionization detection (GC-FID) as fatty acid methyl esters (FAME).

Flash Chromatography—Flash chromatography was used to separate the lipid classes present in the final oil, and to determine the weight percent of each class present in the oil. The chromatography system utilized Silica Gel 60 (EMD Chemical, Gibbstown, N.J.) with mobile phase composed of Petroleum Ether and Ethyl Acetate at 3 mL/min. A step gradient was used to selectively elute each lipid class from the column. The mobile phase gradient started from 100% petroleum ether and finished with 50% ethyl acetate (followed by a 100% methanol wash). Fractions were collected in 10 mL test tubes using a Gilson FC 204 large-bed fraction collector (Gilson, Inc., Middleton, Wis.). Each tube was analyzed by thin layer chromatography (TLC) and the tubes containing individual lipid classes (as judged by single spots on TLC plate with expected retention factor (Rf)) were pooled, concentrated to dryness, and weighed. The total fraction content was then determined gravimetrically.

TLC Analysis—Thin layer chromatography was conducted on silica gel plates. The plates were eluted using a solvent system consisting of petroleum ether:ethyl ether: acetic acid (80:20:1) and were visualized using iodine vapor. The Rf values of each spot were then compared with reported literature values for each lipid class.

Fatty Acid Analysis—The final oil sample and isolated lipid classes were analyzed for fatty acid composition as FAMEs. Samples were weighed directly into screw cap test tubes, and 1 mL of C19:0 internal standard (NuCheck, Elysian, Minn.) in toluene and 2 mL of 1.5 N HCl in methanol was added to each tube. The tubes were vortexed briefly and placed in a heating block for 2 hours at 100° C. The tubes were removed from the heating block, allowed to cool, and 1 mL of saturated NaCl in water was added. The tubes were vortexed again, centrifuged, and a portion of the top (organic) layer was placed in a GC vial and analyzed by GC-FID. FAME's were quantified using a 3-point internal standard calibration curve generated using Nu-Chek-Prep GLC reference standard (Nu-Chek Prep, Inc., Elysian, Minn.) and tentatively identified based on retention time. Fatty acids present were expressed as mg/g and % of total FAME.

The sample was prepared by dissolving 250 mg of final oil in 600 μL of hexane and applying to the head of the column. After fractionation of the sample using flash chromatography, the sterol ester fraction accounted for 1.2% by weight, the triacylglyceride (TAG) fraction accounted for 92.1% by weight, the free fatty acid (FFA) fraction accounted for 2.1% by weight, the sterol fraction accounted for 1.1%, the diacylglyceride (DAG) fraction accounted for 2.8% by weight of the final oil.

The TLC analysis of the pooled fractions showed that the FFA and sterol fractions were mixed with TAG and DAG respectively. The total fatty acid profiles of the FRIOLEX® final oil and isolated fractions are shown below in Table 20 and Table 21 calculated as mg/g and % FAME, respectively.

TABLE 20

Fatty Acid Profile Calculated as Milligrams per Gram of FAME

| Fatty Acid | Final Oil FAME (mg/g) | Sterol Esters FAME (mg/g) | TAG FAME (mg/g) | FFA FAME (mg/g) | Sterol FAME (mg/g) | DAG FAME (mg/g) |
|---|---|---|---|---|---|---|
| Wt. % | NA | 1.2 | 92.1 | 2.1 | 1.1 | 2.8 |
| C12:0* | 0.0 | 0.0 | 1.0 | 0.0 | 1.2 | 0.6 |
| C14:0* | 11.5 | 5.1 | 11.3 | 6.0 | 9.6 | 5.7 |
| C14:1* | 0.0 | 0.0 | 0.0 | 0.0 | 0.0 | 0.0 |
| C15:0 | 2.3 | 0.0 | 2.3 | 1.2 | 2.0 | 1.9 |
| C16:0* | 183.3 | 80.0 | 180.8 | 99.9 | 149.3 | 132.2 |
| C16:1* | 0.0 | 0.0 | 0.9 | 0.0 | 0.8 | 0.6 |
| C18:0* | 19.6 | 17.5 | 19.6 | 7.5 | 16.2 | 6.7 |
| C18:1 N9* | 243.3 | 242.8 | 249.6 | 62.9 | 190.5 | 84.0 |
| C18:1 N7 | 1.9 | 1.7 | 2.0 | 0.8 | 1.9 | 0.9 |
| C18:2 N6* | 13.8 | 5.6 | 13.8 | 6.2 | 14.3 | 9.1 |
| C20:0* | 4.3 | 6.6 | 4.5 | 1.5 | 3.6 | 1.4 |
| C18:3 N3* | 0.0 | 0.0 | 0.3 | 0.0 | 0.0 | 0.0 |
| C20:1 N9* | 0.0 | 0.0 | 0.8 | 0.0 | 0.8 | 0.0 |
| C18:4 N3 | 0.0 | 0.0 | 0.7 | 1.3 | 0.9 | 0.4 |
| C20:2 N6* | 0.0 | 0.0 | 0.6 | 0.0 | 0.0 | 0.0 |
| C20:3 N6 | 0.0 | 0.0 | 0.3 | 0.0 | 0.0 | 0.0 |
| C22:0* | 3.3 | 61.0 | 3.2 | 1.1 | 3.0 | 1.2 |
| C20:4 N7 | 0.0 | 0.0 | 0.0 | 0.0 | 0.0 | 0.0 |
| C20:3 N3 | 0.0 | 0.0 | 0.0 | 0.0 | 0.0 | 0.0 |
| C20:4N6* | 1.7 | 0.0 | 2.3 | 1.4 | 1.9 | 1.3 |
| C22:1 N9* | 0.0 | 0.0 | 0.0 | 0.0 | 0.0 | 0.0 |
| C20:4 N5 | 0.0 | 0.0 | 0.0 | 0.0 | 0.0 | 0.0 |
| C20:4 N3 | 2.4 | 4.5 | 3.0 | 2.2 | 2.6 | 1.3 |
| C20:5 N3* | 28.1 | 3.0 | 27.7 | 38.6 | 25.6 | 43.2 |
| C24:0* | 1.4 | 64.3 | 1.4 | 0.0 | 2.0 | 1.0 |
| C22:4 N9 | 0.0 | 0.0 | 0.0 | 0.0 | 0.0 | 0.0 |
| C24:1 N9* | 0.0 | 0.0 | 0.0 | 0.0 | 0.0 | 0.0 |
| C22:5 N6* | 20.0 | 7.6 | 21.0 | 10.1 | 17.2 | 14.4 |
| C22:5 N3* | 2.8 | 0.0 | 3.1 | 3.7 | 3.4 | 2.9 |
| C22:6 N3* | 407.1 | 72.5 | 417.4 | 443.6 | 350.5 | 428.5 |
| Sum of all FAME's | 936.1 | 572.1 | 967.6 | 688.0 | 797.3 | 737.3 |

TABLE 21

Fatty Acid Profiles as a Percent of Total FAME

| Fatty Acid | Final Oil % FAME | Sterol Esters % FAME | TAG % FAME | FFA % FAME | Sterol % FAME | DAG % FAME |
|---|---|---|---|---|---|---|
| C12:0* | 0.0 | 0.0 | 0.1 | 0.0 | 0.2 | 0.1 |
| C14:0* | 1.2 | 0.9 | 1.2 | 0.9 | 1.2 | 0.8 |
| C14:1* | 0.0 | 0.0 | 0.0 | 0.0 | 0.0 | 0.0 |
| C15:0 | 0.2 | 0.0 | 0.2 | 0.2 | 0.2 | 0.3 |
| C16:0* | 19.6 | 14.0 | 18.7 | 14.5 | 18.7 | 17.9 |
| C16:1* | 0.0 | 0.0 | 0.1 | 0.0 | 0.1 | 0.1 |
| C18:0* | 2.1 | 3.1 | 2.0 | 1.1 | 2.0 | 0.9 |
| C18:1 N9* | 26.0 | 42.4 | 25.8 | 9.1 | 23.9 | 11.4 |
| C18:1 N7 | 0.2 | 0.3 | 0.2 | 0.1 | 0.2 | 0.1 |
| C18:2 N6* | 1.5 | 1.0 | 1.4 | 0.9 | 1.8 | 1.2 |
| C20:0* | 0.5 | 1.1 | 0.5 | 0.2 | 0.5 | 0.2 |
| C18:3 N3* | 0.0 | 0.0 | 0.0 | 0.0 | 0.0 | 0.0 |
| C20:1 N9* | 0.0 | 0.0 | 0.1 | 0.0 | 0.1 | 0.0 |
| C18:4 N3 | 0.0 | 0.0 | 0.1 | 0.2 | 0.1 | 0.1 |
| C20:2 N6* | 0.0 | 0.0 | 0.1 | 0.0 | 0.0 | 0.0 |
| C20:3 N6 | 0.0 | 0.0 | 0.0 | 0.0 | 0.0 | 0.0 |
| C22:0* | 0.4 | 10.7 | 0.3 | 0.2 | 0.4 | 0.2 |
| C20:4 N7 | 0.0 | 0.0 | 0.0 | 0.0 | 0.0 | 0.0 |
| C20:3 N3 | 0.0 | 0.0 | 0.0 | 0.0 | 0.0 | 0.0 |
| C20:4N6* | 0.2 | 0.0 | 0.2 | 0.2 | 0.2 | 0.2 |
| C22:1 N9* | 0.0 | 0.0 | 0.0 | 0.0 | 0.0 | 0.0 |
| C20:4 N5 | 0.0 | 0.0 | 0.0 | 0.0 | 0.0 | 0.0 |
| C20:4 N3 | 0.3 | 0.8 | 0.3 | 0.3 | 0.3 | 0.2 |
| C20:5 N3* | 3.0 | 0.5 | 2.9 | 5.6 | 3.2 | 5.9 |
| C24:0* | 0.2 | 11.2 | 0.1 | 0.0 | 0.2 | 0.1 |
| C22:4 N9 | 0.0 | 0.0 | 0.0 | 0.0 | 0.0 | 0.0 |
| C24:1 N9* | 0.0 | 0.0 | 0.0 | 0.0 | 0.0 | 0.0 |
| C22:5 N6* | 2.1 | 1.3 | 2.2 | 1.5 | 2.2 | 1.9 |
| C22:5 N3* | 0.3 | 0.0 | 0.3 | 0.5 | 0.4 | 0.4 |
| C22:6 N3* | 43.6 | 12.7 | 43.1 | 64.5 | 44.0 | 58.1 |
| Sum of FAME % | 100 | 100 | 100 | 100 | 100 | 100 |

It is noted that fatty acid profiles of Tables 20 and 21 were obtained from samples extracted using a FRIOLEX® process. The fatty acid profiles of Tables 20 and 21 are expected to be the substantially the same if the samples were extracted using the processes of the present invention.

Example 33

A two-day old inoculum flask of the isolated thraustochytrid (ATCC Accession No. PTA-9695) was prepared in a carbon and nitrogen-fed culture with 980 ppm (thraustochytrid media).

Mutagenesis was carried out according to following procedure:

A sterile T=2 day old flask, approximately 50 ml, was poured into a sterile 40 ml glass homogenizer. The culture received 50 plunges in the homogenizer. The culture was pipetted out and filtered through a sterile 50 micron mesh filter, which was placed in a 50 ml sterile tube (the mesh was used as a means of retaining the larger clumps of colonies while letting the smaller clusters and single cells pass through the 50 micron mesh.). The entire concentrated macerate was collected in a sterile 50 ml tube. The macerated culture was vortexed and dilutions at levels up to 1:100 fold were made in tubes containing thraustochytrid media. The diluted macerate samples were vortexed prior to adding 200 µl of inoculum to a thraustochytrid media agar petri dish, 100×15 mm, containing 4-5 glass beads (3 mm glass beads). Each plate was gently agitated in an effort to have the beads spread the inoculum evenly around the plate. Beads were dumped off of plates and plates were left to sit with covers on for approximately 5 minutes to dry. Lights in both the sterile hood and adjoining areas were turned off as the procedure was performed in dim light. There was minimal light available to be able to run the procedure but only indirect and dim.

Five replicate plates were placed on the floor of the XL crosslinker (Spectronics Corporation, New York) with the lids off while the samples were irradiated. The crosslinker delivered power in terms of microjoules and a level was sought that achieved a 90%-95% Kill. Five replicate control plates were inoculated with un-mutagenized cells using the same protocol. These cell counts were used to calculate the % Kill. Once the irradiation was finished the plates were taken out, the lids were replaced, and the plates were wrapped in parafilm followed by a wrap in aluminum foil. It was imperative that the plates grew for the first week in the dark so that they were not able to repair the damaged genes.

Plates were placed in a 22.5° C. room for about 10 days prior to counting the colonies. When final counts were made, individual colonies were picked with a sterile inoculating loop and re-streaked on new thraustochytrid media plates. Each colony was plated on an individual plate. As plates grew dense a sample was taken, using a inoculating loop, and inoculated into a sterile 250 ml shake flask containing 50 ml of thraustochytrid media. This flask was placed on a shaker at 200 rpm in a 22.5° C. room. On T=7 days the shake flask culture was harvested into a 50 ml sterile tube. The pH was taken and the sample was spun down to collect the biomass pellet. Each sample was rinsed and re-suspended in a 50:50 mixture of isopropyl alcohol and distilled water prior to being re-spun. The collected pellet was freeze dried, weighed, and a FAME analysis was performed. The data in Tables 22-28 represents mutants produced with the above process.

TABLE 22

Mutants of Thraustochytrid Strain ATCC Accession No. PTA-9695

| Fatty Acids | control ATCC PTA-9695 | Mutant 1 | Mutant 2 | Mutant 3 | Mutant 4 | Mutant 5 | Mutant 8 | Mutant 9 | Mutant 10 |
|---|---|---|---|---|---|---|---|---|---|
| % 08:0 | 0.00 | 0.00 | 0.00 | 0.00 | 0.00 | 0.00 | 0.00 | 0.00 | 0.00 |
| % 09:0 | 0.00 | 0.00 | 0.00 | 0.00 | 0.00 | 0.00 | 0.00 | 0.00 | 0.00 |
| % 10:0 | 0.00 | 0.00 | 0.00 | 0.00 | 0.00 | 0.00 | 0.00 | 0.00 | 0.00 |
| % 11:0 | 0.00 | 0.00 | 0.00 | 0.00 | 0.00 | 0.00 | 0.00 | 0.00 | 0.00 |
| % 11:1 | 0.00 | 0.00 | 0.00 | 0.00 | 0.00 | 0.00 | 0.00 | 0.00 | 0.00 |
| % 12:0 | 0.10 | 0.10 | 0.08 | 0.08 | 0.13 | 0.07 | 0.11 | 0.08 | 0.08 |
| % 12:1 | 0.00 | 0.00 | 0.00 | 0.00 | 0.00 | 0.00 | 0.00 | 0.00 | 0.00 |
| % 13:0 | 0.11 | 0.11 | 0.17 | 0.13 | 0.12 | 0.18 | 0.11 | 0.15 | 0.14 |
| % 13:1 | 0.00 | 0.00 | 0.00 | 0.00 | 0.00 | 0.00 | 0.00 | 0.00 | 0.00 |
| % 14:0 | 1.79 | 1.85 | 1.49 | 1.37 | 2.36 | 1.29 | 1.85 | 1.72 | 1.57 |
| % 14:1 | 0.00 | 0.00 | 0.00 | 0.00 | 0.00 | 0.00 | 0.00 | 0.00 | 0.00 |
| % 15:1 | 0.00 | 0.00 | 0.00 | 0.00 | 0.00 | 0.00 | 0.00 | 0.00 | 0.00 |
| % 16:0 | 30.98 | 28.75 | 29.96 | 29.97 | 30.33 | 29.86 | 30.97 | 30.11 | 29.20 |
| % 16:1 | 0.27 | 0.20 | 0.31 | 0.14 | 0.25 | 0.27 | 0.16 | 0.27 | 0.24 |
| % 16:2 | 0.00 | 0.00 | 0.00 | 0.00 | 0.00 | 0.00 | 0.00 | 0.00 | 0.00 |
| % 16:3 | 0.00 | 0.00 | 0.00 | 0.00 | 0.00 | 0.00 | 0.00 | 0.00 | 0.00 |
| % 17:0 | 0.12 | 0.15 | 0.13 | 0.17 | 0.27 | 0.12 | 0.16 | 0.13 | 0.13 |
| % 18:0 | 1.29 | 1.22 | 1.38 | 1.47 | 1.22 | 1.57 | 1.25 | 1.34 | 1.34 |
| % 18:1 n-9 | 0.00 | 0.00 | 0.00 | 0.00 | 0.00 | 0.00 | 0.00 | 0.00 | 0.00 |
| % 18:1 n-7 | 0.00 | 0.00 | 0.00 | 0.00 | 0.00 | 0.00 | 0.00 | 0.00 | 0.00 |
| % 18:2 | 0.00 | 0.00 | 0.00 | 0.00 | 0.00 | 0.00 | 0.00 | 0.00 | 0.00 |
| % 18:3 n-6 | 0.00 | 0.03 | 0.00 | 0.00 | 0.07 | 0.00 | 0.03 | 0.00 | 0.00 |
| % 18:3 n-3 | 0.00 | 0.00 | 0.00 | 0.00 | 0.00 | 0.00 | 0.00 | 0.00 | 0.00 |
| % 18:4 n-3 | 0.00 | 0.00 | 0.00 | 0.00 | 0.00 | 0.00 | 0.00 | 0.00 | 0.00 |
| % 20:0 | 0.39 | 0.36 | 0.42 | 0.45 | 0.34 | 0.46 | 0.37 | 0.40 | 0.40 |
| % 20:1 n-9 | 0.00 | 0.00 | 0.00 | 0.00 | 0.00 | 0.00 | 0.00 | 0.00 | 0.00 |
| % 20:2 | 0.00 | 0.00 | 0.00 | 0.00 | 0.00 | 0.00 | 0.00 | 0.00 | 0.00 |
| % 20:3 n-9 | 0.00 | 0.00 | 0.00 | 0.00 | 0.00 | 0.00 | 0.00 | 0.00 | 0.00 |
| % 20:3 n-6 | 0.00 | 0.00 | 0.00 | 0.00 | 0.00 | 0.00 | 0.00 | 0.00 | 0.00 |
| % 20:3 n-3 | 0.37 | 0.38 | 0.32 | 0.42 | 0.44 | 0.32 | 0.41 | 0.33 | 0.36 |
| % 20:4 ARA | 0.55 | 0.55 | 0.94 | 0.57 | 0.80 | 0.89 | 0.60 | 0.73 | 0.75 |
| % 20:5 n-3 EPA | 2.62 | 2.94 | 3.01 | 2.40 | 3.64 | 2.83 | 2.54 | 2.81 | 2.81 |
| % 22:0 | 0.08 | 0.08 | 0.09 | 0.09 | 0.07 | 0.10 | 0.07 | 0.09 | 0.09 |
| % 22:1 | 0.00 | 0.00 | 0.00 | 0.00 | 0.00 | 0.00 | 0.00 | 0.00 | 0.00 |
| % 22:2 | 0.00 | 0.00 | 0.00 | 0.00 | 0.00 | 0.00 | 0.00 | 0.00 | 0.00 |
| % 22:3 | 0.00 | 0.00 | 0.00 | 0.00 | 0.00 | 0.00 | 0.00 | 0.00 | 0.00 |
| % 22:4 n-6 | 0.00 | 0.00 | 0.00 | 0.00 | 0.00 | 0.00 | 0.00 | 0.00 | 0.00 |
| % 22:5 n-6 | 3.19 | 3.19 | 2.94 | 3.43 | 3.35 | 2.87 | 3.34 | 3.01 | 3.15 |
| % 22:5 n-3 | 0.18 | 0.18 | 0.21 | 0.23 | 0.20 | 0.18 | 0.20 | 0.17 | 0.18 |
| % 22:6 n-3 DHA | 56.88 | 58.63 | 57.56 | 57.85 | 54.87 | 57.98 | 56.62 | 57.53 | 58.52 |
| % 24:0 | 0.00 | 0.00 | 0.00 | 0.00 | 0.00 | 0.00 | 0.00 | 0.00 | 0.00 |
| % 24:1 | 0.00 | 0.08 | 0.00 | 0.00 | 0.00 | 0.00 | 0.00 | 0.09 | 0.00 |
| % Fat | 46.83 | 46.10 | 31.23 | 47.39 | 49.78 | 30.62 | 54.71 | 37.72 | 37.87 |
| % Unknown | 0.85 | 0.46 | 0.35 | 0.51 | 0.51 | 0.36 | 0.50 | 0.38 | 0.39 |

TABLE 23

Mutants of Thraustochytrid Strain ATCC Accession No. PTA-9695

| Fatty Acids | control ATCC PTA-9695 | Mutant 11 | Mutant 13 | Mutant 14 | Mutant 15 | Mutant 16 | Mutant 20 | Mutant 21 | Mutant 22 |
|---|---|---|---|---|---|---|---|---|---|
| % 08:0 | 0.00 | 0.00 | 0.00 | 0.00 | 0.00 | 0.00 | 0.00 | 0.00 | 0.00 |
| % 09:0 | 0.00 | 0.00 | 0.00 | 0.00 | 0.00 | 0.00 | 0.00 | 0.00 | 0.00 |
| % 10:0 | 0.00 | 0.00 | 0.00 | 0.00 | 0.00 | 0.00 | 0.00 | 0.00 | 0.00 |
| % 11:0 | 0.00 | 0.00 | 0.00 | 0.00 | 0.00 | 0.00 | 0.00 | 0.00 | 0.00 |

TABLE 23-continued

Mutants of Thraustochytrid Strain ATCC Accession No. PTA-9695

| Fatty Acids | control ATCC PTA-9695 | Mutant 11 | Mutant 13 | Mutant 14 | Mutant 15 | Mutant 16 | Mutant 20 | Mutant 21 | Mutant 22 |
|---|---|---|---|---|---|---|---|---|---|
| % 11:1 | 0.00 | 0.00 | 0.00 | 0.00 | 0.00 | 0.00 | 0.00 | 0.00 | 0.00 |
| % 12:0 | 0.10 | 0.10 | 0.08 | 0.09 | 0.11 | 0.11 | 0.09 | 0.09 | 0.10 |
| % 12:1 | 0.00 | 0.00 | 0.00 | 0.00 | 0.00 | 0.00 | 0.00 | 0.00 | 0.00 |
| % 13:0 | 0.11 | 0.15 | 0.16 | 0.14 | 0.13 | 0.12 | 0.17 | 0.16 | 0.13 |
| % 13:1 | 0.00 | 0.00 | 0.00 | 0.00 | 0.00 | 0.00 | 0.00 | 0.00 | 0.00 |
| % 14:0 | 1.79 | 1.89 | 1.43 | 1.75 | 1.83 | 1.98 | 1.76 | 1.77 | 1.81 |
| % 14:1 | 0.00 | 0.00 | 0.00 | 0.00 | 0.00 | 0.00 | 0.00 | 0.00 | 0.00 |
| % 15:1 | 0.00 | 0.00 | 0.00 | 0.00 | 0.00 | 0.00 | 0.00 | 0.00 | 0.00 |
| % 16:0 | 30.98 | 31.08 | 30.27 | 29.92 | 31.79 | 30.18 | 28.84 | 30.05 | 30.81 |
| % 16:1 | 0.27 | 0.32 | 0.26 | 0.28 | 0.21 | 0.24 | 0.23 | 0.23 | 0.33 |
| % 16:2 | 0.00 | 0.00 | 0.00 | 0.00 | 0.00 | 0.00 | 0.00 | 0.00 | 0.00 |
| % 16:3 | 0.00 | 0.00 | 0.00 | 0.00 | 0.00 | 0.00 | 0.00 | 0.00 | 0.00 |
| % 17:0 | 0.12 | 0.24 | 0.15 | 0.13 | 0.15 | 0.12 | 0.14 | 0.16 | 0.14 |
| % 18:0 | 1.29 | 1.36 | 1.44 | 1.31 | 1.36 | 1.21 | 1.28 | 1.34 | 1.33 |
| % 18:1 n-9 | 0.00 | 0.00 | 0.00 | 0.00 | 0.00 | 0.00 | 0.00 | 0.00 | 0.00 |
| % 18:1 n-7 | 0.00 | 0.00 | 0.00 | 0.00 | 0.00 | 0.00 | 0.00 | 0.00 | 0.00 |
| % 18:2 | 0.00 | 0.00 | 0.00 | 0.00 | 0.00 | 0.00 | 0.00 | 0.00 | 0.00 |
| % 18:3 n-6 | 0.00 | 0.05 | 0.00 | 0.00 | 0.00 | 0.03 | 0.00 | 0.00 | 0.00 |
| % 18:3 n-3 | 0.00 | 0.00 | 0.00 | 0.00 | 0.00 | 0.00 | 0.00 | 0.00 | 0.00 |
| % 18:4 n-3 | 0.00 | 0.00 | 0.00 | 0.00 | 0.00 | 0.00 | 0.00 | 0.00 | 0.00 |
| % 20:0 | 0.39 | 0.38 | 0.42 | 0.39 | 0.40 | 0.37 | 0.37 | 0.38 | 0.38 |
| % 20:1 n-9 | 0.00 | 0.00 | 0.06 | 0.00 | 0.00 | 0.00 | 0.00 | 0.00 | 0.00 |
| % 20:2 | 0.00 | 0.00 | 0.00 | 0.00 | 0.00 | 0.00 | 0.00 | 0.00 | 0.00 |
| % 20:3 n-9 | 0.00 | 0.00 | 0.00 | 0.00 | 0.00 | 0.00 | 0.00 | 0.00 | 0.00 |
| % 20:3 n-6 | 0.00 | 0.00 | 0.00 | 0.00 | 0.00 | 0.00 | 0.00 | 0.00 | 0.00 |
| % 20:3 n-3 | 0.37 | 0.43 | 0.36 | 0.33 | 0.36 | 0.37 | 0.33 | 0.35 | 0.34 |
| % 20:4 ARA | 0.55 | 0.79 | 0.72 | 0.80 | 0.64 | 0.62 | 0.83 | 0.73 | 0.69 |
| % 20:5 n-3 EPA | 2.62 | 3.17 | 2.72 | 2.97 | 2.52 | 2.66 | 3.03 | 2.90 | 2.87 |
| % 22:0 | 0.08 | 0.08 | 0.09 | 0.08 | 0.08 | 0.08 | 0.08 | 0.08 | 0.08 |
| % 22:1 | 0.00 | 0.00 | 0.00 | 0.00 | 0.00 | 0.00 | 0.00 | 0.00 | 0.00 |
| % 22:2 | 0.00 | 0.00 | 0.00 | 0.00 | 0.00 | 0.00 | 0.00 | 0.00 | 0.00 |
| % 22:3 | 0.00 | 0.00 | 0.00 | 0.00 | 0.00 | 0.00 | 0.00 | 0.00 | 0.00 |
| % 22:4 n-6 | 0.00 | 0.00 | 0.00 | 0.00 | 0.00 | 0.00 | 0.00 | 0.00 | 0.00 |
| % 22:5 n-6 | 3.19 | 3.25 | 3.06 | 2.97 | 3.07 | 3.16 | 2.98 | 3.01 | 3.02 |
| % 22:5 n-3 | 0.18 | 0.20 | 0.19 | 0.17 | 0.19 | 0.16 | 0.17 | 0.18 | 0.18 |
| % 22:6 n-3 DHA | 56.88 | 55.17 | 57.52 | 57.63 | 56.02 | 57.38 | 58.58 | 57.45 | 56.65 |
| % 24:0 | 0.00 | 0.00 | 0.00 | 0.00 | 0.00 | 0.00 | 0.00 | 0.00 | 0.00 |
| % 24:1 | 0.00 | 0.00 | 0.00 | 0.00 | 0.00 | 0.07 | 0.00 | 0.00 | 0.08 |
| % Fat | 46.83 | 46.19 | 37.00 | 38.41 | 48.46 | 47.32 | 37.71 | 40.23 | 43.55 |
| % Unknown | 0.85 | 0.47 | 0.39 | 0.36 | 0.47 | 0.44 | 0.37 | 0.39 | 0.38 |

TABLE 24

Mutants of Thraustochytrid Strain ATCC Accession No. PTA-9695

| Fatty Acids | control ATCC PTA-9695 | Mutant 24 | Mutant 26 | Mutant 27 | Mutant 29 | Mutant 30 | Mutant 33 | Mutant 34 | Mutant 35 |
|---|---|---|---|---|---|---|---|---|---|
| % 08:0 | 0.00 | 0.00 | 0.00 | 0.00 | 0.00 | 0.00 | 0.00 | 0.00 | 0.00 |
| % 09:0 | 0.00 | 0.00 | 0.00 | 0.00 | 0.00 | 0.00 | 0.00 | 0.00 | 0.00 |
| % 10:0 | 0.00 | 0.00 | 0.00 | 0.00 | 0.00 | 0.00 | 0.00 | 0.00 | 0.00 |
| % 11:0 | 0.00 | 0.00 | 0.00 | 0.00 | 0.00 | 0.00 | 0.00 | 0.00 | 0.00 |
| % 11:1 | 0.00 | 0.00 | 0.00 | 0.00 | 0.00 | 0.00 | 0.00 | 0.00 | 0.00 |
| % 12:0 | 0.10 | 0.11 | 0.09 | 0.09 | 0.08 | 0.08 | 0.10 | 0.11 | 0.09 |
| % 12:1 | 0.00 | 0.00 | 0.00 | 0.00 | 0.00 | 0.00 | 0.00 | 0.00 | 0.00 |
| % 13:0 | 0.11 | 0.12 | 0.13 | 0.14 | 0.16 | 0.14 | 0.12 | 0.12 | 0.10 |
| % 13:1 | 0.00 | 0.00 | 0.00 | 0.00 | 0.00 | 0.00 | 0.00 | 0.00 | 0.00 |
| % 14:0 | 1.79 | 1.98 | 1.71 | 1.69 | 1.63 | 1.66 | 1.93 | 2.01 | 1.59 |
| % 14:1 | 0.00 | 0.00 | 0.00 | 0.00 | 0.00 | 0.00 | 0.00 | 0.00 | 0.00 |
| % 15:1 | 0.00 | 0.00 | 0.00 | 0.00 | 0.00 | 0.00 | 0.70 | 0.54 | 0.39 |
| % 16:0 | 30.98 | 30.61 | 30.32 | 30.21 | 29.70 | 29.50 | 30.26 | 32.28 | 30.78 |
| % 16:1 | 0.27 | 0.19 | 0.22 | 0.22 | 0.26 | 0.26 | 0.29 | 0.26 | 0.16 |
| % 16:2 | 0.00 | 0.00 | 0.00 | 0.00 | 0.00 | 0.00 | 0.00 | 0.00 | 0.00 |
| % 16:3 | 0.00 | 0.00 | 0.00 | 0.00 | 0.00 | 0.00 | 0.00 | 0.00 | 0.00 |
| % 17:0 | 0.12 | 0.15 | 0.18 | 0.16 | 0.13 | 0.13 | 0.26 | 0.16 | 0.12 |
| % 18:0 | 1.29 | 1.24 | 1.31 | 1.31 | 1.32 | 1.30 | 1.32 | 1.37 | 1.34 |
| % 18:1 n-9 | 0.00 | 0.00 | 0.00 | 0.00 | 0.00 | 0.00 | 0.10 | 0.11 | 0.09 |
| % 18:1 n-7 | 0.00 | 0.00 | 0.00 | 0.00 | 0.00 | 0.00 | 0.00 | 0.00 | 0.00 |
| % 18:2 | 0.00 | 0.00 | 0.00 | 0.00 | 0.00 | 0.00 | 0.00 | 0.00 | 0.00 |
| % 18:3 n-6 | 0.00 | 0.00 | 0.00 | 0.00 | 0.00 | 0.00 | 0.00 | 0.00 | 0.00 |
| % 18:3 n-3 | 0.00 | 0.00 | 0.00 | 0.00 | 0.00 | 0.00 | 0.00 | 0.00 | 0.00 |

TABLE 24-continued

Mutants of Thraustochytrid Strain ATCC Accession No. PTA-9695

| Fatty Acids | control ATCC PTA-9695 | Mutant 24 | Mutant 26 | Mutant 27 | Mutant 29 | Mutant 30 | Mutant 33 | Mutant 34 | Mutant 35 |
|---|---|---|---|---|---|---|---|---|---|
| % 18:4 n-3 | 0.00 | 0.00 | 0.00 | 0.00 | 0.00 | 0.00 | 0.00 | 0.00 | 0.00 |
| % 20:0 | 0.39 | 0.37 | 0.39 | 0.40 | 0.40 | 0.39 | 0.37 | 0.40 | 0.40 |
| % 20:1 n-9 | 0.00 | 0.00 | 0.00 | 0.00 | 0.00 | 0.00 | 0.00 | 0.13 | 0.14 |
| % 20:2 | 0.00 | 0.00 | 0.00 | 0.00 | 0.00 | 0.00 | 0.00 | 0.00 | 0.00 |
| % 20:3 n-9 | 0.00 | 0.00 | 0.00 | 0.00 | 0.00 | 0.00 | 0.00 | 0.00 | 0.00 |
| % 20:3 n-6 | 0.00 | 0.00 | 0.00 | 0.00 | 0.00 | 0.00 | 0.00 | 0.00 | 0.00 |
| % 20:3 n-3 | 0.37 | 0.38 | 0.37 | 0.35 | 0.35 | 0.35 | 0.00 | 0.00 | 0.00 |
| % 20:4 ARA | 0.55 | 0.61 | 0.59 | 0.69 | 0.68 | 0.32 | 0.34 | 0.24 | 0.28 |
| % 20:5 n-3 EPA | 2.62 | 2.62 | 2.70 | 2.85 | 2.90 | 2.91 | 3.28 | 2.51 | 2.59 |
| % 22:0 | 0.08 | 0.08 | 0.08 | 0.08 | 0.09 | 0.08 | 0.08 | 0.08 | 0.08 |
| % 22:1 | 0.00 | 0.00 | 0.00 | 0.00. | 0.00 | 0.00 | 0.00 | 0.00 | 0.00 |
| % 22:2 | 0.00 | 0.00 | 0.00 | 0.00 | 0.00 | 0.00 | 0.00 | 0.00 | 0.00 |
| % 22:3 | 0.00 | 0.00 | 0.00 | 0.00 | 0.00 | 0.00 | 0.00 | 0.00 | 0.00 |
| % 22:4 n-6 | 0.00 | 0.00 | 0.00 | 0.00 | 0.00 | 0.00 | 0.00 | 0.00 | 0.00 |
| % 22:5 n-6 | 3.19 | 3.10 | 3.11 | 3.05 | 3.10 | 3.11 | 3.43 | 3.26 | 3.56 |
| % 22:5 n-3 | 0.18 | 0.16 | 0.18 | 0.19 | 0.18 | 0.18 | 0.18 | 0.15 | 0.24 |
| % 22:6 n-3 DHA | 56.88 | 57.03 | 57.46 | 57.46 | 57.96 | 58.52 | 55.92 | 54.96 | 56.73 |
| % 24:0 | 0.00 | 0.00 | 0.00 | 0.00 | 0.00 | 0.00 | 0.00 | 0.00 | 0.00 |
| % 24:1 | 0.00 | 0.08 | 0.00 | 0.00 | 0.00 | 0.00 | 0.07 | 0.07 | 0.07 |
| % Fat | 46.83 | 47.80 | 43.50 | 38.86 | 38.60 | 38.16 | 46.95 | 46.43 | 51.55 |
| % Unknown | 0.85 | 0.45 | 0.42 | 0.39 | 0.37 | 0.82 | 1.25 | 1.23 | 1.25 |

TABLE 25

Mutants of Thraustochytrid Strain ATCC Accession No. PTA-9695

| Fatty Acids | control ATCC PTA-9695 | Mutant 36 | Mutant 37 | Mutant 38 | Mutant 39 | Mutant 40 | Mutant 42 | Mutant 43 | Mutant 44 |
|---|---|---|---|---|---|---|---|---|---|
| % 08:0 | 0.00 | 0.00 | 0.00 | 0.00 | 0.00 | 0.00 | 0.00 | 0.00 | 0.00 |
| % 09:0 | 0.00 | 0.00 | 0.00 | 0.00 | 0.00 | 0.00 | 0.00 | 0.00 | 0.00 |
| % 10:0 | 0.00 | 0.00 | 0.00 | 0.00 | 0.00 | 0.00 | 0.00 | 0.00 | 0.00 |
| % 11:0 | 0.00 | 0.00 | 0.00 | 0.00 | 0.00 | 0.00 | 0.00 | 0.00 | 0.00 |
| % 11:1 | 0.00 | 0.00 | 0.00 | 0.00 | 0.00 | 0.00 | 0.00 | 0.00 | 0.00 |
| % 12:0 | 0.10 | 0.00 | 0.11 | 0.00 | 0.11 | 0.09 | 0.08 | 0.12 | 0.09 |
| % 12:1 | 0.00 | 0.00 | 0.00 | 0.00 | 0.00 | 0.00 | 0.00 | 0.00 | 0.00 |
| % 13:0 | 0.11 | 0.44 | 0.09 | 0.24 | 0.12 | 0.11 | 0.12 | 0.08 | 0.15 |
| % 13:1 | 0.00 | 0.00 | 0.00 | 0.00 | 0.00 | 0.00 | 0.00 | 0.00 | 0.00 |
| % 14:0 | 1.79 | 1.25 | 1.99 | 1.48 | 1.96 | 1.76 | 1.43 | 2.17 | 1.75 |
| % 14:1 | 0.00 | 0.00 | 0.00 | 0.00 | 0.00 | 0.00 | 0.00 | 0.00 | 0.00 |
| % 15:1 | 0.00 | 2.12 | 0.48 | 0.71 | 0.54 | 0.55 | 0.36 | 0.62 | 0.50 |
| % 16:0 | 30.98 | 26.95 | 28.04 | 32.28 | 30.84 | 30.25 | 25.77 | 43.37 | 30.18 |
| % 16:1 | 0.27 | 0.00 | 0.26 | 0.23 | 0.22 | 0.21 | 0.10 | 1.05 | 0.22 |
| % 16:2 | 0.00 | 0.00 | 0.00 | 0.00 | 0.00 | 0.00 | 0.00 | 0.00 | 0.00 |
| % 16:3 | 0.00 | 0.00 | 0.00 | 0.00 | 0.00 | 0.00 | 0.00 | 0.00 | 0.00 |
| % 17:0 | 0.12 | 0.95 | 0.13 | 0.28 | 0.16 | 0.16 | 0.10 | 0.26 | 0.13 |
| % 18:0 | 1.29 | 1.58 | 1.11 | 1.79 | 1.30 | 1.29 | 1.25 | 2.21 | 1.34 |
| % 18:1 n-9 | 0.00 | 0.37 | 0.08 | 0.25 | 0.09 | 0.09 | 0.12 | 0.09 | 0.10 |
| % 18:1 n-7 | 0.00 | 0.00 | 0.00 | 0.00 | 0.00 | 0.00 | 0.00 | 0.05 | 0.00 |
| % 18:2 | 0.00 | 0.00 | 0.00 | 0.00 | 0.00 | 0.00 | 0.00 | 0.00 | 0.00 |
| % 18:3 n-6 | 0.00 | 0.00 | 0.06 | 0.00 | 0.00 | 0.00 | 0.00 | 0.00 | 0.00 |
| % 18:3 n-3 | 0.00 | 0.00 | 0.00 | 0.00 | 0.00 | 0.00 | 0.00 | 0.00 | 0.00 |
| % 18:4 n-3 | 0.00 | 0.00 | 0.00 | 0.00 | 0.00 | 0.00 | 0.00 | 0.00 | 0.00 |
| % 20:0 | 0.39 | 0.34 | 0.31 | 0.43 | 0.38 | 0.39 | 0.36 | 0.61 | 0.40 |
| % 20:1 n-9 | 0.00 | 0.00 | 0.00 | 0.43 | 0.00 | 0.14 | 0.15 | 0.15 | 0.49 |
| % 20:2 | 0.00 | 0.00 | 0.00 | 0.00 | 0.00 | 0.00 | 0.00 | 0.00 | 0.00 |
| % 20:3 n-9 | 0.00 | 0.00 | 0.00 | 0.00 | 0.00 | 0.00 | 0.00 | 0.00 | 0.00 |
| % 20:3 n-6 | 0.00 | 0.00 | 0.00 | 0.00 | 0.00 | 0.00 | 0.00 | 0.00 | 0.00 |
| % 20:3 n-3 | 0.37 | 0.00 | 0.00 | 0.00 | 0.00 | 0.00 | 0.00 | 0.00 | 0.00 |
| % 20:4 ARA | 0.55 | 0.41 | 0.31 | 0.24 | 0.27 | 0.24 | 0.30 | 0.35 | 0.23 |
| % 20:5 n-3 EPA | 2.62 | 5.36 | 2.77 | 4.00 | 2.72 | 2.80 | 3.21 | 3.47 | 2.80 |
| % 22:0 | 0.08 | 0.00 | 0.07 | 0.14 | 0.07 | 0.08 | 0.07 | 0.14 | 0.08 |
| % 22:1 | 0.00 | 0.00 | 0.00 | 0.00 | 0.00 | 0.00 | 0.00 | 0.00 | 0.00 |
| % 22:2 | 0.00 | 0.00 | 0.00 | 0.00 | 0.00 | 0.00 | 0.00 | 0.00 | 0.00 |
| % 22:3 | 0.00 | 0.00 | 0.00 | 0.00 | 0.00 | 0.00 | 0.00 | 0.00 | 0.00 |
| % 22:4 n-6 | 0.00 | 0.00 | 0.06 | 0.00 | 0.00 | 0.00 | 0.00 | 0.00 | 0.00 |
| % 22:5 n-6 | 3.19 | 2.40 | 3.94 | 2.57 | 3.48 | 3.29 | 3.89 | 2.37 | 3.33 |
| % 22:5 n-3 | 0.18 | 0.00 | 0.19 | 0.00 | 0.17 | 0.17 | 0.30 | 0.33 | 0.17 |
| % 22:6 n-3 DHA | 56.88 | 57.52 | 58.57 | 54.20 | 56.24 | 57.09 | 60.99 | 41.61 | 56.76 |
| % 24:0 | 0.00 | 0.00 | 0.00 | 0.00 | 0.00 | 0.00 | 0.00 | 0.00 | 0.00 |

TABLE 25-continued

Mutants of Thraustochytrid Strain ATCC Accession No. PTA-9695

| Fatty Acids | control ATCC PTA-9695 | Mutant 36 | Mutant 37 | Mutant 38 | Mutant 39 | Mutant 40 | Mutant 42 | Mutant 43 | Mutant 44 |
|---|---|---|---|---|---|---|---|---|---|
| % 24:1 | 0.00 | 0.00 | 0.08 | 0.00 | 0.08 | 0.09 | 0.08 | 0.06 | 0.09 |
| % Fat | 46.83 | 12.73 | 54.86 | 18.08 | 45.74 | 42.59 | 42.48 | 56.44 | 41.20 |
| % Unknown | 0.85 | 0.29 | 1.36 | 0.73 | 1.28 | 1.20 | 1.31 | 0.90 | 1.20 |

TABLE 26

Mutants of Thraustochytrid Strain ATCC Accession No. PTA-9695

| Fatty Acids | control ATCC PTA-9695 | Mutant 45 | Mutant 46 | Mutant 47 | Mutant 48 | Mutant 49 | Mutant 50 | Mutant 51 | Mutant 52 |
|---|---|---|---|---|---|---|---|---|---|
| % 08:0 | 0.00 | 0.00 | 0.00 | 0.00 | 0.00 | 0.00 | 0.00 | 0.00 | 0.00 |
| % 09:0 | 0.00 | 0.00 | 0.00 | 0.00 | 0.00 | 0.00 | 0.00 | 0.00 | 0.00 |
| % 10:0 | 0.00 | 0.00 | 0.00 | 0.00 | 0.00 | 0.00 | 0.00 | 0.00 | 0.00 |
| % 11:0 | 0.00 | 0.00 | 0.00 | 0.00 | 0.00 | 0.00 | 0.00 | 0.00 | 0.00 |
| % 11:1 | 0.00 | 0.00 | 0.00 | 0.00 | 0.00 | 0.00 | 0.00 | 0.00 | 0.00 |
| % 12:0 | 0.10 | 0.10 | 0.13 | 0.11 | 0.07 | 0.09 | 0.09 | 0.09 | 0.11 |
| % 12:1 | 0.00 | 0.00 | 0.00 | 0.00 | 0.00 | 0.00 | 0.00 | 0.00 | 0.00 |
| % 13:0 | 0.11 | 0.11 | 0.10 | 0.09 | 0.13 | 0.09 | 0.13 | 0.10 | 0.09 |
| % 13:1 | 0.00 | 0.00 | 0.00 | 0.00 | 0.00 | 0.00 | 0.00 | 0.00 | 0.00 |
| % 14:0 | 1.79 | 1.79 | 2.07 | 1.86 | 1.52 | 1.62 | 1.78 | 1.78 | 1.85 |
| % 14:1 | 0.00 | 0.00 | 0.00 | 0.00 | 0.00 | 0.00 | 0.00 | 0.00 | 0.00 |
| % 15:1 | 0.00 | 0.41 | 0.76 | 0.57 | 0.46 | 0.48 | 0.55 | 0.53 | 0.53 |
| % 16:0 | 30.98 | 28.79 | 24.90 | 30.07 | 29.07 | 31.21 | 30.46 | 30.79 | 32.53 |
| % 16:1 | 0.27 | 0.19 | 0.24 | 0.18 | 0.17 | 0.17 | 0.18 | 0.21 | 0.22 |
| % 16:2 | 0.00 | 0.00 | 0.00 | 0.00 | 0.00 | 0.00 | 0.00 | 0.00 | 0.00 |
| % 16:3 | 0.00 | 0.00 | 0.00 | 0.00 | 0.00 | 0.00 | 0.00 | 0.00 | 0.00 |
| % 17:0 | 0.12 | 0.11 | 0.24 | 0.16 | 0.12 | 0.14 | 0.17 | 0.18 | 0.15 |
| % 18:0 | 1.29 | 1.24 | 1.07 | 1.28 | 1.41 | 1.43 | 1.36 | 1.48 | 1.35 |
| % 18:1 n-9 | 0.00 | 0.08 | 0.07 | 0.09 | 0.09 | 0.08 | 0.10 | 0.09 | 0.06 |
| % 18:1 n-7 | 0.00 | 0.00 | 0.00 | 0.00 | 0.00 | 0.00 | 0.00 | 0.00 | 0.00 |
| % 18:2 | 0.00 | 0.00 | 0.00 | 0.00 | 0.00 | 0.00 | 0.00 | 0.00 | 0.00 |
| % 18:3 n-6 | 0.00 | 0.00 | 0.12 | 0.05 | 0.00 | 0.00 | 0.00 | 0.00 | 0.00 |
| % 18:3 n-3 | 0.00 | 0.00 | 0.00 | 0.00 | 0.00 | 0.00 | 0.00 | 0.00 | 0.00 |
| % 18:4 n-3 | 0.00 | 0.00 | 0.00 | 0.00 | 0.00 | 0.00 | 0.00 | 0.00 | 0.00 |
| % 20:0 | 0.39 | 0.36 | 0.29 | 0.37 | 0.42 | 0.42 | 0.39 | 0.40 | 0.41 |
| % 20:1 n-9 | 0.00 | 0.15 | 0.13 | 0.11 | 0.24 | 0.13 | 0.19 | 0.16 | 0.19 |
| % 20:2 | 0.00 | 0.00 | 0.00 | 0.00 | 0.00 | 0.00 | 0.00 | 0.00 | 0.00 |
| % 20:3 n-9 | 0.00 | 0.00 | 0.00 | 0.00 | 0.00 | 0.00 | 0.00 | 0.00 | 0.00 |
| % 20:3 n-6 | 0.00 | 0.00 | 0.05 | 0.00 | 0.00 | 0.00 | 0.00 | 0.00 | 0.00 |
| % 20:3 n-3 | 0.37 | 0.00 | 0.12 | 0.00 | 0.00 | 0.00 | 0.00 | 0.00 | 0.00 |
| % 20:4 ARA | 0.55 | 0.29 | 0.65 | 0.26 | 0.18 | 0.21 | 0.22 | 0.24 | 0.24 |
| % 20:5 n-3 EPA | 2.62 | 3.05 | 4.28 | 2.66 | 2.93 | 2.46 | 2.71 | 2.94 | 2.44 |
| % 22:0 | 0.08 | 0.07 | 0.06 | 0.07 | 0.09 | 0.09 | 0.08 | 0.08 | 0.08 |
| % 22:1 | 0.00 | 0.00 | 0.00 | 0.00 | 0.00 | 0.00 | 0.00 | 0.00 | 0.00 |
| % 22:2 | 0.00 | 0.00 | 0.00 | 0.00 | 0.00 | 0.00 | 0.00 | 0.00 | 0.00 |
| % 22:3 | 0.00 | 0.00 | 0.00 | 0.00 | 0.00 | 0.00 | 0.00 | 0.00 | 0.00 |
| % 22:4 n-6 | 0.00 | 0.06 | 0.07 | 0.05 | 0.00 | 0.00 | 0.00 | 0.00 | 0.00 |
| % 22:5 n-6 | 3.19 | 3.59 | 4.28 | 3.46 | 3.07 | 3.32 | 3.17 | 3.18 | 3.24 |
| % 22:5 n-3 | 0.18 | 0.25 | 0.27 | 0.18 | 0.17 | 0.17 | 0.16 | 0.17 | 0.17 |
| % 22:6 n-3 DHA | 56.88 | 57.74 | 58.32 | 56.70 | 58.65 | 56.45 | 56.83 | 56.19 | 55.06 |
| % 24:0 | 0.00 | 0.00 | 0.00 | 0.00 | 0.00 | 0.00 | 0.00 | 0.00 | 0.00 |
| % 24:1 | 0.00 | 0.07 | 0.15 | 0.10 | 0.10 | 0.11 | 0.10 | 0.10 | 0.07 |
| % Fat | 46.83 | 48.91 | 58.95 | 54.80 | 35.41 | 48.60 | 44.93 | 43.01 | 51.93 |
| % Unknown | 0.85 | 1.55 | 1.63 | 1.57 | 1.09 | 1.35 | 1.31 | 1.28 | 1.19 |

TABLE 27

Mutants of Thraustochytrid Strain ATCC Accession No. PTA-9695

| Fatty Acids | control ATCC PTA-9695 | Mutant 53 | Mutant 54 | Mutant 55 | Mutant 56 | Mutant 57 | Mutant 58 | Mutant 60 | Mutant 61 | Mutant 65 |
|---|---|---|---|---|---|---|---|---|---|---|
| % 08:0 | 0.00 | 0.00 | 0.00 | 0.00 | 0.00 | 0.00 | 0.00 | 0.00 | 0.00 | 0.00 |
| % 09:0 | 0.00 | 0.00 | 0.00 | 0.00 | 0.00 | 0.00 | 0.00 | 0.00 | 0.00 | 0.00 |

TABLE 27-continued

Mutants of Thraustochytrid Strain ATCC Accession No. PTA-9695

| Fatty Acids | control ATCC PTA-9695 | Mutant 53 | Mutant 54 | Mutant 55 | Mutant 56 | Mutant 57 | Mutant 58 | Mutant 60 | Mutant 61 | Mutant 65 |
|---|---|---|---|---|---|---|---|---|---|---|
| % 10:0 | 0.00 | 0.00 | 0.00 | 0.00 | 0.00 | 0.00 | 0.00 | 0.00 | 0.00 | 0.00 |
| % 11:0 | 0.00 | 0.00 | 0.00 | 0.00 | 0.00 | 0.00 | 0.00 | 0.00 | 0.00 | 0.00 |
| % 11:1 | 0.00 | 0.00 | 0.00 | 0.00 | 0.00 | 0.00 | 0.00 | 0.00 | 0.00 | 0.00 |
| % 12:0 | 0.10 | 0.09 | 0.08 | 0.12 | 0.08 | 0.08 | 0.08 | 0.08 | 0.10 | 0.08 |
| % 12:1 | 0.00 | 0.00 | 0.00 | 0.00 | 0.00 | 0.00 | 0.00 | 0.00 | 0.00 | 0.00 |
| % 13:0 | 0.11 | 0.11 | 0.12 | 0.08 | 0.09 | 0.13 | 0.16 | 0.14 | 0.09 | 0.14 |
| % 13:1 | 0.00 | 0.00 | 0.00 | 0.00 | 0.00 | 0.00 | 0.00 | 0.00 | 0.00 | 0.00 |
| % 14:0 | 1.79 | 1.74 | 1.63 | 2.13 | 1.67 | 1.59 | 1.59 | 1.59 | 1.85 | 1.58 |
| % 14:1 | 0.00 | 0.00 | 0.00 | 0.00 | 0.00 | 0.00 | 0.00 | 0.00 | 0.00 | 0.00 |
| % 15:1 | 0.00 | 0.53 | 0.52 | 0.48 | 0.51 | 0.52 | 0.45 | 0.50 | 0.51 | 0.48 |
| % 16:0 | 30.98 | 30.13 | 29.54 | 33.01 | 31.08 | 29.37 | 30.65 | 29.39 | 31.15 | 30.03 |
| % 16:1 | 0.27 | 0.21 | 0.23 | 0.26 | 0.26 | 0.14 | 0.25 | 0.22 | 0.26 | 0.25 |
| % 16:2 | 0.00 | 0.00 | 0.00 | 0.00 | 0.00 | 0.00 | 0.00 | 0.00 | 0.00 | 0.00 |
| % 16:3 | 0.00 | 0.00 | 0.00 | 0.00 | 0.00 | 0.00 | 0.00 | 0.00 | 0.00 | 0.00 |
| % 17:0 | 0.12 | 0.15 | 0.14 | 0.14 | 0.14 | 0.16 | 0.12 | 0.13 | 0.14 | 0.13 |
| % 18:0 | 1.29 | 1.30 | 1.30 | 1.37 | 1.38 | 1.37 | 1.46 | 1.30 | 1.30 | 1.35 |
| % 18:1 n-9 | 0.00 | 0.08 | 0.08 | 0.00 | 0.06 | 0.11 | 0.09 | 0.10 | 0.07 | 0.07 |
| % 18:1 n-7 | 0.00 | 0.00 | 0.00 | 0.00 | 0.00 | 0.00 | 0.00 | 0.00 | 0.00 | 0.00 |
| % 18:2 | 0.00 | 0.00 | 0.00 | 0.00 | 0.00 | 0.00 | 0.00 | 0.00 | 0.00 | 0.00 |
| % 18:3 n-6 | 0.00 | 0.00 | 0.00 | 0.00 | 0.00 | 0.00 | 0.00 | 0.00 | 0.00 | 0.00 |
| % 18:3 n-3 | 0.00 | 0.00 | 0.00 | 0.00 | 0.00 | 0.00 | 0.00 | 0.00 | 0.00 | 0.00 |
| % 18:4 n-3 | 0.00 | 0.00 | 0.00 | 0.00 | 0.00 | 0.00 | 0.00 | 0.00 | 0.00 | 0.00 |
| % 20:0 | 0.39 | 0.38 | 0.39 | 0.40 | 0.42 | 0.38 | 0.43 | 0.39 | 0.39 | 0.41 |
| % 20:1 n-9 | 0.00 | 0.19 | 0.16 | 0.13 | 0.19 | 0.20 | 0.17 | 0.14 | 0.13 | 0.21 |
| % 20:2 | 0.00 | 0.00 | 0.00 | 0.00 | 0.00 | 0.00 | 0.00 | 0.00 | 0.00 | 0.00 |
| % 20:3 n-9 | 0.00 | 0.00 | 0.00 | 0.00 | 0.00 | 0.00 | 0.00 | 0.00 | 0.00 | 0.00 |
| % 20:3 n-6 | 0.00 | 0.00 | 0.00 | 0.00 | 0.00 | 0.00 | 0.00 | 0.00 | 0.00 | 0.00 |
| % 20:3 n-3 | 0.37 | 0.00 | 0.00 | 0.00 | 0.00 | 0.00 | 0.00 | 0.00 | 0.00 | 0.00 |
| % 20:4 ARA | 0.55 | 0.25 | 0.21 | 0.26 | 0.22 | 0.25 | 0.51 | 0.20 | 0.24 | 0.19 |
| % 20:5 n-3 EPA | 2.62 | 2.75 | 2.78 | 2.81 | 2.67 | 2.78 | 5.76 | 2.72 | 2.59 | 2.82 |
| % 22:0 | 0.08 | 0.08 | 0.08 | 0.08 | 0.09 | 0.08 | 0.09 | 0.08 | 0.08 | 0.09 |
| % 22:1 | 0.00 | 0.00 | 0.00 | 0.00 | 0.00 | 0.00 | 0.00 | 0.00 | 0.00 | 0.00 |
| % 22:2 | 0.00 | 0.00 | 0.00 | 0.00 | 0.00 | 0.00 | 0.00 | 0.00 | 0.00 | 0.00 |
| % 22:3 | 0.00 | 0.00 | 0.00 | 0.00 | 0.00 | 0.00 | 0.00 | 0.00 | 0.00 | 0.00 |
| % 22:4 n-6 | 0.00 | 0.00 | 0.00 | 0.00 | 0.00 | 0.00 | 0.00 | 0.00 | 0.06 | 0.00 |
| % 22:5 n-6 | 3.19 | 3.47 | 3.20 | 3.25 | 3.19 | 3.43 | 2.62 | 3.30 | 3.42 | 3.18 |
| % 22:5 n-3 | 0.18 | 0.18 | 0.18 | 0.17 | 0.17 | 0.20 | 0.59 | 0.17 | 0.17 | 0.17 |
| % 22:6 n-3 DHA | 56.88 | 56.99 | 58.07 | 54.04 | 56.38 | 57.76 | 54.09 | 58.21 | 55.91 | 57.56 |
| % 24:0 | 0.00 | 0.00 | 0.00 | 0.00 | 0.00 | 0.00 | 0.00 | 0.00 | 0.00 | 0.00 |
| % 24:1 | 0.00 | 0.09 | 0.09 | 0.07 | 0.10 | 0.09 | 0.11 | 0.10 | 0.07 | 0.08 |
| % Fat | 46.83 | 45.83 | 39.59 | 48.81 | 41.92 | 43.97 | 33.96 | 36.97 | 50.40 | 36.21 |
| % Unknown | 0.85 | 1.28 | 1.19 | 1.19 | 1.29 | 1.35 | 0.77 | 1.24 | 1.48 | 1.17 |

TABLE 28

Mutants of Thraustochytrid Strain ATCC Accession No. PTA-9695

| Fatty Acids | control ATCC PTA-9695 | Mutant 66 | Mutant 67 | Mutant 68 ATCC PTA-9696 | Mutant 69 | Mutant 70 ATCC PTA-9697 | Mutant 71 | Mutant 72 ATCC PTA-9698 | Mutant 73 | Mutant 74 |
|---|---|---|---|---|---|---|---|---|---|---|
| % 08:0 | 0.00 | 0.00 | 0.00 | 0.00 | 0.00 | 0.00 | 0.00 | 0.00 | 0.00 | 0.00 |
| % 09:0 | 0.00 | 0.00 | 0.00 | 0.00 | 0.00 | 0.00 | 0.00 | 0.00 | 0.00 | 0.00 |
| % 10:0 | 0.00 | 0.00 | 0.00 | 0.00 | 0.00 | 0.00 | 0.00 | 0.00 | 0.00 | 0.00 |
| % 11:0 | 0.00 | 0.00 | 0.00 | 0.00 | 0.00 | 0.00 | 0.00 | 0.00 | 0.00 | 0.00 |
| % 11:1 | 0.00 | 0.00 | 0.00 | 0.00 | 0.00 | 0.00 | 0.00 | 0.00 | 0.00 | 0.00 |
| % 12:0 | 0.15 | 0.00 | 0.00 | 0.00 | 0.00 | 0.00 | 0.00 | 0.13 | 0.00 | 0.00 |
| % 12:1 | 0.00 | 0.00 | 0.00 | 0.00 | 0.00 | 0.00 | 0.00 | 0.00 | 0.00 | 0.00 |
| % 13:0 | 0.00 | 0.00 | 0.00 | 0.00 | 0.00 | 0.00 | 0.00 | 0.22 | 0.00 | 0.00 |
| % 13:1 | 0.00 | 0.00 | 0.00 | 0.00 | 0.00 | 0.00 | 0.00 | 0.00 | 0.00 | 0.00 |
| % 14:0 | 2.42 | 2.29 | 2.07 | 2.09 | 2.11 | 2.21 | 2.27 | 2.29 | 1.97 | 2.06 |
| % 14:1 | 0.00 | 0.00 | 0.00 | 0.00 | 0.00 | 0.00 | 0.19 | 0.00 | 0.00 | 0.00 |
| % 15:1 | 0.55 | 0.47 | 0.48 | 0.47 | 0.47 | 0.44 | 0.46 | 0.40 | 0.50 | 0.47 |
| % 16:0 | 39.19 | 31.02 | 26.20 | 25.84 | 27.79 | 28.14 | 28.89 | 33.49 | 24.50 | 23.95 |
| % 16:1 | 0.43 | 0.19 | 0.00 | 0.00 | 0.00 | 0.00 | 0.19 | 0.21 | 0.00 | 0.00 |
| % 16:2 | 0.00 | 0.00 | 0.00 | 0.00 | 0.00 | 0.00 | 0.00 | 0.00 | 0.00 | 0.00 |
| % 16:3 | 0.00 | 0.00 | 0.00 | 0.00 | 0.00 | 0.00 | 0.00 | 0.00 | 0.00 | 0.00 |
| % 17:0 | 0.16 | 0.00 | 0.00 | 0.00 | 0.00 | 0.00 | 0.00 | 0.13 | 0.00 | 0.00 |
| % 18:0 | 1.67 | 1.68 | 1.22 | 1.22 | 1.44 | 1.49 | 1.51 | 2.24 | 1.11 | 1.02 |
| % 18:1 n-9 | 0.00 | 0.00 | 0.00 | 0.00 | 0.00 | 0.00 | 0.00 | 0.00 | 0.00 | 0.00 |

TABLE 28-continued

Mutants of Thraustochytrid Strain ATCC Accession No. PTA-9695

| Fatty Acids | control ATCC PTA-9695 | Mutant 66 | Mutant 67 | Mutant 68 ATCC PTA-9696 | Mutant 69 | Mutant 70 ATCC PTA-9697 | Mutant 71 | Mutant 72 ATCC PTA-9698 | Mutant 73 | Mutant 74 |
|---|---|---|---|---|---|---|---|---|---|---|
| % 18:1 n-7 | 0.00 | 0.00 | 0.00 | 0.00 | 0.00 | 0.00 | 0.00 | 0.00 | 0.00 | 0.00 |
| % 18:2 | 0.00 | 0.00 | 0.00 | 0.00 | 0.00 | 0.00 | 0.00 | 0.00 | 0.00 | 0.00 |
| % 18:3 n-6 | 0.00 | 0.00 | 0.00 | 0.00 | 0.00 | 0.00 | 0.00 | 0.00 | 0.00 | 0.00 |
| % 18:3 n-3 | 0.00 | 0.18 | 0.20 | 0.21 | 0.19 | 0.17 | 0.22 | 0.16 | 0.22 | 0.22 |
| % 18:4 n-3 | 0.00 | 0.00 | 0.00 | 0.00 | 0.00 | 0.00 | 0.00 | 0.00 | 0.00 | 0.00 |
| % 20:0 | 0.49 | 0.41 | 0.32 | 0.31 | 0.35 | 0.37 | 0.44 | 0.52 | 0.29 | 0.27 |
| % 20:1 n-9 | 0.00 | 0.00 | 0.00 | 0.00 | 0.00 | 0.00 | 0.00 | 0.00 | 0.00 | 0.00 |
| % 20:2 | 0.00 | 0.00 | 0.00 | 0.00 | 0.00 | 0.00 | 0.00 | 0.00 | 0.00 | 0.00 |
| % 20:3 n-9 | 0.00 | 0.00 | 0.00 | 0.00 | 0.00 | 0.00 | 0.00 | 0.00 | 0.00 | 0.00 |
| % 20:3 n-6 | 0.00 | 0.00 | 0.00 | 0.00 | 0.15 | 0.00 | 0.00 | 0.00 | 0.00 | 0.00 |
| % 20:3 n-3 | 0.00 | 0.00 | 0.00 | 0.00 | 0.00 | 0.00 | 0.00 | 0.00 | 0.00 | 0.00 |
| % 20:4 ARA | 0.18 | 0.16 | 0.33 | 0.27 | 0.24 | 0.37 | 0.30 | 0.27 | 0.38 | 0.39 |
| % 20:5 n-3 EPA | 1.76 | 2.30 | 3.86 | 3.97 | 3.32 | 4.12 | 3.09 | 2.74 | 4.43 | 4.53 |
| % 22:0 | 0.33 | 0.46 | 0.35 | 0.44 | 0.48 | 0.38 | 0.43 | 0.12 | 0.35 | 0.34 |
| % 22:1 | 0.00 | 0.00 | 0.00 | 0.00 | 0.00 | 0.00 | 0.00 | 0.00 | 0.00 | 0.00 |
| % 22:2 | 0.00 | 0.00 | 0.00 | 0.00 | 0.00 | 0.00 | 0.00 | 0.00 | 0.00 | 0.00 |
| % 22:3 | 0.00 | 0.00 | 0.00 | 0.00 | 0.00 | 0.00 | 0.00 | 0.00 | 0.00 | 0.00 |
| % 22:4 n-6 | 0.00 | 0.00 | 0.00 | 0.00 | 0.00 | 0.00 | 0.00 | 0.00 | 0.00 | 0.00 |
| % 22:5 n-6 | 2.62 | 2.83 | 3.17 | 2.66 | 2.72 | 2.95 | 3.46 | 2.79 | 3.17 | 3.19 |
| % 22:5 n-3 | 0.18 | 0.18 | 0.46 | 0.42 | 0.34 | 0.61 | 0.25 | 0.27 | 0.48 | 0.57 |
| % 22:6 n-3 DHA | 49.52 | 57.01 | 60.60 | 61.42 | 59.74 | 58.03 | 55.62 | 53.06 | 61.83 | 62.23 |
| % 24:0 | 0.00 | 0.00 | 0.00 | 0.00 | 0.00 | 0.00 | 0.00 | 0.00 | 0.00 | 0.00 |
| % 24:1 | 0.00 | 0.00 | 0.00 | 0.00 | 0.00 | 0.00 | 0.00 | 0.00 | 0.00 | 0.00 |
| % Fat | 52.70 | 49.32 | 48.51 | 49.49 | 48.80 | 53.65 | 40.38 | 63.40 | 48.27 | 46.63 |
| % Unknown | 0.35 | 0.82 | 0.73 | 0.66 | 0.67 | 0.73 | 2.46 | 1.18 | 0.78 | 0.76 |

Example 34

Isolation of Microorganisms

Samples were collected from intertidal habitats during low tide, including bays and estuaries along the West Coast of North America (California, Oregon, and Washington) and Hawaii. Water, sediment, living plant material, and decaying plant/animal debris were placed into sterile 50 ml tubes. Portions of each sample along with the water were spread onto solid agar plates of isolation media. Isolation media consisted of: 500 ml of artificial seawater, 500 ml of distilled water, 1 g of glucose, 1 g of glycerol, 13 g of agar, 1 g of glutamate, 0.5 g of yeast extract, 0.5 g casein hydrolysate, 1 ml of a vitamin solution (100 mg/L thiamine, 0.5 mg/L biotin, 0.5 mg $B_{12}$), 1 ml of a trace mineral solution (PH metals, containing per liter: 6.0 g $FeCl_3 6H_2O$, 6.84 g $H_3BO_3$, 0.86 g $MnCl_2 4H_2O$, 0.06 g $ZnCl_2$, 0.026 $CoCl_2 6H_2O$, 0.052 g $NiSO_4 H_2O$, 0.002 g $CuSO_4 5H_2O$ and 0.005 g $Na_2MoO_4 2H_2O$), and 500 mg each of penicillin G and streptomycin sulfate. The agar plates were incubated in the dark at 20-25° C. After 2-4 days the agar plates were examined under magnification, and colonies of cells were picked with a sterile toothpick and restreaked onto a fresh plate of media. Cells were repeatedly streaked onto fresh media until contaminated organisms were removed. Two of the isolated microorganisms were deposited under ATCC Accession Nos. PTA-10212 and PTA-10208.

Taxonomic Characteristics of the Isolated Microorganism Deposited Under ATCC Accession No. PTA-10212

Cultures of the isolated microorganism deposited under ATCC Accession No. PTA-10212 ("PTA-10212") appeared as white, wet, smeared colonies without visible isolated sori.

PTA-10212 was grown on solid and liquid FFM, solid KMV, KMV slush (1%), KMV broth, and MH broth to further examine growth characteristics. PTA-10212 was observed to grow rapidly on KMV and MH. See, e.g., Porter D., 1989. *Phylum Labyrinthulomycota*. In Margulis, L., Corliss, J. O., Melkonian, M., Chapman, D. J. (Eds.) Handbook of Protoctista, Jones and Bartlett, Boston, pp. 388-398 (KMV); Honda et al., Mycol. Res. 102:439-448 (1998) (MH); and U.S. Pat. No. 5,130,242 (FFM).

The following observations were made after growth of PTA-10212 over several days on solid FFM media, after 72 hours growth in KMV medias, and MH broth. Sporangia were not clumped in/on any media and were very small (5-10 μm). PTA-10212 did not demonstrate the copious tetrads characteristic of *Schizochytrium* cleavage patterns. Amoeboid cells appeared about 24 hours after transfer to fresh solid media. These amoeboid cells were gone after a few days and were not evident in liquid or slush media. Unlike *Aurantiochytrium*, described by Yokoyama, R. et al.,

*Mycoscience* 48(6): 329-341 (2007), as having the appearance of "small sandgrains on the bottom of the flask" when grown in liquid media, PTA-10212 did not settle at the bottom of the flask but was suspended in both KMV and MH liquid media. The sporangia were not as dense as typical of *Schizochytrium* or *Oligochytrium*, which also have robust ectoplasmic networks that were absent from PTA-10212. While most species undergo vegetative cleavage of small sporangia or assimilative cells by the division of a larger sporangium over several hours, PTA-10212 formed dumbbell-shaped elongated assimilative cells, which then formed a thin isthmus that pulled apart as the ends of the dumbbell separated. The resulting cells appeared to be small assimilative cells. Direct transformation of an amoeboid cell into the dumbbell shaped assimilative cell was not observed. Typical biflagellate zoospores were observed swimming but were relatively rare. PTA-10212 was non-prolific, dividing by vegetative cleavage. Direct release of zoospores was not observed, although zoospores were observed swimming. Vegetative cells were very small (2 µm to 5 µm).

PTA-10212 was further examined using the flow-through technique, in which microscopic slides were prepared by suspending a small portion of an agar-grown colony in a drop of half-strength sea water. With this technique, primary sporangia were observed to be globose and approximately 10 µm in diameter. Walls were very thin and remnants were not observed when binary division of the protoplast was initiated. Repeated binary division produced 8-16 smaller (4-5 µm in diameter) secondary sporangia. The secondary sporangia remained quiescent for several hours before again releasing an amorphous protoplast. The amorphous protoplast divided by pinching and pulling, initially producing typical dumbbell-shaped intermediate stages and finally resulting in 4-8 small globose bodies 2.5-2.8 µm in diameter. The latter rested for several minutes up to 1-2 hours, then changed shape (elongated) and turned into biflagellate zoospores, 2.3-2.5×3.7-3.9 µm. Zoospores were abundant and could be precisely measured when they came to rest. Zoospores then rounded off and started a new cycle of development. The zoospores were larger than *Sicyoldochytrium minutum* and smaller than *Ulkenia visurgensis*.

PTA-10212 was further characterized based on the similarity of its 18s rRNA gene to that of known species. Genomic DNA was prepared from PTA-10212 by standard procedures. See, for example, Sambrook J. and Russell D. 2001. Molecular cloning: A laboratory manual, 3rd edition. Cold Spring Harbor Laboratory Press, Cold Spring Harbor, N.Y. Briefly: (1) 500 pit of cells were centrifuged from mid-log culture. The cells were re-centrifuged, and all traces of liquid were removed from the cell pellet with a small-bore tip; (2) pellets were resuspended with 200 µL lysis buffer (20 mM Tris pH 8.0, 125 µg/mL Proteinase K, 50 mM NaCl, 10 mM EDTA pH 8.0, 0.5% SDS); (3) cells were lysed at 50° C. for 1 hour; (4) the lysis mixture was pipetted into phase-lock gel (PLG-Eppendorf) 2 mL tubes; (5) equal volume of P:C:I was added and allowed to mix for 1.5 hours; (6) the tubes were centrifuged at 12,000×g for 5 minutes; (7) the aqueous phase was removed from above the gel within the PLG tube and an equal volume of chloroform was added to the aqueous phase, and mixed for 30 minutes; (8) the tubes were centrifuged at 14,000×g for approximately 5 minutes; (9) the top layer (aqueous phase) was pipetted away from the chloroform, and placed in a new tube; (10) 0.1 volume of 3 M NaOAC was added and mixed (inverted several times); (11) 2 volumes of 100% EtOH were added and mixed (inverted several times) with genomic DNA precipitant forming at this stage; (12) the tubes were centrifuged at 4° C. in a microcentrifuge at 14,000×g for approximately 15 minutes; (13) the liquid was gently poured off with genomic DNA remaining at the bottom of the tube; (14) the pellet was washed with 0.5 mL 70% EtOH; (15) the tubes were centrifuged at 4° C. in a microcentrifuge at 14,000×g for approximately 5 minutes; (16) the EtOH was gently poured off and the genomic DNA pellet was dried; and (17) a suitable volume of $H_2O$ and RNase was added directly to the genomic DNA pellet. The PCR amplification of the 18s rRNA gene was carried out with primers previously described (Honda et. al., 0.1 Euk. Micro. 46(6): 637-647 (1999). The PCR conditions with chromosomal DNA template were as follows: 0.2 µM dNTPs, 0.1 µM each primer, 8% DMSO, 200 ng chromosomal DNA, 2.5 U Herculase® II Fusion DNA Polymerase (Stratagene), and Herculase® buffer (Stratagene) in a 50 µL total volume. The PCR Protocol included the following steps: (1) 95° C. for 2 minutes; (2) 95° C. for 35 seconds; (3) 55° C. for 35 seconds; (4) 72° C. for 1 minute and 30 seconds; (5) repeat steps 2-4 for 30 cycles; (6) 72° C. for 5 minutes; and (7) hold at 4° C.

PCR amplification yielded a distinct DNA product with the expected size using chromosomal template described above. The PCR product was cloned into the vector pJET1.2/blunt (Fermentas) according to the manufacturer's instructions, and the insert sequence was determined using supplied standard primers.

Phylogenetic analysis places PTA-10212 within the lineage that includes *Thraustochytrium pachydermum* and *Thraustochytrium aggregatum* with moderate support. The sporangia of *T. pachydermum* have very thick cell walls. *T. aggregatum* forms clearly visible clumps of sori that are opaque. PTA-10212 shows neither of these characteristics. The presence of many amoeboid cells has been described in other taxa, such as *Ulkenia, T. gaertnerium, A. limiacinum*, and *S. mangrovei*; however, the descriptions associated with those taxa differ from the observed characteristics of the isolate. Moreover, PTA-10212 did not show phylogenetic affinity towards any of these taxa.

Table 29 shows a comparison of the 18s rRNA sequence from the microorganism deposited under ATCC Accession No. PTA-10212 to DNA sequences in the National Center for Biotechnology Information (NCBI) electronic database. The percent identity was determined using two different calculations. "Calculation #1" takes into consideration any "gaps" that occurs in the sequences, either from non-homologous regions or partial sequence (AlignX-VectorNTI default settings). "Calculation #2" does not include calculated penalties for gaps (AlignX-VectorNTI "IDENTITY" matrix setting).

TABLE 29

Comparison of 18s rRNA Sequences

| Thraustochytrids | % Identity Calculation #1 | % Identity Calculation #2 |
|---|---|---|
| *Thraustochytrium pachydermum* | 85% | 93% |
| *Thraustochytrium aggregatum* (p) | 83% | 92% |
| *Thraustochytrium gaertnerium* | 82% | 92% |
| *Ulkenia visurgensis* | 82% | 92% |
| *Schizochytrium* sp. PTA-9695 | 80% | 92% |
| *Schizochytrium mangrovei* | 80% | 91% |
| *Schizochytrium* sp. ATCC 20888 | 80% | 90% |
| *Aurantiochytrium limiacinum* | 79% | 90% |

(p): indicates partial sequence

As shown in Table 29, it was found that, in terms of % identity, the 18s rRNA gene sequence from the microorganism deposited under ATCC Accession No. PTA-10212 is related, though not identical, to 18s rRNA gene sequences available in the NCBI database. It is generally recognized that organisms can have closely related 18s rRNA gene sequences while belonging to a different genus or species.

Based on the above characterization, the isolated microorganism (ATCC Accession No. PTA-10212) is believed to represent a new *Thraustochytrium* species and is therefore also designated as *Thraustochytrium* sp. ATCC PTA-10212.

Taxonomic Characteristics of the Isolated Microorganism Deposited Under ATCC Accession No. PTA-10208

The microorganism deposited under ATCC Accession No. PTA-10208 ("PTA-10208") was identified as a sub-isolate (an individual cell isolated from a culture and maintained as a new separate and distinct culture) of the microorganism deposited under ATCC Accession No. PTA-9695 ("PTA-9695"), described in U.S. Pub. No. 2010/0239533 and Int'l. Pub. No. WO 2010/107415.

PTA-10208 shares taxonomic characteristics with PTA-9695. PTA-9695 was found to have biflagellate zoospores at discharge that swim actively away from the mature sporangium, wall remnants of which were clearly visible (in phase contrast) after spore release. PTA-9695 sporangia measured 12.5 µm to 25 µm in diameter, and zoospores were 2.5 µm to 2.8 µm×4.5 µm to 4.8 µm in size. There were 8 to 24 spores per individual PTA-9695 sporangium. Settled PTA-9695 zoospores enlarged and rapidly underwent binary divisions leading to tetrads, octads, and finally to clusters of sporangia. Tetrad formation commenced at a very early stage prior to maturity of the sporangia. These characteristics are in agreement with the genus *Schizochytrium*. In terms of % identity, the PTA-9695 18s rRNA gene sequence, which is shared by PTA-10208, was found to be closely related, though not identical, to the 18s rRNA gene sequence of *T. aggregatum* provided in Honda, D. et al., *J. Euk. Micro.* 46(6): 637-647 (1999). The 18s rRNA sequence published for *Thraustochytrium aggregatum* is a partial sequence, with an approximately 71 DNA nucleotide gap in the middle of the sequence. PTA-9695 is believed to represent a new *Schizochytrium* species. As such, the sub-isolate PTA-10208 is also designated as *Schizochytrium* sp. ATCC PTA-10208.

Example 35

Growth Characteristics of the Isolated Microorganism Deposited Under ATCC Accession No. PTA-10212

The isolated microorganism (ATCC Accession No. PTA-10212) was examined for growth characteristics in individual fermentation runs, as described below. Typical media and cultivation conditions are shown in Table 30.

TABLE 30

| PTA-10212 Vessel Media | | | |
|---|---|---|---|
| Ingredient | | concentration | ranges |
| $Na_2SO_4$ | g/L | 31.0 | 0-50, 15-45, or 25-35 |
| NaCl | g/L | 0.625 | 0-25, 0.1-10, or 0.5-5 |
| KCl | g/L | 1.0 | 0-5, 0.25-3, or 0.5-2 |
| $MgSO_4 \cdot 7H_2O$ | g/L | 5.0 | 0-10, 2-8, or 3-6 |
| $(NH_4)_2SO_4$ | g/L | 0.44 | 0-10, 0.25-5, or 0.05-3 |
| $MSG \cdot 1H_2O$ | g/L | 6.0 | 0-10, 4-8, or 5-7 |
| $CaCl_2$ | g/L | 0.29 | 0.1-5, 0.15-3, or 0.2-1 |
| T 154 (yeast extract) | g/L | 6.0 | 0-20, 0.1-10, or 1-7 |
| $KH_2PO_4$ | g/L | 0.8 | 0.1-10, 0.5-5, or 0.6-1.8 |

TABLE 30-continued

| PTA-10212 Vessel Media | | | |
|---|---|---|---|
| Post autoclave (Metals) | | | |
| Citric acid | mg/L | 3.5 | 0.1-5000, 10-3000, or 3-2500 |
| $FeSO_4 \cdot 7H_2O$ | mg/L | 10.30 | 0.1-100, 1-50, or 5-25 |
| $MnCl_2 \cdot 4H_2O$ | mg/L | 3.10 | 0.1-100, 1-50, or 2-25 |
| $ZnSO_4 \cdot 7H_2O$ | mg/L | 3.10 | 0.01-100, 1-50, or 2-25 |
| $CoCl_2 \cdot 6H_2O$ | mg/L | 0.04 | 0-1, 0.001-0.1, or 0.01-0.1 |
| $Na_2MoO_4 \cdot 2H_2O$ | mg/L | 0.04 | 0.001-1, 0.005-0.5, or 0.01-0.1 |
| $CuSO_4 \cdot 5H_2O$ | mg/L | 2.07 | 0.1-100, 0.5-50, or 1-25 |
| $NiSO_4 \cdot 6H_2O$ | mg/L | 2.07 | 0.1-100, 0.5-50, or 1-25 |
| Post autoclave (Vitamins) | | | |
| Thiamine | mg/L | 9.75 | 0.1-100, 1-50, or 5-25 |
| Vitamin B12 | mg/L | 0.16 | 0.01-100, 0.05-5, or 0.1-1 |
| Ca½-pantothenate | mg/L | 2.06 | 0.1-100, 0.1-50, or 1-10 |
| Biotin | mg/L | 3.21 | 0.1-100, 0.1-50, or 1-10 |
| Post autoclave (Carbon) | | | |
| Glycerol | g/L | 30.0 | 5-150, 10-100, or 20-50 |
| Nitrogen Feed: | | | |
| $MSG \cdot 1H_2O$ | g/L | 17 | 0-150, 10-100, or 15-50 |
| Typical cultivation conditions would include the following | | | |
| pH | | about 6.5-about 9.5, about 6.5-about 8.0, or about 6.8-about 7.8; | |
| temperature: | | about 15-about 30 degrees Celsius, about 18-about 28 degrees Celsius, or about 21 to about 23 degrees Celsius; | |
| dissolved oxygen: | | about 0.1-about 100% saturation, about 5-about 50% saturation, or about 10-about 30% saturation; and/or | |
| glycerol controlled @: | | about 5-about 50 g/L, about 10-about 40 g/L, or about 15-about 35 g/L. | |

In carbon (glycerol) and nitrogen-fed cultures with 1000 ppm CF at 22.5° C. with 20% dissolved oxygen at pH 7.3, PTA-10212 produced a dry cell weight of 26.2 g/L after 138 hours of culture in a 10 L fermentor volume. The lipid yield was 7.9 g/L; the omega-3 yield was 5.3 g/L; the EPA yield was 3.3 g/L; and the DHA yield was 1.8 g/L. The fatty acid content was 30.3% by weight; the EPA content was 41.4% of fatty acid methyl esters (FAME); and the DHA content was 26.2% of FAME. The lipid productivity was 1.38 g/L/day, and the omega-3 productivity was 0.92 g/L/day under these conditions, with 0.57 g/L/day EPA productivity and 0.31 g/L/day DHA productivity.

In carbon (glycerol) and nitrogen-fed cultures with 1000 ppm Cl$^-$ at 22.5° C. with 20% dissolved oxygen at pH 7.3, PTA-10212 produced a dry cell weight of 38.4 g/L after 189 hours of culture in a 10 L fermentor volume. The lipid yield was 18 g/L; the omega-3 yield was 12 g/L; the EPA yield was 5 g/L; and the DHA yield was 6.8 g/L. The fatty acid content was 45% by weight; the EPA content was 27.8% of FAME; and the DHA content was 37.9% of FAME. The lipid productivity was 2.3 g/L/day, and the omega-3 productivity was 1.5 g/L/day under these conditions, with 0.63 g/L/day EPA productivity and 0.86 g/L/day DHA productivity.

In carbon (glycerol) and nitrogen-fed cultures with 1000 ppm Cl$^-$ at 22.5° C. with 20% dissolved oxygen at pH 6.8-7.7, PTA-10212 produced a dry cell weight of 13 g/L after 189 hours of culture in a 10 L fermentor volume. The lipid yield was 5.6 g/L; the omega-3 yield was 3.5 g/L; the EPA yield was 1.55 g/L; and the DHA yield was 1.9 g/L. The fatty acid content was 38% by weight; the EPA content was 29.5% of FAME; and the DHA content was 36% of FAME. The lipid productivity was 0.67 g/L/day, and the omega-3 productivity was 0.4 g/L/day under these conditions, with 0.20 g/L/day EPA productivity and 0.24 g/L/day DHA productivity.

In carbon (glycerol) and nitrogen-fed cultures with 1000 ppm at 22.5-28.5° C. with 20% dissolved oxygen at pH 6.6-7.2, PTA-10212 produced a dry cell weight of 36.7 g/L-48.7 g/L after 191 hours of culture in a 10 L fermentor volume. The lipid yield was 15.2 g/L-25.3 g/L; the omega-3 yield was 9.3 g/L-13.8 g/L; the EPA yield was 2.5 g/L-3.3 g/L; and the DHA yield was 5.8 g/L-11 g/L. The fatty acid content was 42.4%-53% by weight; the EPA content was 9.8%-22% of FAME; and the DHA content was 38.1%-43.6% of FAME. The lipid productivity was 1.9 g/L/day-3.2 g/L/day, and the omega-3 productivity was 1.2 g/L/day-1.7 g/L/day under these conditions, with 0.31 g/L/day-0.41 g/L/day EPA productivity and 0.72 g/L/day-1.4 g/L/day DHA productivity.

Growth Characteristics of the Isolated Microorganism Deposited Under ATCC Accession No. PTA-10208

The isolated microorganism (ATCC Accession No. PTA-10208) was examined for growth characteristics in individual fermentation runs, as described below. Typical media and cultivation conditions are shown in Table 31.

TABLE 31

PTA-10208 Vessel Media

| Ingredient | | concentration | ranges |
|---|---|---|---|
| $Na_2SO_4$ | g/L | 8.8 | 0-25, 2-20, or 3-10 |
| NaCl | g/L | 0.625 | 0-25, 0.1-10, or 0.5-5 |
| KCl | g/L | 1.0 | 0-5, 0.25-3, or 0.5-2 |
| $MgSO_4 \cdot 7H_2O$ | g/L | 5.0 | 0-10, 2-8, or 3-6 |
| $(NH_4)_2SO_4$ | g/L | 0.42 | 0-10, 0.25-5, or 0.05-3 |
| $CaCl_2$ | g/L | 0.29 | 0.1-5, 0.15-3, or 0.2-1 |
| T 154 (yeast extract) | g/L | 1.0 | 0-20, 0.1-10, or 0.5-5 |
| $KH_2PO_4$ | g/L | 1.765 | 0.1-10, 0.5-5, or 1-3 |
| Post autoclave (Metals) | | | |
| Citric acid | mg/L | 46.82 | 0.1-5000, 10-3000, or 40-2500 |
| $FeSO_4 \cdot 7H_2O$ | mg/L | 10.30 | 0.1-100, 1-50, or 5-25 |
| $MnCl_2 \cdot 4H_2O$ | mg/L | 3.10 | 0.1-100, 1-50, or 2-25 |
| $ZnSO_4 \cdot 7H_2O$ | mg/L | 9.3 | 0.01-100, 1-50, or 2-25 |
| $CoCl_2 \cdot 6H_2O$ | mg/L | 0.04 | 0-1, 0.001-0.1, or 0.01-0.1 |
| $Na_2MoO_4 \cdot 2H_2O$ | mg/L | 0.04 | 0.001-1, 0.005-0.5, or 0.01-0.1 |
| $CuSO_4 \cdot 5H_2O$ | mg/L | 2.07 | 0.1-100, 0.5-50, or 1-25 |
| $NiSO_4 \cdot 6H_2O$ | mg/L | 2.07 | 0.1-100, 0.5-50, or 1-25 |
| Post autoclave (Vitamins) | | | |
| Thiamine | mg/L | 9.75 | 0.1-100, 1-50, or 5-25 |
| Ca½-pantothenate | mg/L | 3.33 | 0.1-100, 0.1-50, or 1-10 |
| Biotin | mg/L | 3.58 | 0.1-100, 0.1-50, or 1-10 |
| Post autoclave (Carbon) | | | |
| Glucose | g/L | 30.0 | 5-150, 10-100, or 20-50 |
| Nitrogen Feed: | | | |
| $NH_4OH$ | mL/L | 23.6 | 0-150, 10-100, or 15-50 |

Typical cultivation conditions would include the following:

| | |
|---|---|
| pH | about 6.5-about 8.5, about 6.5-about 8.0, or about 7.0-about 8.0; |
| temperature: | about 17-about 30 degrees Celsius, about 20-about 28 degrees Celsius, or about 22 to about 24 degrees Celsius; |
| dissolved oxygen: | about 2-about 100% saturation, about 5-about 50% saturation, or about 7-about 20% saturation; and/or |
| glucose controlled @: | about 5-about 50 g/L, about 10-about 40 g/L, or about 20-about 35 g/L. |

In carbon (glucose) and nitrogen-fed cultures with 1000 ppm Cl⁻ at 22.5° C. at pH 7.0 with 20% dissolved oxygen during the nitrogen feed and 10% dissolved oxygen thereafter, PTA-10208 produced a dry cell weight of 95 g/L after 200 hours of culture in a 10 L fermentor volume. The lipid yield was 53.7 g/L; the omega-3 yield was 37 g/L; the EPA yield was 14.3 g/L; and the DHA yield was 21 g/L. The fatty acid content was 57% by weight; the EPA content was 27.7% of FAME; and the DHA content was 39.1% of FAME. The lipid productivity was 6.4 g/L/day, and the omega-3 productivity was 4.4 g/L/day under these conditions, with 1.7 g/L/day EPA productivity and 2.5 g/L/day DHA productivity.

In carbon (glucose) and nitrogen-fed cultures with 1000 ppm Cl⁻ at 22.5° C. at pH 7.5 with 20% dissolved oxygen during the nitrogen feed and 10% dissolved oxygen thereafter, PTA-10208 produced a dry cell weight of 56 g/L after 139 hours of culture in a 10 L fermentor volume. The lipid yield was 53 g/L; the omega-3 yield was 34 g/L; the EPA yield was 11.5 g/L; and the DHA yield was 22 g/L. The fatty acid content was 58% by weight; the EPA content was 21.7% of FAME; and the DHA content was 41.7% of FAME. The lipid productivity was 9.2 g/L/day, and the omega-3 productivity was 5.9 g/L/day under these conditions, with 2 g/L/day EPA productivity and 3.8 g/L/day DHA productivity.

In carbon (glucose) and nitrogen-fed cultures with 1000 ppm Cl⁻ at 22.5° C. at pH 7.0 with 20% dissolved oxygen during the nitrogen feed and 10% dissolved oxygen thereafter, PTA-10208 produced a dry cell weight of 93.8 g/L after 167 hours of culture in a 2000 L fermentor volume. The lipid yield was 47.2 g/L; the omega-3 yield was 33.1 g/L; the EPA yield was 10.5 g/L; and the DHA yield was 20.4 g/L. The fatty acid content was 50.6% by weight; the EPA content was 23% of FAME; and the DHA content was 42.6% of FAME. The lipid productivity was 6.8 g/L/day, and the omega-3 productivity was 4.7 g/L/day under these conditions, with 1.5 g/L/day EPA productivity and 2.9 g/L/day DHA productivity.

In carbon (glucose) and nitrogen-fed cultures with 1000 ppm Cl⁻ at 22.5° C. at pH 7.0 with 20% dissolved oxygen during the nitrogen feed and 10% dissolved oxygen thereafter, PTA-10208 produced a dry cell weight of 105 g/L after 168 hours of culture in a 2000 L fermentor volume. The lipid yield was 46.4 g/L; the omega-3 yield was 33 g/L; the EPA yield was 10.7 g/L; and the DHA yield was 20.3 g/L. The fatty acid content was 43.9% by weight; the EPA content was 24% of FAME; and the DHA content was 43.7% of FAME. The lipid productivity was 6.6 g/L/day, and the omega-3 productivity was 4.7 g/L/day under these conditions, with 1.5 g/L/day EPA productivity and 2.9 g/L/day DHA productivity.

In carbon (glucose) and nitrogen-fed cultures with 1000 ppm Cl⁻ at 22.5° C. at pH 7.0 with 20% dissolved oxygen during the nitrogen feed and 10% dissolved oxygen thereafter, PTA-10208 produced a dry cell weight of 64.8 g/L after 168 hours of culture in a 2000 L fermentor volume. The lipid yield was 38.7 g/L; the omega-3 yield was 29.9 g/L; the EPA yield was 8.5 g/L; and the DHA yield was 16.7 g/L. The fatty acid content was 59.6% by weight; the EPA content was 23% of FAME; and the DHA content was 42.3% of FAME. The lipid productivity was 5.53 g/L/day, and the omega-3 productivity was 3.8 g/L/day under these conditions, with 1.2 g/L/day EPA productivity and 2.3 g/L/day DHA productivity.

Example 36

Fatty Acid Profiles of Microorganism Strains ATCC PTA-10208 and PTA-10212

Four samples of biomass (PTA-10208 Sample #1; PTA-10208 Sample #2; PTA-10212 Sample #1; and PTA-10212 Sample #2) were analyzed for total crude oil content by solvent extraction, lipid classes were determined by high performance liquid chromatography/evaporative light scattering detection (HPLC/ELSD), triacylglycerol (TAG) were analyzed by HPLC/mass spectrometry (HPLC/MS), and fatty acid (FA) profiles were determined by gas chromatography with flame ionization detection (GC-FID). The crude lipid content of each freeze dried biomass was determined using solvent grinding with hexane and compared to the sum of FAME (mg/g) generated by direct transesterification, and the resultant fatty acid methyl esters (FAME) were quantified by GC/FID analysis. Fatty acids in the extracted crude lipid were also quantified by transesterification and quantified using GC/FID analysis of the resultant FAME. The weight percent of all neutral lipids (NL) and free fatty acids (FFA) were determined in the extracted crude lipid using normal phase HPLC with ELSD and atmospheric pressure chemical ionization-MS (APCI-MS) identification. The method separates and quantifies sterol esters (SE), TAG, free fatty acids (FFA), 1,3-diacylglycerols (1,3-DAG), sterols, 1,2-diacylglycerols (1,2-DAG), and monoacylglycerols (MAG). Results are shown in Tables 32 and 33, below. It is noted that fatty acid profiles of Tables 32 and 33 were obtained from samples extracted using a solvent. The fatty acid profiles of Tables 32 and 33 are expected to be the substantially the same if the samples were extracted using the processes of the present invention.

TAG and phospholipids (PL) were isolated from the crude oils extracted from the four samples of biomass (PTA-10208 Sample #1; PTA-10208 Sample #2; PTA-10212 Sample #1; and PTA-10212 Sample #2). TAG was isolated using low pressure flash chromatography and PL was isolated using solid phase extraction (SPE). The identity of each isolated fraction was confirmed by thin layer chromatography (TLC). The fatty acid profiles of the isolated TAG and PL fractions were determined following direct transesterification using GC-FID as FAME. Results are shown in Tables 34 and 35, below.

The total crude oil content and fatty acid profiles of isolated lipid classes were also determined for two additional samples of biomass from microorganism strain ATCC PTA-10212 (PTA-10212 Sample #3 and PTA-10212 Sample #4). Crude oil was obtained from each sample by hexane extraction, and individual lipid classes were isolated using low pressure flash chromatography. The fatty acid profiles of the biomass, crude oil, and isolated fractions were determined using GC-FID as FAME. Results are shown in Tables 36-39, below. It is noted that fatty acid profiles of Tables 36-39 were obtained from samples extracted using a typical hexane extraction. The fatty acid profiles of Tables 36-39 are expected to be the substantially the same if the samples were extracted using the processes of the present invention.

Individual lipid classes were isolated from a sample of crude oil from microorganism strain ATCC PTA-10212 (PTA-10212 Sample #5) previously extracted using the FRIOLEX® process, and the fatty acid profiles of each class were determined using GC-FID as FAME. Results are shown in Tables 40 and 41, below. It is noted that fatty acid profiles of Tables 40 and 41 were obtained from samples extracted using a FRIOLEX® process. The fatty acid profiles of Tables 40 and 41 are expected to be the substantially the same if the samples were extracted using the processes of the present invention.

Individual lipid classes were isolated from a sample of crude oil from microorganism strain ATCC PTA-10208 (PTA-10208 Sample #3) using normal HPLC with ELSD and APCI-MS identification.

Experimental Procedures

Crude Oil Extraction—Crude oil was extracted from samples of freeze-dried biomass using solvent grinding. For example, approximately 3 grams of biomass was weighed into a Swedish tube. Three ball bearings and 30 mL of hexane were added to the Swedish tube, which was sealed with a neoprene stopper and placed in a shaker for 2 hours. The resultant slurry was filtered using a Buchner funnel and Whatman filter paper. The filtered liquid was collected, the solvent removed under vacuum, and the amount of remaining crude lipid determined gravimetrically.

Fatty Acid Analysis—The samples of biomass, extracted crude lipid, and isolated lipid classes were analyzed for fatty acid composition as FAME. Briefly, freeze-dried biomass and isolated lipid classes were weighed directly into a screw cap test tubes, while samples of the crude oil were dissolved in hexane to give a concentration of approximately 2 mg/mL. Toluene, containing internal standard, and 1.5 N HCl in methanol was added to each tube. The tubes were vortexed, then capped and heated to 100° C. for 2 hours. The tubes were allowed to cool, and saturated NaCl in water was added. The tubes were vortexed again and centrifuged to allow the layers to separate. A portion of the organic layer was then placed in a GC vial and analyzed by GC-FID. FAME was quantified using a 3-point calibration curve generated using Nu-Check-Prep GLC Reference Standard (NuCheck, Elysian, Minn.). Fatty acids present in the extract were expressed as mg/g and as a weight percent. Fat content in the samples was estimated assuming equal response to the internal standard when analyzed by GC-FID.

HPLC/ELSD/MS Method

| | |
|---|---|
| Instrument | Agilent 1100 HPLC, Alltech 3300 ELSD, Agilent 1100 MSD |
| Column | Phenomenex Luna Silica, 250 × 4.6 mm, 5 µm particle size w/Guard Column |
| Mobile Phase | A - 99.5% Hexanes (Omnisolv) 0.4% Isopropyl alcohol (Omnisolv) 0.1% Acetic Acid B - 99.9% Ethanol (Omnisolv, 95:5 Ethanol:IPA) 0.1% Acetic Acid |

| Gradient | | |
|---|---|---|
| Time, min. | % A | % B |
| 0 | 100 | 0 |
| 5 | 100 | 0 |
| 15 | 85 | 10 |
| 20 | 0 | 100 |
| 25 | 0 | 100 |
| 26 | 100 | 0 |
| 35 | 100 | 0 |

| | |
|---|---|
| Column Temp. | 30° C. |
| Flow Rate | 1.5 mL/min |
| Injection Volume | 5 µL |

| | |
|---|---|
| ELSD Detection | Temperature 35° C., Gas flow 1.2 L/min |
| MSD | Mass Range 200-1200, Fragmentor 225 V |
| | Drying Gas Temperature 350° C. |
| | Vaporizer Temperature 325° C. |
| | Capillary Voltage 3500 V |
| | Corona Current 10 µA |

Solid Phase Extraction—PL fractions were separated from the crude lipid by solid phase extraction (SPE) using 2 g aminopropyl cartridges (Biotage, Uppsala, Sweden) placed in a Vac Elut apparatus (Varian Inc, Palo Alto, USA). The cartridge was conditioned with 15 mL of hexane, and ~60 mg of each sample was dissolved in 1 mL $CHCl_3$ and applied to the cartridge. The column was washed with 15 mL of 2:1 $CHCl_3$:isopropyl alcohol to elute all the neutral lipids, which was discarded. The fatty acids were then eluted with 15 mL of 2% acetic acid (HOAc) in ether, which was discarded. The PL portion was eluted with 15 mL of 6:1 Methanol:Chloroform, which was collected, dried under nitrogen, and weighed.

Flash Chromatography—Flash chromatography was used to separate the lipid classes present in the crude oil. Approximately 200 mg of crude oil dissolved in hexane was injected onto the head of the column. The chromatography system utilized Silica Gel 60 (EMD Chemical, Gibbstown, N.J.) with mobile phase composed of Petroleum Ether and Ethyl Acetate at 5 mL/min (Tables 6-7) or 3 mL/min (Tables 8-13). A step gradient was used to selectively elute each lipid class from the column. The mobile phase gradient started from 100% petroleum ether and finished with 50% ethyl acetate. Fractions were collected in 10 mL test tubes using a Gilson FC 204 large-bed fraction collector (Gilson, Inc., Middleton, Wis.). Each tube was analyzed by thin layer chromatography (TLC) and the tubes containing individual lipid classes (as judged by single spots on TLC plate with expected retention factor (Rf)) were pooled, concentrated to dryness, and weighed. The total fraction content was then determined gravimetrically.

TLC Analysis—Thin layer chromatography was conducted on silica gel plates. The plates were eluted using a solvent system consisting of petroleum ether:ethyl ether: acetic acid (80:20:1) and were visualized using iodine vapor. The Rf values of each spot were then compared with reported literature values for each lipid class.

Analysis of TAG and PL fractions—The isolated TAG and PL fractions were analyzed for fatty acid composition as fatty acid methyl esters (FAME). The TAG fractions were dissolved in hexane to give a concentration of approximately 1-2 mg/mL. 1 mL aliquots of the solutions were concentrated to dryness under nitrogen. Toluene, containing internal standard, and 1.5 N HCl in methanol was added to each tube. The tubes were vortexed, then capped and heated to 100° C. for 2 hours. Internal standard and HCl methanol were added directly to the tubes containing the PL fraction and heated. The tubes were allowed to cool, and saturated NaCl in water was added. The tubes were vortexed again and centrifuged to allow the layers to separate. A portion of the organic layer was then placed in a GC vial and analyzed by GC-FID. FAMEs were quantified using a 3-point calibration curve generated using Nu-Check-Prep GLC 502B Reference Standard (NuCheck, Elysian, Minn.). Fatty acids present in the extract were expressed as mg/g and as a % of FAME.

Results

PTA-10208 Sample #1

The fatty acid profile of the biomass and extracted crude lipid for PTA-10208 Sample #1 was determined using GC/FID. Fatty acids in the biomass were transesterified in situ by weighing 28.6 mg of biomass directly into a FAME tube, while a sample of the extracted crude lipid was prepared by weighing 55.0 mg of crude lipid into a 50 mL volumetric flask and transferring 1 ml to a separate FAME tube. The estimated crude lipid content of the biomass was determined to be 53.2% (as SUM of FAME) using GC with FID detection, while 52.0% (wt/wt) lipid was extracted from the dry biomass, giving a 97.8% recovery of total lipid. The crude lipid was determined to be 91.9% fatty acids (as SUM of FAME) using GC/FID. The major fatty acids contained in the crude lipid were C16:0 (182.5 mg/g), C20:5 n-3 (186.8 mg/g), and C22:6 n-3 (423.1 mg/g).

The lipid class profile of the extracted crude lipid was determined by weighing 55.0 mg of crude lipid into a 50 mL volumetric flask and transferring an aliquot into an HPLC vial for HPLC/ELSD/MS analysis. According to the HPLC/ELSD/MS analysis, the crude lipid contained 0.2% sterol esters (SE), 95.1% TAG, 0.4% sterols, and 0.5% 1,2-diacylglycerol (DAG). 5% of the TAG fraction included a peak that eluted directly after the TAG peak, but did not give a recognizable mass spectrum.

Isolated TAG from this sample as determined by flash chromatography made up approximately 92.4% of the crude oil. PL was not detected by weight or TLC after SPE isolation. The major fatty acids (>50 mg/g) contained in the TAG were C16:0 (189 mg/g), C20:5 n-3 (197 mg/g), and C22:6 n-3 (441 mg/g).

PTA-10208 Sample #2

The fatty acid profile of the biomass and extracted crude lipid for PTA-10208 Sample #2 was determined using GC/FID. Fatty acids in the biomass were transesterified in situ by weighing 32.0 mg of biomass directly into a FAME tube, while a sample of the extracted crude lipid was prepared by weighing 60.1 mg of crude lipid into a 50 mL volumetric flask and transferring 1 ml to a separate FAME tube. The estimated crude lipid content of the biomass was determined to be 52.4% (as SUM of FAME) using GC with FID detection, while 48.0% (wt/wt) lipid was extracted from the dry biomass, giving a 91.7% recovery of total lipid. The crude lipid was determined to be 95.3% fatty acids (as SUM of FAME) using GC/FID. The major fatty acids contained in the crude lipid were C16:0 (217.5 mg/g), C20:5 n-3 (169.3 mg/g), and C22:6 n-3 (444.1 mg/g).

The lipid class profile of the extracted crude lipid was determined by weighing 60.1 mg of crude lipid into a 50 mL volumetric flask and transferring an aliquot into an HPLC vial for HPLC/ELSD/MS analysis. According to the HPLC/ELSD/MS analysis, the crude lipid contained 0.2% SE, 95.7% TAG, 0.3% sterols, and 0.7% 1,2-DAG. 5.1% of the TAG fraction included a peak that eluted directly after the TAG peak, but did not give a recognizable mass spectrum.

Isolated TAG from this sample made up approximately 93.9% of the crude oil. PL was not detected by weight or TLC after SPE isolation. The major fatty acids (>50 mg/g) contained in the TAG were C16:0 (218 mg/g), C20:5 n-3 (167 mg/g) and C22:6 n-3 (430 mg/g).

PTA-10208 Sample #3

A sample of crude oil from the microorganism deposited under ATCC Accession No. PTA-10208 (Sample PTA-10208 #3) was analyzed using HPLC/ELSD/MS. A total of 98.38% of lipids were recovered, with the sterol ester (SE) fraction accounting for 0.32%, the TAG fraction accounting for 96.13%, the 1,3-diacylglycerol (DAG) fraction accounting for 0.22%, the 1,2-DAG fraction accounting for 0.78%, and the sterol fraction accounting for 0.93%.

PTA-10212 Sample #1

The fatty acid profile of the biomass and extracted crude lipid for PTA-10212 Sample #1 was determined using GC/FID. Fatty acids in the biomass were transesterified in situ by weighing 27.0 mg of biomass directly into a FAME tube, while a sample of the extracted crude lipid was prepared by weighing 52.5 mg of crude lipid into a 50 mL volumetric flask and transferring 1 ml to a separate FAME tube. The estimated crude lipid content of the biomass was determined to be 38.3% (as SUM of FAME) using GC with FID detection, while 36.3% (wt/wt) lipid was extracted from the dry biomass, giving a 94.6% recovery of total lipid. The crude lipid was determined to be 83.2% fatty acids (as SUM of FAME) using GC/FID. The major fatty acids contained in the crude lipid were C16:0 (328.5 mg/g), C20:5 n-3 (90.08 mg/g), and C22:6 n-3 (289.3 mg/g).

The lipid class profile of the extracted crude lipid was determined by weighing 52.5 mg of crude lipid into a 50 mL volumetric flask and transferring an aliquot into an HPLC vial for HPLC/ELSD/MS analysis. According to the HPLC/ELSD/MS analysis, the crude lipid contained 0.2% SE, 64.2% TAG, 1.9% FFA, 2.8% 1,3-DAG, 1.4% sterols, 18.8% 1,2-DAG, and 0.5% MAG. 3.4% of the TAG fraction included a peak that eluted directly after the TAG peak, but did not give a recognizable mass spectrum.

Isolated TAG from this sample made up approximately 49.8% of the crude oil. Isolated PL made up approximately 8.1% of the crude oil. The major fatty acids (>50 mg/g) contained in the TAG fraction are C16:0 (400 mg/g), C20:5 n-3 (91 mg/g), and C22:6 n-3 (273 mg/g). The major fatty acids (>50 mg/g) contained in the PL fraction are C16:0 (98 mg/g), C20:5 n-3 (33 mg/g), and C22:6 n-3 (227 mg/g).

PTA-10212 Sample #2

The fatty acid profile of the biomass and extracted crude lipid PTA-10212 Sample #2 was determined using GC/FID. Fatty acids in the biomass were transesterified in situ by weighing 29.5 mg of biomass directly into a FAME tube, while a sample of the extracted crude lipid was prepared by weighing 56.5 mg of crude lipid into a 50 mL volumetric flask and transferring 1 ml to a separate FAME tube. The estimated crude lipid content of the biomass was determined to be 40.0% (as SUM of FAME) using GC with FID detection, while 41.3% (wt/wt) lipid was extracted from the dry biomass, giving a 106.1% recovery of total lipid. The crude lipid was determined to be 82.8% fatty acids (as SUM of FAME) using GC/FID. The major fatty acids contained in the crude lipid were C16:0 (327.3 mg/g), C20:5 n-3 (92.5 mg/g), and C22:6 11-3 (277.6 mg/g).

The lipid class profile of the extracted crude lipid was determined by weighing 56.5 mg of crude lipid into a 50 mL volumetric flask and transferring an aliquot into an HPLC vial for HPLC/ELSD/MS analysis. According to the HPLC/ELSD/MS analysis, the crude lipid contained 0.2% SE, 58.2% TAG, 2.3% FFA, 3.4% 1,3-DAG, 1.7% sterols, 23.4% 1,2-DAG, and 0.6% MAG. 3.3% of the TAG fraction included a peak that eluted directly after the TAG peak, but did not give a recognizable mass spectrum.

Isolated TAG from this sample made up approximately 51.9% of the crude oil. Isolated PL made up approximately 8.8% of the crude oil. The major fatty acids (>50 mg/g) contained in the TAG fraction are C16:0 (402 mg/g), C20:5 n-3 (92 mg/g), and C22:6 n-3 (245 mg/g). The major fatty acids (>50 mg/g) contained in the PL fraction are C16:0 (121 mg/g), C20:5 n-3 (48 mg/g), and C22:6 n-3 (246 mg/g).

TABLE 32

Fatty Acid Profiles of PTA-10208 and PTA-10212 Biomasses and Extracted Crude Lipids (mg/g)

| Fatty Acid | PTA-10208 Sample #1 Biomass | PTA-10208 Sample #1 Crude Lipid | PTA-10208 Sample #2 Biomass | PTA-10208 Sample #2 Crude Lipid | PTA-10212 Sample #1 Biomass | PTA-10212 Sample #1 Crude Lipid | PTA-10212 Sample #2 Biomass | PTA-10212 Sample #2 Crude Lipid |
|---|---|---|---|---|---|---|---|---|
| | FAME (mg/g) | FAME (mg/g) | FAME (mg/g) | FAME (mg/g) | FAME (mg/g) | FAME (mg/g) | FAME (mg/g) | FAME (mg/g) |
| C12:0 | 1.47 | 2.43 | 1.80 | 3.14 | 0.99 | 1.90 | 0.87 | 1.91 |
| C14:0 | 11.62 | 20.12 | 16.72 | 31.03 | 5.51 | 12.91 | 5.97 | 13.69 |
| C14:1 | 0.00 | 0.00 | 0.00 | 0.00 | 0.00 | 0.00 | 0.00 | 0.00 |
| C15:0 | 2.43 | 3.75 | 3.60 | 6.22 | 9.13 | 20.42 | 9.39 | 20.81 |
| C16:0 | 105.04 | 182.47 | 117.72 | 217.49 | 145.87 | 328.45 | 147.87 | 327.27 |
| C16:1 | 0.00 | 0.00 | 0.06 | 0.01 | 6.26 | 14.53 | 7.46 | 16.89 |
| C18:0 | 5.37 | 8.96 | 4.77 | 8.37 | 6.77 | 15.39 | 6.77 | 15.15 |
| C18:1 n-9 | 0.00 | 3.26 | 0.00 | 3.09 | 0.03 | 4.04 | 0.08 | 5.87 |
| C18:1 n-7 | 0.00 | 0.00 | 0.00 | 0.00 | 0.00 | 0.00 | 0.00 | 0.00 |
| C18:2 n-6 | 0.00 | 0.00 | 0.00 | 0.00 | 0.00 | 0.00 | 0.00 | 0.00 |
| C20:0 | 1.48 | 1.79 | 1.40 | 1.85 | 1.60 | 3.09 | 1.67 | 3.20 |
| C18:3 n-3 | 0.00 | 0.00 | 0.00 | 0.00 | 0.00 | 0.00 | 0.00 | 0.00 |
| C20:1 n-9 | 0.00 | 0.00 | 0.00 | 0.00 | 0.00 | 0.00 | 0.00 | 0.00 |
| C18:4 n-3 | 0.91 | 1.61 | 1.10 | 2.00 | 2.28 | 2.56 | 2.21 | 2.64 |
| C20:2 n-6 | 0.00 | 0.00 | 0.00 | 0.00 | 0.00 | 0.00 | 0.00 | 0.00 |
| C20:3 n-6 | 0.00 | 0.00 | 0.00 | 0.00 | 0.00 | 0.00 | 0.00 | 0.00 |
| C22:0 | 0.10 | 0.00 | 0.08 | 0.00 | 0.30 | 0.12 | 0.35 | 0.24 |

TABLE 32-continued

Fatty Acid Profiles of PTA-10208 and PTA-10212 Biomasses and Extracted Crude Lipids (mg/g)

| | PTA-10208 Sample #1 Biomass | PTA-10208 Sample #1 Crude Lipid | PTA-10208 Sample #2 Biomass | PTA-10208 Sample #2 Crude Lipid | PTA-10212 Sample #1 Biomass | PTA-10212 Sample #1 Crude Lipid | PTA-10212 Sample #2 Biomass | PTA-10212 Sample #2 Crude Lipid |
|---|---|---|---|---|---|---|---|---|
| C20:4 n-7 | 0.81 | 0.45 | 0.67 | 0.41 | 0.00 | 0.00 | 0.00 | 0.00 |
| C20:4 n-6 | 7.22 | 12.23 | 6.84 | 12.18 | 1.19 | 2.26 | 1.31 | 2.32 |
| C22:1 n-9 | 0.00 | 0.00 | 0.00 | 0.00 | 0.00 | 0.00 | 0.00 | 0.00 |
| C20:4 n-5 | 0.63 | 0.52 | 0.00 | 0.46 | 0.00 | 0.00 | 0.00 | 0.00 |
| C20:4 n-3 | 3.45 | 5.45 | 3.33 | 5.58 | 0.00 | 2.40 | 0.00 | 2.34 |
| C20:3 n-3 | 0.09 | 0.00 | 0.11 | 0.00 | 0.00 | 0.00 | 0.00 | 0.00 |
| C20:5 n-3 | 107.31 | 186.83 | 92.99 | 169.32 | 40.32 | 90.08 | 43.15 | 92.54 |
| C22:4 n-9 | 0.00 | 0.00 | 0.00 | 0.00 | 0.00 | 0.00 | 0.00 | 0.00 |
| C24:0 | 0.60 | 0.00 | 0.52 | 0.00 | 2.81 | 6.83 | 2.74 | 6.53 |
| C24:1 n-9 | 1.55 | 3.26 | 0.85 | 2.04 | 0.43 | 1.34 | 0.42 | 1.24 |
| C22:5 n-6 | 9.66 | 15.84 | 10.27 | 17.98 | 2.42 | 4.68 | 2.32 | 4.21 |
| C22:5 n-3 | 20.44 | 35.13 | 9.92 | 17.50 | 2.41 | 4.94 | 2.69 | 5.23 |
| C22:6 n-3 | 246.98 | 423.10 | 245.96 | 444.08 | 139.58 | 289.34 | 137.35 | 277.57 |
| Sum of FAME | 527.15 | 907.18 | 518.71 | 942.75 | 367.89 | 805.29 | 372.63 | 799.68 |

TABLE 33

Fatty Acid Profiles of PTA-10208 and PTA-10212 Biomasses and Extracted Crude Lipids (%)

| | PTA-10208 Sample #1 Biomass | PTA-10208 Sample #1 Crude Lipid | PTA-10208 Sample #2 Biomass | PTA-10208 Sample #2 Crude Lipid | PTA-10212 Sample #1 Biomass | PTA-10212 Sample #1 Crude Lipid | PTA-10212 Sample #2 Biomass | PTA-10212 Sample #2 Crude Lipid |
|---|---|---|---|---|---|---|---|---|
| Fatty Acid | % FAME | % FAME | % FAME | % FAME | % FAME | % FAME | % FAME | % FAME |
| C12:0 | 0.28 | 0.27 | 0.35 | 0.33 | 0.27 | 0.24 | 0.23 | 0.24 |
| C14:0 | 2.20 | 2.22 | 3.22 | 3.29 | 1.50 | 1.60 | 1.60 | 1.71 |
| C14:1 | 0.00 | 0.00 | 0.00 | 0.00 | 0.00 | 0.00 | 0.00 | 0.00 |
| C15:0 | 0.46 | 0.41 | 0.69 | 0.66 | 2.48 | 2.54 | 2.52 | 2.60 |
| C16:0 | 19.93 | 20.11 | 22.70 | 23.07 | 39.65 | 40.79 | 39.68 | 40.93 |
| C16:1 | 0.00 | 0.00 | 0.01 | 0.00 | 1.70 | 1.80 | 2.00 | 2.11 |
| C18:0 | 1.02 | 0.99 | 0.92 | 0.89 | 1.84 | 1.91 | 1.82 | 1.89 |
| C18:1 n-9 | 0.00 | 0.36 | 0.00 | 0.33 | 0.01 | 0.50 | 0.02 | 0.73 |
| C18:1 n-7 | 0.00 | 0.00 | 0.00 | 0.00 | 0.00 | 0.00 | 0.00 | 0.00 |
| C18:2 n-6 | 0.00 | 0.00 | 0.00 | 0.00 | 0.00 | 0.00 | 0.00 | 0.00 |
| C20:0 | 0.28 | 0.20 | 0.27 | 0.20 | 0.43 | 0.38 | 0.45 | 0.40 |
| C18:3 n-3 | 0.00 | 0.00 | 0.00 | 0.00 | 0.00 | 0.00 | 0.00 | 0.00 |
| C20:1 n-9 | 0.00 | 0.00 | 0.00 | 0.00 | 0.00 | 0.00 | 0.00 | 0.00 |
| C18:4 n-3 | 0.17 | 0.18 | 0.21 | 0.21 | 0.62 | 0.32 | 0.59 | 0.33 |
| C20:2 n-6 | 0.00 | 0.00 | 0.00 | 0.00 | 0.00 | 0.00 | 0.00 | 0.00 |

TABLE 33-continued

Fatty Acid Profiles of PTA-10208 and PTA-10212 Biomasses and Extracted Crude Lipids (%)

| | PTA-10208 Sample #1 Biomass | PTA-10208 Sample #1 Crude Lipid | PTA-10208 Sample #2 Biomass | PTA-10208 Sample #2 Crude Lipid | PTA-10212 Sample #1 Biomass | PTA-10212 Sample #1 Crude Lipid | PTA-10212 Sample #2 Biomass | PTA-10212 Sample #2 Crude Lipid |
|---|---|---|---|---|---|---|---|---|
| C20:3 n-6 | 0.00 | 0.00 | 0.00 | 0.00 | 0.00 | 0.00 | 0.00 | 0.00 |
| C22:0 | 0.02 | 0.00 | 0.01 | 0.00 | 0.08 | 0.02 | 0.09 | 0.03 |
| C20:4 n-7 | 0.15 | 0.05 | 0.13 | 0.04 | 0.00 | 0.00 | 0.00 | 0.00 |
| C204 n-6 | 1.37 | 1.35 | 1.32 | 1.29 | 0.32 | 0.28 | 0.35 | 0.29 |
| C22:1 n-9 | 0.00 | 0.00 | 0.00 | 0.00 | 0.00 | 0.00 | 0.00 | 0.00 |
| C20:4 n-5 | 0.12 | 0.06 | 0.00 | 0.05 | 0.00 | 0.00 | 0.00 | 0.00 |
| C20:4 n-3 | 0.65 | 0.60 | 0.64 | 0.59 | 0.00 | 0.30 | 0.00 | 0.29 |
| C20:3 n-3 | 0.02 | 0.00 | 0.02 | 0.00 | 0.00 | 0.00 | 0.00 | 0.00 |
| C20:5 n-3 | 20.36 | 20.59 | 17.93 | 17.96 | 10.96 | 11.19 | 11.58 | 11.57 |
| C22:4 n-9 | 0.00 | 0.00 | 0.00 | 0.00 | 0.00 | 0.00 | 0.00 | 0.00 |
| C24:0 | 0.11 | 0.00 | 0.10 | 0.00 | 0.76 | 0.85 | 0.74 | 0.82 |
| C24:1 n-9 | 0.29 | 0.36 | 0.16 | 0.22 | 0.12 | 0.17 | 0.11 | 0.16 |
| C22:5 n-6 | 1.83 | 1.75 | 1.98 | 1.91 | 0.66 | 0.58 | 0.62 | 0.53 |
| C22:5 n-3 | 3.88 | 3.87 | 1.91 | 1.86 | 0.65 | 0.61 | 0.72 | 0.65 |
| C22:6 n-3 | 46.85 | 46.64 | 47.42 | 47.10 | 37.94 | 35.93 | 36.86 | 34.71 |
| Sum of FAME % | 100 | 100 | 100 | 100 | 100 | 100 | 100 | 100 |

TABLE 34

Fatty Acid Profiles of PTA-10208 and PTA-10212 Isolated TAG

| | PTA-10208 Sample #1 | PTA-10208 Sample #1 | PTA-10208 Sample #2 | PTA-10208 Sample #2 | PTA-10212 Sample #1 | PTA-10212 Sample #1 | PTA-10212 Sample #2 | PTA-10212 Sample #2 |
|---|---|---|---|---|---|---|---|---|
| Fatty Acid | FAME (mg/g) | % FAME | FAME (mg/g) | % FAME | FAME (mg/g) | % FAME | FAME (mg/g) | % FAME |
| C12:0 | 2.57 | 0.27 | 3.35 | 0.36 | 0,00 | 0.00 | 0.00 | 0.00 |
| C14:0 | 21.07 | 2.23 | 31.37 | 3.41 | 14.05 | 1,61 | 14.45 | 1.69 |
| C14:1 | 0.00 | 0.00 | 0.00 | 0.00 | 0.00 | 0.00 | 0.00 | 0.00 |
| C15:0 | 3.89 | 0.41 | 6.17 | 0.67 | 23.27 | 2.66 | 23.14 | 2.71 |
| C16:0 | 189.28 | 20.07 | 218.78 | 23.75 | 399.51 | 45.75 | 402.43 | 47.07 |
| C16:1 | 0.00 | 0.00 | 0.00 | 0.00 | 15.23 | 1.74 | 17.62 | 2.06 |
| C18:0 | 9.21 | 0.98 | 8.07 | 0.88 | 22.70 | 2.60 | 23.10 | 2.70 |
| C18:1 n-9 | 3.35 | 0.36 | 3.64 | 0.40 | 6.12 | 0.70 | 7.48 | 0.87 |
| C18:1 n-7 | 0.00 | 0.00 | 0.00 | 0.00 | <0.1 | <0.1 | <0.1 | <0.1 |
| C18:2 n-6 | 0.00 | 0.00 | 0.00 | 0.00 | 0.00 | 0.00 | 0.00 | 0.00 |
| C20:0 | 1.86 | 0.20 | 1.55 | 0.17 | 4.76 | 0.55 | 5.32 | 0.62 |
| C18:3 n-3 | 0.00 | 0.00 | 0.00 | 0.00 | 0.00 | 0.00 | 0.00 | 0.00 |
| C20:1 n-9 | 0.00 | 0.00 | 0.00 | 0.00 | 0.00 | 0.00 | 0.00 | 0.00 |
| C18:4 n-3 | 1.64 | 0.17 | 2.00 | 0.22 | 2.25 | 0.26 | 2.24 | 0.26 |
| C20:2 n-6 | 0.00 | 0.00 | 0.00 | 0.00 | 0.00 | 0.00 | 0.00 | 0.00 |

TABLE 34-continued

Fatty Acid Profiles of PTA-10208 and PTA-10212 Isolated TAG

| | PTA-10208 Sample #1 FAME (mg/g) | PTA-10208 Sample #1 % FAME | PTA-10208 Sample #2 FAME (mg/g) | PTA-10208 Sample #2 % FAME | PTA-10212 Sample #1 FAME (mg/g) | PTA-10212 Sample #1 % FAME | PTA-10212 Sample #2 FAME (mg/g) | PTA-10212 Sample #2 % FAME |
|---|---|---|---|---|---|---|---|---|
| C20:3 n-6 | 0.00 | 0.00 | 0.00 | 0.00 | 0.00 | 0.00 | 0.00 | 0.00 |
| C22:0 | 0.00 | 0.00 | 0.00 | 0.00 | 0.55 | 0.06 | 0.89 | 0.10 |
| Unknown | 0.00 | 0.00 | 0.00 | 0.00 | 0.00 | 0.00 | 0.00 | 0.00 |
| C20:4 n-7 | 0.39 | 0.04 | 0.05 | 0.01 | 0.00 | 0.00 | 0.00 | 0.00 |
| C20:3 n-3 | 0.00 | 0.00 | 0.00 | 0.00 | 0.00 | 0.00 | 0.00 | 0.00 |
| C20:4 n-6 | 12.79 | 1.36 | 11.82 | 1.28 | 2.33 | 0.27 | 2.25 | 0.26 |
| C22:1 n-9 | 0.00 | 0.00 | 0.00 | 0.00 | 0.00 | 0.00 | 0.00 | 0.00 |
| C20:4 n-5 | 0.39 | 0.04 | 0.07 | 0.01 | 0.00 | 0.00 | 0.00 | 0.00 |
| C20:4 n-3 | 5.52 | 0.59 | 5.09 | 0.55 | 2.87 | 0.33 | 2.98 | 0.35 |
| C20:5 n-3 | 197.14 | 20.90 | 166.68 | 18.10 | 91.17 | 10.44 | 91.78 | 10.74 |
| C24:0 | 0.00 | 0.00 | 0.00 | 0.00 | 6.93 | 0.79 | 7.36 | 0.86 |
| C22:4 n-9 | 0.00 | 0.00 | 0.00 | 0.00 | 0.00 | 0.00 | 0.00 | 0.00 |
| C24:1 n-9 | 1.08 | 0.11 | <0.1 | <0.1 | 0.00 | 0.00 | 0.00 | 0.00 |
| C22:5 n-6 | 15.88 | 1.68 | 16.57 | 1.80 | 4.01 | 0.46 | 3.39 | 0.40 |
| C22:5 n-3 | 36.05 | 3.82 | 16.00 | 1.74 | 4.53 | 0.52 | 5.07 | 0.59 |
| C22:6 n-3 | 440.99 | 46.76 | 429.83 | 46.67 | 273.02 | 31.26 | 245.38 | 28.70 |
| Sum of FAME | 943.11 | — | 921.03 | — | 873.31 | — | 854.89 | — |
| Total % FAME | — | 100.00 | — | 100.00 | — | 100.00 | — | 100.00 |

TABLE 35

Fatty Acid Profiles of PTA-10212 Isolated PL

| Fatty Acid | PTA-10212 Sample #1 FAME (mg/g) | PTA-10212 Sample #1 % FAME | PTA-10212 Sample #2 FAME (mg/g) | PTA-10212 Sample #2 % FAME |
|---|---|---|---|---|
| C12:0 | 0.00 | 0.00 | 0.00 | 0.00 |
| C14:0 | 0.93 | 0.22 | 1.89 | 0.39 |
| C14:1 | 0.00 | 0.00 | 0.00 | 0.00 |
| C15:0 | 3.44 | 0.82 | 5.07 | 1.05 |
| C16:0 | 98.29 | 23.50 | 120.98 | 25.00 |
| C16:1 | 1.15 | 0.27 | 3.07 | 0.63 |
| C18:0 | 3.25 | 0.78 | 3.72 | 0.77 |
| C18:1 n-9 | 1.12 | 0.27 | 0.95 | 0.20 |
| C18:1 n-7 | <0.1 | <0.1 | 0.02 | 0.003 |
| C18:2 n-6 | 0.00 | 0.00 | 0.00 | 0.00 |
| C20:0 | <0.1 | <0.1 | <0.1 | <0.1 |
| C18:3 n-3 | 0.00 | 0.00 | 0.00 | 0.00 |
| C20:1 n-9 | 0.00 | 0.00 | 0.00 | 0.00 |
| C18:4 n-3 | 3.71 | 0.89 | 3.24 | 0.67 |
| C20:2 n-6 | 0.00 | 0.00 | 0.00 | 0.00 |
| C20:3 n-6 | 0.00 | 0.00 | 0.00 | 0.00 |
| C22:0 | 0.00 | 0.00 | 0.00 | 0.00 |
| Unknown | 42.33 | 10.12 | 44.71 | 9.24 |
| C20:4 n-7 | 0.00 | 0.00 | 0.00 | 0.00 |
| C20:3 n-3 | 0.00 | 0.00 | 0.00 | 0.00 |
| C20:4 n-6 | 0.84 | 0.20 | 1.54 | 0.32 |
| C22:1 n-9 | 0.00 | 0.00 | 0.00 | 0.00 |
| C20:4 n-5 | 0.00 | 0.00 | 0.00 | 0.00 |
| C20:4 n-3 | <0.1 | <0.1 | 0.27 | 0.06 |
| C20:5 n-3 | 33.39 | 7.98 | 47.91 | 9.90 |
| C24:0 | 0.1 | <0.1 | 0.01 | 0.001 |
| C22:4 n-9 | 0.00 | 0.00 | 0.00 | 0.00 |
| C24:1 n-9 | 0.00 | 0.00 | 0.00 | 0.00 |
| C22:5 n-6 | 3.08 | 0.74 | 3.82 | 0.79 |
| C22:5 n-3 | <0.1 | <0.1 | 0.66 | 0.14 |
| C22:6 n-3 | 226.68 | 54.20 | 246.09 | 50.85 |
| Sum of FAME | 418.21 | — | 483.94 | — |
| Total % FAME | — | 100 | — | 100 |

PTA-10212 Sample #3

The lipid content of the biomass for PTA-10212 Sample #3 was estimated to be 34% as the sum of FAME, and the amount of crude oil obtained after solvent extraction was 37% by weight, giving a 109% recovery of fat present in the biomass. After fractionation using flash chromatography, approximately 46% of the crude oil was isolated as TAG, 28% was isolated as DAG. The crude oil contained 309 mg/g DHA and 264 mg/g EPA. The isolated TAG contained 341 mg/g DHA and 274 mg/g EPA. The isolated DAG fraction contained 262 mg/g DHA and 237 mg/g EPA. The total fatty acid profiles of the biomass, extracted crude oil, and isolated fractions are shown below in Table 36 and Table 37 calculated as mg/g and % FAME, respectively.

TABLE 36

Fatty Acid Profiles of PTA-10212 Sample #3 Biomass and Extracted Crude Lipid (mg/g)

| Fatty Acid | Biomass NA FAME (mg/g) | Crude Oil Wt. % 37.2% FAME (mg/g) | TAG 46.0% FAME (mg/g) | DAG 27.9% FAME (mg/g) |
|---|---|---|---|---|
| C12:0 | 0.0 | 0.0 | 0.0 | 0.0 |
| C14:0 | 3.6 | 10.3 | 11.5 | 9.4 |
| C14:1 | 0.0 | 0.0 | 0.0 | 0.0 |
| C15:0 | 4.1 | 10.6 | 9.8 | 6.6 |
| C16:0 | 70.5 | 181.8 | 231.7 | 111.3 |
| C16:1 | 6.7 | 19.1 | 18.7 | 17.1 |
| C18:0 | 2.4 | 10.2 | 14.2 | 0.0 |
| C18:1 n-9 | 0.0 | 6.7 | 0.0 | 0.0 |
| C18:1 n-7 | 0.0 | 1.2 | 0.0 | 0.0 |
| C18:2 n-6 | 0.0 | 1.8 | 0.0 | 0.0 |
| C20:0 | 0.0 | 2.4 | 0.0 | 0.0 |
| C18:3 n-3 | 0.0 | 0.0 | 0.0 | 0.0 |
| C20:1 n-9 | 0.0 | 0.3 | 0.0 | 1.7 |
| C18:4 n-3 | 1.9 | 3.4 | 3.2 | 4.4 |
| C20:2 n-6 | 0.0 | 0.0 | 0.0 | 0.0 |
| C20:3 n-6 | 0.0 | 0.0 | 0.0 | 0.0 |
| C22:0 | 3.3 | 0.0 | 0.0 | 0.0 |
| C20:4 n-7 | 0.0 | 2.1 | 1.5 | 0.0 |
| C20:3 n-3 | 0.0 | 0.0 | 0.0 | 0.0 |
| C20:4 n-6 | 6.8 | 17.9 | 21.4 | 13.8 |
| C22:1 n-9 | 0.0 | 0.0 | 0.0 | 0.0 |
| C20:4 n-5 | 0.0 | 1.3 | 1.3 | 0.0 |
| C20:4 n-3 | 3.0 | 8.5 | 10.9 | 6.4 |
| C20:5 n-3 | 102.0 | 263.6 | 274.2 | 237.4 |
| C24:0 | 0.0 | 1.7 | 3.9 | 0.0 |
| C22:4 n-9 | 0.0 | 0.0 | 0.0 | 0.0 |
| C24:1 n-9 | 0.0 | 0.0 | 4.2 | 0.0 |
| C22:5 n-6 | 3.2 | 8.3 | 10.7 | 6.1 |
| C22:5 n-3 | 3.8 | 10.4 | 15.1 | 6.6 |
| C22:6 n-3 | 131.2 | 309.4 | 341.1 | 261.9 |
| Sum of FAME | 342.4 | 871.1 | 973.2 | 682.6 |

TABLE 37

Fatty Acid Profiles of PTA-10212 Sample #3 Biomass and Extracted Crude Lipid (%)

| Fatty Acid | Biomass NA FAME (mg/g) | Crude Oil Wt. % 37.2% FAME (mg/g) | TAG 46.0% FAME (mg/g) | DAG 27.9% FAME (mg/g) |
|---|---|---|---|---|
| C12:0 | 0.0 | 0.0 | 0.0 | 0.0 |
| C14:0 | 1.1 | 1.2 | 1.2 | 1.4 |
| C14:1 | 0.0 | 0.0 | 0.0 | 0.0 |
| C15:0 | 1.2 | 1.2 | 1.0 | 1.0 |
| C16:0 | 20.6 | 20.9 | 23.8 | 16.3 |
| C16:1 | 2.0 | 2.2 | 1.9 | 2.5 |
| C18:0 | 0.7 | 1.2 | 1.5 | 0.0 |
| C18:1 n-9 | 0.0 | 0.8 | 0.0 | 0.0 |
| C18:1 n-7 | 0.0 | 0.1 | 0.0 | 0.0 |
| C18:2 n-6 | 0.0 | 0.2 | 0.0 | 0.0 |
| C20:0 | 0.0 | 0.3 | 0.0 | 0.0 |
| C18:3 n-3 | 0.0 | 0.0 | 0.0 | 0.0 |
| C20:1 n-9 | 0.0 | 0.0 | 0.0 | 0.2 |
| C18:4 n-3 | 0.6 | 0.4 | 0.3 | 0.6 |
| C20:2 n-6 | 0.0 | 0.0 | 0.0 | 0.0 |
| C20:3 n-6 | 0.0 | 0.0 | 0.0 | 0.0 |
| C22:0 | 1.0 | 0.0 | 0.0 | 0.0 |
| C20:4 n-7 | 0.0 | 0.2 | 0.2 | 0.0 |
| C20:3 n-3 | 0.0 | 0.0 | 0.0 | 0.0 |
| C20:4 n-6 | 2.0 | 2.1 | 2.2 | 2.0 |
| C22:1 n-9 | 0.0 | 0.0 | 0.0 | 0.0 |
| C20:4 n-5 | 0.0 | 0.1 | 0.1 | 0.0 |
| C20:4 n-3 | 0.9 | 1.0 | 1.1 | 0.9 |
| C20:5 n-3 | 29.8 | 30.3 | 28.2 | 34.8 |
| C24:0 | 0.0 | 0.2 | 0.4 | 0.0 |
| C22:4 n-9 | 0.0 | 0.0 | 0.0 | 0.0 |
| C24:1 n-9 | 0.0 | 0.0 | 0.4 | 0.0 |
| C22:5 n-6 | 0.9 | 1.0 | 1.1 | 0.9 |
| C22:5 n-3 | 1.1 | 1.2 | 1.6 | 1.0 |
| C22:6 n-3 | 38.3 | 35.5 | 35.1 | 38.4 |
| Total % FAME | 100.0 | 100.0 | 100.0 | 100.0 |

PTA-10212 Sample #4

PTA-10212 Sample #4 contained approximately 23% lipid determined as the sum of FAME, of which 107% was recovered using hexane extraction. After fractionation using flash chromatography, approximately 42% of the crude oil was isolated as TAG, 18% was isolated as DAG. The crude oil contained 275 mg/g DHA and 209 mg/g EPA. The isolated TAG contained 296 mg/g DHA and 205 mg/g EPA. The isolated DAG fraction contained 245 mg/g DHA and 219 mg/g EPA. The total fatty acid profiles of the biomass, extracted crude oil, and isolated fractions are shown below in Table 38 (mg/g) and Table 39 (% FAME).

TABLE 38

Fatty Acid Profiles of PTA-10212 Sample #4 Biomass and Extracted Crude Lipid (mg/g)

| Fatty Acid | Biomass NA FAME (mg/g) | Crude Oil Wt. % 24.7% FAME (mg/g) | TAG 42.2% FAME (mg/g) | DAG 18.4% FAME (mg/g) |
|---|---|---|---|---|
| C12:0 | 0.0 | 0.0 | 2.1 | 2.4 |
| C14:0 | 2.0 | 8.3 | 9.8 | 9.6 |
| C14:1 | 0.0 | 0.0 | 0.0 | 0.0 |
| C15:0 | 4.8 | 16.8 | 0.4 | 0.9 |
| C16:0 | 63.3 | 210.6 | 285.7 | 138.0 |
| C16:1 | 1.6 | 6.7 | 7.4 | 7.5 |
| C18:0 | 2.8 | 12.2 | 19.9 | 4.6 |
| C18:1 n-9 | 0.0 | 3.7 | 0.7 | 1.1 |
| C18:1 n-7 | 0.0 | 0.0 | 0.3 | 1.2 |
| C18:2 n-6 | 0.0 | 0.0 | 0.0 | 0.0 |
| C20:0 | 0.0 | 3.3 | 6.0 | 1.5 |
| C18:3 n-3 | 0.0 | 0.0 | 0.0 | 0.0 |
| C20:1 n-9 | 0.0 | 0.0 | 0.7 | 1.2 |
| C18:4 n-3 | 1.4 | 3.8 | 3.6 | 5.0 |
| C20:2 n-6 | 0.0 | 0.0 | 0.0 | 0.0 |
| C20:3 n-6 | 0.0 | 0.0 | 0.4 | 0.0 |
| C22:0 | 1.5 | 0.0 | 1.9 | 0.0 |
| C20:4 n-7 | 0.0 | 0.0 | 0.9 | 0.6 |
| C20:3 n-3 | 0.0 | 0.0 | 0.0 | 0.0 |

TABLE 38-continued

Fatty Acid Profiles of PTA-10212 Sample #4 Biomass and Extracted Crude Lipid (mg/g)

| Fatty Acid | Biomass NA FAME (mg/g) | Crude Oil Wt. % 24.7% FAME (mg/g) | TAG 42.2% FAME (mg/g) | DAG 18.4% FAME (mg/g) |
|---|---|---|---|---|
| C20:4 n-6 | 2.5 | 10.1 | 13.0 | 10.3 |
| C22:1 n-9 | 0.0 | 0.0 | 0.0 | 0.0 |
| C20:4 n-5 | 0.0 | 0.0 | 0.8 | 0.7 |
| C20:4 n-3 | 1.4 | 6.3 | 8.6 | 6.0 |
| C20:5 n-3 | 57.6 | 209.1 | 205.4 | 219.0 |
| C24:0 | 0.0 | 2.6 | 0.8 | 0.0 |
| C22:4 n-9 | 0.1 | 0.0 | 0.0 | 0.0 |
| C24:1 n-9 | 0.0 | 0.0 | 1.1 | 0.5 |
| C22:5 n-6 | 1.4 | 6.1 | 7.9 | 4.5 |
| C22:5 n-3 | 4.0 | 15.8 | 20.8 | 12.9 |
| C22:6 n-3 | 87.7 | 275.0 | 296.4 | 244.8 |
| Sum of FAME | 232.2 | 790.1 | 894.8 | 672.4 |

TABLE 39

Fatty Acid Profiles of PTA-10212 Sample #4 Biomass and Extracted Crude Lipid (%)

| Fatty Acid | Biomass NA FAME (mg/g) | Crude Oil Wt. % 24.7% FAME (mg/g) | TAG 42.2% FAME (mg/g) | DAG 18.4% FAME (mg/g) |
|---|---|---|---|---|
| C12:0 | 0.0 | 0.0 | 0.2 | 0.4 |
| C14:0 | 0.9 | 1.0 | 1.1 | 1.4 |
| C14:1 | 0.0 | 0.0 | 0.0 | 0.0 |
| C15:0 | 2.1 | 2.1 | 0.0 | 0.1 |
| C16:0 | 27.3 | 26.7 | 31.9 | 20.5 |
| C16:1 | 0.7 | 0.8 | 0.8 | 1.1 |
| C18:0 | 1.2 | 1.5 | 2.2 | 0.7 |
| C18:1 n-9 | 0.0 | 0.5 | 0.1 | 0.2 |
| C18:1 n-7 | 0.0 | 0.0 | 0.0 | 0.2 |
| C18:2 n-6 | 0.0 | 0.0 | 0.0 | 0.0 |
| C20:0 | 0.0 | 0.4 | 0.7 | 0.2 |
| C18:3 n-3 | 0.0 | 0.0 | 0.0 | 0.0 |
| C20:1 n-9 | 0.0 | 0.0 | 0.1 | 0.2 |
| C18:4 n-3 | 0.6 | 0.5 | 0.4 | 0.7 |
| C20:2 n-6 | 0.0 | 0.0 | 0.0 | 0.0 |
| C20:3 n-6 | 0.0 | 0.0 | 0.0 | 0.0 |
| C22:0 | 0.6 | 0.0 | 0.2 | 0.0 |
| C20:4 n-7 | 0.0 | 0.0 | 0.1 | 0.1 |
| C20:3 n-3 | 0.0 | 0.0 | 0.0 | 0.0 |
| C20:4 n-6 | 1.1 | 1.3 | 1.5 | 1.5 |
| C22:1 n-9 | 0.0 | 0.0 | 0.0 | 0.0 |
| C20:4 n-5 | 0.0 | 0.0 | 0.1 | 0.1 |
| C20:4 n-3 | 0.6 | 0.8 | 1.0 | 0.9 |
| C20:5 n-3 | 24.8 | 26.5 | 23.0 | 32.6 |
| C24:0 | 0.0 | 0.3 | 0.1 | 0.0 |
| C22:4 n-9 | 0.0 | 0.0 | 0.0 | 0.0 |
| C24:1 n-9 | 0.0 | 0.0 | 0.1 | 0.1 |
| C22:5 n-6 | 0.6 | 0.8 | 0.9 | 0.7 |
| C22:5 n-3 | 1.7 | 2.0 | 2.3 | 1.9 |
| C22:6 n-3 | 37.8 | 34.8 | 33.1 | 36.4 |
| Total % FAME | 100.0 | 100.0 | 100.0 | 100.0 |

PTA-10212 Sample #5

A sample of crude oil was extracted from a biomass of PTA-10212 using the FRIOLEX® process (GEA Westfalia Separator UK Ltd., Milton Keynes, England) to yield microbial oil PTA-10212 Sample #5. Individual lipid classes were isolated from PTA-10212 Sample #5 using low pressure flash chromatography, and the weight percent of each class was determined. The fatty acid profile of each class was determined using GC-FID.

Briefly, the sample was prepared by dissolving 240 mg of crude oil in 600 μL of hexane and applying to the head of the column. After fractionation of the sample using flash chromatography, the combined weights of all the fractions was 240 mg giving a 100% recovery. The sterol ester fraction accounted for 0.9%, the TAG fraction accounted for 42.6%, the free fatty acid (FFA) fraction accounted for 1.3%, the sterol fraction accounted for 2.2%, and the DAG fraction accounted for 41.6%. The total fatty acid profiles of the FRIOLEX® crude oil and isolated fractions are shown below in Table 40 and Table 41 calculated as mg/g and % FAME, respectively.

TABLE 40

Fatty Acid Profiles of PTA-10212 Sample #5 Crude Oil (mg/g)

| Fatty Acid | Crude Oil Wt. % NA FAME (mg/g) | TAG 42.6% FAME (mg/g) | DAG 41.6% FAME (mg/g) |
|---|---|---|---|
| C12:0 | 0 | 0.7 | 1.0 |
| C14:0 | 7.7 | 7.7 | 8.5 |
| C14:1 | 0 | 0.0 | 0.0 |
| C15:0 | 10.3 | 11.7 | 9.3 |
| C16:0 | 179.3 | 217.7 | 134.6 |
| C16:1 | 18.1 | 16.3 | 25.9 |
| C18:0 | 8.1 | 13.2 | 2.3 |
| C18:1 n-9 | 4.7 | 8.4 | 0.7 |
| C18:1 n-7 | 0 | 1.8 | 1.0 |
| C18:2 n-6 | 1.8 | 3.3 | 0.7 |
| C20:0 | 1.9 | 3.6 | 0.2 |
| C18:3 n-3 | 0 | 0.0 | 0.0 |
| C20:1 n-9 | 0 | 0.7 | 1.0 |
| C18:4 n-3 | 3.1 | 2.8 | 3.8 |
| C20:2 n-6 | 0 | 0.0 | 0.0 |
| C20:3 n-6 | 0 | 0.6 | 0.4 |
| C22:0 | 0 | 1.5 | 0.0 |
| C20:4 n-7 | 0 | 1.0 | 0.7 |
| C20:3 n-3 | 0 | 0.0 | 0.0 |
| C20:4 n-6 | 12.7 | 16.1 | 13.6 |
| C22:1 n-9 | 0 | 0.0 | 0.0 |
| C20:4 n-5 | 0 | 1.5 | 0.8 |
| C20:4 n-3 | 6.5 | 9.3 | 6.4 |
| C20:5 n-3 | 213.3 | 223.7 | 252.8 |
| C24:0 | 2.3 | 4.4 | 0.6 |
| C22:4 n-9 | 0 | 1.9 | 0.9 |
| C24:1 n-9 | 0 | 0.0 | 0.0 |
| C22:5 n-6 | 7.9 | 9.5 | 8.3 |
| C22:5 n-3 | 13 | 20.6 | 9.7 |
| C22:6 n-3 | 305.6 | 327.4 | 353.8 |
| Sum of FAME | 796.6 | 905.3 | 837.4 |

TABLE 41

Fatty Acid Profiles of PTA-10212 Sample #5 Crude Oil (%)

| Fatty Acid | Crude Oil % FAME | TAG % FAME | DAG % FAME |
|---|---|---|---|
| C12:0 | 0 | 0.1 | 0.1 |
| C14:0 | 1 | 0.9 | 1.0 |
| C14:1 | 0 | 0.0 | 0.0 |
| C15:0 | 1.3 | 1.3 | 1.1 |
| C16:0 | 22.5 | 24.0 | 16.1 |
| C16:1 | 2.3 | 1.8 | 3.1 |
| C18:0 | 1 | 1.5 | 0.3 |

TABLE 41-continued

Fatty Acid Profiles of PTA-10212 Sample #5 Crude Oil (%)

| Fatty Acid | Crude Oil % FAME | TAG % FAME | DAG % FAME |
|---|---|---|---|
| C18:1 n-9 | 0.6 | 0.9 | 0.1 |
| C18:1 n-7 | 0 | 0.2 | 0.1 |
| C18:2 n-6 | 0.2 | 0.4 | 0.1 |
| C20:0 | 0.2 | 0.4 | 0.0 |
| C18:3 n-3 | 0 | 0.0 | 0.0 |
| C20:1 n-9 | 0 | 0.1 | 0.1 |
| C18:4 n-3 | 0.4 | 0.3 | 0.5 |
| C20:2 n-6 | 0 | 0.0 | 0.0 |
| C20:3 n-6 | 0 | 0.1 | 0.0 |
| C22:0 | 0 | 0.2 | 0.0 |
| C20:4 n-7 | 0 | 0.1 | 0.1 |
| C20:3 n-3 | 0 | 0.0 | 0.0 |
| C20:4 n-6 | 1.6 | 1.8 | 1.6 |
| C22:1 n-9 | 0 | 0.0 | 0.0 |
| C20:4 n-5 | 0 | 0.2 | 0.1 |
| C20:4 n-3 | 0.8 | 1.0 | 0.8 |
| C20:5 n-3 | 26.8 | 24.7 | 30.2 |
| C24:0 | 0.3 | 0.5 | 0.1 |
| C22:4 n-9 | 0 | 0.2 | 0.1 |
| C24:1 n-9 | 0 | 0.0 | 0.0 |
| C22:5 n-6 | 1 | 1.1 | 1.0 |
| C22:5 n-3 | 1.6 | 2.3 | 1.2 |
| C22:6 n-3 | 38.4 | 36.2 | 42.3 |
| Total % FAME | 100 | 100 | 100 |

Example 37

Crude oils were further processed via refining, bleaching, and deodorizing to obtain refined oils. The refined oils were diluted with high oleic sunflower oil to obtain final oils with a DHA content of approximately 400 mg/g. Individual lipid classes were isolated and the fatty acid profiles of each class were determined using GC-FID as FAME.

PTA-10208 Final Oils

The fatty acid profiles for PTA-10208 Final Oils #1-5 are summarized in Tables 42-43, including profiles associated within the isolated TAG fraction (Tables 44-45) and the isolated sterols/DAG fraction (Tables 46-47).

Individual lipid classes in the final oils were also determined using flash chromatography (Table 48) and normal HPLC with ELSD and APCI-MS confirmation (Table 49).

TABLE 42

Fatty Acid Profiles of PTA-10208 Final Oils (mg/g)

| Fatty Acid | PTA-10208 Final Oil #1 FAME (mg/g) | PTA-10208 Final Oil #2 FAME (mg/g) | PTA-10208 Final Oil #3 FAME (mg/g) | PTA-10208 Final Oil #4 FAME (mg/g) | PTA-10208 Final Oil #5 FAME (mg/g) |
|---|---|---|---|---|---|
| C12:0 | 2.5 | 2.4 | 2.8 | 2.7 | 2.7 |
| C14:0 | 16.1 | 14.9 | 21.0 | 18.4 | 17.5 |
| C14:1 | 0.0 | 0.0 | 0.0 | 0.0 | 0.0 |
| C15:0 | 3.8 | 3.6 | 4.4 | 3.9 | 3.9 |
| C16:0 | 192.1 | 179.1 | 193.1 | 184.3 | 194.6 |
| C16:1 | 0.4 | 0.5 | 0.5 | 0.5 | 0.5 |
| C17:0 | 0.6 | 0.5 | 0.9 | 0.8 | 2.1 |
| C18:0 | 12.8 | 13.9 | 11.5 | 12.3 | 12.9 |
| C18:1 n-9 | 23.5 | 82.0 | 25.7 | 26.0 | 29.5 |
| C18:1 n-7 | 0.2 | 0.7 | 0.1 | 0.1 | 0.1 |
| C18:2 n-6 | 3.7 | 8.1 | 4.0 | 4.1 | 4.3 |
| C20:0 | 4.3 | 4.1 | 3.7 | 4.0 | 4.0 |
| C18:3 n-3 | 0.0 | 0.0 | 0.0 | 0.0 | 0.0 |
| C20:1 n-9 | <0.1 | 0.1 | <0.1 | <0.1 | <0.1 |
| C18:4 n-3 | 2.4 | 2.5 | 2.8 | 2.7 | 2.8 |
| C20:2 n-6 | 0.0 | 0.0 | 0.0 | 0.0 | 0.0 |
| C20:3 n-6 | 0.2 | 0.1 | 0.1 | 0.1 | 0.1 |
| C22:0 | 1.2 | 1.8 | 1.0 | 1.1 | 1.1 |
| C20:4 n-7 | 1.7 | 1.6 | 1.7 | 1.8 | 1.6 |
| C20:3 n-3 | 0.0 | 0.0 | 0.0 | 0.0 | 0.0 |
| C20:4 n-6 | 12.9 | 12.1 | 13.5 | 13.5 | 13.3 |
| C22:1 n-9 | 0.0 | 0.0 | 0.0 | 0.0 | 0.0 |
| C20:4 n-5 | 1.6 | 1.4 | 1.5 | 1.7 | 1.5 |
| C20:4 n-3 | 6.0 | 5.7 | 6.0 | 6.0 | 6.1 |
| C20:5 n-3 | 173.8 | 163.3 | 196.4 | 209.6 | 197.9 |
| C24:0 | 1.4 | 1.6 | 1.3 | 1.3 | 1.0 |
| C22:4 \n-9 | 0.0 | 0.0 | 0.0 | 0.0 | 0.0 |
| C24:1 n-9 | 3.4 | 3.2 | 2.3 | 2.6 | 2.3 |
| C22:5 n-6 | 14.9 | 14.0 | 14.4 | 13.0 | 12.9 |
| C22:5 n-3 | 43.9 | 41.3 | 32.8 | 40.3 | 36.9 |
| C22:6 n-3 | 394.8 | 373.7 | 373.2 | 374.3 | 364.2 |
| Sum of FAME | 918.1 | 932.2 | 914.7 | 925.1 | 914.1 |

TABLE 43

Fatty Acid Profiles of PTA-10208 Final Oils (%)

| Fatty Acid | PTA-10208 Final Oil #1 % FAME | PTA-10208 Final Oil #2 % FAME | PTA-10208 Final Oil #3 % FAME | PTA-10208 Final Oil #4 % FAME | PTA-10208 Final Oil #5 % FAME |
|---|---|---|---|---|---|
| C12:0 | 0.3 | 0.3 | 0.3 | 0.3 | 0.3 |
| C14:0 | 1.8 | 1.6 | 2.3 | 2.0 | 1.9 |
| C14:1 | 0.0 | 0.0 | 0.0 | 0.0 | 0.0 |
| C15:0 | 0.4 | 0.4 | 0.5 | 0.4 | 0.4 |
| C16:0 | 20.9 | 19.2 | 21.1 | 19.9 | 21.3 |
| C16:1 | <0.1 | <0.1 | <0.1 | <0.1 | 0.1 |
| C17:0 | 0.1 | 0.1 | 0.1 | 0.1 | 0.2 |
| C18:0 | 1.4 | 1.5 | 1.3 | 1.3 | 1.4 |
| C18:1 n-9 | 2.6 | 8.8 | 2.8 | 2.8 | 3.2 |
| C18:1 n-7 | <0.1 | 0.1 | <0.1 | <0.1 | <0.1 |
| C18:2 n-6 | 0.4 | 0.9 | 0.4 | 0.4 | 0.5 |
| C20:0 | 0.5 | 0.4 | 0.4 | 0.4 | 0.4 |
| C18:3 n-3 | 0.0 | 0.0 | 0.0 | 0.0 | 0.0 |
| C20:1 n-9 | <0.1 | <0.1 | <0.1 | <0.1 | <0.1 |
| C18:4 n-3 | 0.3 | 0.3 | 0.3 | 0.3 | 0.3 |
| C20:2 n-6 | 0.0 | 0.0 | 0.0 | 0.0 | 0.0 |
| C20:3 n-6 | <0.1 | <0.1 | <0.1 | <0.1 | <0.1 |
| C22:0 | 0.1 | 0.2 | 0.1 | 0.1 | 0.1 |
| C20:4 n-7 | 0.2 | 0.2 | 0.2 | 0.2 | 0.2 |
| C20:3 n-3 | 0.0 | 0.0 | 0.0 | 0.0 | 0.0 |
| C20:4 n-6 | 1.4 | 1.3 | 1.5 | 1.5 | 1.5 |
| C22:1 n-9 | 0.0 | 0.0 | 0.0 | 0.0 | 0.0 |
| C20:4 \n-5 | 0.2 | 0.2 | 0.2 | 0.2 | 0.2 |
| C20:4 \n-3 | 0.7 | 0.6 | 0.7 | 0.7 | 0.7 |
| C20:5 n-3 | 18.9 | 17.5 | 21.5 | 22.7 | 21.6 |
| C24:0 | 0.1 | 0.2 | 0.1 | 0.1 | 0.1 |
| C22:4 n-9 | 0.0 | 0.0 | 0.0 | 0.0 | 0.0 |
| C24:1 n-9 | 0.4 | 0.3 | 0.2 | 0.3 | 0.2 |
| C22:5 n-6 | 1.6 | 1.5 | 1.6 | 1.4 | 1.4 |
| C22:5 n-3 | 4.8 | 4.4 | 3.6 | 4.4 | 4.0 |
| C22:6 n-3 | 43.0 | 40.1 | 40.8 | 40.5 | 39.9 |

TABLE 44

Isolated TAG Fatty Acid Profiles: PTA-10208 Final Oils (mg/g)

| Fatty Acid | PTA-10208 Final Oil #1 FAME (mg/g) | PTA-10208 Final Oil #2 FAME (mg/g) | PTA-10208 Final Oil #3 FAME (mg/g) | PTA-10208 Final Oil #4 FAME (mg/g) | PTA-10208 Final Oil #5 FAME (mg/g) |
|---|---|---|---|---|---|
| C12:0 | 2.5 | 2.3 | 2.7 | 2.5 | 2.6 |
| C14:0 | 16.3 | 15.1 | 21.3 | 18.6 | 18.1 |
| C14:1 | 0.0 | 0.0 | 0.0 | 0.0 | 0.0 |
| C15:0 | 3.9 | 3.6 | 4.4 | 4.0 | 4.0 |
| C16:0 | 194.2 | 181.9 | 196.1 | 186.1 | 199.8 |
| C16:1 | 0.4 | 0.4 | 0.6 | 0.5 | 0.7 |
| C17:0 | 0.6 | 0.5 | 0.9 | 0.8 | 0.8 |
| C18:0 | 12.9 | 14.2 | 11.7 | 12.5 | 13.2 |
| C18:1 n-9 | 24.3 | 84.0 | 26.8 | 26.1 | 34.0 |
| C18:1 n-7 | 0.1 | 0.7 | 0.1 | 0.1 | 0.3 |
| C18:2 n-6 | 3.2 | 7.7 | 3.4 | 3.5 | 4.0 |
| C20:0 | 4.4 | 4.2 | 3.8 | 4.0 | 4.2 |
| C18:3 n-3 | 0.0 | 0.0 | 0.0 | 0.0 | 0.0 |
| C20:1 n-9 | <0.1 | 0.2 | <0.1 | <0.1 | 0.1 |
| C18:4 n-3 | 2.5 | 2.4 | 2.8 | 2.6 | 2.7 |
| C20:2 n-6 | 0.0 | 0.0 | 0.0 | 0.0 | 0.0 |
| C20:3 n-6 | 0.2 | 0.2 | 0.1 | 0.1 | 0.1 |
| C22:0 | 1.2 | 1.9 | 1.0 | 1.1 | 1.1 |
| C20:4 n-7 | 1.7 | 1.6 | 1.8 | 1.8 | 1.7 |
| C20:3 n-3 | 0.0 | 0.0 | 0.0 | 0.0 | 0.0 |
| C20:4 n-6 | 13.2 | 12.3 | 13.8 | 13.7 | 13.8 |
| C22:1 n-9 | 0.0 | 0.0 | 0.0 | 0.0 | 0.0 |
| C20:4 n-5 | 1.6 | 1.5 | 1.6 | 1.7 | 1.5 |
| C20:4 n-3 | 6.1 | 5.7 | 6.1 | 5.9 | 6.2 |
| C20:5 n-3 | 176.0 | 166.1 | 199.0 | 211.2 | 204.2 |
| C24:0 | 1.2 | 1.3 | 1.0 | 1.1 | 1.2 |
| C22:4 n-9 | 0.0 | 0.0 | 0.0 | 0.0 | 0.0 |
| C24:1 n-9 | 3.3 | 3.2 | 2.2 | 2.5 | 2.4 |
| C22:5 n-6 | 15.0 | 14.2 | 14.7 | 13.2 | 13.5 |

TABLE 44-continued

Isolated TAG Fatty Acid Profiles: PTA-10208 Final Oils (mg/g)

| Fatty Acid | PTA-10208 Final Oil #1 FAME (mg/g) | PTA-10208 Final Oil #2 FAME (mg/g) | PTA-10208 Final Oil #3 FAME (mg/g) | PTA-10208 Final Oil #4 FAME (mg/g) | PTA-10208 Final Oil #5 FAME (mg/g) |
|---|---|---|---|---|---|
| C22:5 n-3 | 44.4 | 42.0 | 33.3 | 40.5 | 38.3 |
| C22:6 n-3 | 397.9 | 378.4 | 376.4 | 375.5 | 375.5 |
| Sum of FAME | 926.9 | 945.7 | 925.5 | 929.6 | 944.1 |

TABLE 45

Isolated TAG Fatty Acid Profiles: PTA-10208 Final Oils (%)

| Fatty Acid | PTA-10208 Final Oil #1 % FAME | PTA-10208 Final Oil #2 % FAME | PTA-10208 Final Oil #3 % FAME | PTA-10208 Final Oil #4 % FAME | PTA-10208 Final Oil #5 % FAME |
|---|---|---|---|---|---|
| C12:0 | 0.3 | 0.2 | 0.3 | 0.3 | 0.3 |
| C14:0 | 1.8 | 1.6 | 0.3 | 0.3 | 0.3 |
| C14:1 | 0.0 | 0.0 | 0.0 | 0.0 | 0.0 |
| C15:0 | 0.4 | 0.4 | 0.5 | 0.4 | 0.4 |
| C16:0 | 20.9 | 19.2 | 21.2 | 20.0 | 21.2 |
| C16:1 | <0.1 | <0.1 | 0.1 | 0.1 | 0.1 |
| C17:0 | 0.1 | 0.1 | 0.1 | 0.1 | 0.1 |
| C18:0 | 1.4 | 1.5 | 1.3 | 1.3 | 1.4 |
| C18:1 n-9 | 2.6 | 8.9 | 2.9 | 2.8 | 3.6 |
| C18:1 n-7 | <0.1 | 0.1 | <0.1 | <0.1 | <0.1 |
| C18:2 n-6 | 0.3 | 0.8 | 0.4 | 0.4 | 0.4 |
| C20:0 | 0.5 | 0.4 | 0.4 | 0.4 | 0.4 |
| C18:3 n-3 | 0.0 | 0.0 | 0.0 | 0.0 | 0.0 |
| C20:1 n-9 | <0.1 | <0.1 | <0.1 | <0.1 | <0.1 |
| C18:4 n-3 | 0.3 | 0.3 | 0.3 | 0.3 | 0.3 |
| C20:2 n-6 | 0.0 | 0.0 | 0.0 | 0.0 | 0.0 |
| C20:3 n-6 | <0.1 | <0.1 | <0.1 | <0.1 | <0.1 |
| C22:0 | 0.1 | 0.2 | 0.1 | 0.1 | 0.1 |
| C20:4 n-7 | 0.2 | 0.2 | 0.2 | 0.2 | 0.2 |
| C20:3 n-3 | 0.0 | 0.0 | 0.0 | 0.0 | 0.0 |
| C20:4 n-6 | 1.4 | 1.3 | 1.5 | 1.5 | 1.5 |
| C22:1 n-9 | 0.0 | 0.0 | 0.0 | 0.0 | 0.0 |
| C20:4 n-5 | 0.2 | 0.2 | 0.2 | 0.2 | 0.2 |
| C20:4 n-3 | 0.7 | 0.6 | 0.7 | 0.6 | 0.7 |
| C20:5 n-3 | 19.0 | 17.6 | 21.5 | 22.7 | 21.6 |
| C24:0 | 0.1 | 0.1 | 0.1 | 0.1 | 0.1 |
| C22:4 n-9 | 0.0 | 0.0 | 0.0 | 0.0 | 0.0 |
| C24:1 n-9 | 0.4 | 0.3 | 0.2 | 0.3 | 0.3 |
| C22:5 n-6 | 1.6 | 1.5 | 1.6 | 1.4 | 1.4 |
| C22:5 n-3 | 4.8 | 4.4 | 3.6 | 4.4 | 4.1 |
| C22:6 n-3 | 42.9 | 40.0 | 40.7 | 40.4 | 39.8 |

TABLE 46

Isolated Sterols/DAG Fatty Acid Profiles: PTA-10208 Final Oils (mg/g)

| Fatty Acid | PTA-10208 Final Oil #1 FAME (mg/g) | PTA-10208 Final Oil #2 FAME (mg/g) | PTA-10208 Final Oil #3 FAME (mg/g) | PTA-10208 Final Oil #4 FAME (mg/g) | PTA-10208 Final Oil #5 FAME (mg/g) |
|---|---|---|---|---|---|
| C12:0 | 1.9 | 2.1 | 2.9 | 2.1 | 1.9 |
| C14:0 | 9.9 | 9.5 | 9.7 | 10.3 | 8.0 |
| C14:1 | 0.0 | 0.0 | 0.0 | 0.0 | 0.0 |
| C15:0 | 2.4 | 2.3 | 2.2 | 2.3 | 2.0 |
| C16:0 | 132.6 | 128.6 | 110.1 | 116.8 | 106.4 |
| C16:1 | 0.2 | 0.3 | <0.1 | 0.3 | 0.4 |
| C17:0 | 0.3 | 0.2 | 0.3 | 0.3 | 0.3 |
| C18:0 | 7.3 | 8.1 | 6.4 | 6.8 | 6.1 |
| C18:1 n-9 | 15.0 | 55.1 | 47.4 | 19.0 | 30.1 |
| C18:1 n-7 | 0.4 | 0.7 | 0.1 | <0.1 | 0.2 |
| C18:2 n-6 | 13.1 | 16.7 | 21.6 | 13.5 | 18.4 |
| C20:0 | 2.0 | 2.1 | 1.2 | 1.8 | 1.4 |
| C18:3 n-3 | 0.0 | 0.0 | 0.0 | 0.0 | 0.0 |
| C20:1 n-9 | <0.1 | <0.1 | <0.1 | <0.1 | <0.1 |
| C18:4 n-3 | 2.3 | 2.4 | 2.4 | 2.4 | 2.0 |
| C20:2 n-6 | 0.0 | 0.0 | 0.0 | 0.0 | 0.0 |
| C20:3 n-6 | <0.1 | <0.1 | <0.1 | <0.1 | <0.1 |

TABLE 46-continued

Isolated Sterols/DAG Fatty Acid Profiles: PTA-10208 Final Oils (mg/g)

| Fatty Acid | PTA-10208 Final Oil #1 FAME (mg/g) | PTA-10208 Final Oil #2 FAME (mg/g) | PTA-10208 Final Oil #3 FAME (mg/g) | PTA-10208 Final Oil #4 FAME (mg/g) | PTA-10208 Final Oil #5 FAME (mg/g) |
|---|---|---|---|---|---|
| C22:0 | 0.6 | 1.0 | 0.5 | 0.6 | 0.5 |
| C20:4 n-7 | 0.8 | 0.9 | 2.1 | 0.9 | 0.7 |
| C20:3 n-3 | 0.0 | 0.0 | 0.0 | 0.0 | 0.0 |
| C20:4 n-6 | 5.7 | 5.8 | 4.8 | 6.1 | 4.5 |
| C22:1 n-9 | 0.0 | 0.0 | 0.0 | 0.0 | 0.0 |
| C20:4 n-5 | <0.1 | <0.1 | <0.1 | 0.6 | <0.1 |
| C20:4 n-3 | 2.7 | 2.7 | 2.1 | 2.7 | 2.0 |
| C20:5 n-3 | 92.9 | 94.5 | 91.9 | 111.6 | 84.8 |
| C24:0 | 1.2 | 1.3 | 1.1 | 1.1 | 1.3 |
| C22:4 n-9 | 0.0 | 0.0 | 0.0 | 0.0 | 0.0 |
| C24:1 n-9 | 1.9 | 2.0 | 1.2 | 1.5 | 1.2 |
| C22:5 n-6 | 7.8 | 8.0 | 6.7 | 7.0 | 5.5 |
| C22:5 n-3 | 22.2 | 22.9 | 13.9 | 20.7 | 14.2 |
| C22:6 n-3 | 246.3 | 252.7 | 223.5 | 240.3 | 196.3 |
| Sum of FAME | 569.3 | 619.8 | 552.1 | 568.7 | 488.2 |

TABLE 47

Isolated Sterols/DAG Fatty Acid Profiles: PTA-10208 Final Oils (%)

| Fatty Acid | PTA-10208 Final Oil #1 % FAME | PTA-10208 Final Oil #2 % FAME | PTA-10208 Final Oil #3 % FAME | PTA-10208 Final Oil #4 % FAME | PTA-10208 Final Oil #5 % FAME |
|---|---|---|---|---|---|
| C12:0 | 0.3 | 0.3 | 0.5 | 0.4 | 0.4 |
| C14:0 | 1.7 | 1.5 | 1.8 | 1.8 | 1.6 |
| C14:1 | 0.0 | 0.0 | 0.0 | 0.0 | 0.0 |
| C15:0 | 0.4 | 0.4 | 0.4 | 0.4 | 0.4 |
| C16:0 | 23.3 | 20.8 | 19.9 | 20.5 | 21.8 |
| C16:1 | <0.1 | <0.1 | <0.1 | <0.1 | 0.1 |
| C17:0 | 0.0 | 0.0 | 0.1 | 0.1 | 0.1 |
| C18:0 | 1.3 | 1.3 | 1.2 | 1.2 | 1.2 |
| C18:1 n-9 | 2.6 | 8.9 | 8.6 | 3.3 | 6.2 |
| C18:1 n-7 | 0.1 | 0.1 | <0.1 | <0.1 | <0.1 |
| C18:2 n-6 | 2.3 | 2.7 | 3.9 | 2.4 | 3.8 |
| C20:0 | 0.4 | 0.3 | 0.2 | 0.3 | 0.3 |
| C18:3 n-3 | 0.0 | 0.0 | 0.0 | 0.0 | 0.0 |
| C20:1 n-9 | <0.1 | <0.1 | <0.1 | <0.1 | <0.1 |
| C18:4 n-3 | 0.4 | 0.4 | 0.4 | 0.4 | 0.4 |
| C20:2 n-6 | 0.0 | 0.0 | 0.0 | 0.0 | 0.0 |
| C20:3 n-6 | <0.1 | <0.1 | <0.1 | <0.1 | <0.1 |
| C22:0 | 0.1 | 0.2 | 0.1 | 0.1 | 0.1 |
| C20:4 n-7 | 0.1 | 0.1 | 0.4 | 0.2 | 0.1 |
| C20:3 n-3 | 0.0 | 0.0 | 0.0 | 0.0 | 0.0 |
| C20:4 n-6 | 1.0 | 0.9 | 0.9 | 1.1 | 0.9 |
| C22:1 n-9 | 0.0 | 0.0 | 0.0 | 0.0 | 0.0 |
| C20:4 n-5 | <0.1 | <0.1 | <0.1 | 0.1 | <0.1 |
| C20:4 n-3 | 0.5 | 0.4 | 0.4 | 0.5 | 0.4 |
| C20:5 n-3 | 16.3 | 15.2 | 16.6 | 19.6 | 17.4 |
| C24:0 | 0.2 | 0.2 | 0.2 | 0.2 | 0.3 |
| C22:4 n-9 | 0.0 | 0.0 | 0.0 | 0.0 | 0.0 |
| C24:1 n-9 | 0.3 | 0.3 | 0.2 | 0.3 | 0.2 |
| C22:5 n-6 | 1.4 | 1.3 | 1.2 | 1.2 | 1.1 |
| C22:5 n-3 | 3.9 | 3.7 | 2.5 | 3.6 | 2.9 |
| C22:6 n-3 | 43.3 | 40.8 | 40.5 | 42.3 | 40.2 |

TABLE 48

Lipid class separation by flash chromatography (wt %)

| Lipid Class Separation | PTA-10208 Final Oil #1 | PTA-10208 Final Oil #2 | PTA-10208 Final Oil #3 | PTA-10208 Final Oil #4 | PTA-10208 Final Oil #5 |
|---|---|---|---|---|---|
| TAG | 93.4 | 95.4 | 94.0 | 95.7 | 95.1 |
| Sterols/DAG | 3.1 | 2.9 | 2.6 | 3.0 | 2.9 |
| Recovery (%) | 96.5 | 98.3 | 96.6 | 98.7 | 98.0 |

TABLE 49

Lipid class separation by HPLC-ELSD (wt %)

| | Sterol Esters | TAG | FFA | Sterols | 1,3-DAG | 1,2-DAG | MAG | Total |
|---|---|---|---|---|---|---|---|---|
| PTA-10208 Final Oil #1 | 0.4 | 90.8 | ND | 0.8 | 0.5 | 0.5 | N.D. | 93.0 |
| PTA-10208 Final Oil #2 | 0.4 | 88.5 | ND | 0.6 | 0.6 | 0.6 | N.D. | 90.7 |
| PTA-10208 Final Oil 43 | 0.3 | 89.4 | ND | 0.8 | 0.6 | 0.5 | N.D. | 91.6 |
| PTA-10208 Final Oil #4 | 0.3 | 88.0 | ND | 0.8 | 0.5 | 0.5 | N.D. | 90.1 |
| PTA-10208 Final Oil #5 | 0.3 | 86.3 | ND | 0.7 | 0.8 | 0.5 | N.D. | 88.6 |
| PTA-10208 Final Oil #16 | 0.36 | 100.76 | ND | 0.84 | 0.54 | 0.61 | N.D. | 103.11 |

ND = Not Detected

PTA-10212 Final Oil

DHA was present in a PTA-10212 Final Oil at 41.63% and 366.9 mg/g, while EPA was present at 16.52%. Individual fatty acid profiles were determined and are summarized in Table 50.

TABLE 50

Fatty Acid Profiles of PTA-10212 Final Oil (% FAME)

| Fatty Acid | % FAME |
|---|---|
| C6:0 | ND |
| C7:0 | ND |
| C8:0 | ND |
| C9:0 | ND |
| C10:0 | ND |
| C11:0 | ND |
| C12:0 | ND |
| C13:0 | ND |
| C14:0 | 0.84 |
| C14:1 | ND |
| C15:0 | 1.33 |
| C16:0 | 27.09 |
| C16:1 | 1.03 |
| C17:0 | 0.34 |
| C17:1 | ND |
| C18:0 | 1.26 |
| C18:1 n-9 | 2.14 |
| C18:1 n-7 | 0.18 |
| C19:0 | ND |
| C18:2 n-6 | 0.58 |
| C20:0 | 0.32 |
| C18:3 n-3 | ND |
| C20:1 n-9 | ND |
| C18:3 n-6 | ND |
| C20:2 n-6 | 0.26 |
| C20:3 n-6 | ND |
| C22:0 | 0.14 |
| C20:3 n-3 | ND |
| C20:4 n-6 | 1.34 |
| C22:1 n-9 | ND |
| C23:0 | ND |
| C20:5 n-3 | 16.53 |
| C24:0 | 0.53 |
| C24:1 n-9 | ND |
| C22:5 n-6 | 1.50 |
| C22:5 n-3 | 1.30 |
| C22:6 n-3 | 41.63 |
| Unknown | 0.87 |

ND = Not Detected

Example 38

A two-day old inoculum flask of the isolated microorganisms deposited under ATCC Accession Nos. PTA-10208 and 10212 was prepared as a carbon and nitrogen-fed culture in media according to Tables 30 and 31.

Mutagenesis was carried out according to following procedure:

A sterile T=2 day old flask, approximately 50 ml, was poured into a sterile 40 ml glass homogenizer. The culture received 50 plunges in the homogenizer. The culture was pipetted out and filtered through a sterile 50 micron mesh filter, which was placed in a 50 ml sterile tube (the mesh was used as a means of retaining the larger clumps of colonies while letting the smaller clusters and single cells pass through the 50 micron mesh.). The entire concentrated macerate was collected in a sterile 50 ml tube. The macerated culture was vortexed and dilutions at levels up to 1:100 fold were made. The diluted macerate samples were vortexed prior to adding 200 µl of inoculum to a media agar plate, 100×15 mm, containing 4-5 glass beads (3 mm glass beads). Each plate was gently agitated in an effort to have the beads spread the inoculum evenly around the plate. Beads were dumped off of plates and plates were left to sit with covers on for approximately 5 minutes to dry. Lights in both the sterile hood and adjoining areas were turned off as the procedure was performed in dim light. There was minimal light available to be able to run the procedure but only indirect and dim.

Five replicate plates were placed on the floor of the XL crosslinker (Spectronics Corporation, New York) with the lids off while the samples were irradiated. The crosslinker delivered power in terms of microjoules and a level was sought that achieved a 90%-95% Kill. Five replicate control plates were inoculated with un-mutagenized cells using the same protocol. These cell counts were used to calculate the % Kill. Once the irradiation was finished the plates were taken out, the lids were replaced, and the plates were wrapped in parafilm followed by a wrap in aluminum foil. It was imperative that the plates grew for the first week in the dark so that they were not able to repair the damaged genes.

Plates were placed in a 22.5° C. room for about 10 days prior to counting the colonies. When final counts were made, individual colonies were picked with a sterile inoculating loop and re-streaked on new media plates. Each colony was plated on an individual plate. As plates grew dense a sample was taken, using a inoculating loop, and inoculated into a sterile 250 ml shake flask containing 50 ml of media. This flask was placed on a shaker at 200 rpm in a 22.5° C. room. On T=7 days the shake flask culture was harvested into a 50 ml sterile tube. The pH was taken and the sample was centrifuged to collect the biomass pellet. Each sample was rinsed and re-suspended in a 50:50 mixture of isopropyl alcohol and distilled water prior to being re-centrifuged. The collected pellet was freeze dried, weighed, and a FAME analysis was performed. The data in Tables 51 and 52 represents mutants produced with the above process from strains PTA-10208 and PTA-10212, respectively.

TABLE 51

PTA-10208 Mutants

| Fatty Acids | control PTA-10208 | Mutant 1 PTA-10209 | Mutant 2 PTA-10210 | Mutant 3 PTA-10211 |
|---|---|---|---|---|
| % 08:0 | 0.00 | 0.00 | 0.00 | 0.00 |
| % 09:0 | 0.00 | 0.00 | 0.00 | 0.00 |
| % 10:0 | 0.00 | 0.00 | 0.00 | 0.00 |
| % 11:0 | 0.00 | 0.00 | 0.00 | 0.00 |
| % 11:1 | 0.00 | 0.00 | 0.00 | 0.00 |
| % 12:0 | 0.11 | 0.10 | 0.22 | 0.19 |
| % 12:1 | 0.00 | 0.00 | 0.00 | 0.00 |
| % 13:0 | 0.19 | 0.19 | 0.15 | 0.16 |
| % 13:1 | 0.00 | 0.00 | 0.00 | 0.00 |
| % 14:0 | 1.94 | 1.82 | 2.98 | 2.59 |
| % 14:1 | 0.00 | 0.00 | 0.00 | 0.00 |
| % 15:1 | 2.66 | 2.22 | 1.76 | 1.66 |
| % 16:0 | 24.87 | 24.97 | 23.71 | 25.01 |
| % 16:1 | 0.20 | 0.25 | 0.07 | 0.07 |
| % 16:2 | 0.00 | 0.00 | 0.00 | 0.00 |
| % 16:3 | 0.00 | 0.00 | 0.00 | 0.00 |
| % 17:0 | 1.49 | 1.21 | 0.62 | 0.66 |
| % 18:0 | 1.13 | 1.14 | 0.91 | 1.01 |
| % 18:1 n-9 | 0.07 | 0.07 | 0.06 | 0.06 |
| % 18:1 n-7 | 0.00 | 0.00 | 0.00 | 0.00 |
| % 18:2 | 0.00 | 0.00 | 0.00 | 0.00 |
| % 18:3 n-6 | 0.00 | 0.00 | 0.05 | 0.04 |
| % 18:3 n-3 | 0.09 | 0.08 | 0.17 | 0.14 |
| % 18:4 n-3 | 0.00 | 0.00 | 0.00 | 0.00 |
| % 20:0 | 0.31 | 0.33 | 0.24 | 0.30 |
| % 20:1 n-9 | 0.00 | 0.04 | 0.00 | 0.00 |
| % 20:2 | 0.00 | 0.00 | 0.05 | 0.00 |
| % 20:3 n-9 | 0.00 | 0.00 | 0.00 | 0.00 |
| % 20:3 n-6 | 0.12 | 0.13 | 0.08 | 0.04 |
| % 20:3 n-3 | 0.42 | 0.42 | 0.08 | 0.06 |
| % 20:4 ARA | 0.68 | 0.67 | 1.44 | 1.11 |
| % 20:5 n-3 EPA | 6.56 | 6.47 | 11.99 | 9.87 |
| % 22:0 | 0.07 | 0.07 | 0.06 | 0.07 |
| % 22:1 | 0.00 | 0.00 | 0.00 | 0.00 |
| % 22:2 | 0.11 | 0.09 | 0.10 | 0.08 |
| % 22:3 | 0.00 | 0.00 | 0.00 | 0.00 |
| % 22:4 n-6 | 0.00 | 0.00 | 0.00 | 0.00 |
| % 22:5 n-6 | 2.32 | 2.36 | 2.36 | 2.36 |
| % 22:5 n-3 | 0.48 | 0.66 | 0.66 | 0.52 |
| % 22:6 n-3 DHA | 51.58 | 52.27 | 48.17 | 49.35 |
| % 24:0 | 0.00 | 0.00 | 0.00 | 0.00 |
| % 24:1 | 0.00 | 0.00 | 0.00 | 0.00 |
| % Fat | 47.87 | 49.41 | 66.00 | 63.12 |
| % Unknown | 4.61 | 4.45 | 4.07 | 4.64 |

TABLE 52

PTA-10212 Mutants

| Fatty Acids | Control PTA-10212 | Mutant 1 PTA-10213 | Mutant 2 PTA-10214 | Mutant 3 PTA-10215 |
|---|---|---|---|---|
| % 08:0 | 0.00 | 0.00 | 0.00 | 0.00 |
| % 09:0 | 0.00 | 0.00 | 0.00 | 0.00 |
| % 10:0 | 0.00 | 0.00 | 0.00 | 0.00 |
| % 11:0 | 0.00 | 0.00 | 0.00 | 0.00 |
| % 11:1 | 0.00 | 0.00 | 0.00 | 0.00 |
| % 12:0 | 0.00 | 0.00 | 0.00 | 0.00 |
| % 12:1 | 0.00 | 0.00 | 0.00 | 0.00 |
| % 13:0 | 0.00 | 0.00 | 0.21 | 0.20 |
| % 13:1 | 0.00 | 0.00 | 0.00 | 0.00 |
| % 14:0 | 0.68 | 0.77 | 0.62 | 0.97 |
| % 14:1 | 0.00 | 0.00 | 0.00 | 0.00 |
| % 15:1 | 0.00 | 0.00 | 0.00 | 0.00 |
| % 16:0 | 17.36 | 19.94 | 15.27 | 23.61 |
| % 16:1 | 1.45 | 2.33 | 1.40 | 2.57 |
| % 16:2 | 0.00 | 0.00 | 0.00 | 0.00 |
| % 16:3 | 0.00 | 0.00 | 0.00 | 0.00 |
| % 17:0 | 0.20 | 0.21 | 0.18 | 0.27 |
| % 18:0 | 0.78 | 0.82 | 0.79 | 0.81 |
| % 18:1 n-9 | 0.00 | 0.00 | 0.00 | 0.00 |
| % 18:1 n-7 | 0.18 | 0.27 | 0.20 | 0.19 |
| % 18:2 | 0.00 | 0.00 | 0.00 | 0.00 |
| % 18:3 n-6 | 0.00 | 0.00 | 0.00 | 0.00 |
| % 18:3 n-3 | 0.00 | 0.00 | 0.00 | 0.00 |
| % 18:4 n-3 | 0.00 | 0.00 | 0.00 | 0.00 |
| % 20:0 | 0.00 | 0.00 | 0.00 | 0.00 |
| % 20:1 n-9 | 0.00 | 0.00 | 0.00 | 0.00 |
| % 20:2 | 0.00 | 0.00 | 0.00 | 0.00 |
| % 20:3 n-9 | 0.00 | 0.00 | 0.00 | 0.00 |
| % 20:3 n-6 | 0.00 | 0.00 | 0.00 | 0.00 |
| % 20:3 n-3 | 0.90 | 0.77 | 0.99 | 0.66 |
| % 20:4 ARA | 1.43 | 1.32 | 1.65 | 0.72 |
| % 20:5 n-3 EPA | 13.33 | 14.93 | 14.14 | 8.54 |
| % 22:0 | 0.00 | 0.00 | 0.00 | 0.00 |
| % 22:1 | 0.00 | 0.00 | 0.00 | 0.00 |
| % 22:2 | 0.00 | 0.00 | 0.00 | 0.00 |
| % 22:3 | 0.00 | 0.00 | 0.00 | 0.00 |
| % 22:4 n-6 | 0.00 | 0.00 | 0.00 | 0.00 |
| % 22:5 n-6 | 2.39 | 1.95 | 2.59 | 2.18 |
| % 22:5 n-3 | 0.73 | 0.79 | 0.80 | 0.68 |
| % 22:6 n-3 DHA | 59.18 | 54.31 | 59.89 | 56.39 |
| % 24:0 | 0.00 | 0.00 | 0.00 | 0.00 |
| % 24:1 | 0.00 | 0.00 | 0.00 | 0.00 |
| % Fat | 45.69 | 38.08 | 42.88 | 48.48 |
| % Unknown | 1.38 | 1.58 | 1.27 | 2.19 |

Example 39

Two cell broths (approximately 13.3 kg) containing microbial cells (*Schizochytrium*) were heated to 60° C. in a 20 liter fermentor. The fermentor had two 6-blade Rushton impellers having a diameter of 15 cm. The top impeller was positioned at the 12 liter mark and the bottom impeller was positioned 10 cm below the top impeller. The first cell broth was continuously agitated at 307 centimeters/second. The second cell broth was continuously agitated at 464 centimeters/second. Enzymes (i.e., Alcalase 2.4 L FG 0.5%) were added to the cell biomass to lyse the cells and form an emulsified lysed cell composition. The emulsified lysed cell composition was first treated with a base (NaOH, 250 kg of 50% w/w solution) until the pH of the lysed cell composition was from 10.4 to 10.6. Next, a salt (solid NaCl, in an amount of 2%, by weight, of the lysed cell composition) was added to the lysed cell composition. The lysed cell composition was then heated to a temperature of 90° C. and held at that temperature level for 20 hours. A sample of each cell broth was taken and the pH was adjusted to 8.0 and placed in 50 ml test tubes. The test tubes were centrifuged and the oil extraction data was measured. The oil extraction data is provided in Table 53.

TABLE 53

Results from extraction testing in 50 mL tubes at pH 8.0.

| Wet broth tested for Extraction (g) | Mass of Oil Recovered (g) | % yield (oil/broth) | % yield (oil/solids)* |
|---|---|---|---|
| 307 centimeters/second | | | |
| 49.990 | 3.881 | 7.76 | 27.81 |
| 50.814 | 2.747 | 5.41 | 19.36 |
| 50.772 | 2.418 | 4.76 | 17.05 |
| 464 centimeters/second | | | |
| 51.154 | 7.067 | 13.81 | 49.13 |
| 51.092 | 7.055 | 13.81 | 49.11 |
| 50.132 | 6.606 | 13.18 | 46.86 |

*based on solids content of untreated pasteurized broth

The data provided in Table 53 demonstrates that the higher agitation speed resulted in a greater mass of oil recovered, a greater % yield of oil from the broth, and a greater % yield of oil from the solids content of the untreated pasteurized broth.

CONCLUSION

All of the various embodiments or options described herein can be combined in any and all variations. While the invention has been particularly shown and described with reference to some embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above described exemplary embodiments, but should be defined only in accordance with the following claims and their equivalents.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A process for obtaining a lipid from a cell composition, comprising:
   (a) lysing a cell of said cell composition to form a lysed cell composition;
   (b) demulsifying said lysed cell composition to form a demulsified cell composition, wherein the demulsifying comprises contacting said lysed cell composition with a first base to raise the pH of the lysed cell composition to 8 and further comprising contacting the lysed cell composition with a second base to raise the pH of the lysed cell composition to 8 or above to demulsify the cell composition;
   (c) separating said lipid from the demulsified cell composition; and
   (d) harvesting said lipid;
   wherein (b) comprises heating said lysed cell composition to a temperature of at least 70° C.

2. The process of claim 1, wherein (b) further comprises contacting said lysed cell composition with a salt.

3. The process of claim 2, wherein the salt is added in an amount of 0.1% to 20% by weight of the lysed cell composition.

4. The process of claim 2, wherein the salt is selected from the group consisting of alkali metal salts, alkali earth metal salts, sulfate salts, and combinations thereof.

5. The process of claim 1, comprising washing the cell or cell composition prior to lysing the cell.

6. The process of claim 1, comprising pasteurizing the cell or cell composition prior to lysing the cell.

7. The process of claim 1, step (a) further comprising concentrating the lysed cell composition.

8. A lipid obtained by the process of claim 1, the lipid comprising at least 35% by weight docosahexaenoic acid, at least 20% by weight eicosapentaenoic acid and less than 5% by weight each of arachidonic acid, docosapentaenoic acid n-6, oleic acid, linoleic acid, linolenic acid, eicosenoic acid, erucic acid, and stearidonic acid.

9. The lipid of claim 8, wherein the lipid has an anisidine value of 26 or less.

10. The lipid of claim 8, wherein the lipid has a phosphorus content of 100 ppm or less.

11. The lipid of claim 8, wherein the lipid has a peroxide value of 5 or less.

12. The lipid of claim 8, wherein the lipid has a peroxide value of 5 or less.

13. The lipid of claim 8, wherein the lipid is a crude oil.

14. The process of claim 1, wherein (b) comprises heating said lysed cell composition to a temperature of from 70° C. to 100° C.

15. The process of claim 1, wherein (b) comprises agitating the lysed cell composition to demulsify the cell composition.

16. The process of claim 1, wherein (a) comprises adding a salt to said cell composition.

17. The process of claim 1, wherein (a) comprises raising the pH of said cell composition to 8 or above to lyse the cell composition.

18. The process of claim 1, wherein the lysed cell composition is in the form of an oil-in-water emulsion comprising a mixture of a continuous aqueous phase and a dispersed lipid phase.

19. The process of claim 1, wherein (c) comprises centrifuging the demulsified cell composition.

20. The process of claim 1, wherein the lipid is a crude lipid.

21. The process of claim 20, further comprising (e) refining said crude lipid to obtain a refined lipid.

22. The process of claim 1, wherein said lipid has an anisidine value of 26 or less.

23. The process of claim 1, wherein said lipid has a peroxide value of 5 or less.

24. The process of claim 1, wherein said cell is a microbial cell.

25. The process of claim 24, wherein said microbial cell is of the genus *Thraustochytrium, Schizochytrium*, or mixtures thereof.

26. The process of claim 1, wherein said lipid comprises omega 3 and/or omega-6 polyunsaturated fatty acids.

27. The process of claim 1, wherein said lipid comprises at least one of DHA, DPA(n-3), DPA(n-6), EPA, and ARA.

28. The process of claim 1, wherein an organic solvent is not added to said cell composition, said lysed cell composition, or said lipid in an amount or concentration sufficient to extract said lipid from said cell.

29. The process of claim 1, wherein the lipid contains less than 5% by weight of an organic solvent.

30. The process of claim 21, wherein refining is selected from the group consisting of caustic refining, degumming, acid treatment, alkali treatment, cooling, heating, bleaching, deodorizing, deacidification, and combinations thereof.

* * * * *